US006600742B1

(12) United States Patent
Hiromori et al.

(10) Patent No.: US 6,600,742 B1
(45) Date of Patent: Jul. 29, 2003

(54) ADD-DROP MULTIPLEXER IN AN SDH TRANSMISSION UNIT

(75) Inventors: Masaki Hiromori, Osaka (JP); Seiji Matsuzaki, Osaka (JP); Hiroyuki Matsuo, Osaka (JP); Hirokazu Ito, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/340,598

(22) Filed: Jun. 28, 1999

(30) Foreign Application Priority Data

Nov. 30, 1998 (JP) ........................................ 10-340327

(51) Int. Cl.[7] ........................ H04L 12/50; H04Q 11/00

(52) U.S. Cl. ..................................... 370/376; 370/388

(58) Field of Search ............................... 370/376, 434, 370/228, 388

(56) References Cited

U.S. PATENT DOCUMENTS 5,283,785 A * 2/1994 Ferguson .................... 370/376
5,490,142 A * 2/1996 Hurlocker .................... 370/476
5,497,363 A * 3/1996 Gingell ........................ 370/376
5,586,115 A * 12/1996 Nakano et al. ............. 370/376
5,740,169 A * 4/1998 Eames ......................... 370/376
6,038,044 A * 3/2000 Fee et al. .................... 359/110
6,295,146 B1 * 9/2001 Nathan et al. .............. 370/224

* cited by examiner

*Primary Examiner*—Chau Nguyen
*Assistant Examiner*—Keith M. George
(74) *Attorney, Agent, or Firm*—Katten Muchin Zavis Rosenman

(57) ABSTRACT

In an SDH transmission unit, a tributary block includes a plurality of routing blocks for accommodating low speed line signals of a predetermined capacity and performing line selection processing of the low speed line signals to be interfaced with a high speed block in accordance with a form of a tributary network. The form of the tributary network includes various line speeds and network configurations. At least one of the routing blocks serves, when the low speed line signals accommodated therein do not fully occupy the predetermined capacity, as a master block which accommodates at least one of the other routing blocks as a slave block in order to accommodate the low speed line signals accommodated in the other routing block.

10 Claims, 103 Drawing Sheets

ADD-DROP MULTIPLEXER IN AN SDH TRANSMISSION UNIT

BACKGROUND OF THE INVENTION

1) Field of the Invention

This invention relates to an SDH transmission unit for use with a network based on an SDH (Synchronous Digital Hierarchy) transmission system, and more particularly to an SDH transmission unit having a function as an ADM (Add-Drop Multiplexer).

2) Description of the Related Art

In an SDH transmission network (called SONET (Synchronous Optical Network) in the North America), high speed (source) networks which handle transmission (signal) frames of a predetermined transmission capacity (rate) of OC-N [Optical Carrier-level N: N=192 (approximately 10 Gb/s)/48 (approximately 2.4 Gb/s)/12 (approximately 600 Mb/s) and so forth) are implemented at present, and as a network application (network configuration) of it, for example, such terminal/linear, regenerator, ring [UPSR (Unidirectional Path Switched Ring)/BLSR (Bidirectional Line Switched Ring)] as shown in FIGS. 47 to 49 are available.

Referring to FIGS. 47 to 49, an ADM (SDH transmission unit) 100 having a main function of time slot assignment (TSA) of performing Add/Drop/Through processing in accordance with a line (signal) unit mapped to an OC-N signal frame mentioned above uses functions corresponding to such various applications as mentioned above so that the various applications can be applied by the single unit.

Where, for example, a high speed side line (OC-N) has a ring (UPSR) configuration as shown in FIG. 50, an ADM (node A) handles (accommodates) a line capacity for a sum total (=N channels) of channels (STS-1×n) allocated to communication among nodes (stations) B, C and D on the ring, and adds the same signal to signals in the EAST/WEST directions of the ring or selects one of same signals sent from the EAST/WEST directions to the ADM (node A) as a termination side node with respect to the node C which has a higher line quality and drops a pertaining signal channel (low speed line signal) to the low speed line (tributary) side.

A tributary block (TB) which performs processing of low speed side lines (OC-N/4, N/16, N/64 and so forth) can apply various applications such as a ring configuration similar to that on the high speed line side described above and a 1+1 redundancy configuration of the work/protection systems. Therefore, the TB is constructed taking an interface between various functioning boards (units) into consideration which is used to satisfy accommodation compatibility of interface (IF) units corresponding to various transmission levels (capacities) or applications.

In particular, for example, as shown in FIG. 51, a TB 200 has a plurality of IF units (IF boards (cards)) 300 for performing production/termination processing of OC-n transmission frames corresponding to various transmission levels (OC-n: when n<N and N=192, for example, n=48/12/3 and so forth) of low speed side lines. Where the IF boards 300 accommodate low speed lines (tributary networks) of a 1+1 redundancy configuration, they are used for work units/protect units, but where the IF boards 300 accommodate low speed lines of a ring configuration, they are used for EAST/WEST side transmission units.

Each of the IF boards 300 includes, for a transmission line (line: OC-n level) input signal, an O/E (opto-electric) conversion section 301, a frame synchronism protection section 302, a descrambling section 303, an SOH reception processing section 304, a byte demultiplexing section 305, a supervision section 306 for various alarms such as an AIS and transfers a signal demultiplexed from a received OC-n transmission frame to a routing block (RB) 400 which is positioned in the next stage and performs low speed side line time slot assignment.

On the contrary, each of the IF boards 300 includes, for a signal transferred from the RB 400 after low speed side time slot assignment (Add assignment), a byte multiplexing section 307, an SOH insertion section 308, a scrambling section 309, an E/O conversion section 310, a BIP (Bit Interleaved Parity) processing section 311 and so forth and performs multiplexing of the Add assigned signal into a transmission frame (OC-n level), addition of an SOH to the multiplexed transmission frame, scramble coding, E/O conversion and so forth to produce a transmission line (OC-n level) output signal.

It is to be noted that the RB 400 performs switching operations (switching/bridging and so forth) of the low speed side lines suitable for the various applications described above. For example, the RB 400 has a function 40*a* of performing, where the 1+1 redundancy configuration is employed, a line switching (line selection) process in accordance an APS (Automatic Protection Switch) protocol for a transmission line, but performing, where the ring (UPSP) configuration is employed on the OC-n described above, selection processing of signals in the EAST/WEST directions. The RB 400 further has a time slot assignment (Add/Drop/Through: TSA) function 40*b* for low speed side lines. Consequently, the RB 400 can cope with various applications to the low speed side lines and allows connection to a high speed side line (high speed block 500).

The high speed block (HB) 500 includes an interface section 501 for interfacing with the high speed line side (a high speed circuit signal), and a TSA function 502 for performing time slot assignment (Add/Drop/Through) on the high speed line side and accommodates the low speed side lines by means of the TB 200 (RB 400) However, since the number of accommodated slots for the IF boards (cards) 300 (the number of the IF boards (cards) 300) for the low speed side lines (OC-n) which can be accommodated in one TB 200 (RB 400) has a physical restriction, for example, a plurality of (m) RBs 400 are accommodated for the high speed side line capacity (N channels) as shown in FIG. 52 so that all of the high speed side lines (for N channels) are accommodated in all of the RBs 400.

For example, if the high speed side lines have a ring configuration (UPSR) which handles signals (transmission frames) of the OC-192 (10 Gb/s) level, then the HB 500 is constructed with a signal processing capability of the OC-192 (10 Gb/s) capacity, and, for example, four RBs 400 having a signal processing capability of the OC-48 (2.4 Gb/s) level are accommodated in the HB 500. Further, four IF boards 300 are accommodated in each of the RBs 400 if the IF boards 300 are for the OC-12 (600 Mb/s) level, but one IF board 300, which is one fourth that in the case just described, is accommodated in each of the RBs 400 if the IF board 300 is for the OC-48 (2.4 Gb/s) level.

In short, a number of IF boards 300 corresponding to a transmission level applied to the low speed side lines equal to the number of slots corresponding to the processing capability (capacity) of the TB 200 (RB 400) are allocated to the TB 200 (RB 400). If it is assumed that the total signal capacity when the IF boards 300 for the OC-n level are accommodated in the full slots is the processing capacity of the TB 200, then when the IF boards 300 for the OC-(n×4) level are accommodated, the number of slots in which IF boards 300 are accommodated is reduced to one fourth, thereby providing compatibility in mounting of various IF boards 300.

In particular, the ADM 100 described above is designed with the OC-n level set as a basic transmission level taking accommodation compatibility of the IF boards 300 for various transmission levels in the TBs 200 and the signal capacity for the high speed side lines (HB 500) (the processing capacity of the TBs 200) into consideration.

However, the ADM 100 described above has a subject to be solved in that, if IF boards 300 having a capacity smaller than the basic transmission capacity OC-n (for example, a capacity of an OC-n/4 or the like) are accommodated in a TB 200, then this directly results in reduction of the processing capacity of the TB 200.

For example, such an instance as shown in FIG. 54 is considered wherein the low speed side lines have a redundancy configuration (1+1 configuration having work lines/protection lines), and in a full slot accommodation condition, L IF boards 300 of OC-n for the work lines/protection lines (which are used for the EAST/WEST where a ring configuration is employed) are accommodated (mounted) in each of the TBs 200 (only two are shown in FIG. 54).

In this instance, while the total capacity of signals inputted to one RB 400 is OC-n×L×2 (in the case of FIG. 53, 4.8 Gb/s because n=12 and L=4), by a work/protection selection (APS) function, a transmission capacity equal to one half that mentioned above (OC-n×L: in the case of FIG. 53, 2.4 Gb/s) is selected by the RB 400 and interfaced to the high-speed block 500. In short, the communication capacity of one RB 400 when the RB 400 is interfaced (Add/Drop/Through processing) with the high speed block 500 is OC-n×L (in the case of FIG. 53, 2.4 Gb/s) (full condition).

Where the TB 200 has such a construction as described above, if, for example, each of the IF boards 300 is constructed (exchanged) for OC-n/4 [OC-3 (150 Mb/s) in FIG. 53] of the 1/4 transmission capacity, then the total capacity of signals inputted to one RB 400 is OC-n/4×L×2 (1.2 Gb/s in FIG. 53), and the signal capacity interfaced with the high speed block 500 is one half that given just above, that is, OC-n/4×L (600 Mb/s). In short, in this instance, the signal capacity of one RB 400 interfaced with the high speed block 500 is reduced simply to ¼ (600 Mb/s)from the full condition (2.4 Gb/s) mentioned above.

In particular, in the TB 200 described above, if existing wiring line connections are diverted so as to deal with the IF boards 300 of various transmission capacities (so that the compatibility of each IF board 300 may not be lost), then as the transmission capacity of the IF boards 300 decreases from the basic transmission capacity OC-n, the processing capacity of one RB 400 interfaced with the high speed block 500 decreases [the density of the processing capacity to be actually interfaced decreases with respect to the processing capability (capacity) of the RB 400 which can be interfaced with the high speed block 500].

Here, in order to prevent such reduction of the processing capacity of the RB 400 as described above, the number of slots of the RB 400 for the IF boards 300 may be increased simply (for example, in the case of OC-n/4, a number of IF boards 300 equal to four times should be connected). However, this not only makes the unit scale very large, but also loses the accommodation compatibility (actually, since the number of accommodation slots of one RB 400 has a physical restriction as described hereinabove, such countermeasure as just described is substantially impossible).

SUMMARY OF THE INVENTION

It is an object of the present invention to provide an SDH transmission unit which can suppress reduction of the signal capacity to be interfaced with a high speed block while maintaining the accommodation compatibility with an IF unit (low speed line signal) of a transmission (signal) capacity smaller than a basic transmission capacity.

In order to attain the object described above, according to an aspect of the present invention, there is provided an SDH transmission unit, comprising a high speed block for accommodating high speed line signals handled by source network based on an SDH transmission system, and a tributary block for accommodating low speed line signals handled by a tributary network based on an SDH transmission system and having a transmission capacity lower than that of the high speed line signals and interfacing with the high speed block, the tributary block including a plurality of routing blocks each of which accommodates low speed line signals for a predetermined capacity and performing line selection processing for low speed line signals to be interfaced with the high speed block in accordance with a form of the tributary network, at least one of the routing blocks serving, when the low speed line signals accommodated therein do not fully occupy the predetermined capacity, as a master block which accommodates at least one of the other routing blocks as slave block in order to accommodate the low speed line signals accommodated in the other routing block.

In the SDH transmission unit having the construction described above, the master block (routing block) in the tributary block accommodates the other routing block (slave block). Consequently, a capacity portion of the master block by which the predetermined capacity is not satisfied can be made up for with the low speed line signals accommodated in the slave block. Accordingly, while the capacity of low speed line signals accommodated in one routing block is provided with flexibility (compatibility), even when the accommodated amount of low speed line signals in one routing block does not fully occupy the predetermined capacity, reduction of the capacity (hereinafter referred to as interface capacity) of low speed line signals to be interfaced with the high speed block can be prevented.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

A. Aspect of the Invention

First, an aspect of the present invention is described with reference to the drawings.

Figure 1:
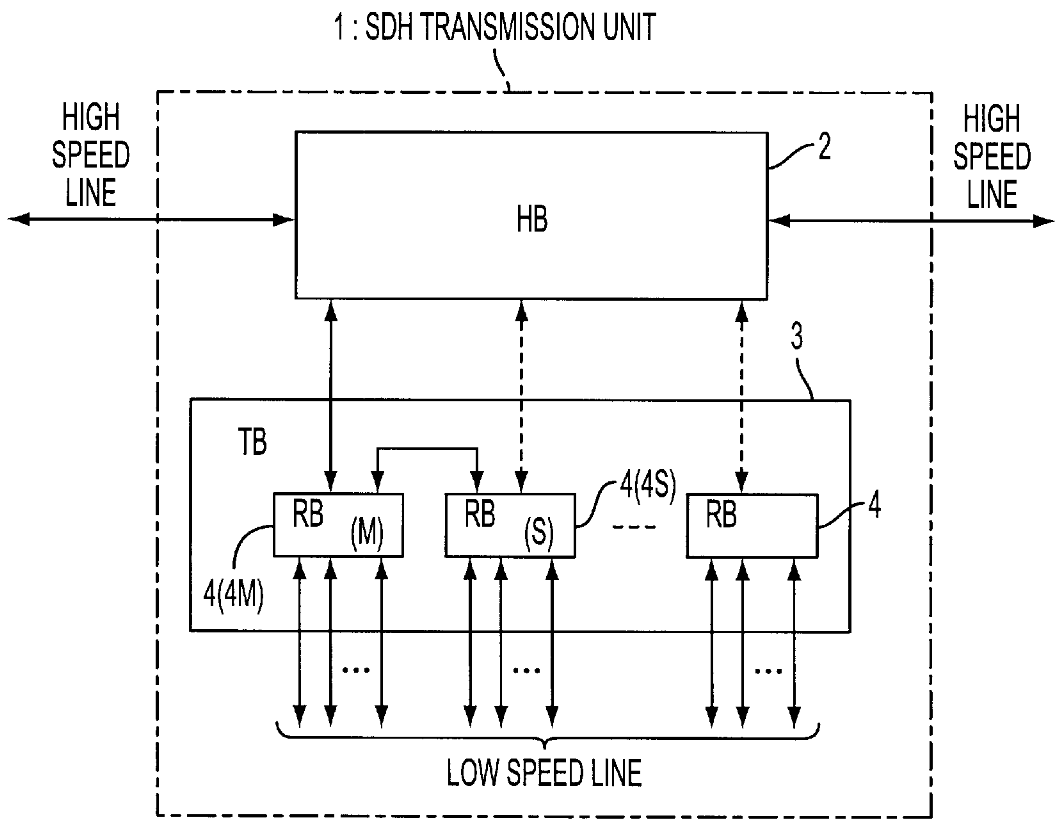
FIG. 1 is a block diagram showing an aspect of the present invention.

FIG. 1 shows an SDH transmission unit according to the aspect of the present invention. Referring to FIG. 1, the SDH transmission unit shown is denoted at 1 and includes a high speed block 2 for accommodating high speed line signals handled by source network based on an SDH transmission system, and a tributary block 3 for accommodating low speed line signals handled by a tributary network based on SDH transmission system and having a transmission capacity lower than that of the high speed line signals and interfacing with the high speed block 2.

The tributary block 3 includes, as shown in FIG. 1, a plurality of routing blocks 4 each of which accommodates low speed line signals for a predetermined capacity and performing line selection processing for low speed line signals to be interfaced with the high speed block 2 in accordance with a form of the tributary network.

At least one of the routing blocks 4 serves, when the low speed line signals accommodated therein do not fully occupy the predetermined capacity, as a master block 4M which accommodates at least one of the other routing blocks 4 as slave blocks 4S in order to accommodate the low speed line signals accommodated in the other routing blocks 4.

In the SDH transmission unit 1 having the construction described above, the master block (routing block) 4M in the tributary block 3 accommodates the other routing blocks (slave blocks) 4S and thereby accommodates the low speed line signals accommodated in the slave blocks 4s. Consequently, a capacity portion by which the predetermined capacity is not satisfied can be made up for with the low speed line signals accommodated in the slave blocks 4S.

Accordingly, while the capacity of low speed line signals accommodated in one routing block 4 is provided with flexibility (compatibility), even when the accommodated amount of low speed line signals in one routing block 4 does not fully occupy the predetermined capacity, reduction of the capacity (hereinafter referred to as interface capacity) of low speed line signals to be interfaced with the high speed block 2 can be prevented.

Each of the slave blocks 4S may include a first folding back section for causing the low speed line signals accommodated therein to be folded back and accommodated in a free capacity portion of the master block 4M. By the construction, each of the slave blocks 4S can realize connection with the slave block 4M without varying a usual routing block significantly. Consequently, the time required for development of a unit can be reduced and the burden involved therein can be reduced significantly.

The master block 4M may include a second folding back section for causing the low speed line signals accommodated therein to be folded back and accommodated in a free capacity portion of another master block in which the master block is accommodated when the master block becomes a slave block. By the construction, the master block 4M can be used alternatively (diverted) as a slave block. Consequently, an existing user of the tributary block 3 need not purchase a new slave block, and also a demand from a new user can be coped with flexibly.

Each of the master block 4M and the slave blocks 4S may include a masking processing section for performing masking processing for signal lines which are not used between the master block 4M and the slave blocks 4S by line selection processing in accordance with the form of the tributary network. By the construction, since masking processing is performed for signal lines which are not used between the blocks 4M and 4S, useless consumption of power which is otherwise caused by the unused signal lines can be prevented. This contributes very much to reduction of power consumption of the SDH transmission unit 1.

Each of the master block 4M and the slave blocks 4S may include interface sections for a plurality of slots each of which accommodates low speed line signals for a plurality of channels, and a time divisional line selection processing section for performing line selection processing for the low speed line signals form the interface sections in a time dividing relationship in units of a channel in accordance with the form of the tributary network. By the construction, even if each of the blocks 4M and 4S accommodates low speed line signals for a plurality of channels in one slot (interface section) thereof, normal line selection processing can be performed in units of a channel by the time division line selection processing section. Accordingly, even if the number of slots is equal, a transmission capacity for a greater number of channels can be accommodated, and reduction of the interface capacity of the high speed block 2 can be further prevented.

The time division line selection processing section may include a memory section for storing low speed line signals from the interface sections, and a reading control section for controlling reading timings of the low speed line signals from the memory section with timings synchronized with intra-unit frame outputting timings to the interface sections to read out the low speed line signals with frame leading positions thereof aligned to one another, time division line selection processing in units of a channel being performed for the low speed line signals in a condition wherein the frame leading positions are aligned to one another by the reading control section.

By the construction described above, the time division line selection processing section aligns the frame leading positions of the low speed line signals from the interface sections by the reading control by the reading control section. Consequently, time division line selection processing in units of a channel can be performed readily. Accordingly, simplification of the construction of the unit 1 can be achieved.

The reading control section may be constructed to allow arbitrary variation of the reading timings. This eliminates the necessity to take fine timing (phase) adjustment in a unit designing stage into consideration. Consequently, the time required for development of the unit 1 can be reduced significantly.

Alternatively, the reading control section may be constructed so as to be capable of controlling the reading timings with a fixed timing based on an intra-unit frame outputting timing to each of the interface sections. In this instance, an influence of an undefined operation of a frame phase, which is caused by insertion or removal of an interface section, upon time division line selection processing can be prevented. Consequently, the reliability in time division line selection processing can be augmented significantly.

Each of the master block 4M and the slave blocks 4S may include a plurality of trouble detection sections each for detecting a trouble of one of the interface sections, and a plurality of alarm signal generation sections each for generating an alarm signal as a low speed line signal when a trouble is detected by the corresponding trouble detection section, and the time division line selection processing section may be constructed such that, when a trouble is detected by all of the trouble detection sections, the time division line selection processing section performs time division sending out processing of the alarm signal in accordance with an intra-unit frame timing, but when no trouble is detected at least one of the trouble detection sections, the time division line selection processing section performs time division sending out processing of the alarm signal in accordance with a frame timing of the low speed line signal from that one of the interface sections from which no trouble is detected.

By the construction described above, the time division line selection processing section can perform sending out of an alarm signal in units of a channel and can prevent a malfunction upon sending out of an alarm signal which is caused by collision between an intra-unit frame timing and a frame timing from one of the interface sections when no trouble occurs with the interface section. This contributes very much to augmentation of the reliability in alarm signal sending out processing.

The time division line selection processing section may be constructed such that, where the configuration of the tributary network is a redundancy configuration which includes a work system and a protective system, the time division line selection processing section selects one of the low speed line signals of the work system and the protective system in a time dividing relationship, but where the configuration of the tributary network is a ring configuration, the time division line selection processing section selects the low speed line signals in different transmission directions in the ring configuration individually in a time dividing relationship. By the construction, the time division line selection processing section can perform normal line selection processing whichever one of the redundancy configuration and the ring configuration is employed. Consequently, the universality (compatibility) of the SDH transmission unit 1 for a configuration of the tributary network can be assured sufficiently.

The interface section may be constructed so as to add a dummy signal to the low speed line signals to convert the transmission rate of the low speed line signals to a basic transmission capacity when the low speed line signals for the predetermined rate are accommodated. In this instance, the time division line selection processing section performs the line selection processing at a basic processing rate equal to that when the low speed line signals of the basic transmission rate are accommodated.

Consequently, even when the transmission capacity of low speed line signals accommodated in each of the master block 4M and the slave blocks 4S does not fully occupy the predetermined capacity, since the input signals have the basic transmission rate due to the presence of the added dummy signals, the time division line selection processing section can perform the line selection processing normally at the basic processing rate. Accordingly, the time division line selection processing can be realized without significant modification such as addition of a speed conversion function to each block and without provision of a processing load.

B. Embodiment of the Invention

B1. Basic Concept

Figure 2:
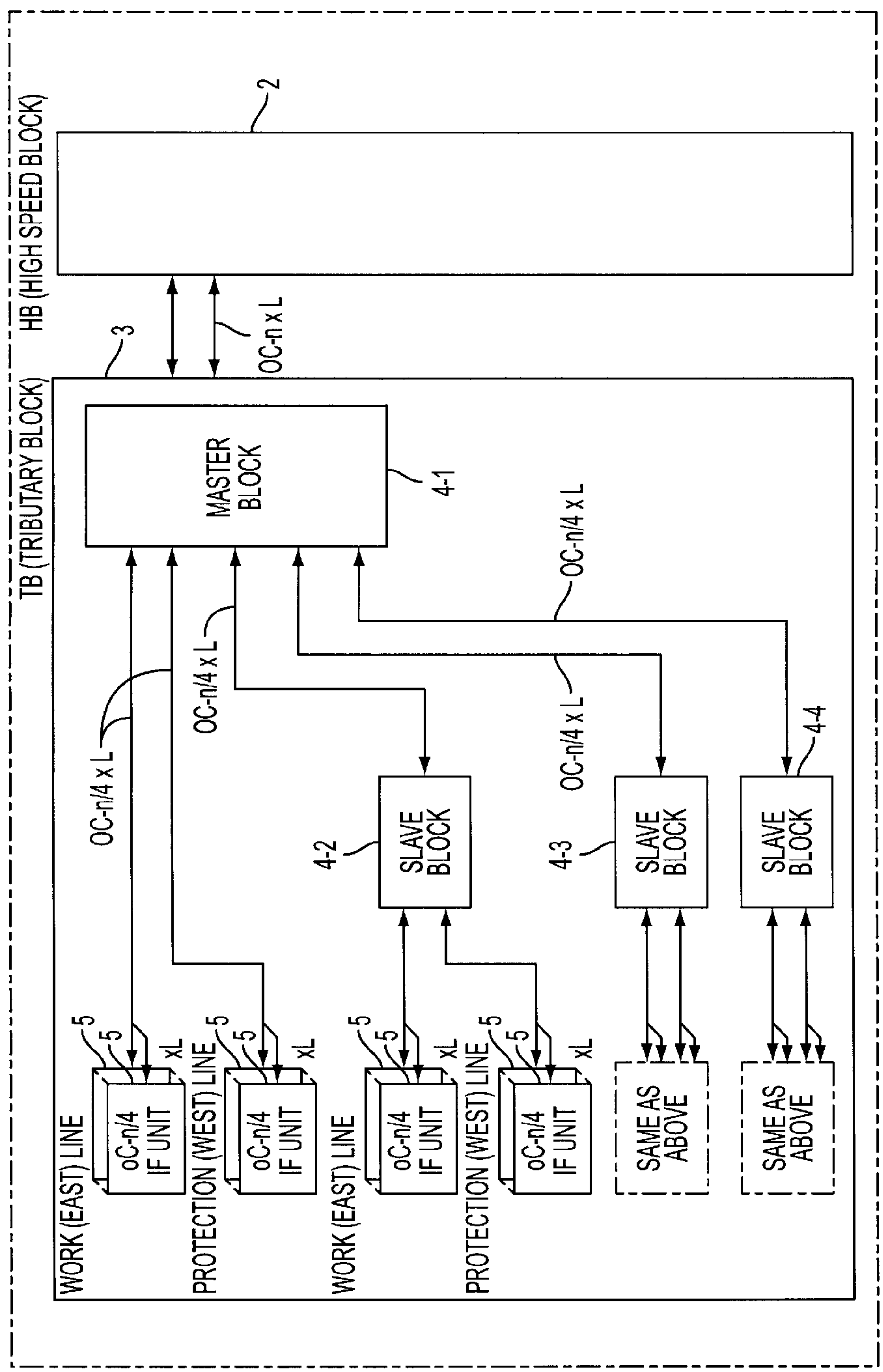
FIG. 2 is a block diagram showing a construction of an ADM (SDH transmission unit) according to an embodiment of the present invention.

FIG. 2 shows a construction of an ADM (SDH transmission unit) according to an embodiment of the present invention. Referring to FIG. 2, also the ADM 1 shown includes a high speed block (HB) 2 which accommodates a predetermined high speed line (OC-N) signal, and a tributary block (TB) 3 for accommodating a number of low speed line (OC-n level) signals of a lower transmission capacity than the OC-N signal handled by low speed (tributary) networks (applications: a 1+1 redundancy configuration, a ring configuration and so forth) corresponding to a capacity equal to the transmission capacity of the HB 2 and interfacing them with the HB 2.

The TB 3 includes a master block (routing block: RB) 4-1, and slave blocks (RBs) 4-2 to 4-4 which belong to and are connected to (accommodated in) the master block 4-1. L interface (IF) unit(IF board(card))s 5 for OC-n/4 for accommodating signals of a transmission capacity (rate) equal to ¼ the basic transmission capacity OC-n are loaded as interface units for work lines/protection lines in a 1+1 redundancy configuration (which are used, in a ring configuration, as interface units for EAST lines/WEST lines) in prescribed slots [accommodation (mounting) positions] of each of the routing blocks 4-i (where i=1 to 4) as shown in FIG. 2.

It is to be noted that, in the following description, where it is necessary to distinguish the IF boards 5 for work (EAST) lines and the IF boards 5 for protection (WEST) lines from each other, the IF boards 5 for work (EAST) lines are denoted at 5W (5EA) and the IF boards 5 for protection (WEST) lines are denoted at 5P (5WE).

In short, the TB3 in the present embodiment includes a plurality of RBs 4-i each of which accommodates a number of OC-n signals corresponding to a predetermined capacity (OC-n×L×2) and performs routing (line selection) processing of an OC-n signal to be interfaced with the HB 2 in accordance with the configuration of a pertaining tributary network. In order that the RB 4-1 which is one of the RBs 4-i may serve, when accommodation signals do not satisfy the predetermined capacity (OC-n×L×2) (in the case of FIG. 2, 1/4 because the capacity is OC-n×L×2), as a master block (MB) which accommodates OC-4/n signals accommodated in the RBs 4-2 to 4-4 other than the self RB 4-1, it accommodates the other RBs 4-2 to 4-4 as slave blocks (SBs).

In such a construction as described above, the processing capacity of each one of the SBs 4-2 to 4-4 is OC-n/4×L, and the interface (Add/Drop/Through processing) capacity between the one RB (MB) 4-1 and the HB 2 is equal to a sum total (=OC-n×L) of the processing capacity (OC-n/4×L) of the MB 4-1 and the processing capacity (OC-n/4×L×3) of the three SBs 4-2 to 4-4 and is equal to an interface capacity when IF boards for OC-n are fully mounted.

In short, in the present ADM 1, the MB 4-1 of the TB 3 accommodates the RBs 4-2 to 4-4 other than the self MB 4-1 as SBs to accommodate OC-n/4 signals accommodated in the SBs 4-2 to 4-4 so that a capacity by which the predetermined capacity is not fully occupied is supplemented by the OC-n/4 signals accommodated in the SBs 4-2 to 4-4.

Accordingly, while the capacity of signals accommodated in each one of the RBs 4-i is provided with flexibility (compatibility), even where the accommodation capacity of signals of one RB 4-i does not fully occupy the predetermined capacity described above, reduction of the capacity (interface capacity) of signals to be interfaced with the HB 2 can be prevented. In particular, even if existing BWB wiring line (inter-unit wiring line) connections in the TB 3 are diverted as they are, accommodation compatibility with the IF boards 5 which have a transmission capacity smaller than the basic transmission capacity OC-n can be provided to the TB 3 (RBs 4-i) to minimize reduction of the processing capacity between the RBs 4-i and the HB 2.

Figure 3:
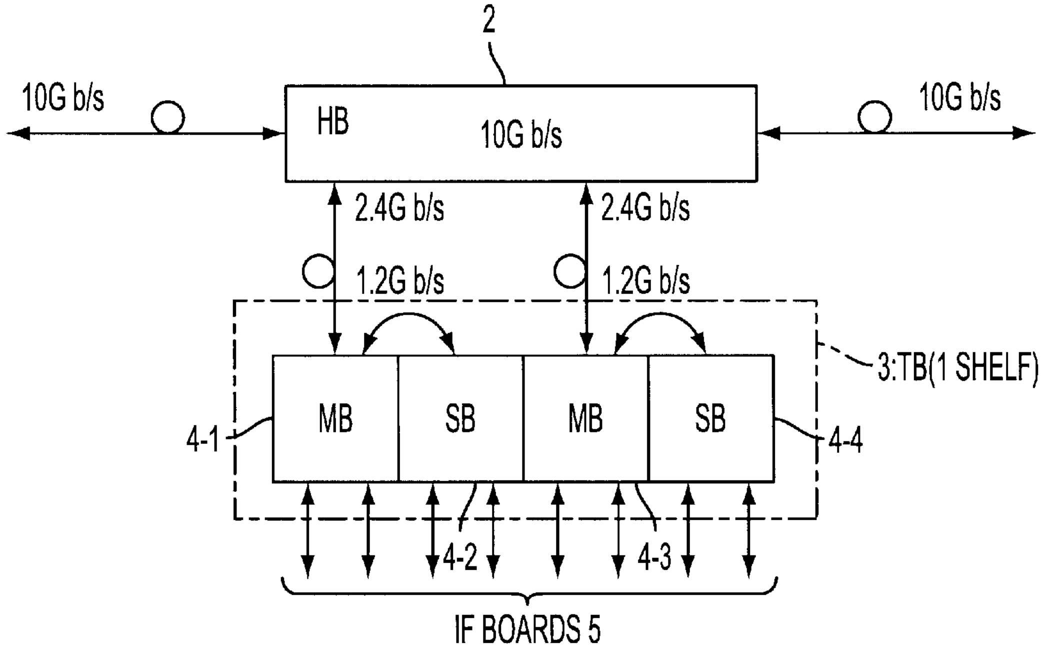
FIG. 3 is a block diagram showing an accommodation structure for a high speed block and a routing block of the ADM of FIG. 2.

In the present embodiment, however, since it is difficult in the existing state of thins to provide the MB 4-1 with a connection interface with the three SBs 4-2 to 4-4 from a restriction to the degree of integration of the RBs 4-i, for example, as shown in FIG. 3, the RB 4-1 and the RB 4-4 are constructed so as to act as MBs and each accommodates one SB 4-2 or 4-4.

In this instance, if IF boards 5 for OC-n/4 [for example, for OC-3c (approximately 150 Mb/s)] are fully mounted as described above, then the signal capacity to be interfaced with the HB 2 by the MBs 4-1 and 4-3 can be raised to only one half (150 Mb/s×4×2=1.2 Gb/s) a signal capacity where IF boards for OC-n [OC-12c (approximately 600 Mb/s)] are fully mounted (600 Mbs×4=2.4 Gb/s). However, this is preferable to mere reduction to ¼ (150 Mb/s×4=600 Mb/s).

In the following, details of the MB 4-1 and the SBs 4-2 to 4-4 which realize such a function as described above are described.

Figure 4:
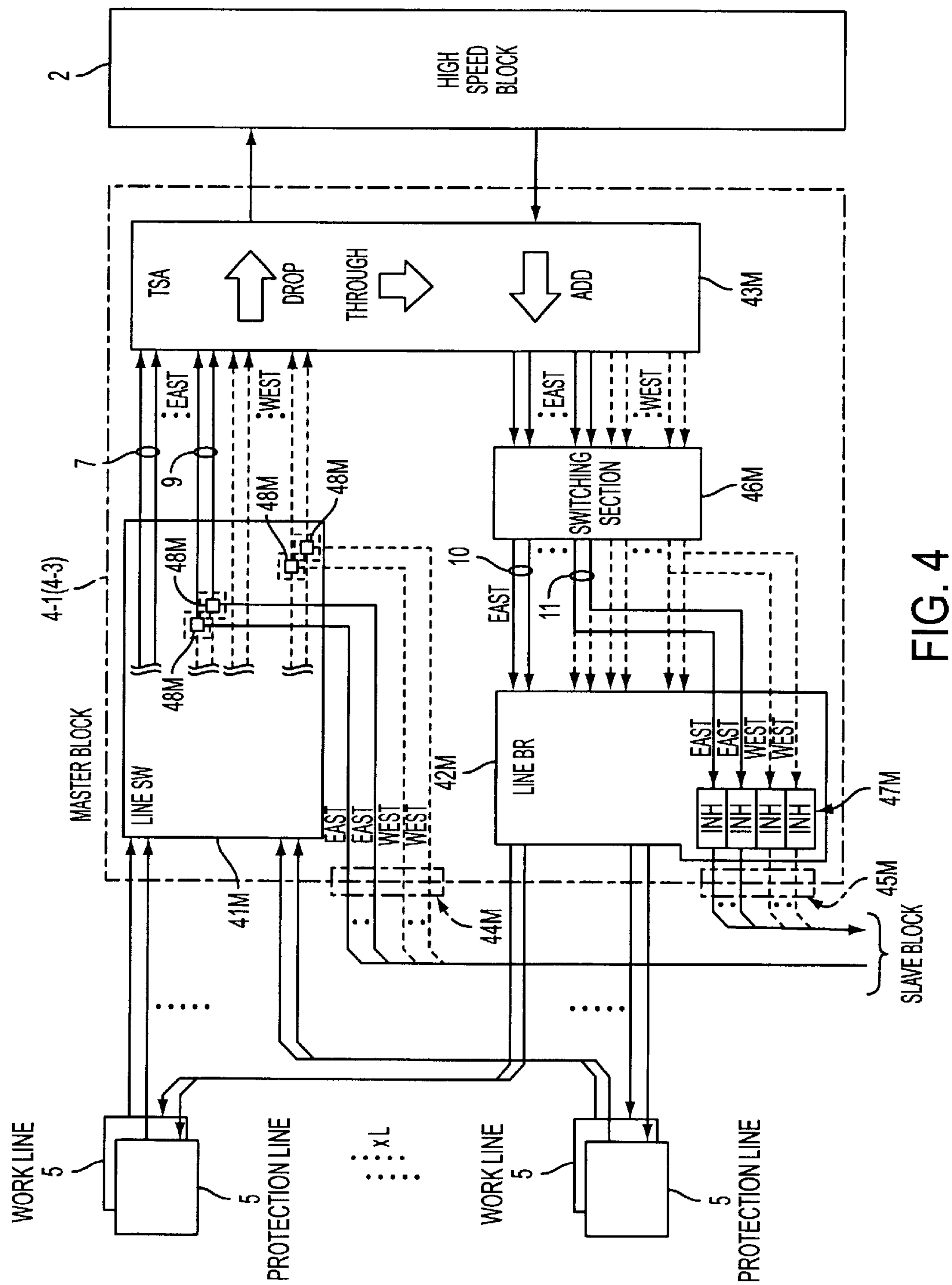
FIG. 4 is a block diagram showing a construction of a master block of the ADM of FIG. 2 and illustrating operation of the master block in a 1+1 mode.
Figure 6:
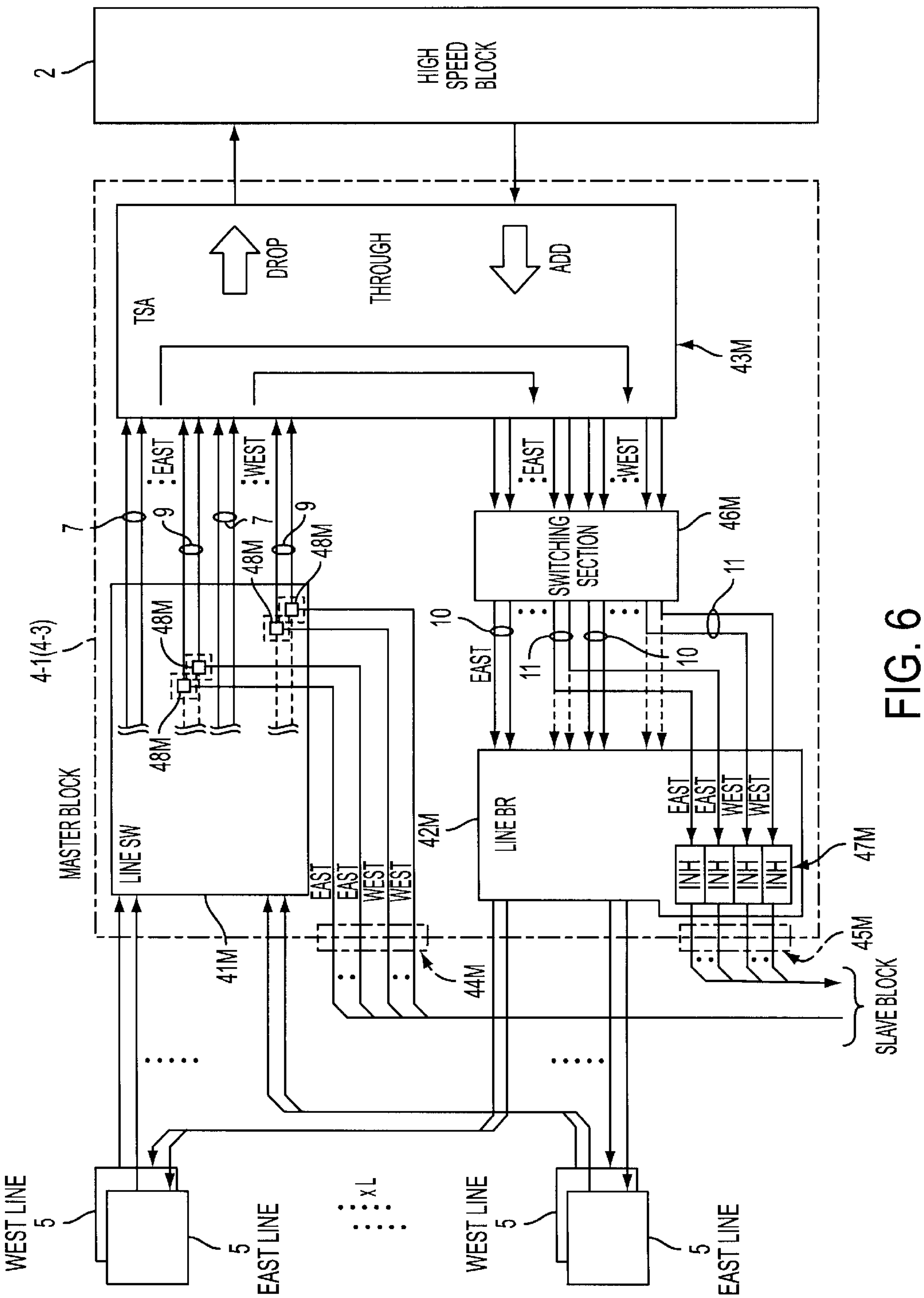
FIG. 6 is a block diagram showing a construction of the master block of the ADM of FIG. 2 and illustrating operation of the master block in a ring mode.

First, the. MB 4-1 (also 4-3) includes, for example, as shown in FIGS. 4 and 6, a line switch section 41M, a line bridging section 42M, a TSA processing section 43M, a reception side slave interface (SIF) section 44M, a transmission side slave interface (SIF) section 45M and a switching section 46M. The line bridging section 42M includes an inhibit (INH) processing section 47M.

The line switch section 41M basically performs such line switching processing that, in a 1+1 redundancy configuration [1+1 (APS) mode], it selects one of same signals sent thereto from the IF boards 5 for work/protection lines and sends out the selected signal to the TSA processing section 43M, but sends out, in a ring (UPSR) mode, EAST/WEST line signals sent thereto from the IF boards 5 for EAST/WEST lines to the TSA processing section 43M. In the present embodiment, by a signal selection switch 48M which selects one of a signal from the IF boards 5 side and another signal sent from the SB 4-2 (4-4) through the reception side SIF section 44M, the signal sent from the SB 4-2 (4-4) can be inputted to the TSA processing section 43M.

The TSA processing section 43M performs Add/Drop/Through processing for an input signal thereto. For example, the TSA processing section 43M drops, in the 1+1 mode, a work line or protection line signal selected by the line switch section 41M to the HB 2 side, but in the ring mode, the TSA processing section 43M transmits an EAST (WEST) line signal therethrough to the line bridging section 42M side so that it may be transmitted to the WEST (EAST) line.

However, from among signals processed by the TSA processing section 43M the signal for the SB 4-2 (4-4) [the signal which is to be transmitted to IF boards accommodated in the SB4-2(4-4)] is outputted to the SB 4-2 (4-4) through the transmission side SIF section 45M.

Further, the line bridging section 42M branches, in the 1+1 mode, a signal processed by the line bridging section 42M to two paths and distributes the same signal to the IF boards 5 (5W and 5P) for work lines/protection lines, but performs, in the ring mode, line bridging processing to distribute EAST line signals/WEST line signals processed by the TSA processing section 43M to the IF boards 5 (5EF and 5WE) for EAST lines/WEST lines, respectively.

The reception side SIF section 44M forms input ports (terminals) for receiving signals from the SB 4-2 (4-4) The transmission side SIF section 45M forms output ports (terminals) for outputting signals for the SB 4-2 (4-4) of signals TSA processed by the TSA processing section 43M to the SB 4-2 (4-4).

Further, the switching section (second folding back section) 46M switches the connection destination of EAST line signals or WEST line signals from the TSA processing section 43M in a similar manner to that by a folding back connection section 43S (hereinafter described with reference to FIGS. 5 and 7) of the SB 4-2 (4-4) as hereinafter described so that the MB 4-1 (4-3) may be used alternatively as an SB to cause OC-n/4 signals accommodated in the self MB 4-1 (4-3) to be folded back by and accommodated in a idle capacity portion of another MB (a detailed example is hereinafter described) in which the MB 4-1 (4-3) is accommodated.

The INH processing section 47M performs inhibition (masking) processing for those of the signal lines (wiring lines) to the SB 4-2 (4-4) which are not used using AND gates and so forth. For example, since the WEST lines are not used in the 1+1 mode, the INH processing section 47M performs inhibition processing for the signal lines to (outputs of) the SB 4-2 (4-4) for WEST line signals.

Figure 5:
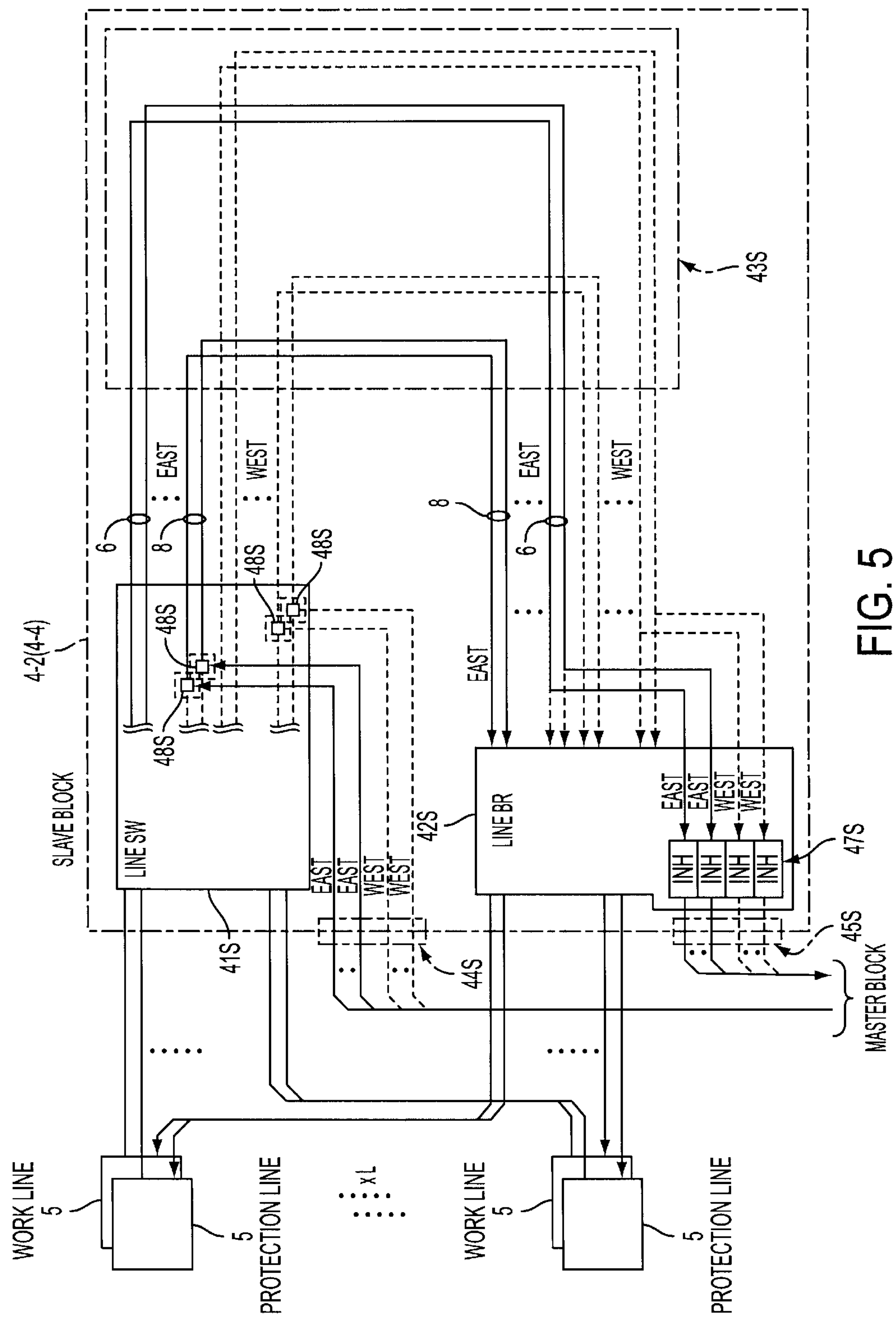
FIG. 5 is a block diagram showing a construction of a slave block of the ADM of FIG. 2 and illustrating operation of the slave block in the 1+1 mode.
Figure 7:
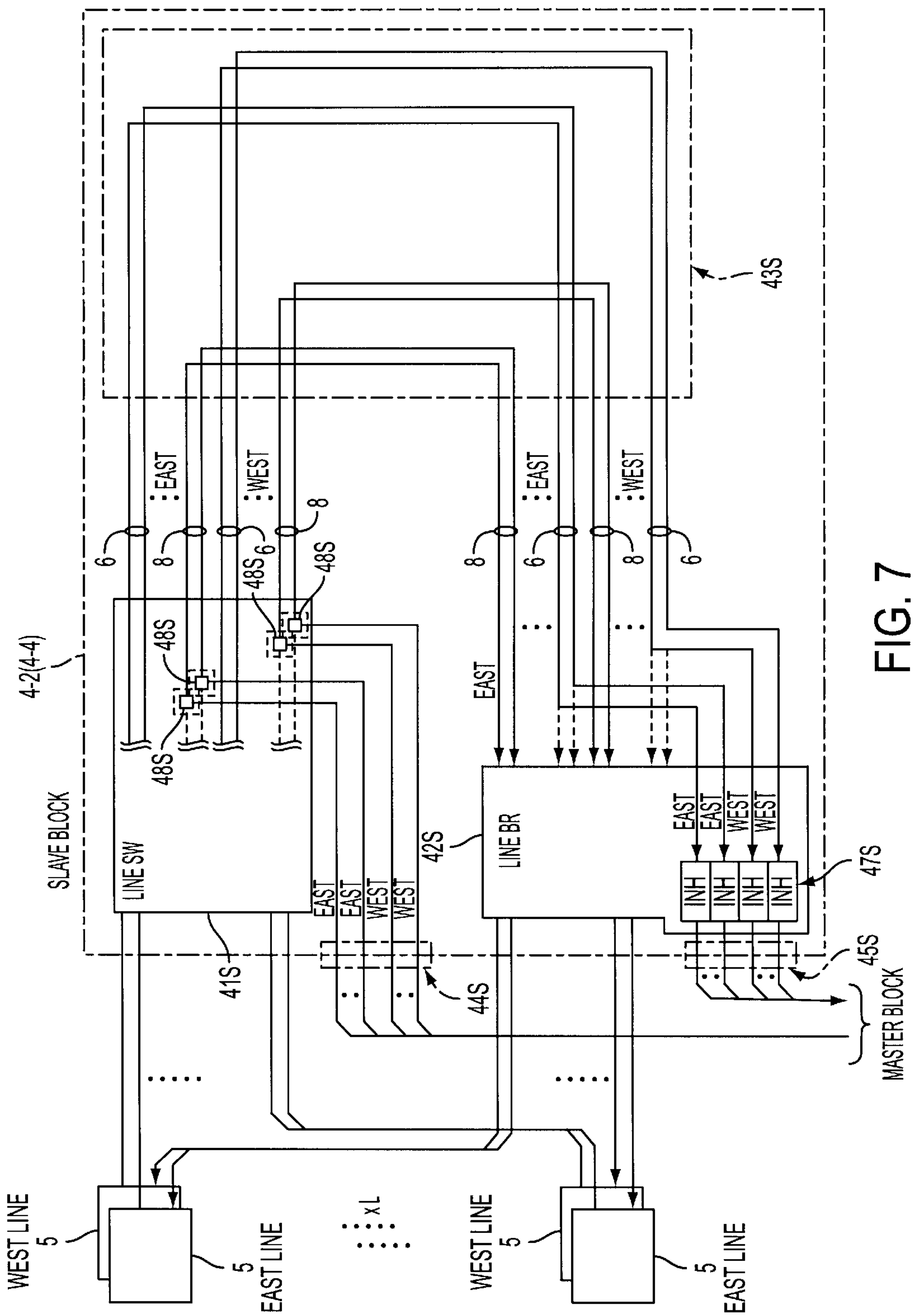
FIG. 7 is a block diagram showing a construction of the slave block of the ADM of FIG. 2 and illustrating operation of the slave block in the ring mode.

Meanwhile, the SB 4-2 (4-4) includes, for example, as shown in FIGS. 5 and 7, a line switch section 41S and a line bridging section 42S similar to those of the MB 4-1 (4-3). The SB 4-2 (4-4) further includes a folding back connection section 43S, a reception side master interface (MIF) section 44S, and a transmission side master interface (MIF) section 45S. Further, the line bridging section 42S includes an inhibition (INH) processing section 47S.

The line switch section 41S basically performs such line switching processing that, in the 1+1 configuration (1+1 mode), it selects one of same signals sent thereto from the IF boards 5 for work/protection lines and sends out the selected signal to the folding back connection section 43S, but sends out, in the ring (UPSR) mode, EAST/WEST line signals sent thereto from the IF boards 5 for EAST/WEST lines to the folding back connection section 43S. In the present embodiment, by a signal selection switch 48S which selects one of a signal from the IF boards 5 side and another signal sent from the MB 4-1 (4-3) through the reception side SIF section 44S, the signal sent from the MB 4-1 (4-3) can be inputted to the folding back connection section 43S.

The folding back connection section (first folding back section) 43S folds back and outputs signals from the IF boards 5 inputted thereto from the line switch section 41S to the line bridging section 42S side. However, different from those in the TSA processing (through processing) of the TSA processing section 43M of the MB 4-1 (4-3), the folding back connection section 43S outputs EAST line signals as EAST line signals and outputs WEST line signals as WEST line signals.

In the 1+1 mode, signals from the IF boards 5 selected by the line switch section 41S are outputted over the signal lines for EAST lines (the EAST side of the transmission side MIF section 45S) are outputted to the MB 4-1 (4-3), and signals from the MB 4-1 (4-3) [signals to be distributed to the IF boards 5 accommodated in the SB 4-2 (4-4)] are outputted to the line bridging section 42S.

On the other hand, in the ring mode, EAST/WEST line signals from the line switch section 41S are outputted to the MB 4-1 (4-3) over the signal lines for EAST/WEST line signals (the EAST/WEST sides of the transmission side MIF section 45S), but EAST/WEST line signals from the MB 4-1 (4-3) [signals to be distributed to the. IF boards 5 accommodated in the SB 4-2 (4-4)] are outputted to the line bridging section 42S.

In short, the folding back connection section 43S has a function as a first folding back section for folding back OC-n signals accommodated in the self SB 4-2 (4-4) so that they may be accommodated into a free capacity portion of the MB 4-1 (4-3) (a particular example is hereinafter described).

The line bridging section 42S branches, in the 1+1 mode, signals folded back by the folding back connection section 43S [signals from the MB 4-1 (4-3)] each into two paths and distributes the same signals to the IF boards 5 for work lines/protection lines, but performs, in the ring mode, line bridging processing for distributing EAST line signals/WEST line signals [(signals from the MB 4-1 (4-3)] folded back by the folding back connection section 43S to the IF boards 5 for EAST lines/WEST lines.

The reception side MIF section 44S forms input ports (terminals) for receiving signals from the MB 4-1 (4-3). The transmission side MIF section 45S forms output ports (terminals) for outputting those of signals folded back by the folding back connection section 43S which are for the MB 4-1 (4-3) (signals from the IF boards 5 accommodated in the SB 4-2 (4-4)) to the MB 4-1 (4-3).

The INH processing section 47S performs inhibition (masking) processing for those of the signal lines to the MB 4-1 (4-3) which are not used using AND gates and so forth similarly as in the MB 4-1 (4-3). For example, since the WEST lines are not used in the 1+1 mode, the INH processing section 47S performs inhibition processing for the signal lines to (outputs of) the MB 4-1 (4-3) for WEST line signals.

Basic operation of the MB 4-1 (4-3) and the SB 4-2 (4-4) constructed in such a manner as described above is described below. First, in the 1+1 mode, signals from the IF boards 5 are subject to predetermined line switching processing [including also multiplexing (hereinafter described) and so forth of the signals] by the line switch section 41S of the SB 4-2 (4-4) and then folded back at folding back connections 6 as indicated by solid lines 6 in FIG. 5, where after they pass through the EAST side of the transmission side MIF section 45S and are transmitted to the MB 4-1 (4-3).

It is to be noted that, in this instance (in the 1+1 mode), since the WEST side of the transmission side MIF section 45S is not used (connected), masking processing is performed for the connections of the WEST side (outputs: signal lines) by the INH processing section 47S. Consequently, wasteful consumption of power by the MB 4-1 (4-3) and the SB 4-2 (4-4) is prevented and reduction of power consumption of the ADM 1 is achieved.

Then, in the MB 4-1 (4-3), as indicated by solid lines 7 and 9 in FIG. 4, signals from the IF boards 5 accommodated in the self MB 4-1 (4-3) and signals from the reception side SIF section 44M [MB 4-1 (4-3)] selected by the signal selection switch 48M are inputted, by line switching processing by the line switch section 41M, to the TSA processing section 43M, by which TSA processing of them is performed to effect interfacing with the HB 2.

On the other hand, input signals from the HB 2 are subject to TSA processing by the TSA processing section 43M, and those of the signals which are for the IF boards 5 accommodated in the self MB 4-1 (4-3) are transmitted to the line bridging section 42S (refer to solid lines 10 in FIG. 4) while those signals for the IF boards 5 accommodated in the SB 4-2 (4-4) are transmitted to the EAST side of the transmission side SIF section 45M (refer to solid lines 11 in FIG. 4).

It is to be noted that, also in this instance, since the WEST side of the transmission side SIF section 45M is not used (connected), masking processing is performed for connections (outputs: signal lines) of the WEST side by the INH processing section 47M consequently, wasteful consumption of power by the MB 4-1 (4-3) and the SB 4-2 (4-4) is prevented and reduction of power consumption of the present ADM 1 is achieved.

Then, the line bridging section 42M performs line bridging processing (branching of each signal to two paths and so forth) corresponding to the line switching processing by the line switch section 41S, and the signals after the processing are distributed to the IF boards 5 for work/protection lines. On the other hand, signals transmitted to the EAST side of the transmission side SIF section 45M are transmitted as they are to the SB 4-2 (4-4) and received by the EAST side of the reception side MIF section 44S of the SB 4-2 (4-4). Then, the signals pass through the signal selection switch 48S and are folded back by the folding back connection section 43S, whereafter they are inputted to the line bridging section 42S.

The line bridging section 42S performs bridging processing (branching of each signal to two paths and so forth) corresponding to the line switching processing by the line switch section 41S, and the signals after the processing are distributed to the IF boards 5 accommodated in the self SB 4-2 (4-4).

On the other hand, in the ring mode, line switching processing by the line switch section 41S of the SB 4-2 (4-4) is performed for signals from the IF boards 5 for EAST/WEST lines accommodated in the self SB 4-2 (4-4) (for EAST line signals and WEST line signals), and the EAST/WEST line signals are outputted to the EAST side/WEST side of the transmission side MIF section 45S, respectively, and transmitted to the MB 4-1 (4-3) (the INH processing section 47S does not perform masking processing).

In the MB 4-1 (4-3), signals from the IF boards 5 for EAST/WEST lines accommodated in the self MB 4-1 (4-3) (EAST line signals and WEST line signals) pass through the line switch section 41M and are outputted to the TSA processing section 43M as indicated by solid lines 7 in FIG. 6, and EAST line signals and WEST line signals from the SB 4-2 (4-4) pass through the EAST side/WEST side of the reception side SIF section 44M, respectively, and are outputted to the TSA processing section 43M. Then, the TSA processing section 43M performs TSA processing for the input signals thereto and outputs the signals to the HB 2 to establish interfacing with the HB 2.

Meanwhile, those of signals after the TSA processing by the TSA processing section 43M which are for the IF boards 5 accommodated in the self MB 4-1 (4-3) are outputted to the line bridging section 42M (refer to solid lines 10 in FIG. 6), but those signals for the IF boards 5 accommodated in the SB 4-2 (4-4) are outputted to the EAST side/WEST side of the transmission side SIF section 45M and transmitted to the SB 4-2 (4-4) (refer to solid lines 11 in FIG. 6). It is to be noted that the INH processing section 47M does not perform masking processing.

Then, line bridging processing corresponding to the line switching processing by the line switch section 41M is performed by the line bridging section 42M of the MB 4-1 (4-3), and the EAST line signals/WEST line signals are transmitted to the IF boards 5 for EAST/WEST lines accommodated in the MB 4-1 (4-3). Meanwhile, the EAST line signals/WEST line signals transmitted to the EAST side/WEST side of the transmission side SIF section 45M are transmitted as they are to the SB 4-2 (4-4). Then, the EAST line signals/WEST line signals pass through the EAST side/WEST side of the reception side MIF section 44S and the signal selection switch 48S as indicated by solid lines 8 in FIG. 7 and are folded back by the folding back connection section 43S, whereafter they are inputted to the line bridging section 42S.

The line bridging section 42S performs bridging processing corresponding to the line switching processing by the line switch section 41S for the EAST line signals/WEST line signals and transmits the signals to the corresponding IF boards 5 for EAST/WEST lines.

Since such communication of signals between the MB 4-1 (4-3) and the SB 4-2 (4-4) [folding back connection from the SB 4-2 (4-4) to the MB 4-1 (4-3)] as described above is performed, the MB 4-1 (4-3) can accommodate OC-n/4 signals accommodated in the RB 4-2 (4-4) other than the self MB 4-1 (4-3) and establish interfacing with the HB 2 as described above.

Figure 8:
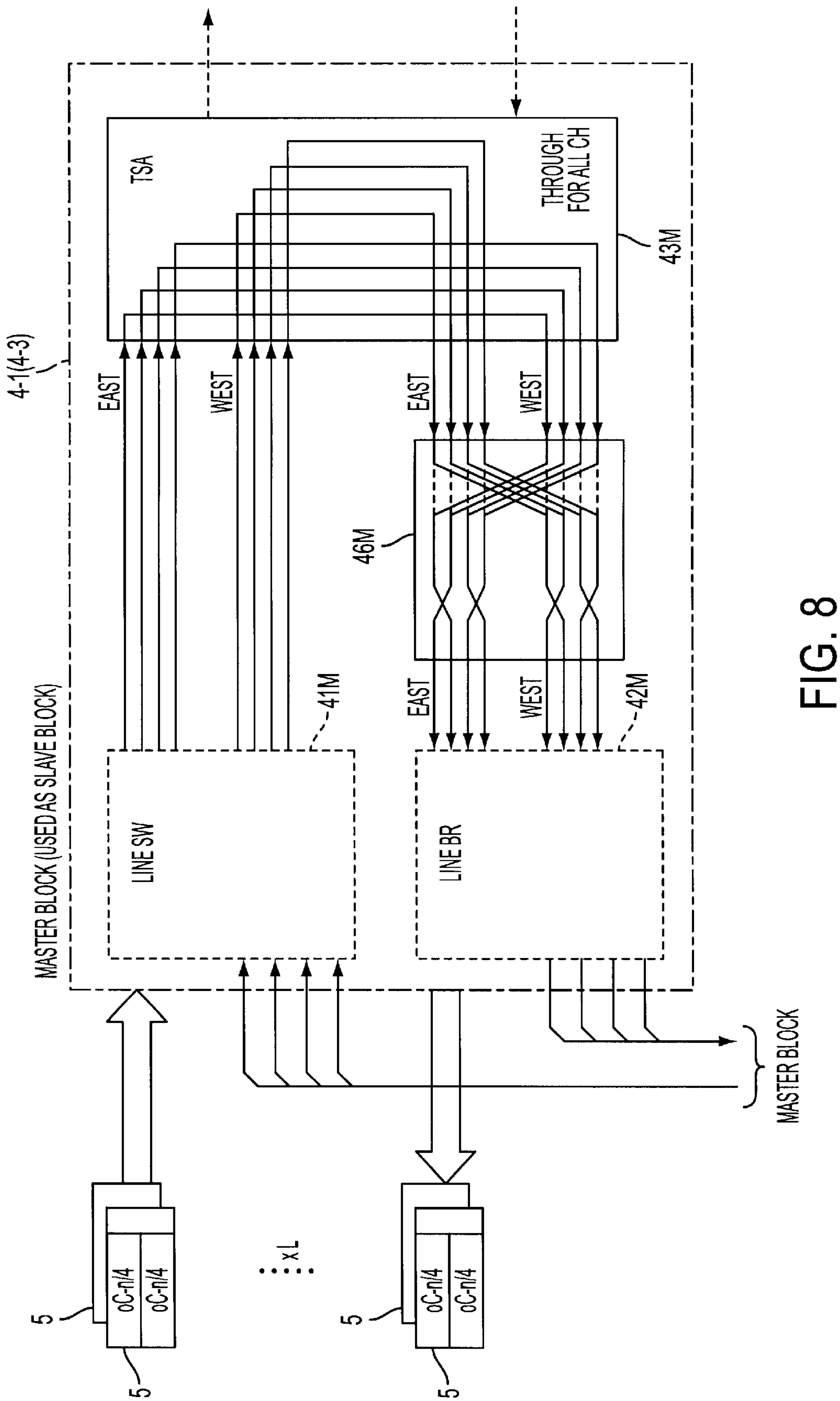
FIG. 8 is a block diagram showing a construction for using the master block of the ADM of FIG. 2 alternatively as a slave block.

By the way, the MB 4-1 (4-3) described above can be used alternatively (diverted) as the SB 4-2 (4-4) by causing, for example, as schematically shown in FIG. 8, the TSA processing section 43M to perform passing-through processing for all signals (at this point of time, EAST line signals are outputted to the WEST side while WEST line signals are outputted to the EAST side) and causing the switching section 46M to perform switching setting so that connections to the line bridging section 42M may be equivalent to the connections of the SB 4-2 (4-4).

It is to be noted that, while, in FIGS. 4, 6 and 8, the switching section 46M is interposed between the line bridging section 42M and the TSA processing section 43M, it may alternatively be interposed between the TSA processing section 43M and the HB 2 or be provided in the TSA processing section 43M.

Figure 9:
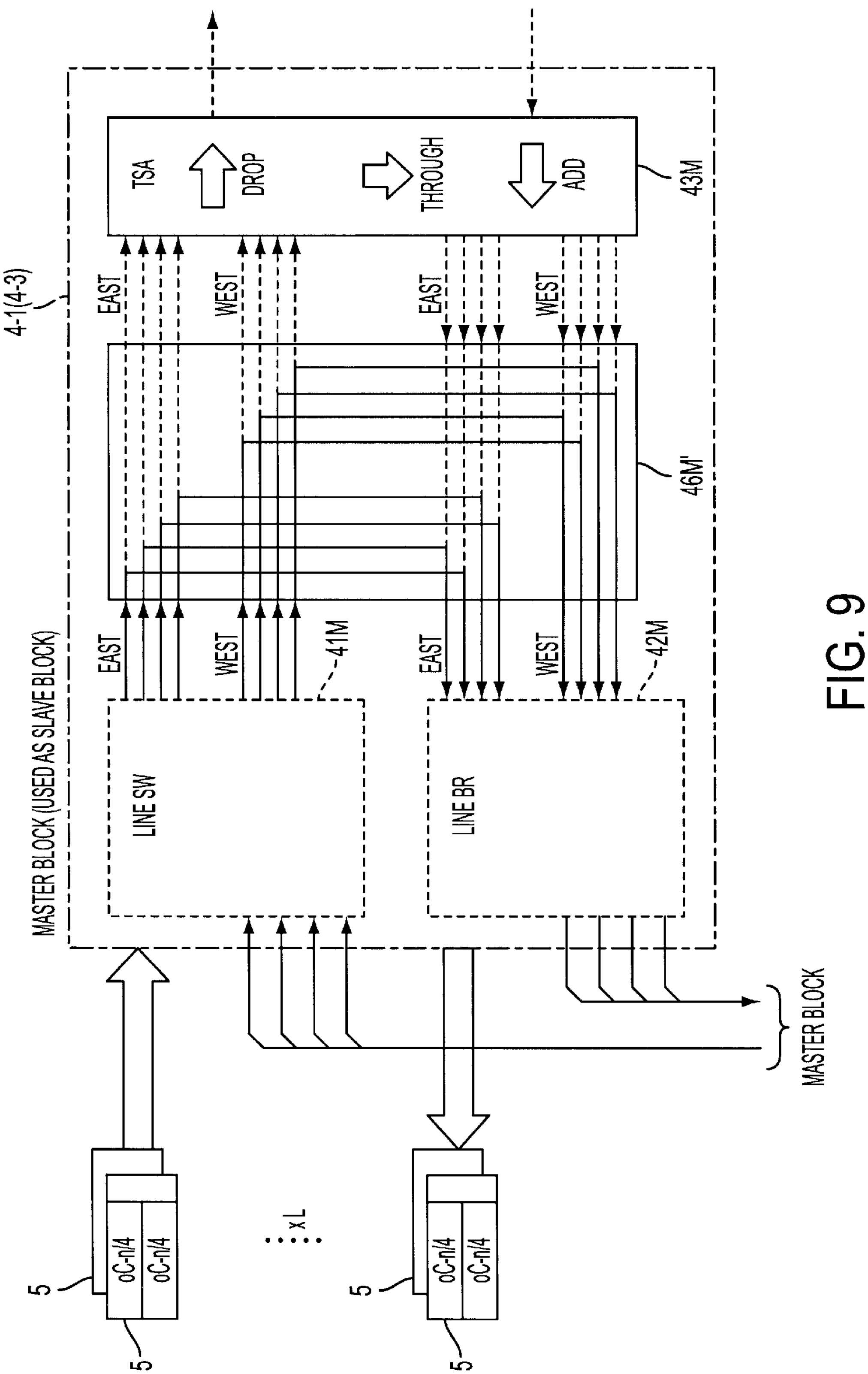
FIG. 9 is a block diagram showing another construction for using the master block of the ADM of FIG. 2 alternatively as a slave block.

Further, such switching can be realized also, for example, as schematically shown in FIG. 9, by providing a switching section 46M' which allows folding back connections quite similar to those in the SB 4-2 (4-4) in a stage preceding to the TSA processing section 43M. However, since the circuit scale of the switching section 46M' in this instance becomes larger than that of the switching section 46M described above also from the point of view of the mounting area (integration degree), it is advantageous to provide the switching section 46M making use of passing-through processing of the TSA processing section 43M as shown in FIGS. 4, 6 and 8.

Subsequently, a further detailed example of the MB 4-1 (4-3) and the SB 4-2 (4-4) described above is described with reference to FIGS. 10 to 13. First, a case is examined wherein four OC-n/4 IF boards 5 for work lines and four OC-n/4 IF boards 5 for protection lines (totaling eight IF boards) are mounted individually in slots (totaling eight slots) for OC-n IF boards of each of the MB 4-1 (4-3) and the SB 4-2 (4-4).

Figure 12A:
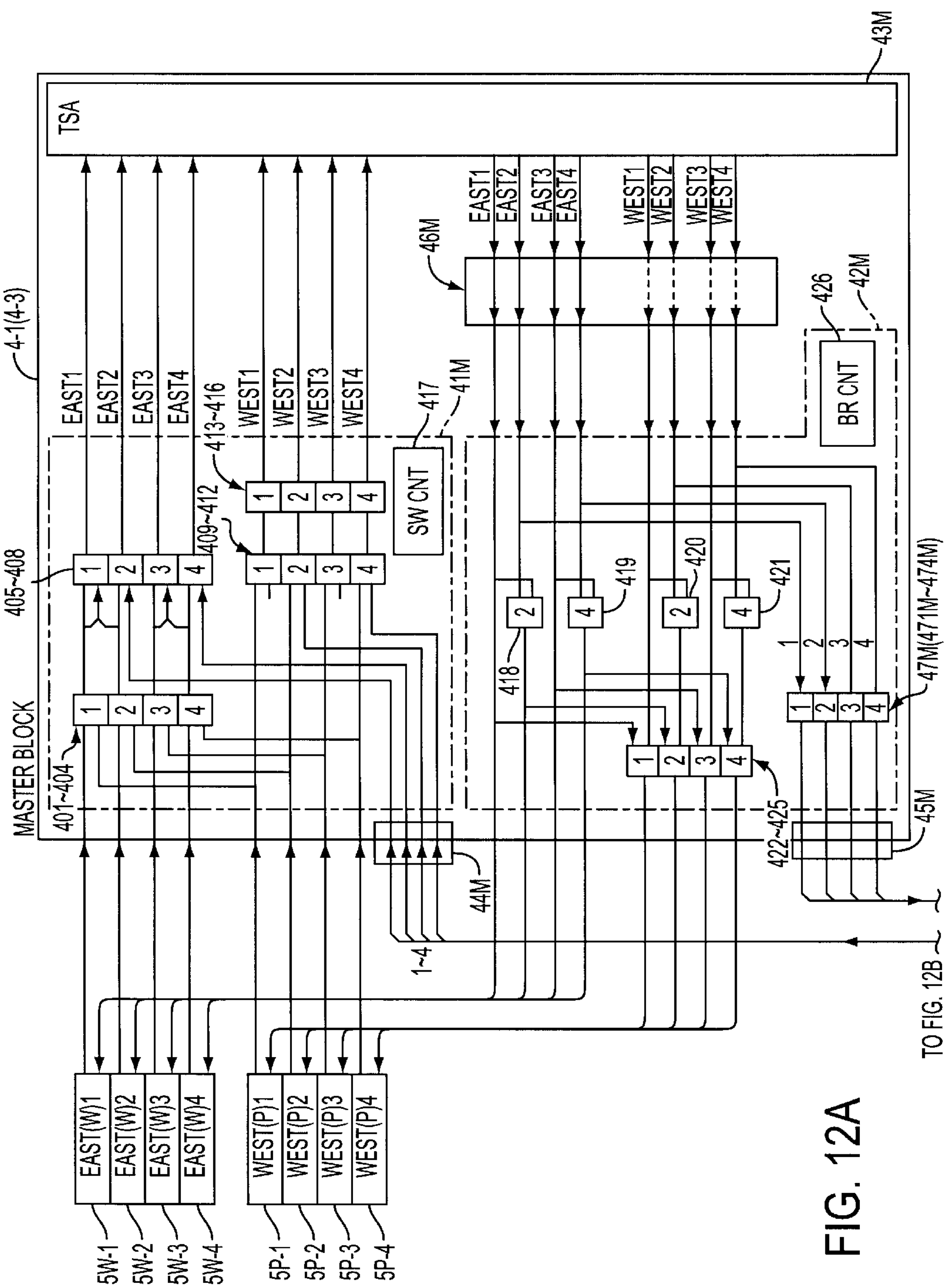
FIG. 12 is a block diagram showing detailed constructions of the master block and the slave block of the ADM of FIG. 2 and illustrating operation of the master block and the slave block in the 1+1 mode.
Figure 12B:
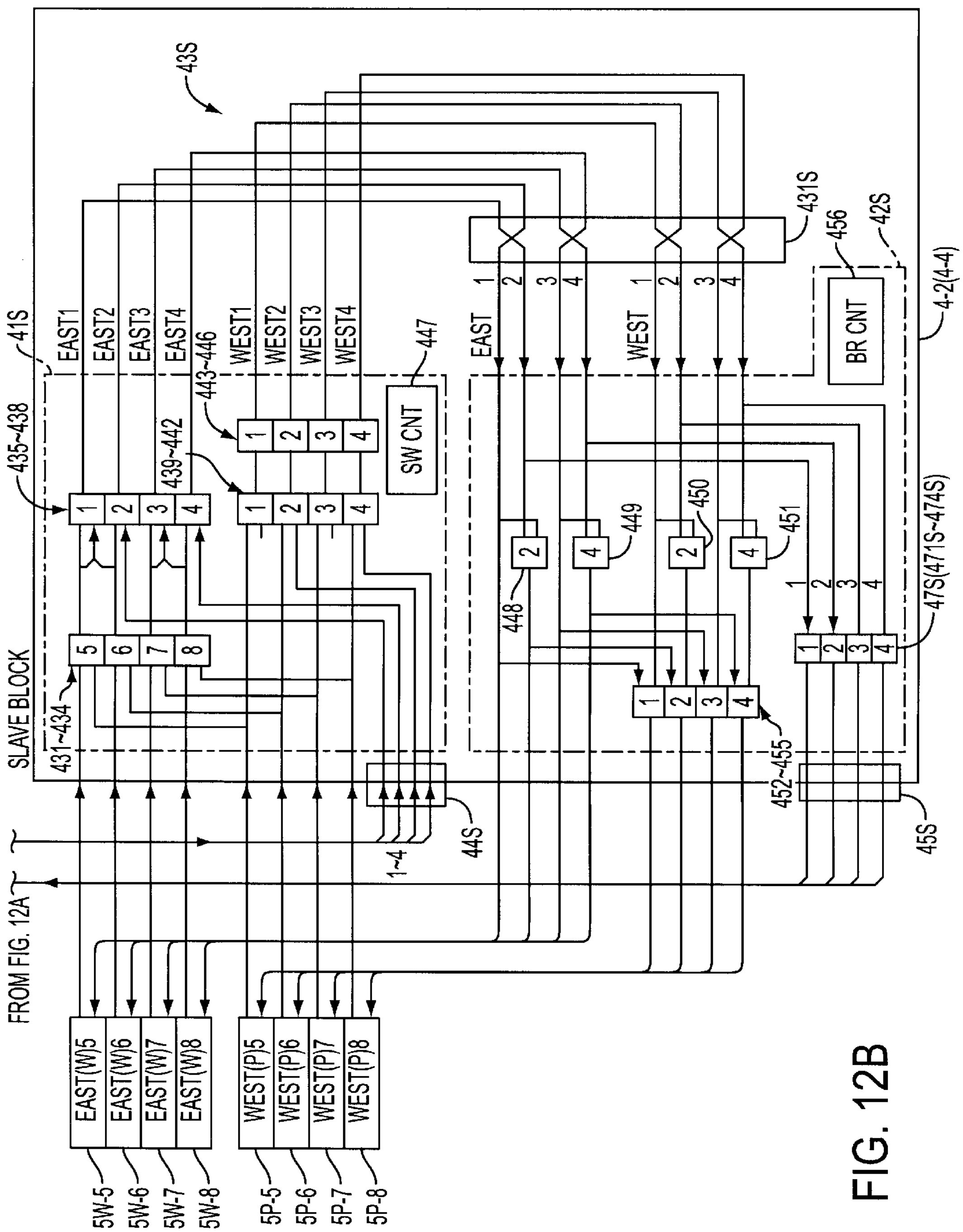
Figure 13A:
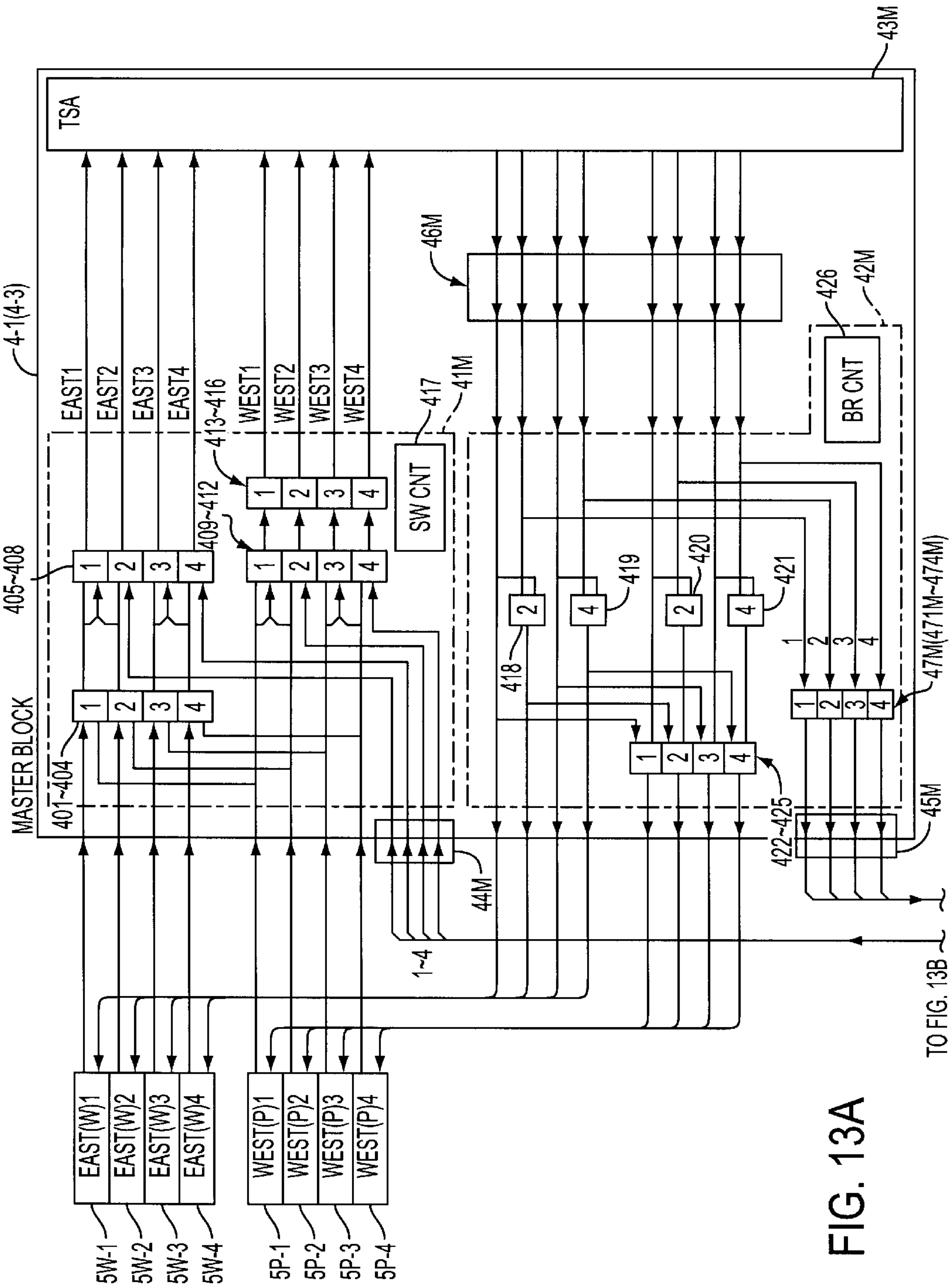
FIG. 13 is a block diagram showing detailed constructions of the master block and the slave block of the ADM of FIG. 2 and illustrating operation of the master block and the slave block in the ring mode.
Figure 13B:
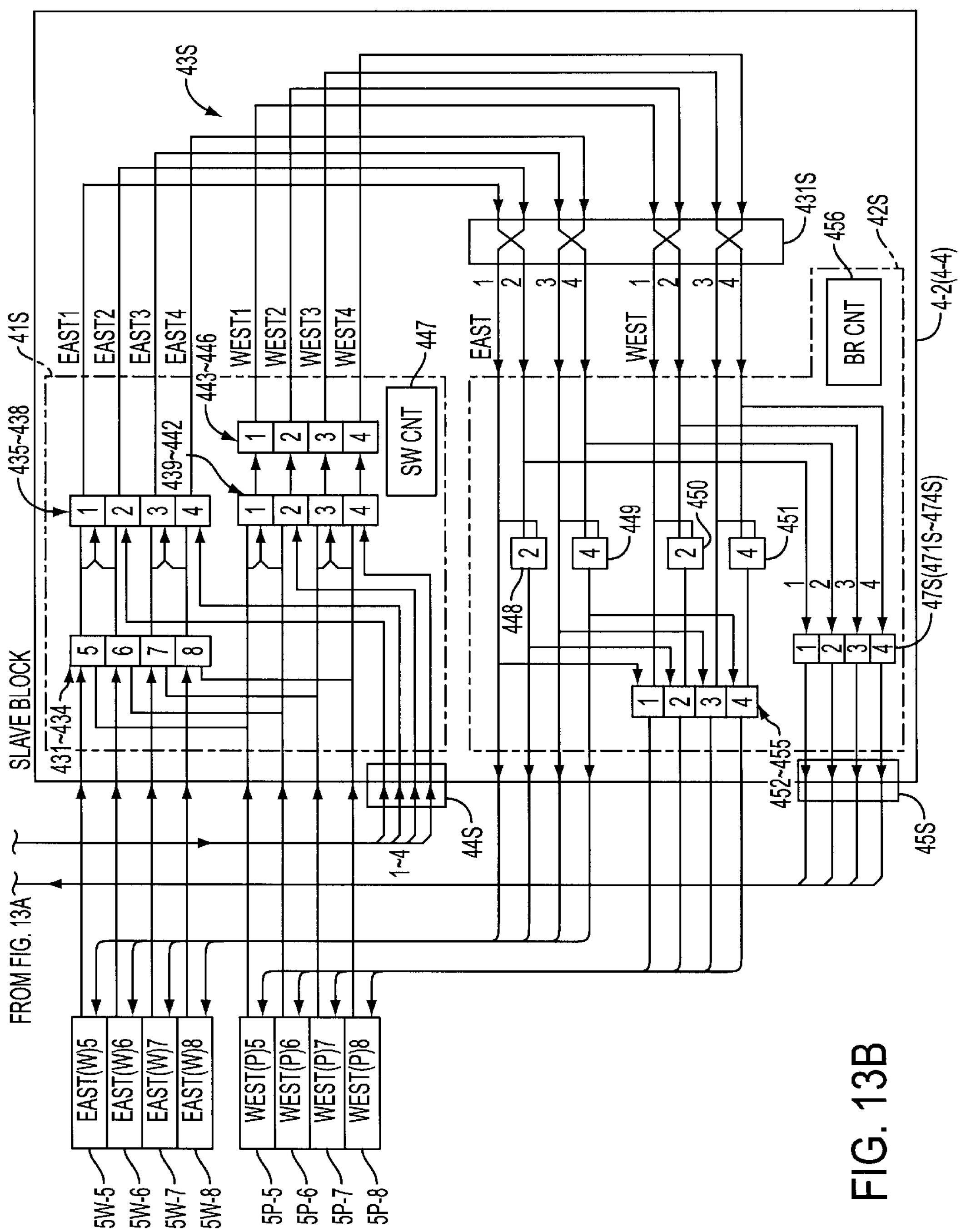
Figure 14A:
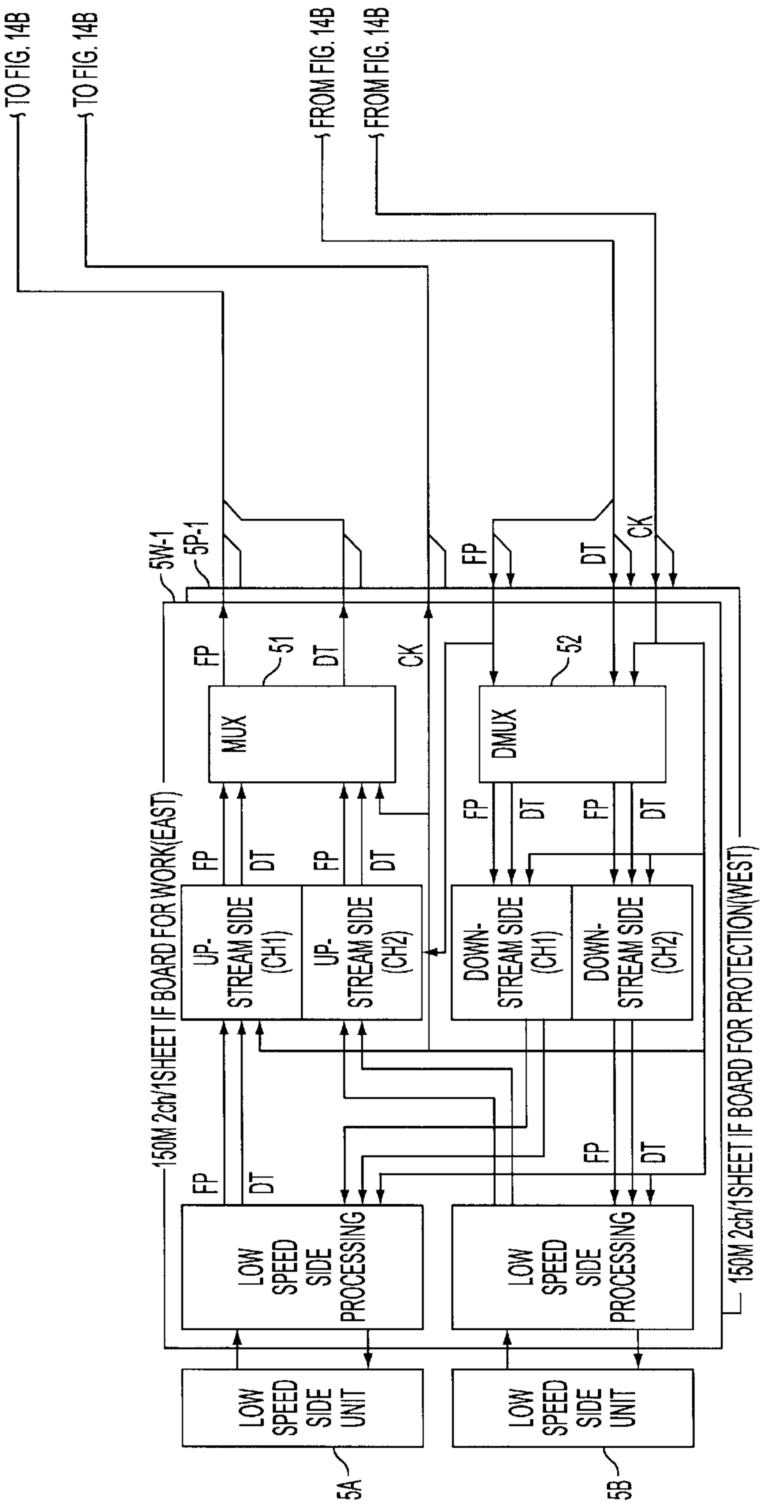
FIG. 14 is a block diagram showing detailed constructions of an IF board mounted on the ADM of FIG. 2 and the master block and illustrating operation of the IF board and the master block in the 1+1 mode;.
Figure 14B:
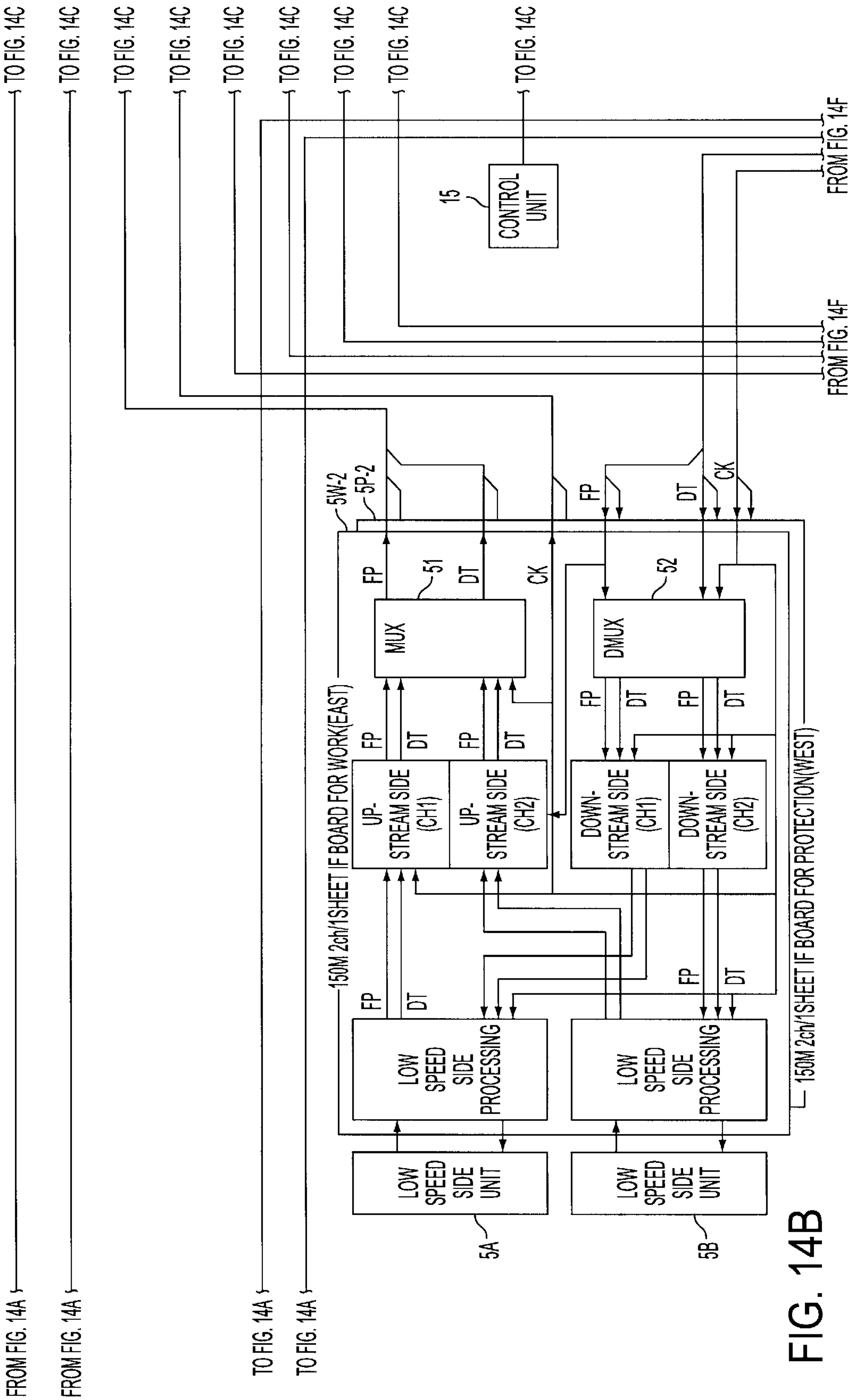
Figure 14C:
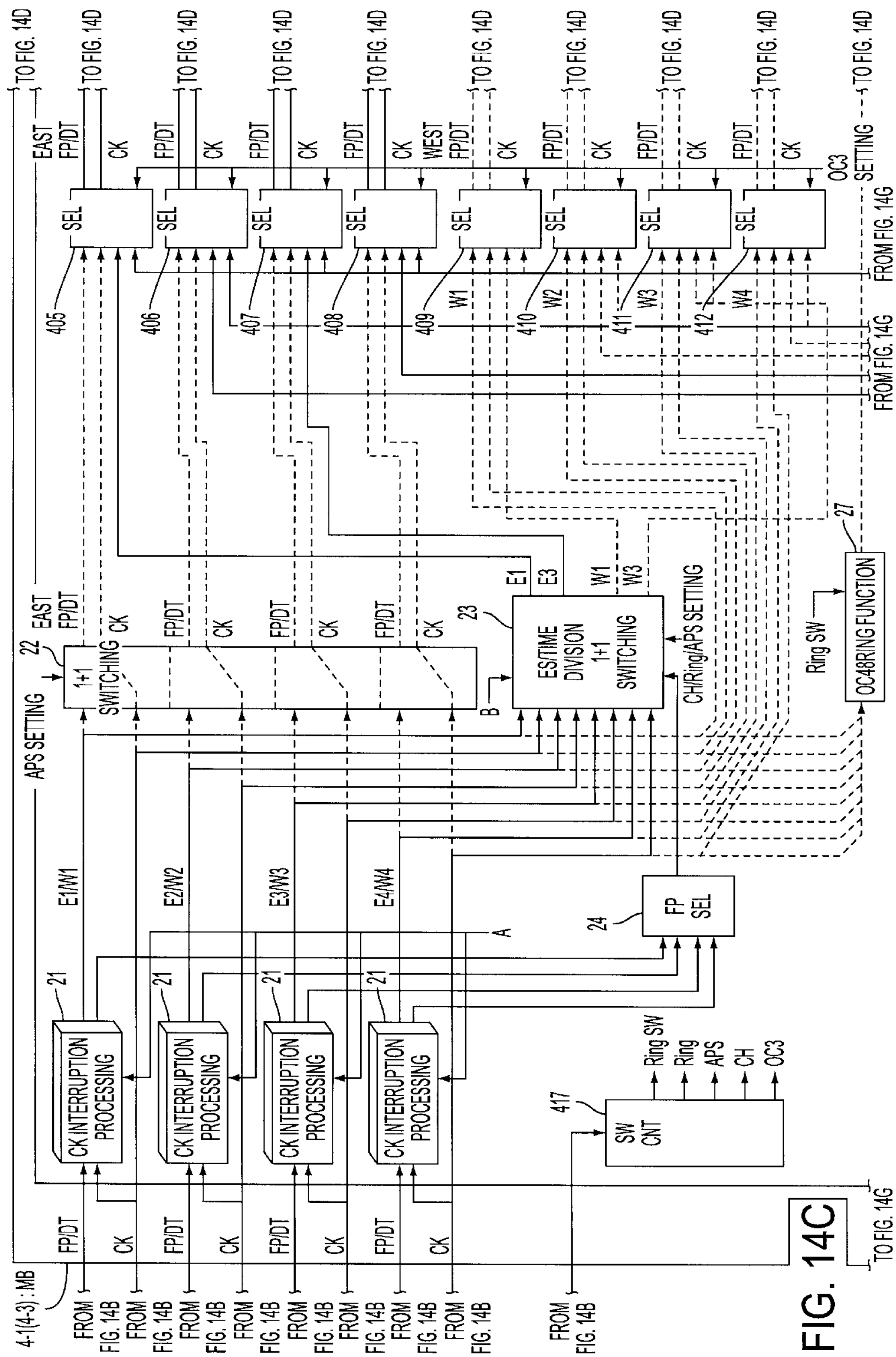
Figure 14D:
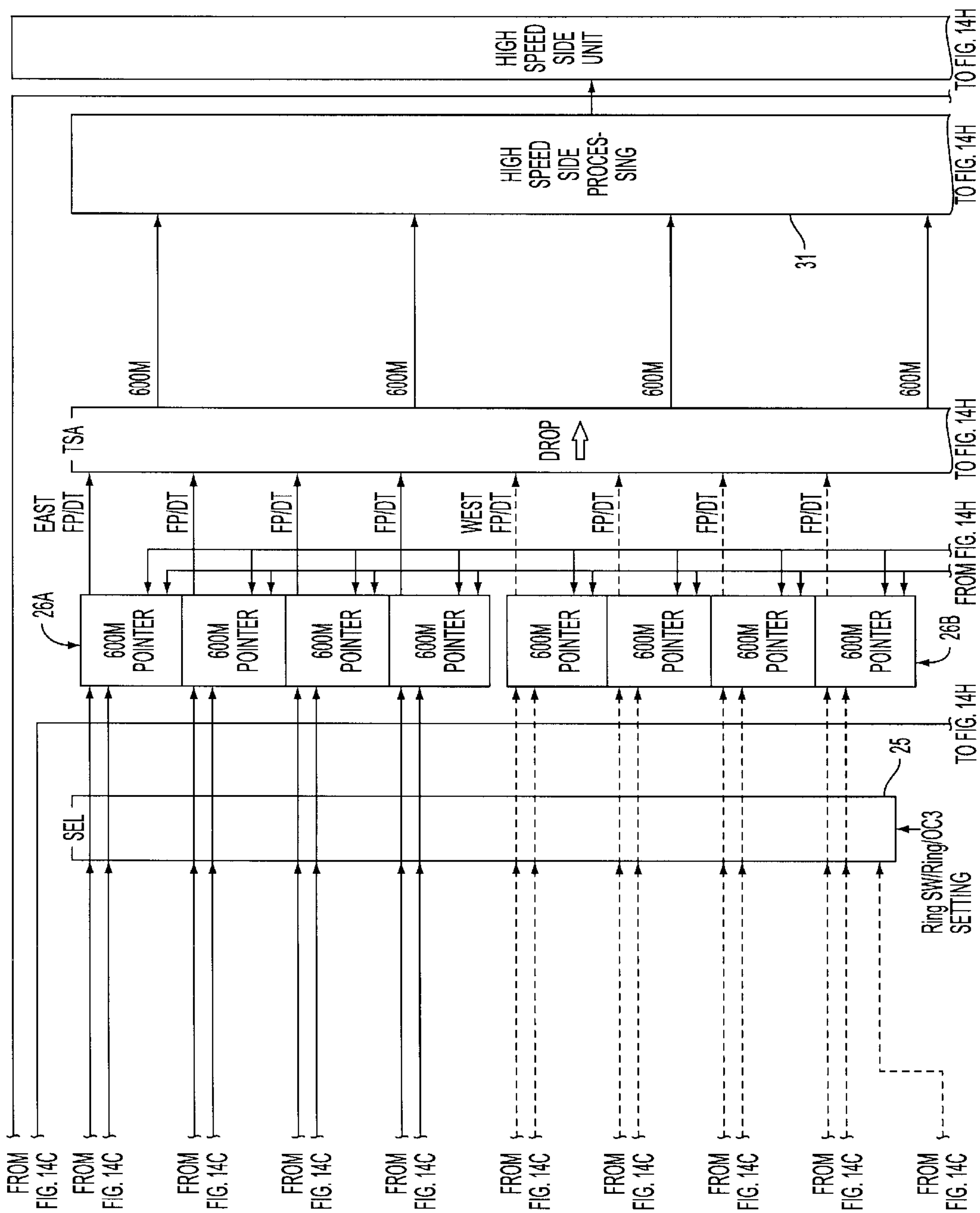
Figure 14E:
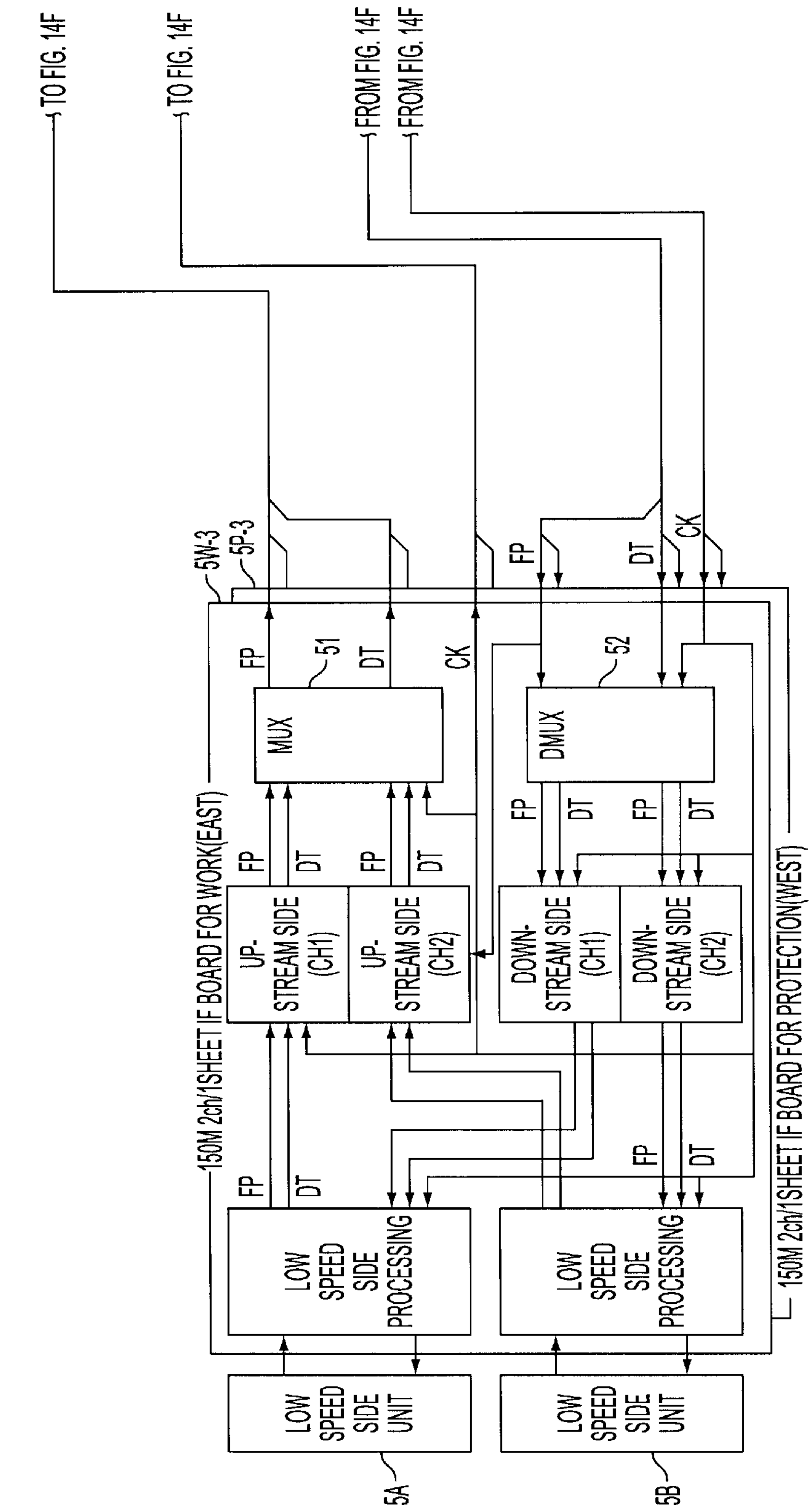
Figure 14F:
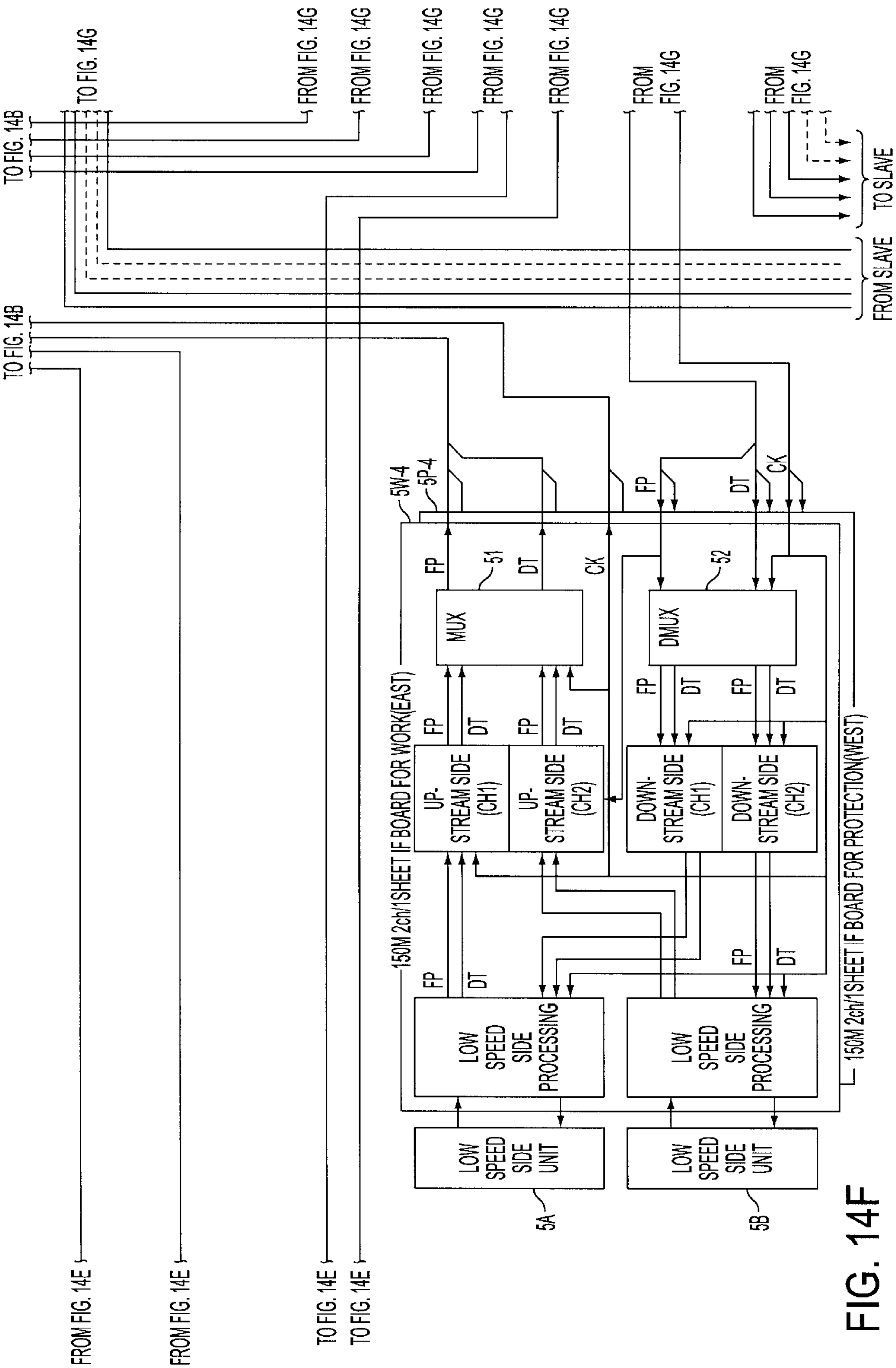
Figure 14G:
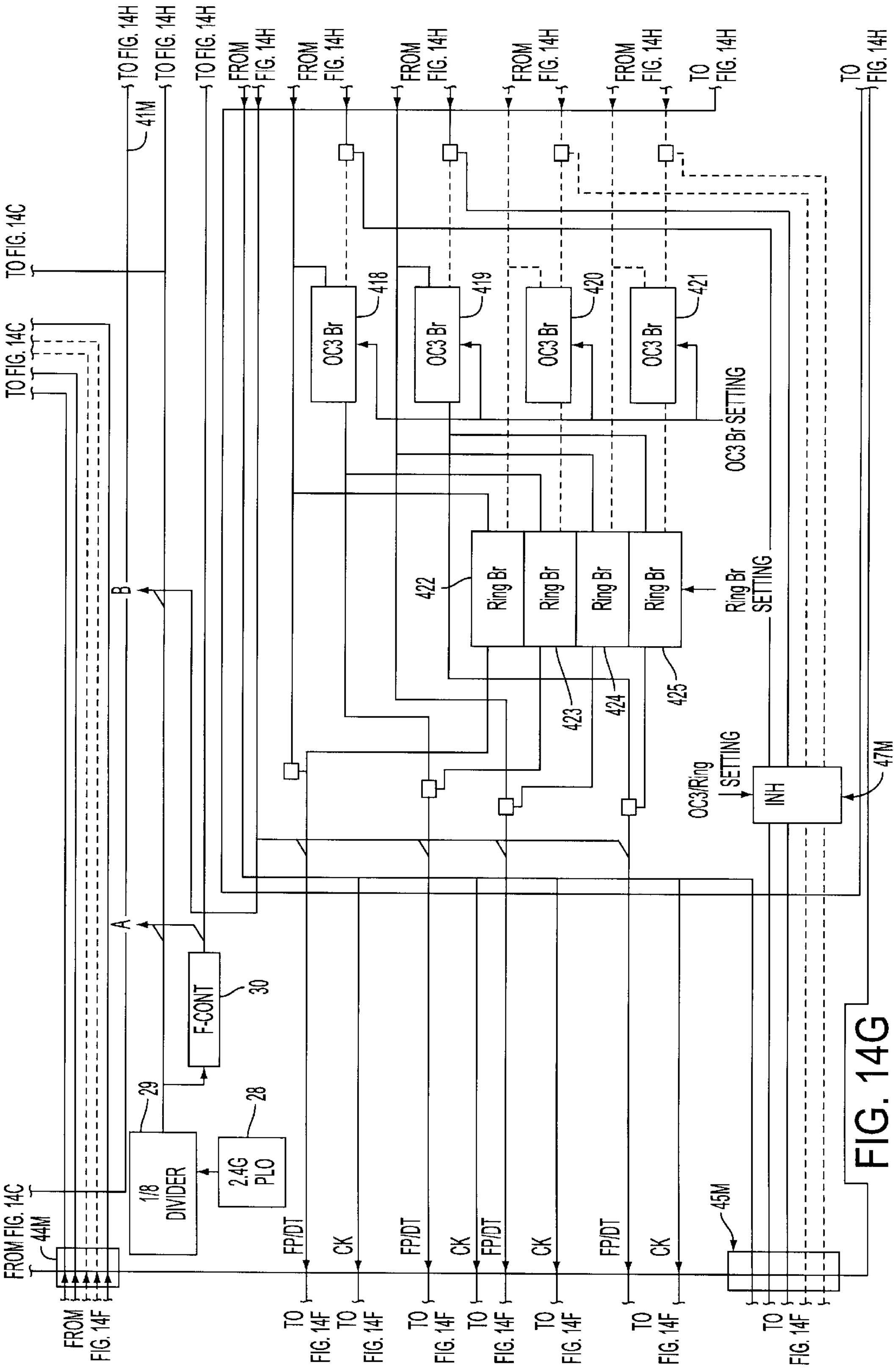
Figure 14H:
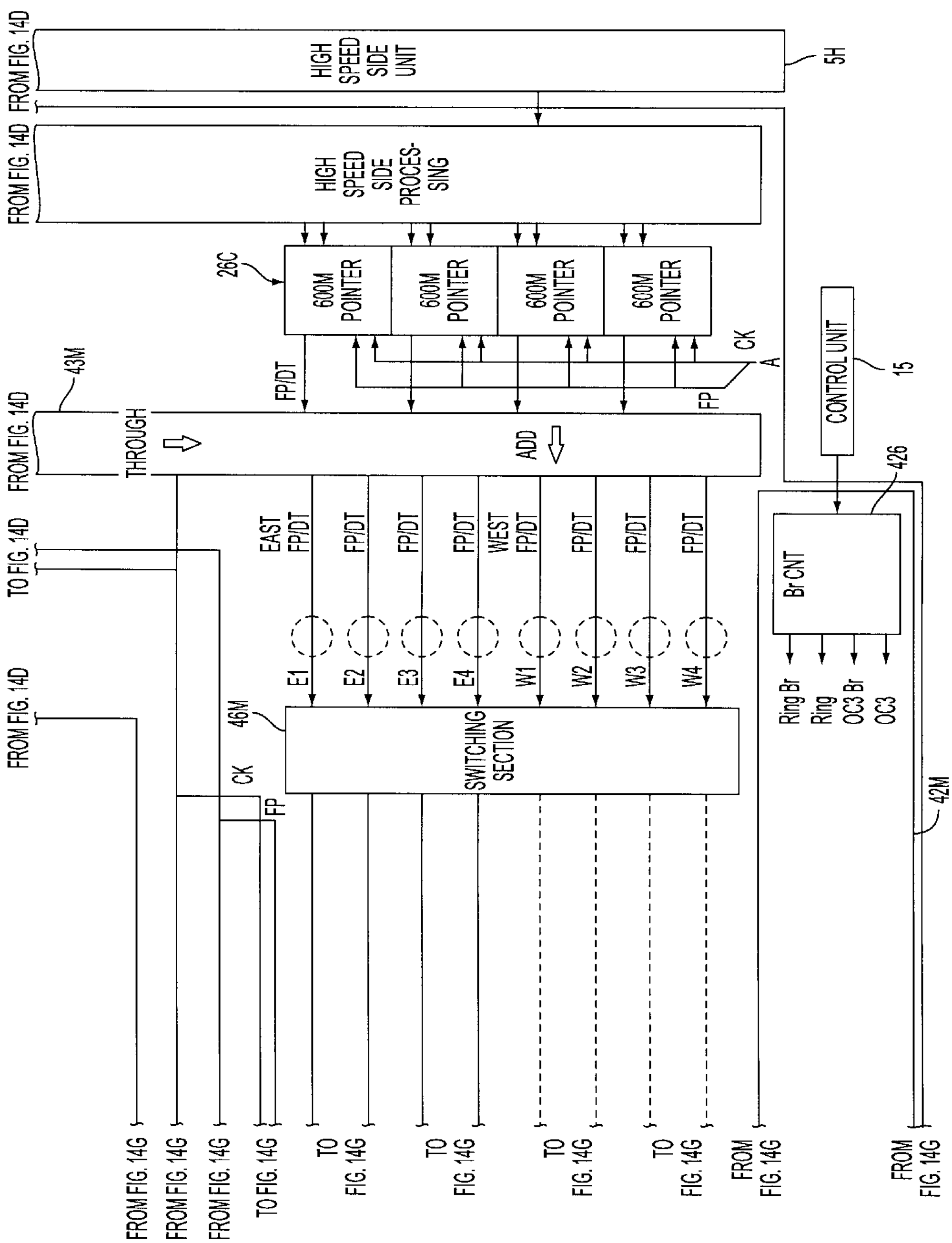
Figure 15A:
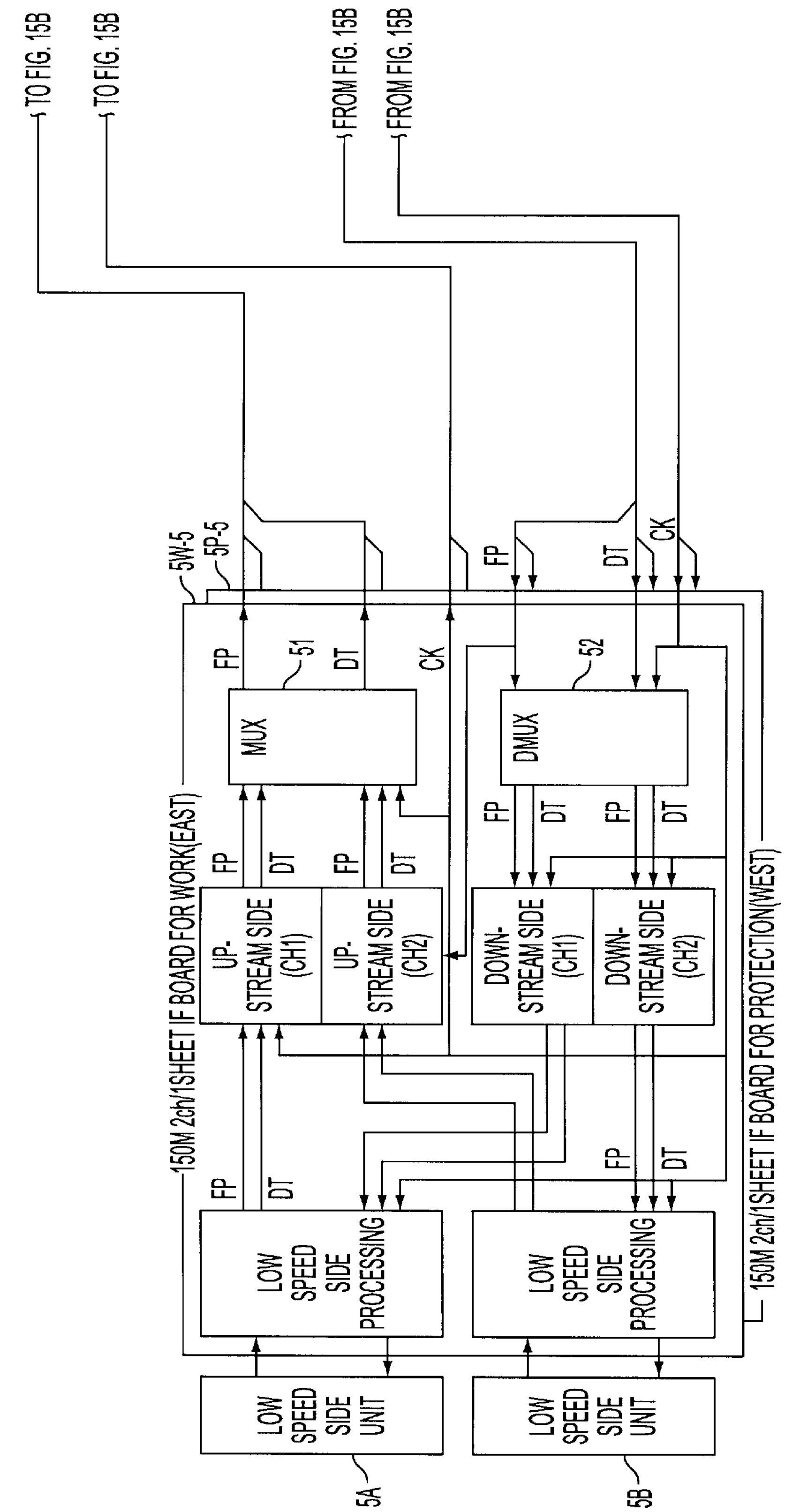
FIG. 15 is a block diagram showing detailed constructions of an IF board mounted on the ADM of FIG. 2 and the slave block and illustrating operation of the IF board and the slave block in the 1+1 mode.
Figure 15B:
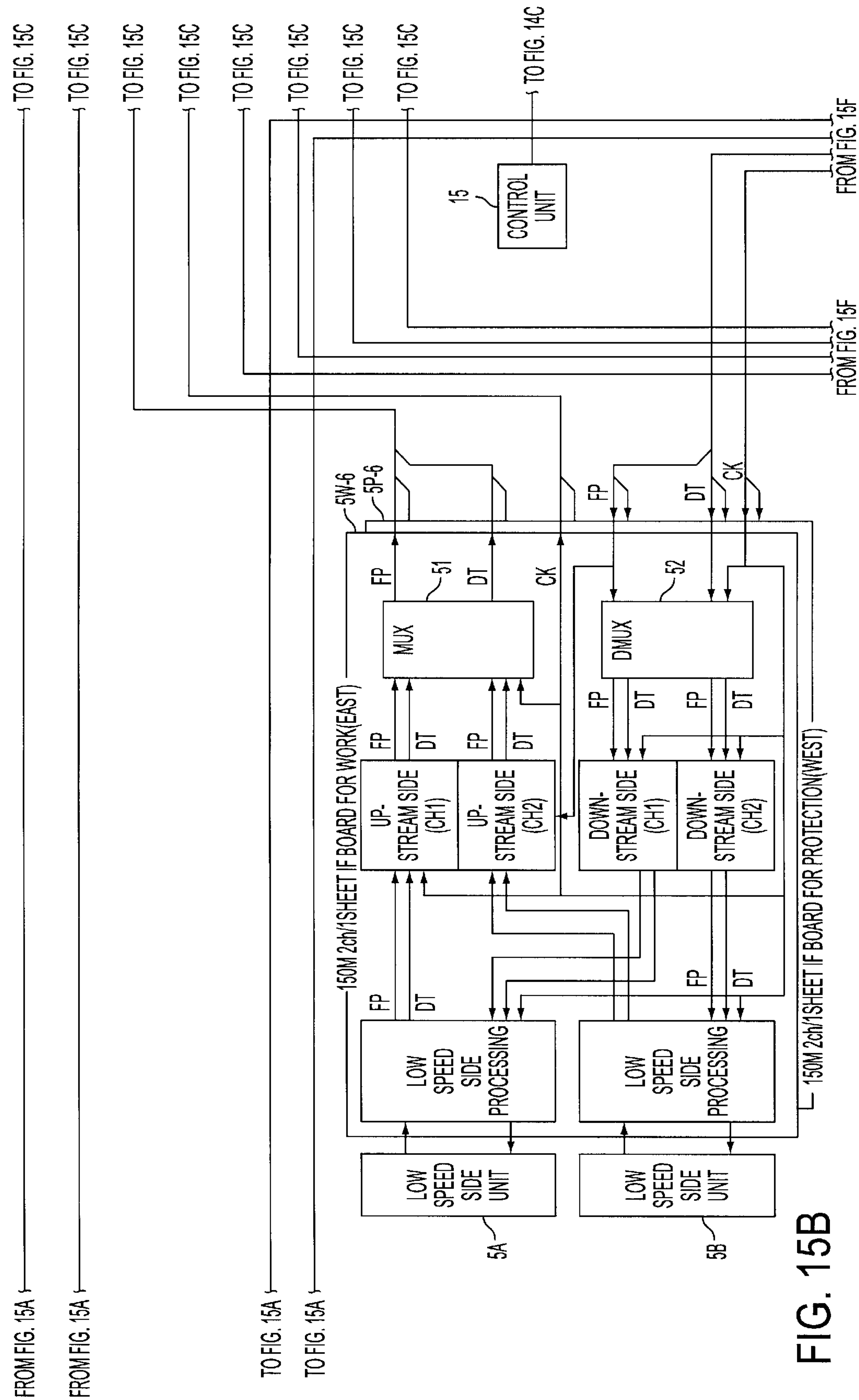
Figure 15C:
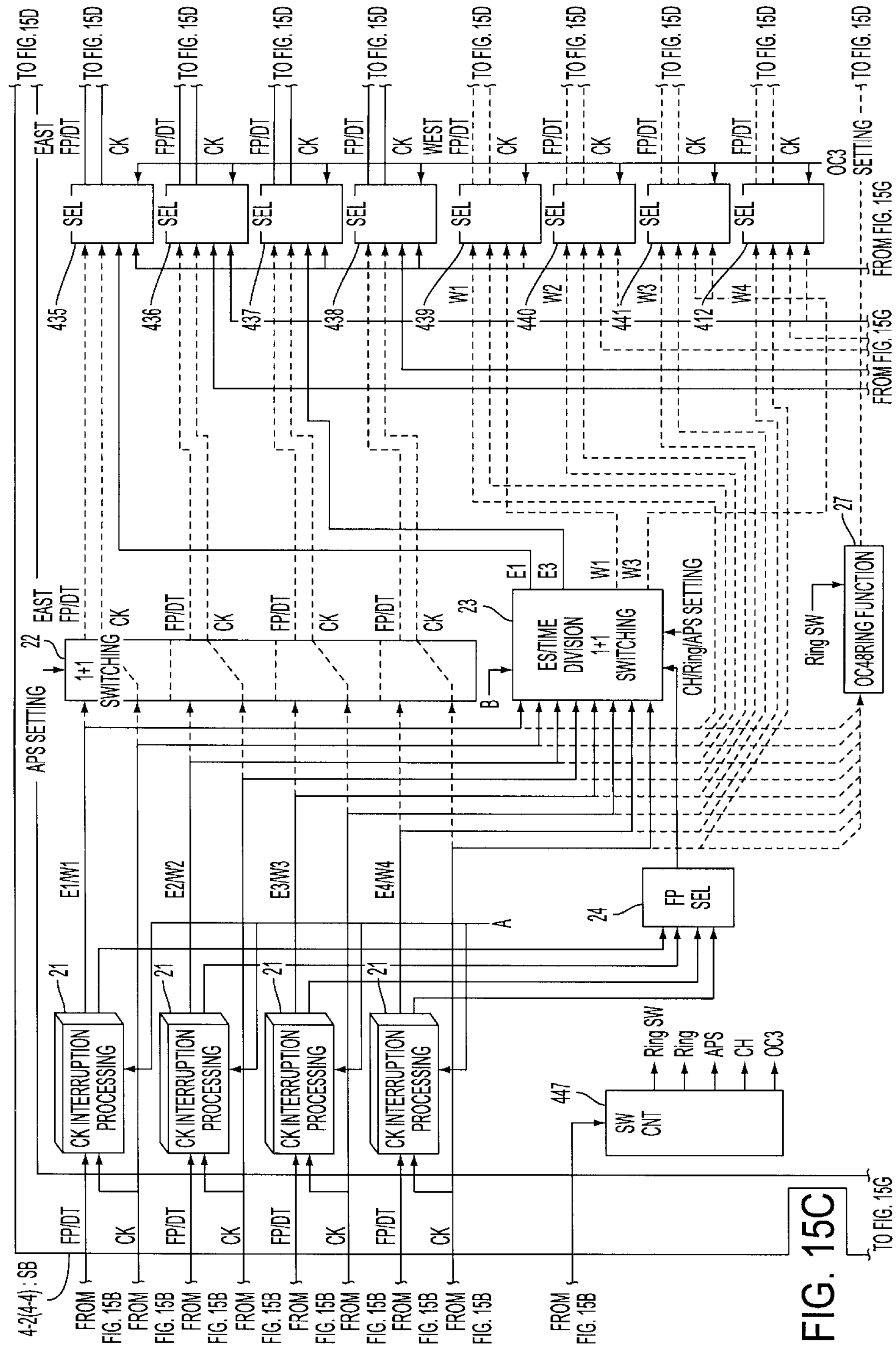
Figure 15D:
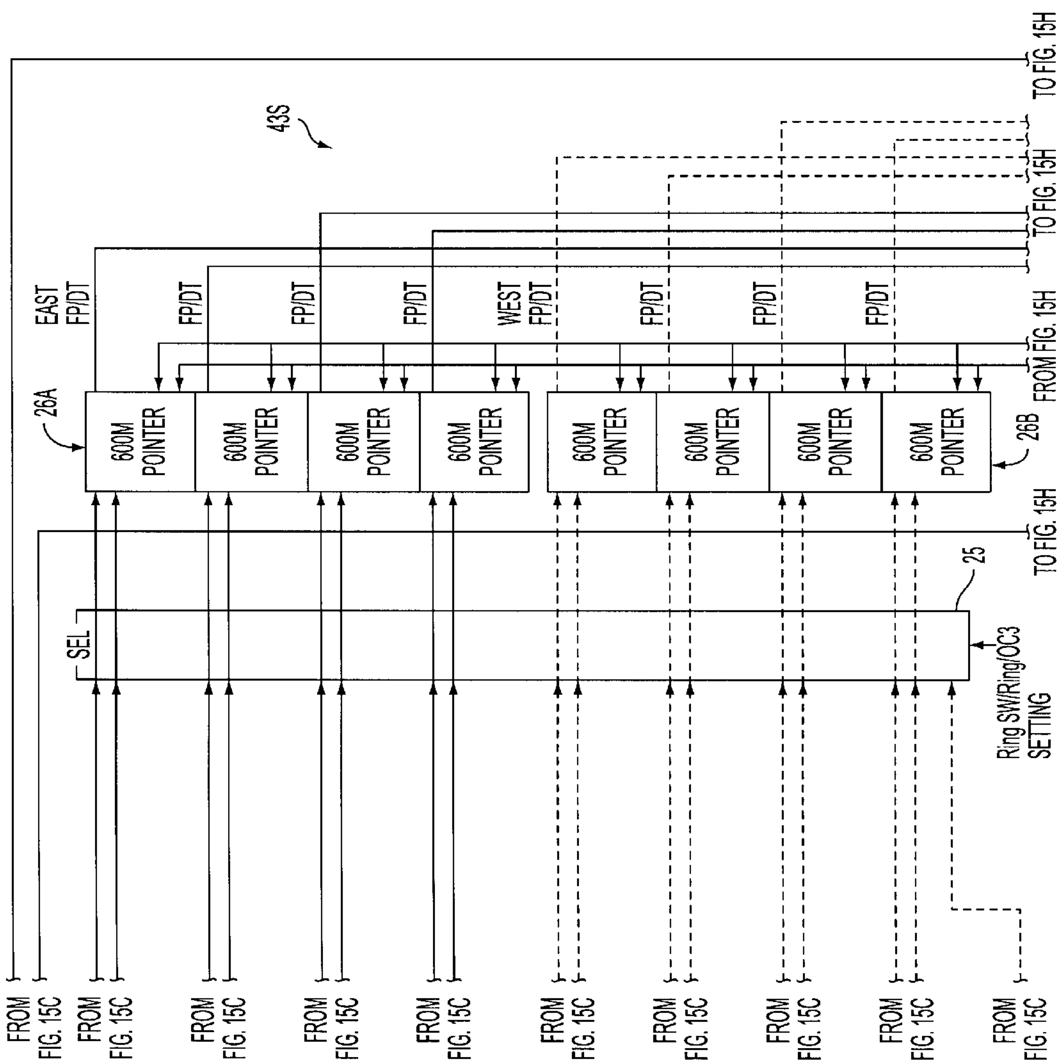
Figure 15E:
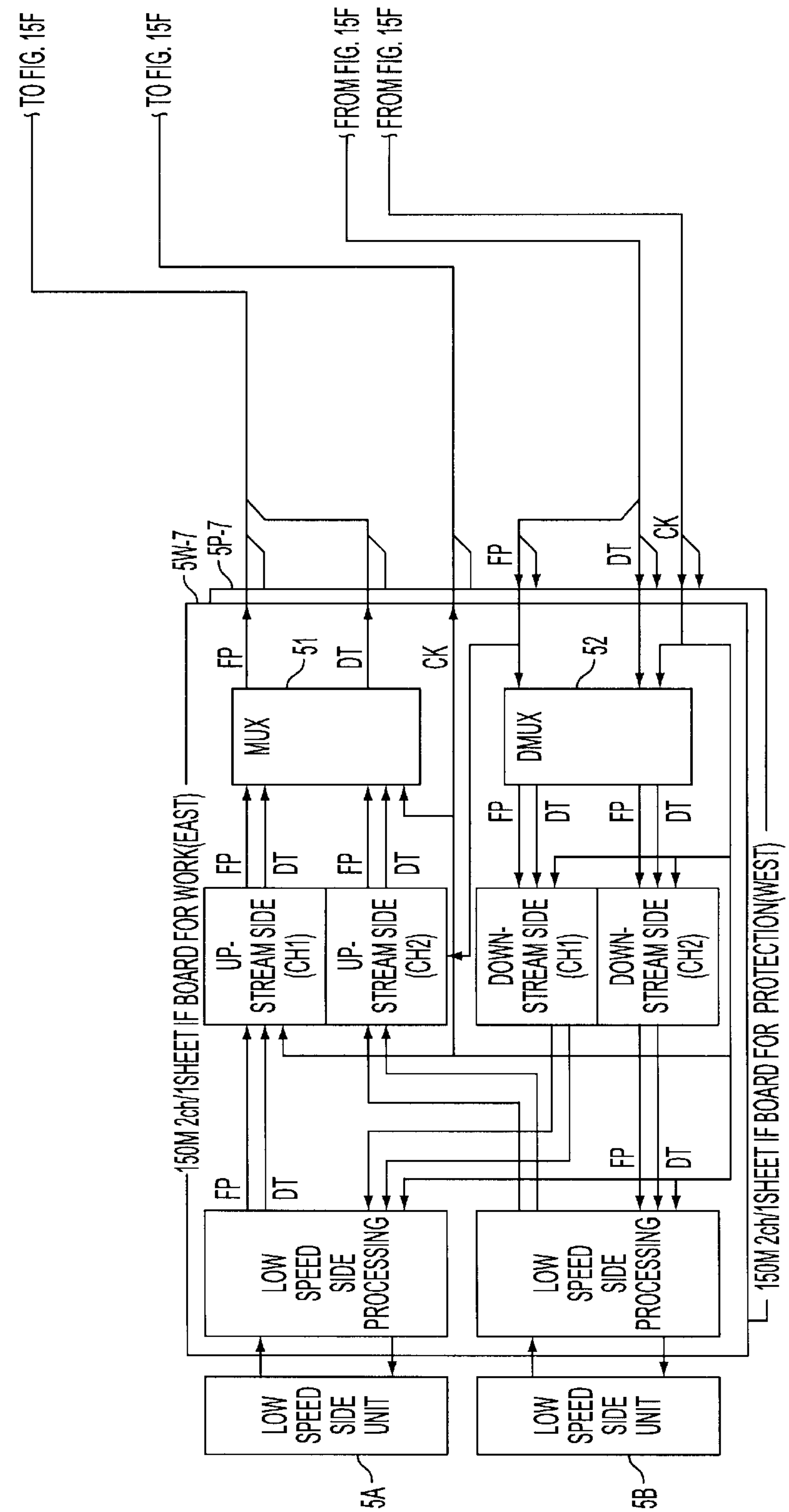
Figure 15F:
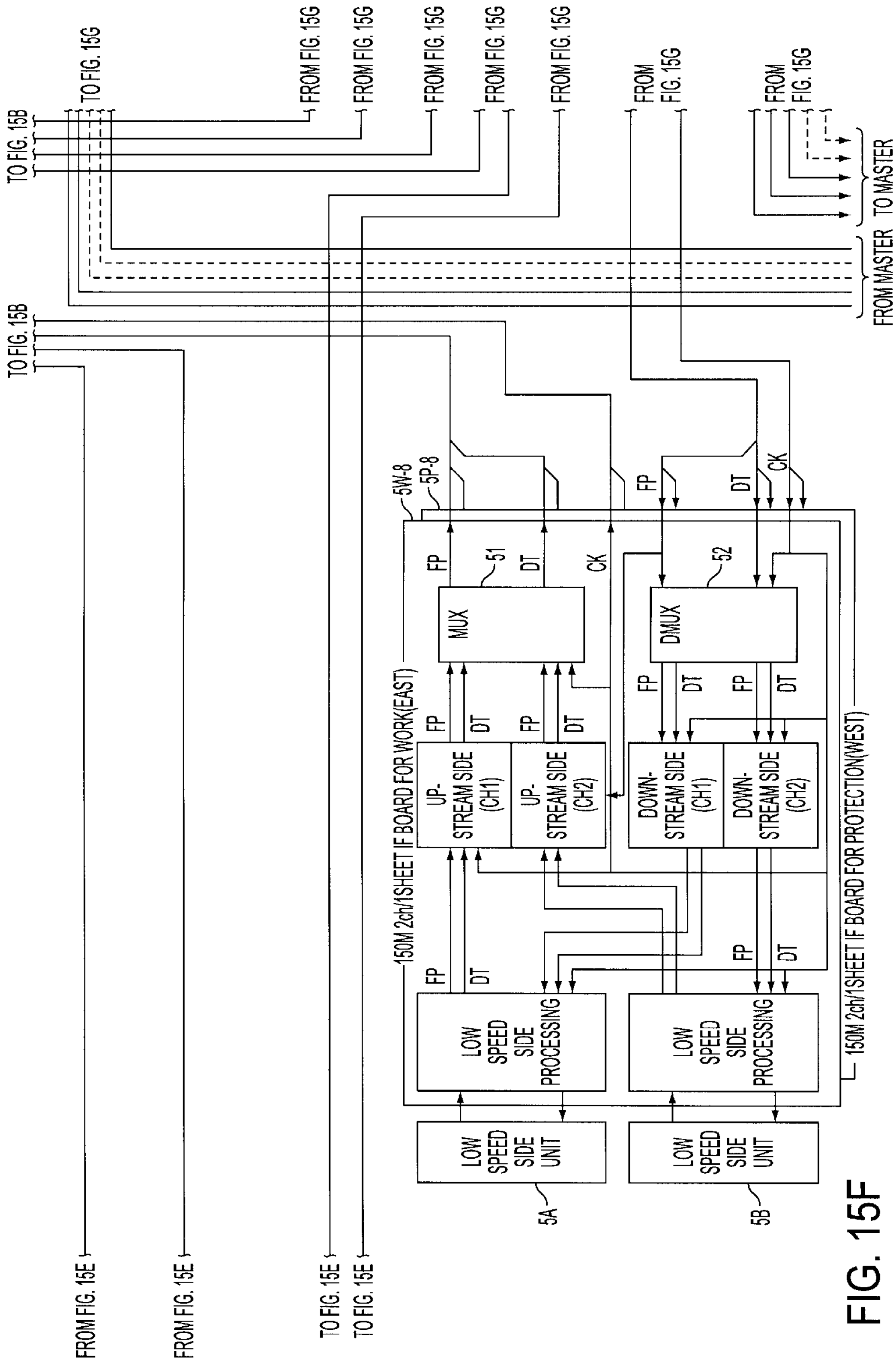
Figure 15G:
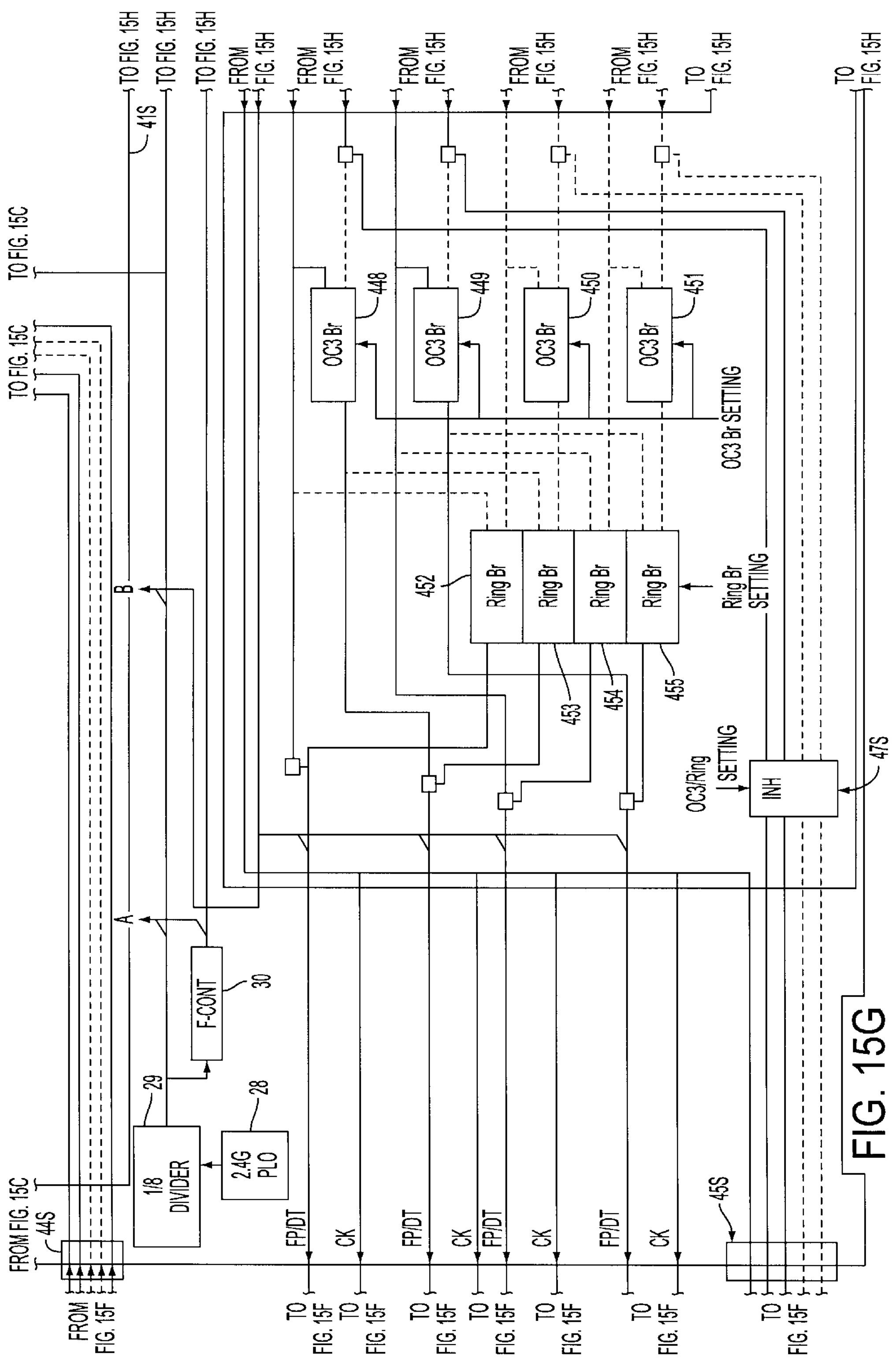
Figure 15H:
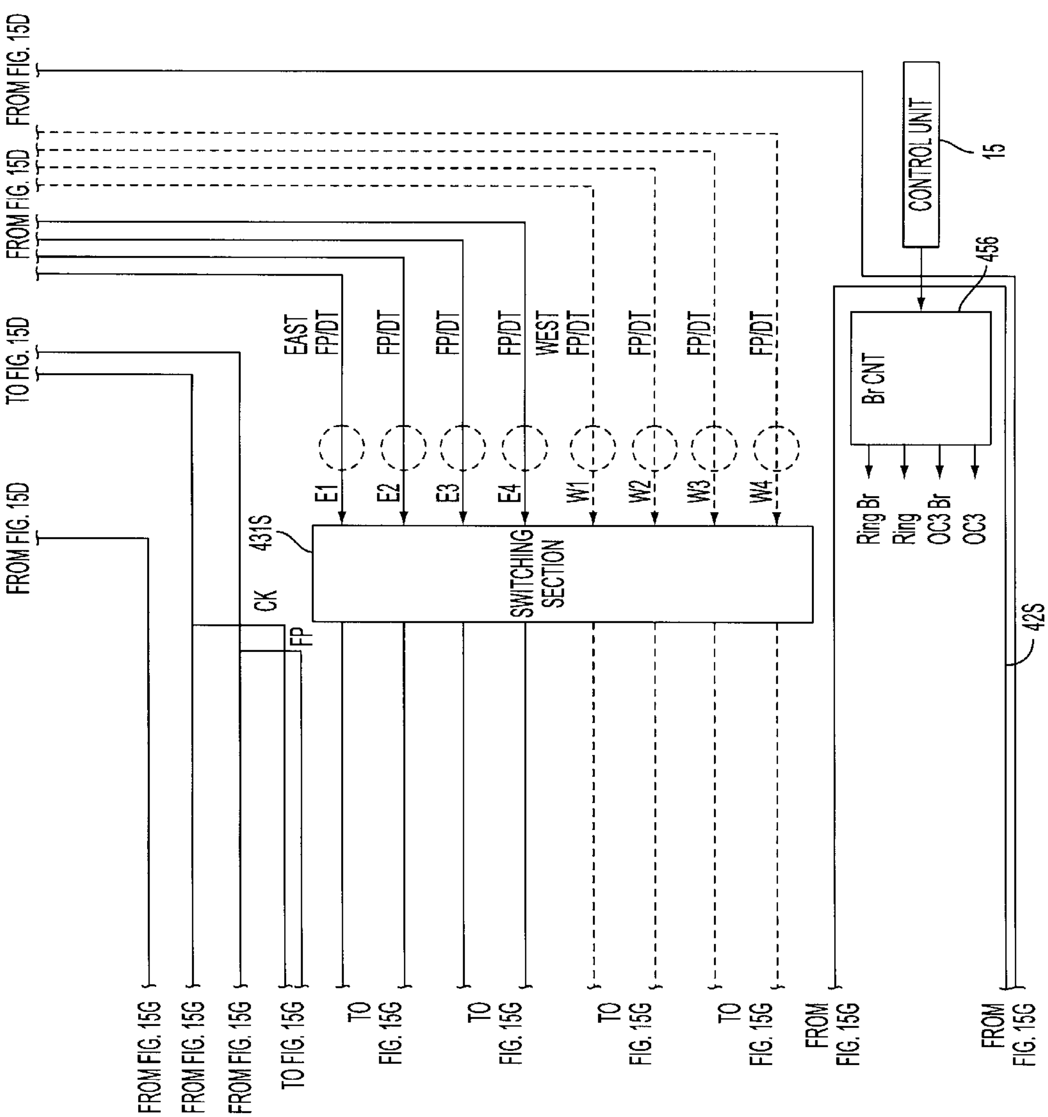
Figure 16A:
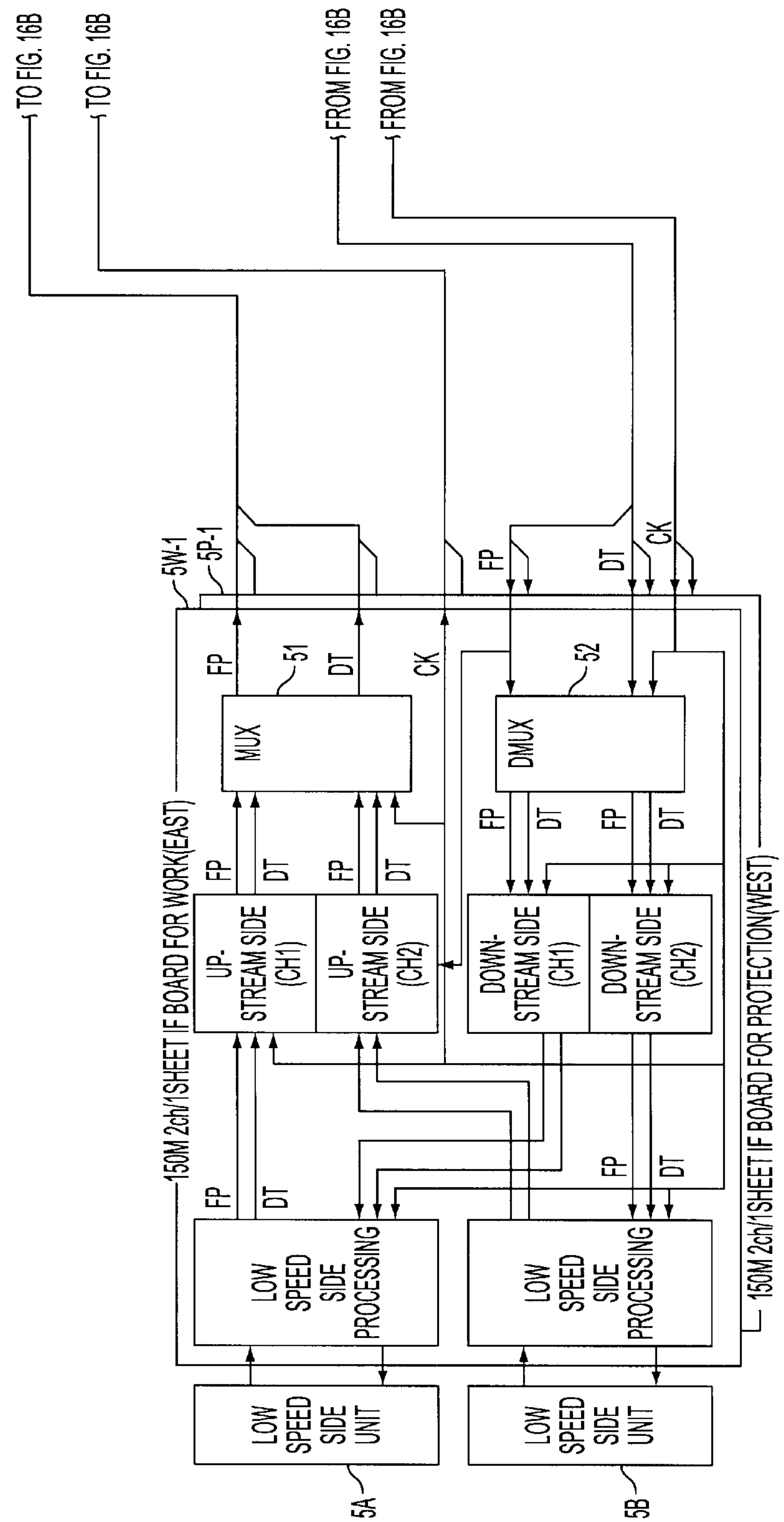
FIG. 16 is a block diagram showing detailed constructions of the IF board mounted on the ADM of FIG. 2 and the master block and illustrating operation of the IF board and the master block in the ring mode.
Figure 16B:
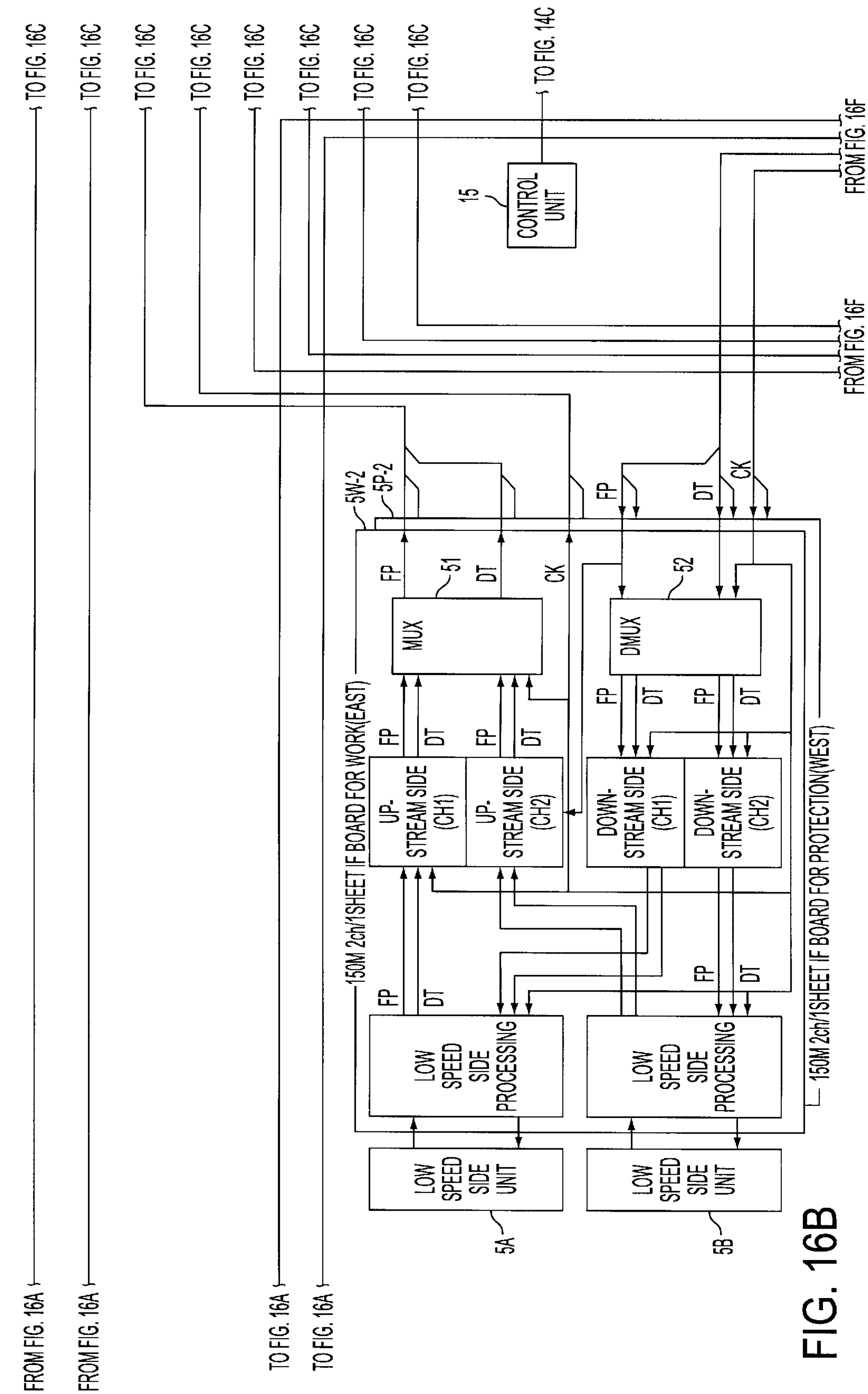
Figure 16C:
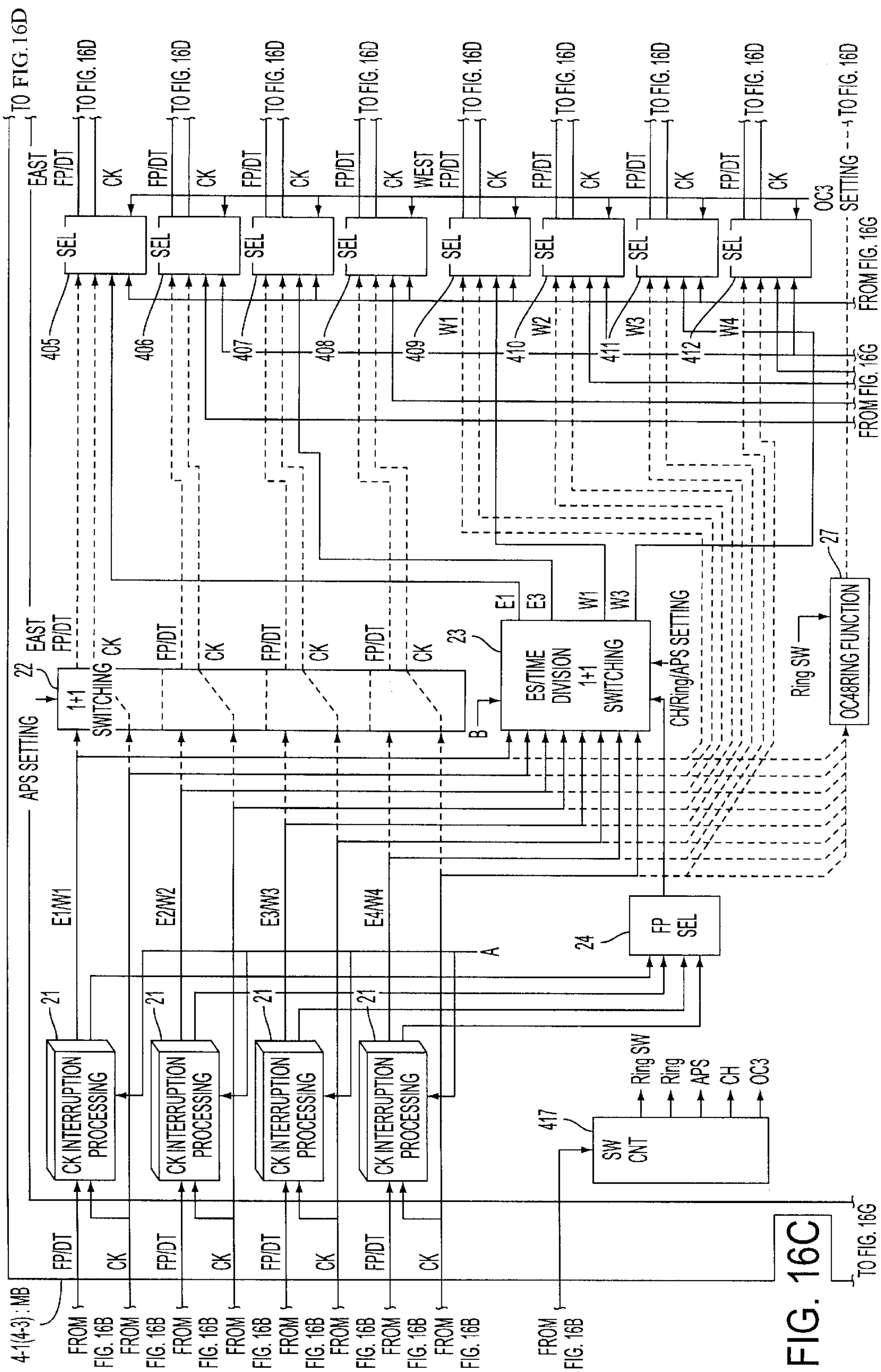
Figure 16D:
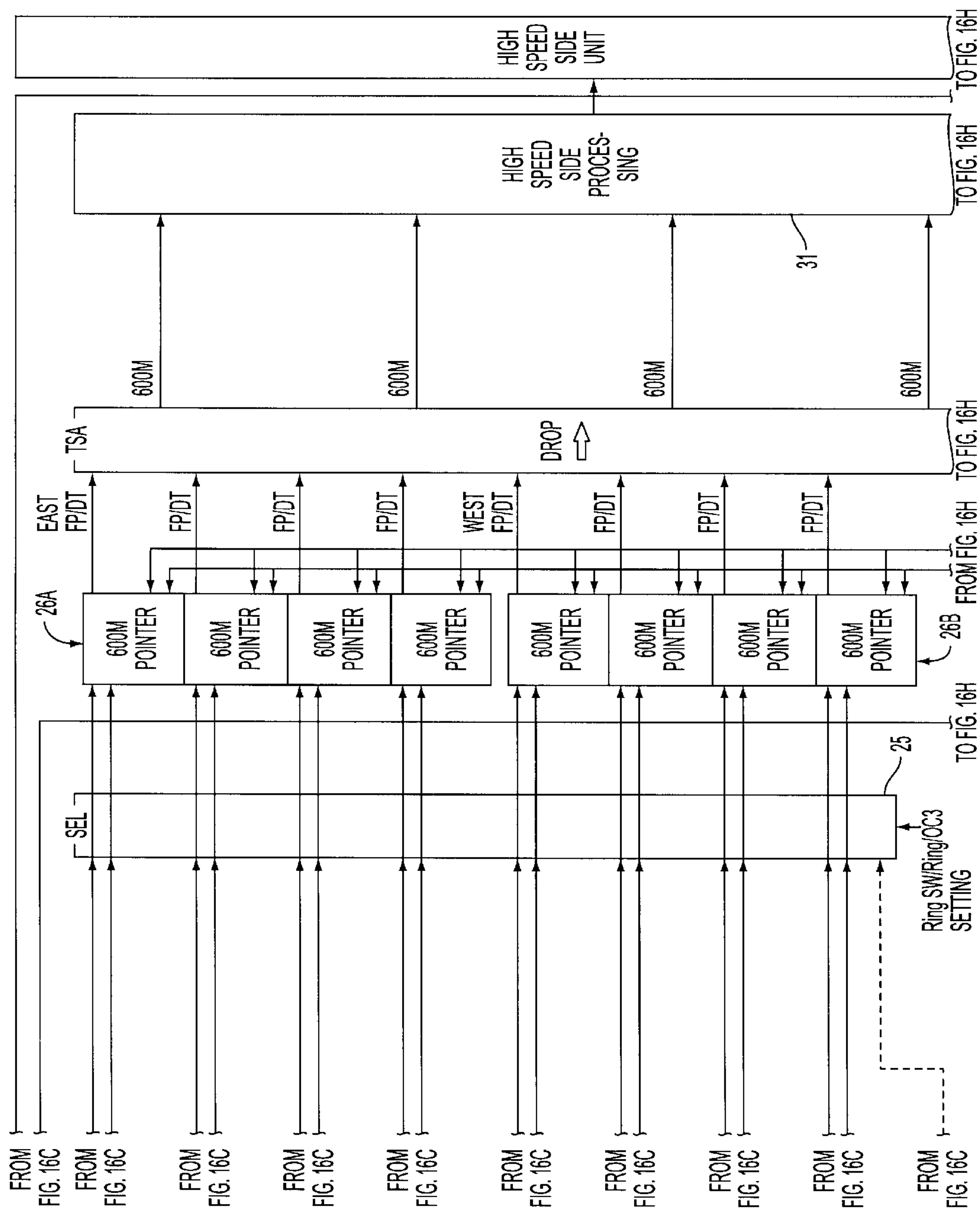
Figure 16E:
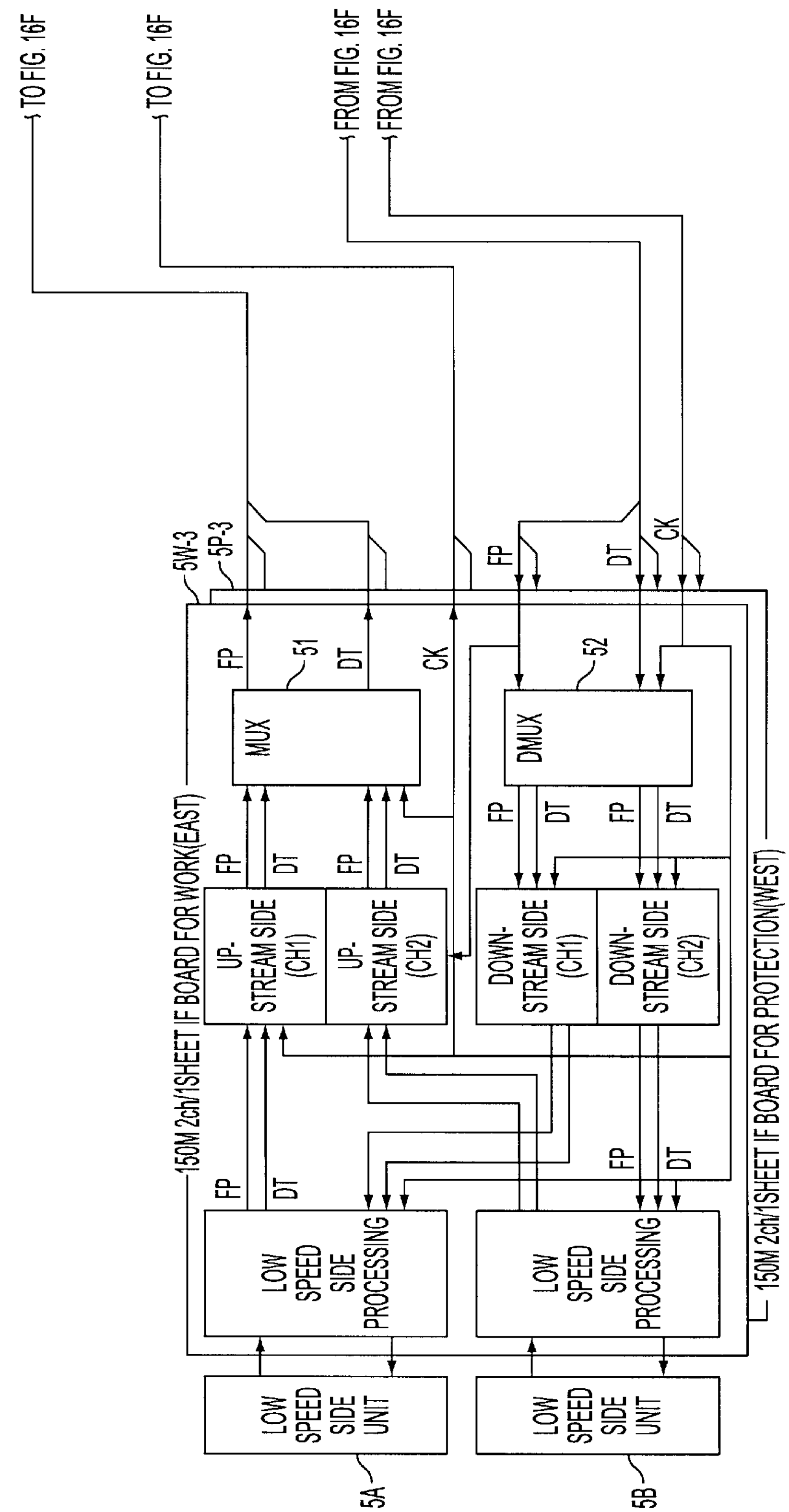
Figure 16F:
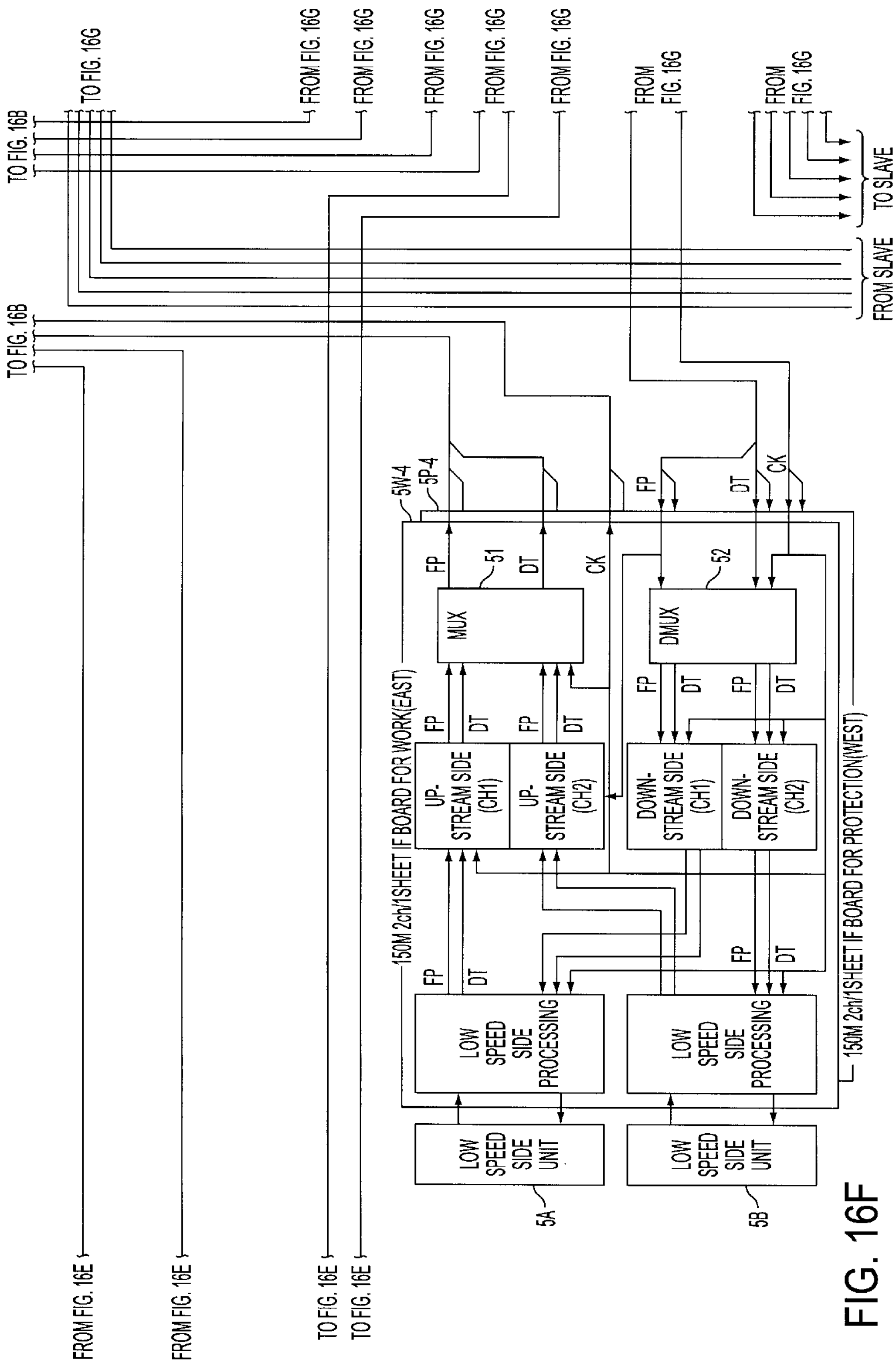
Figure 16G:
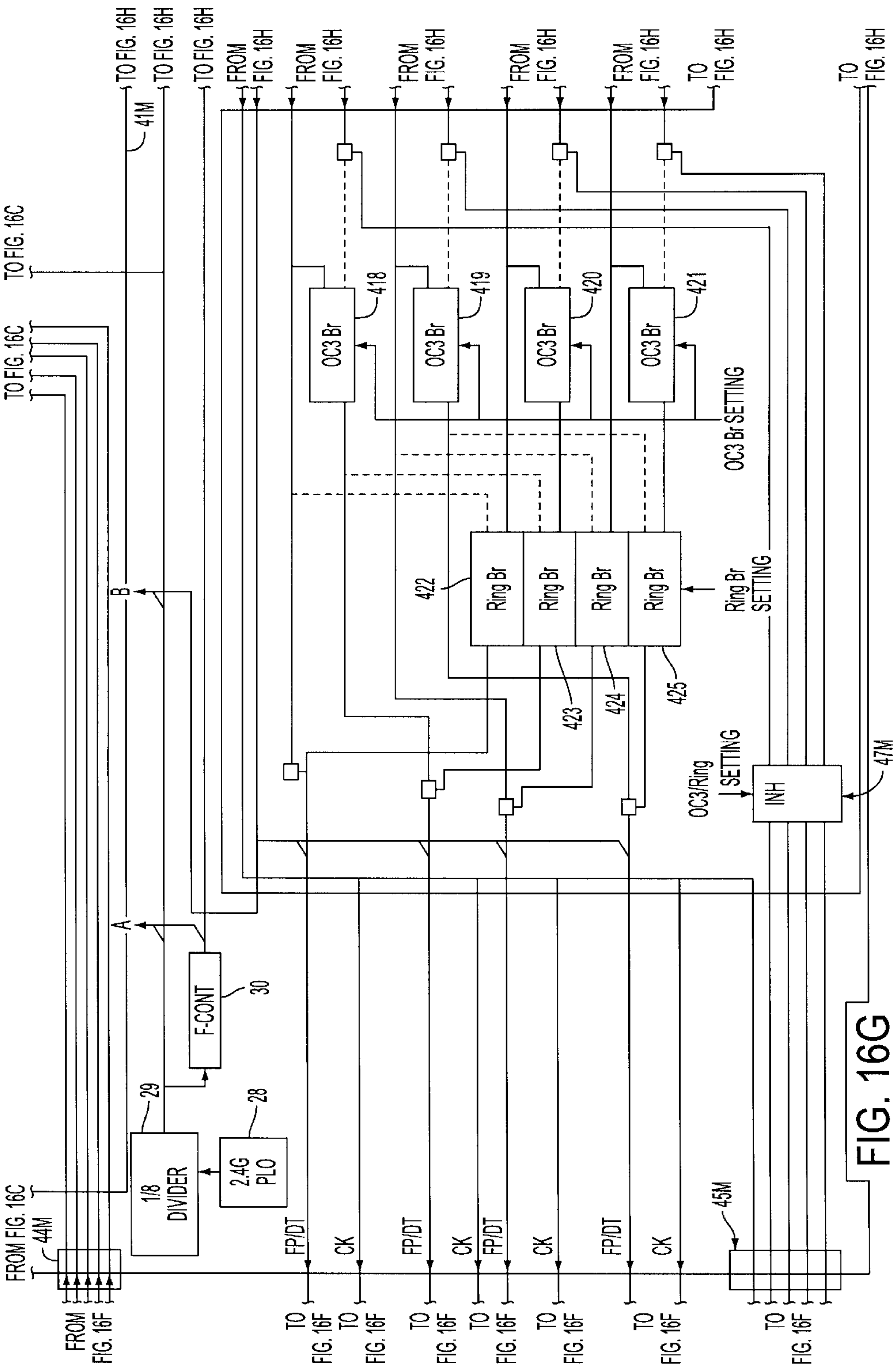
Figure 16H:
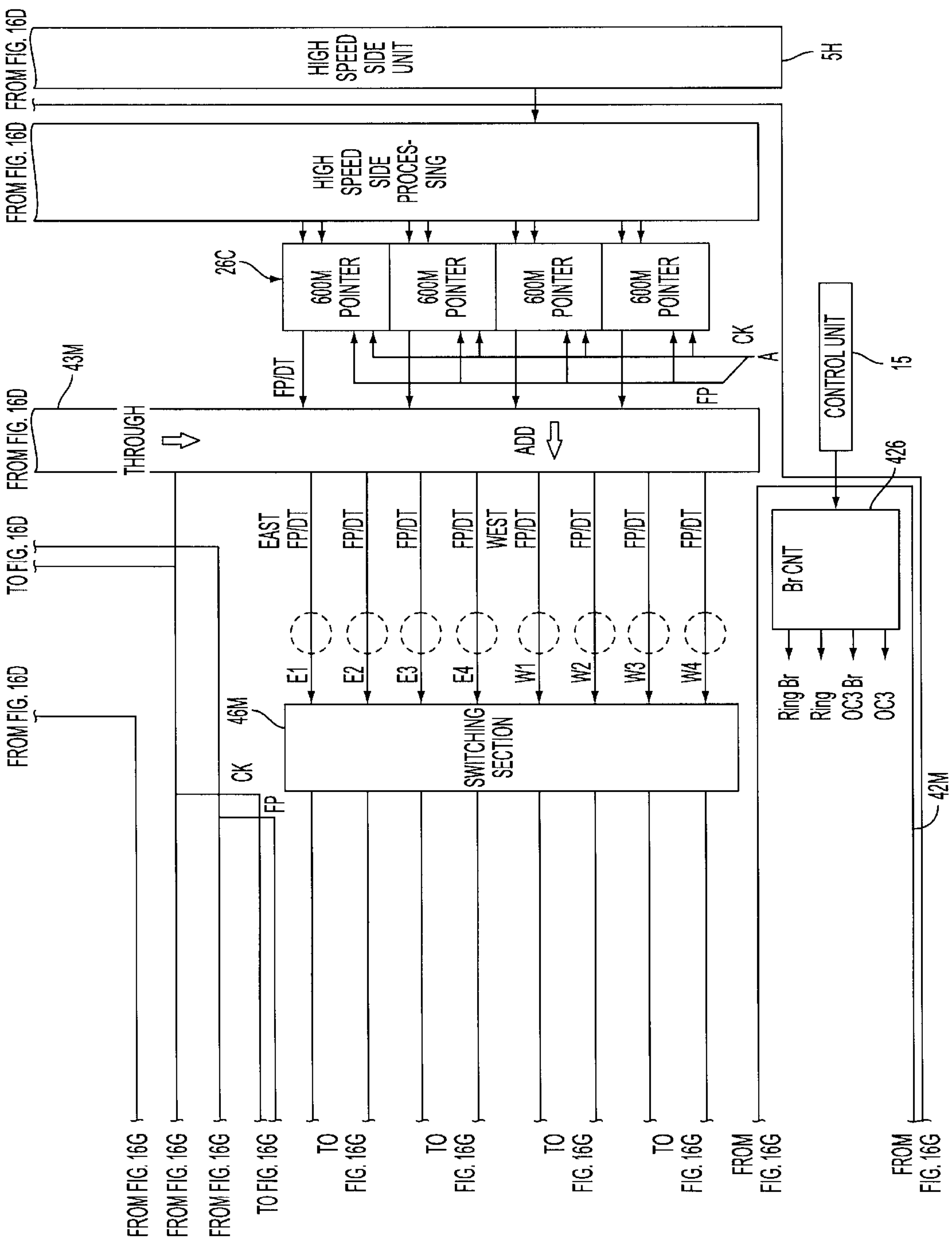
Figure 17A:
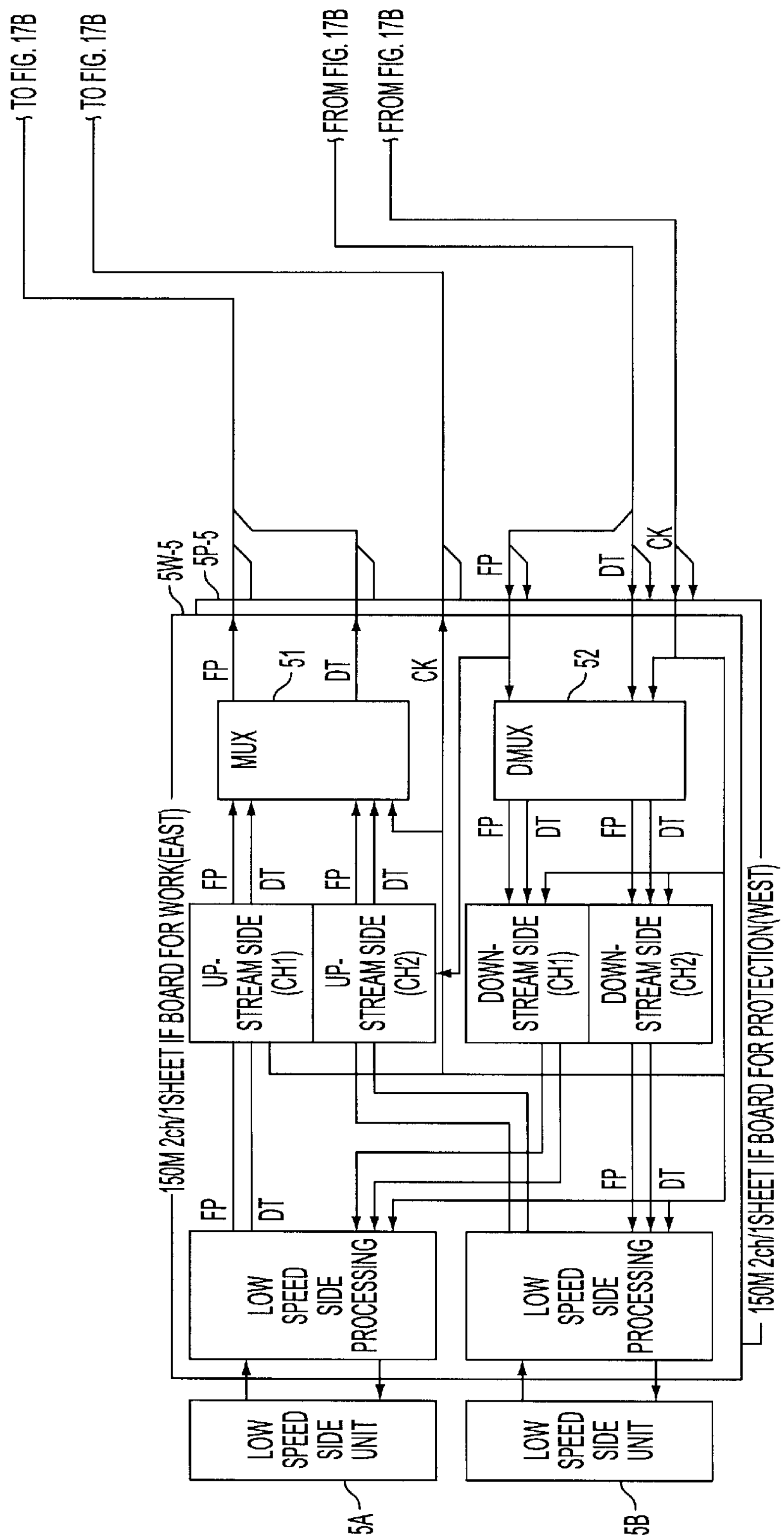
FIG. 17 is a block diagram showing detailed constructions of the IF board mounted on the ADM of FIG. 2 and the slave block and illustrating operation of the IF board and the slave block in the ring mode.
Figure 17B:
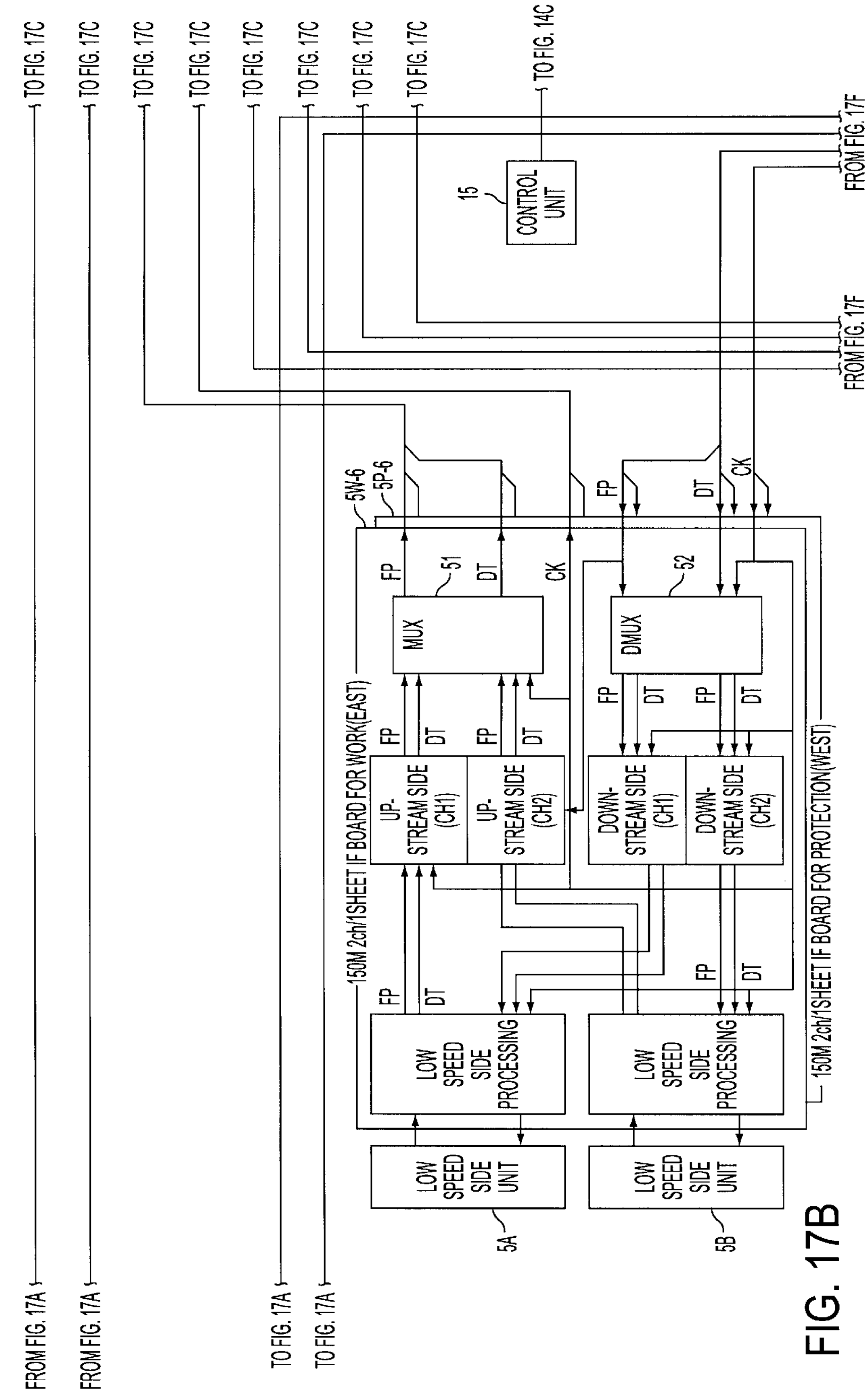
Figure 17C:
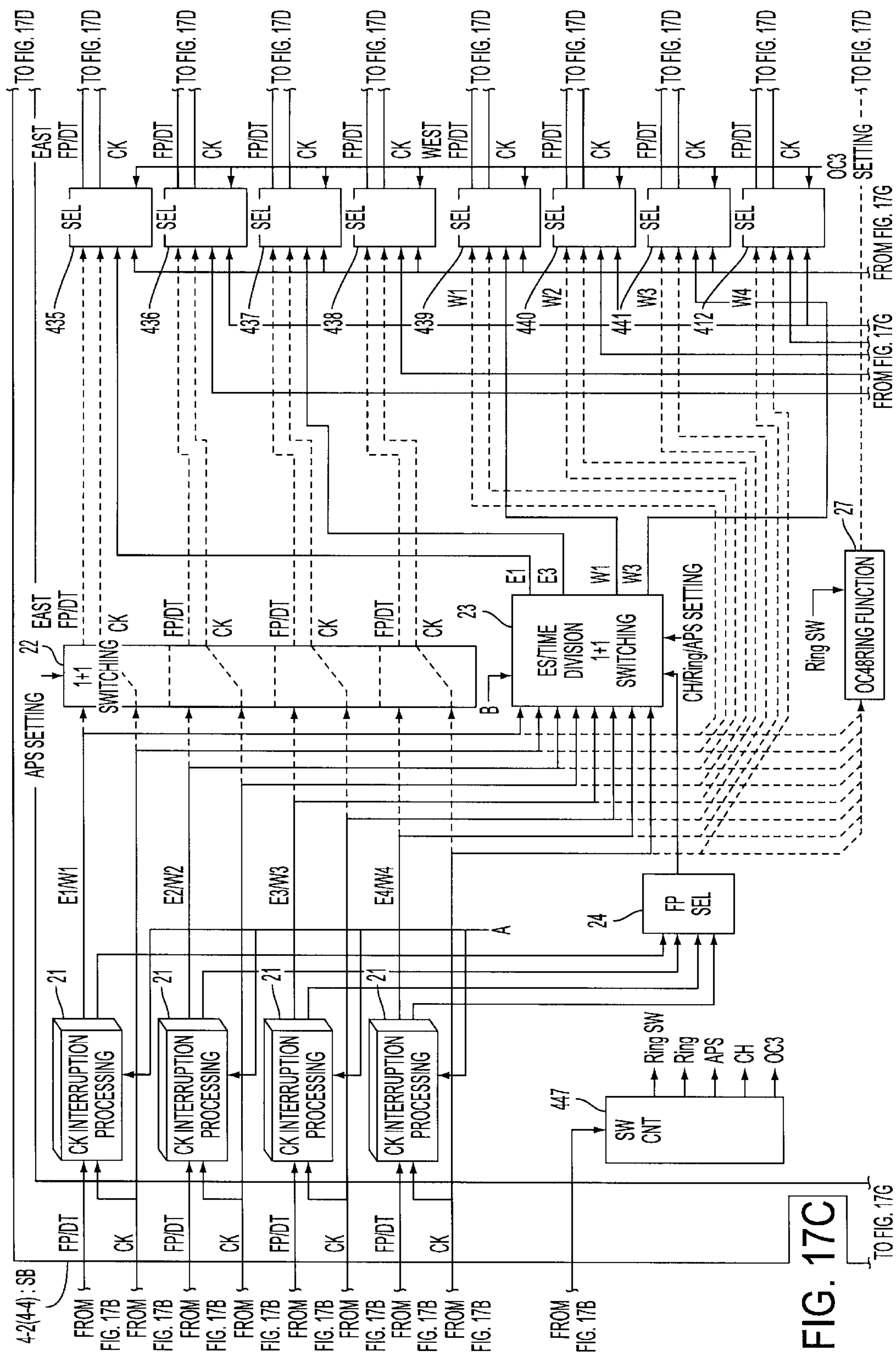
Figure 17D:
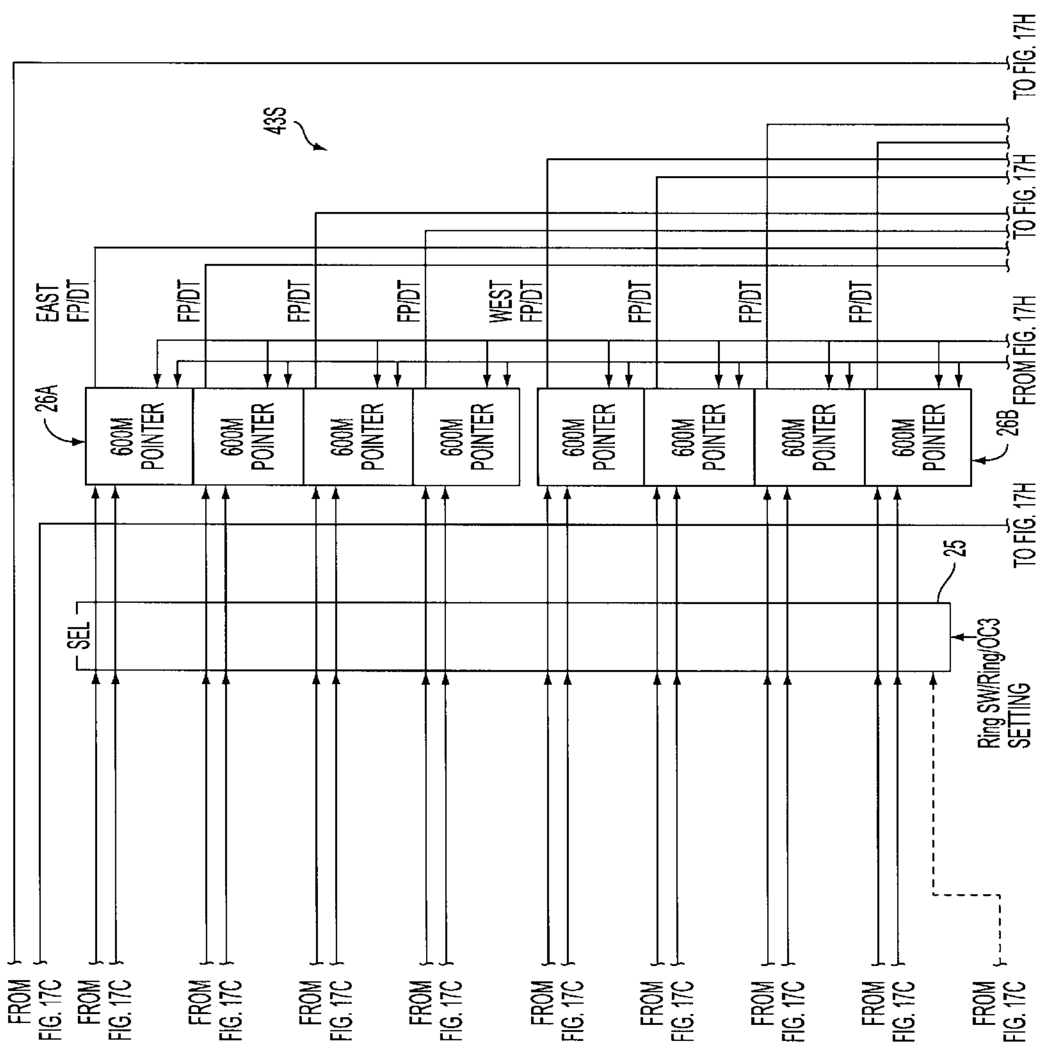
Figure 17E:
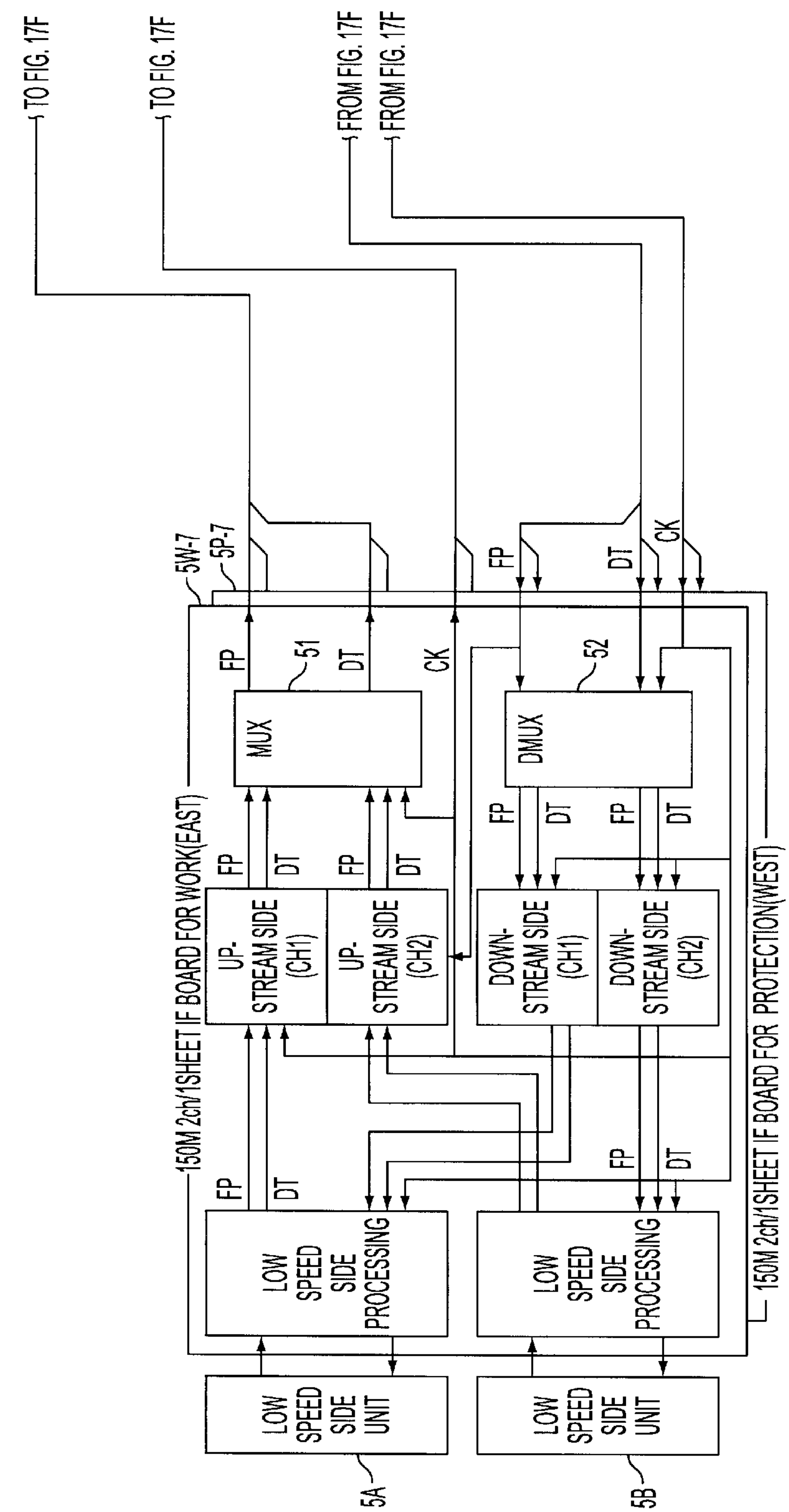
Figure 17F:
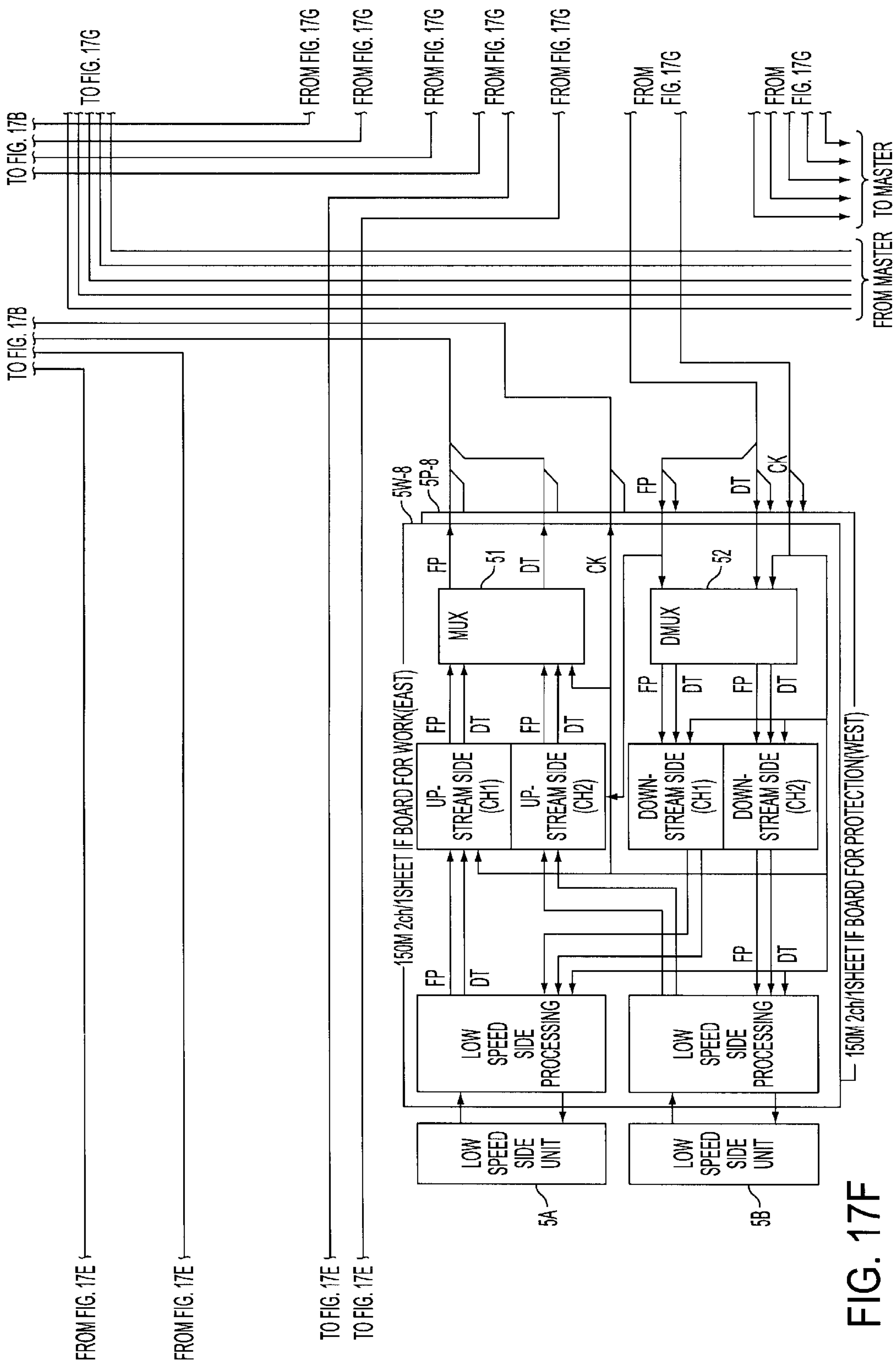
Figure 17G:
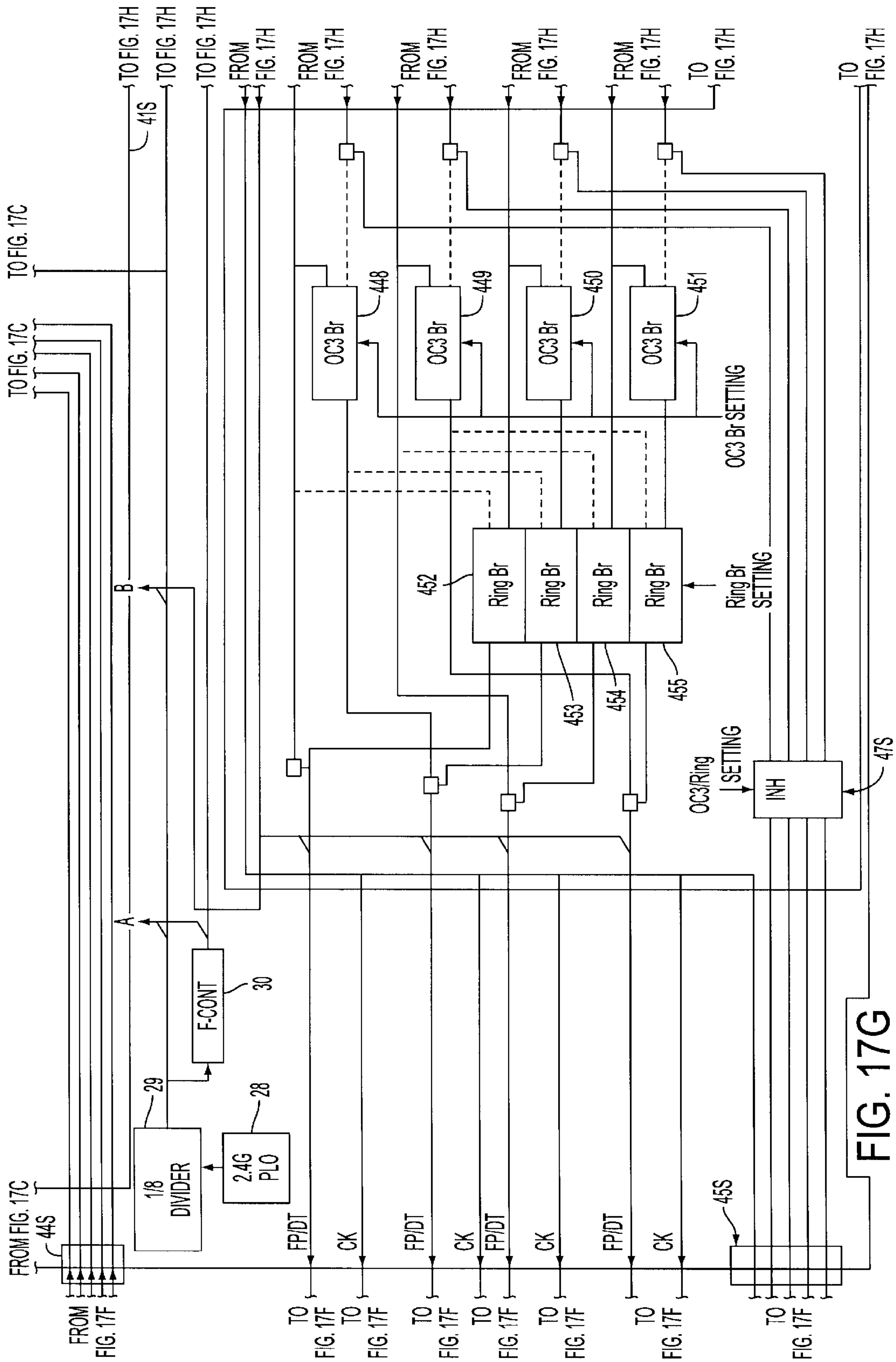
Figure 17H:
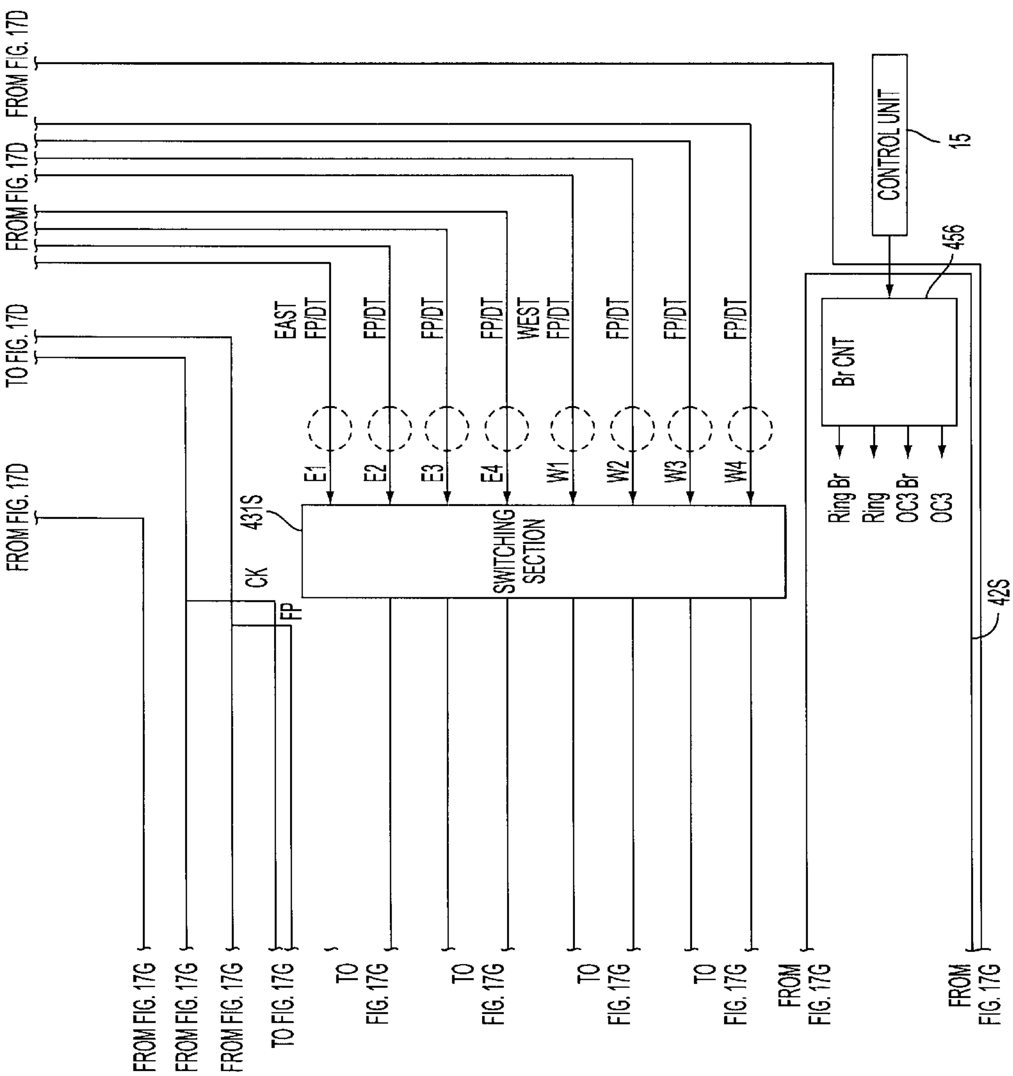
Figure 18A:
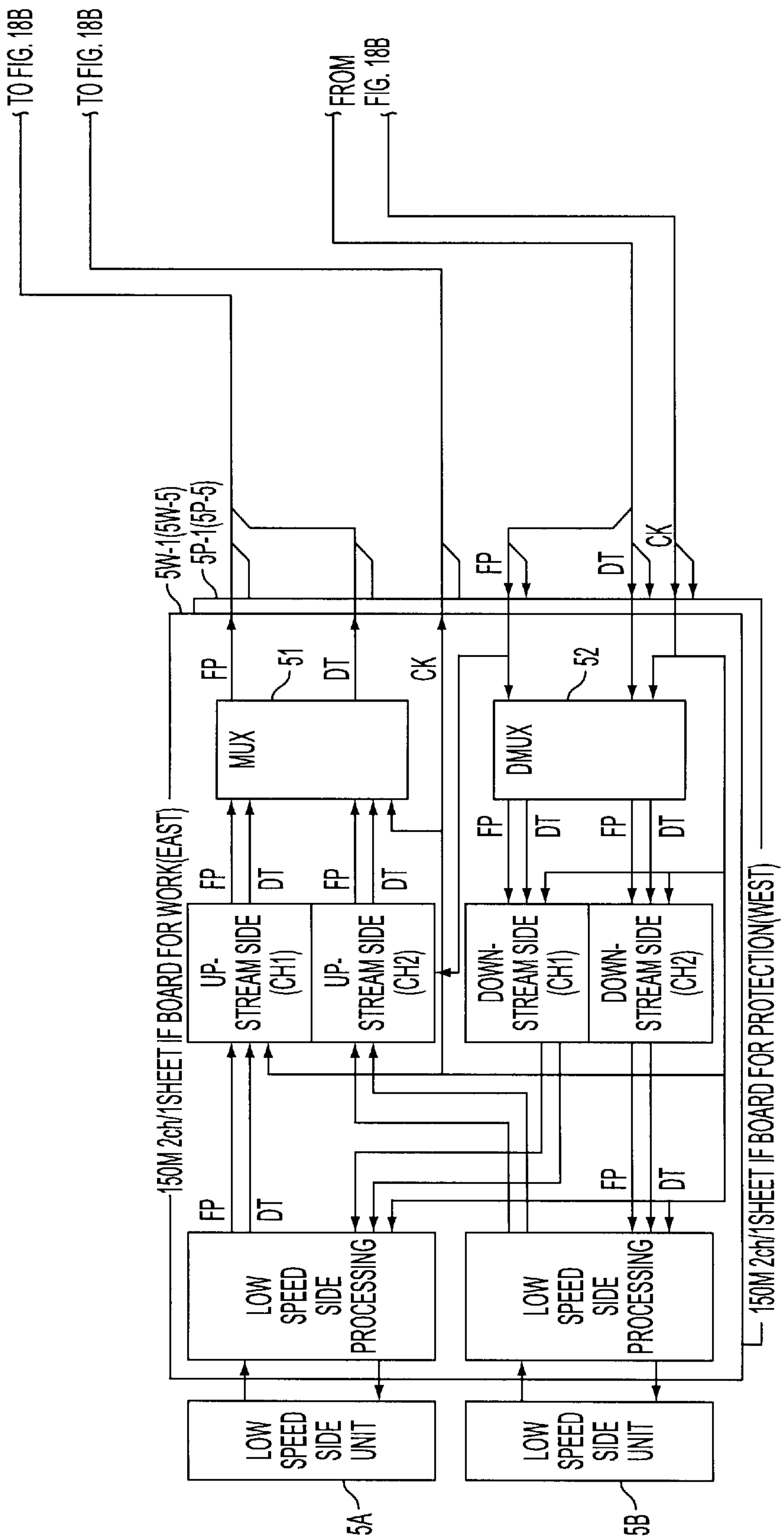
FIG. 18 is a block diagram showing a detailed construction of a routing block wherein different IF boards are mounted in a mixed condition on the ADM of FIG. 2 and illustrating operation of the routing block.
Figure 18B:
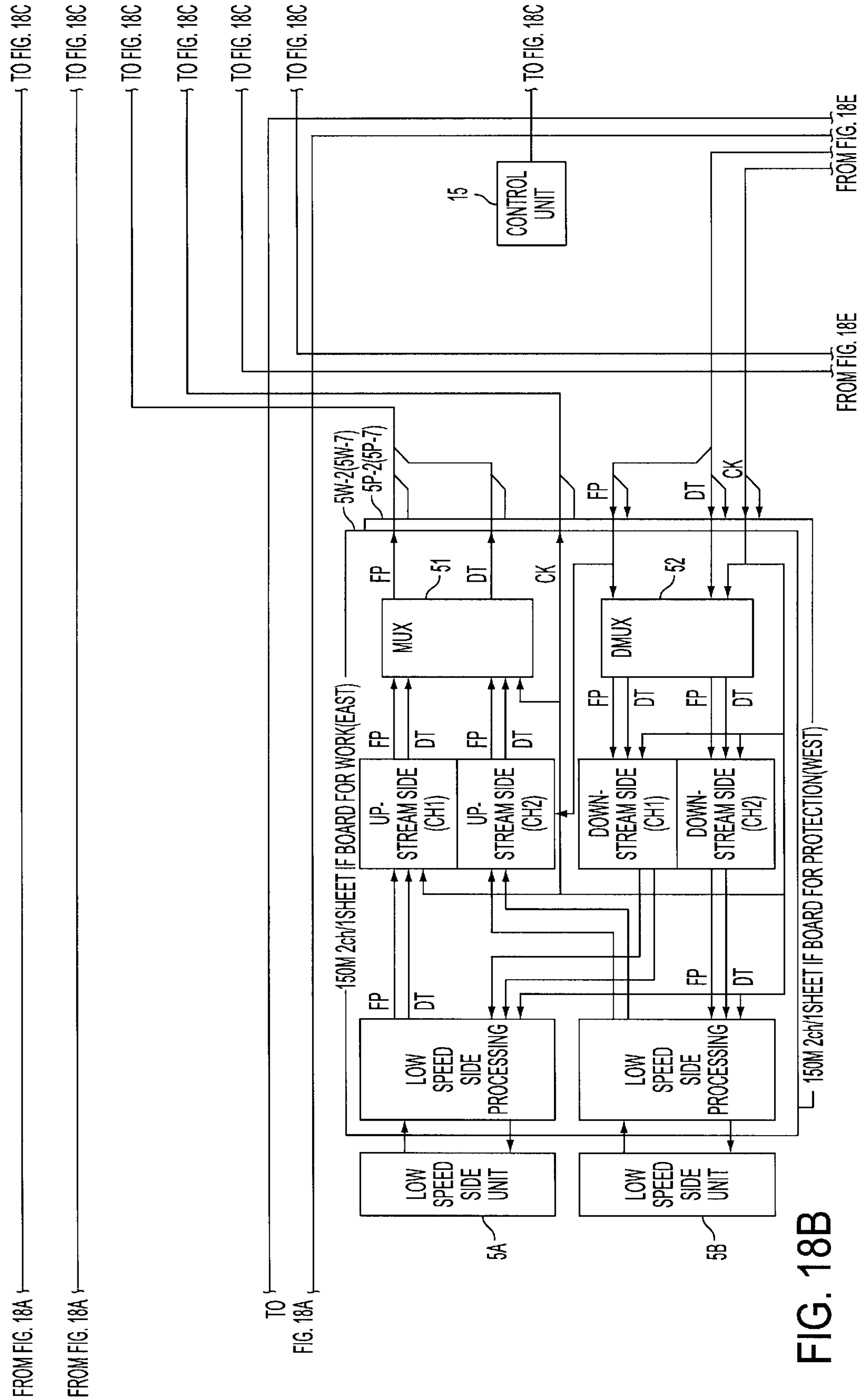
Figure 18C:
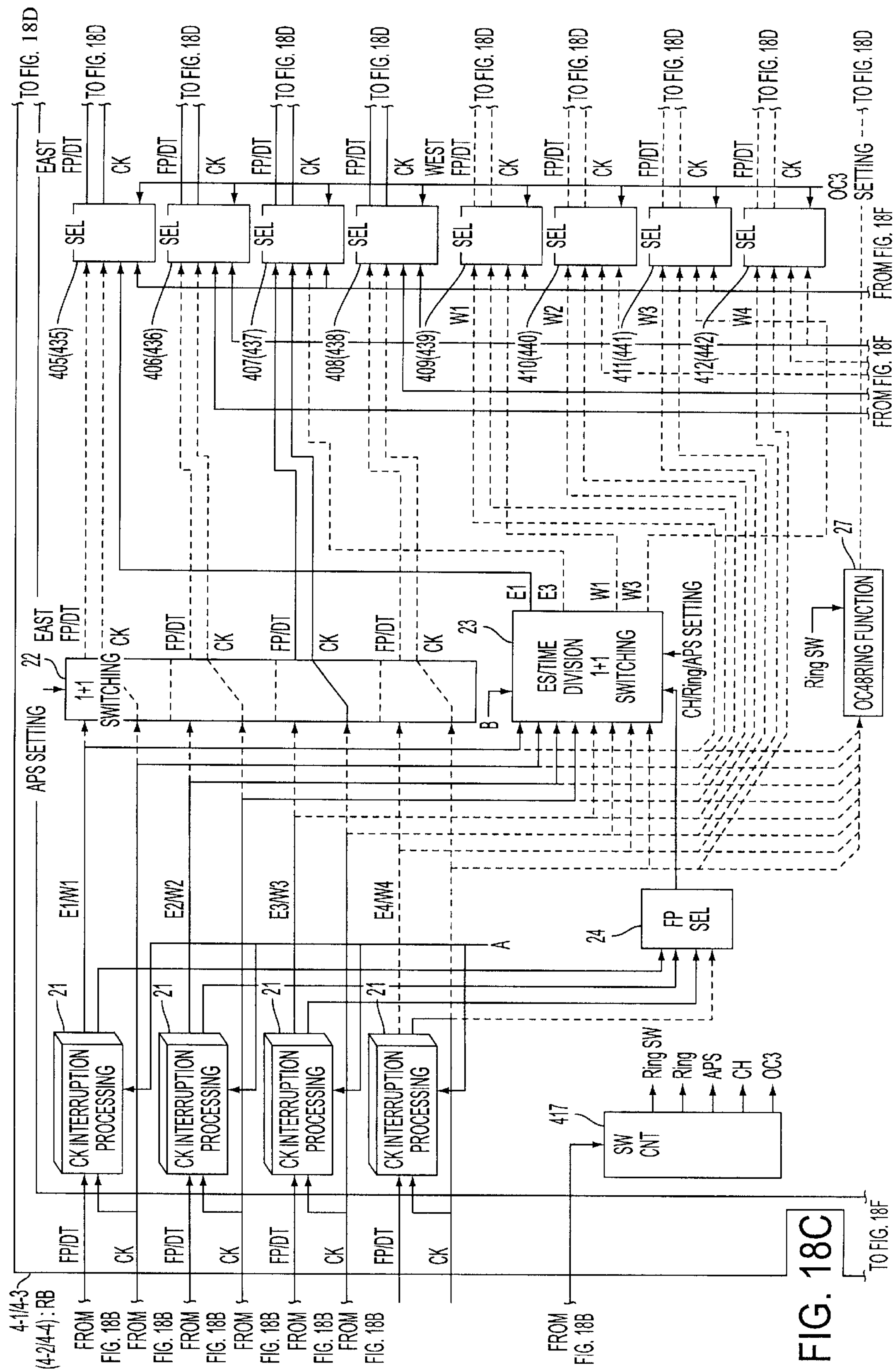
Figure 18D:
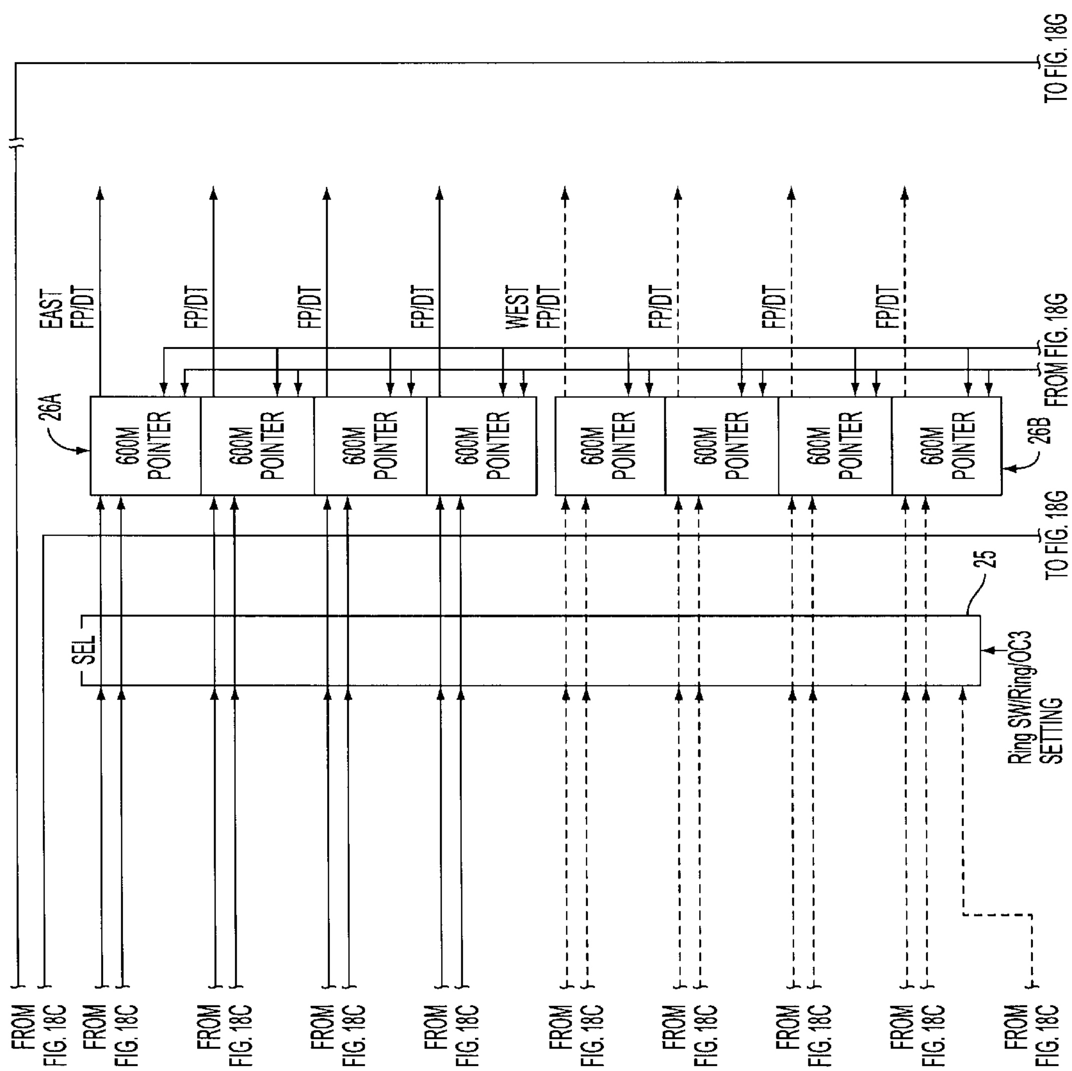
Figure 18E:
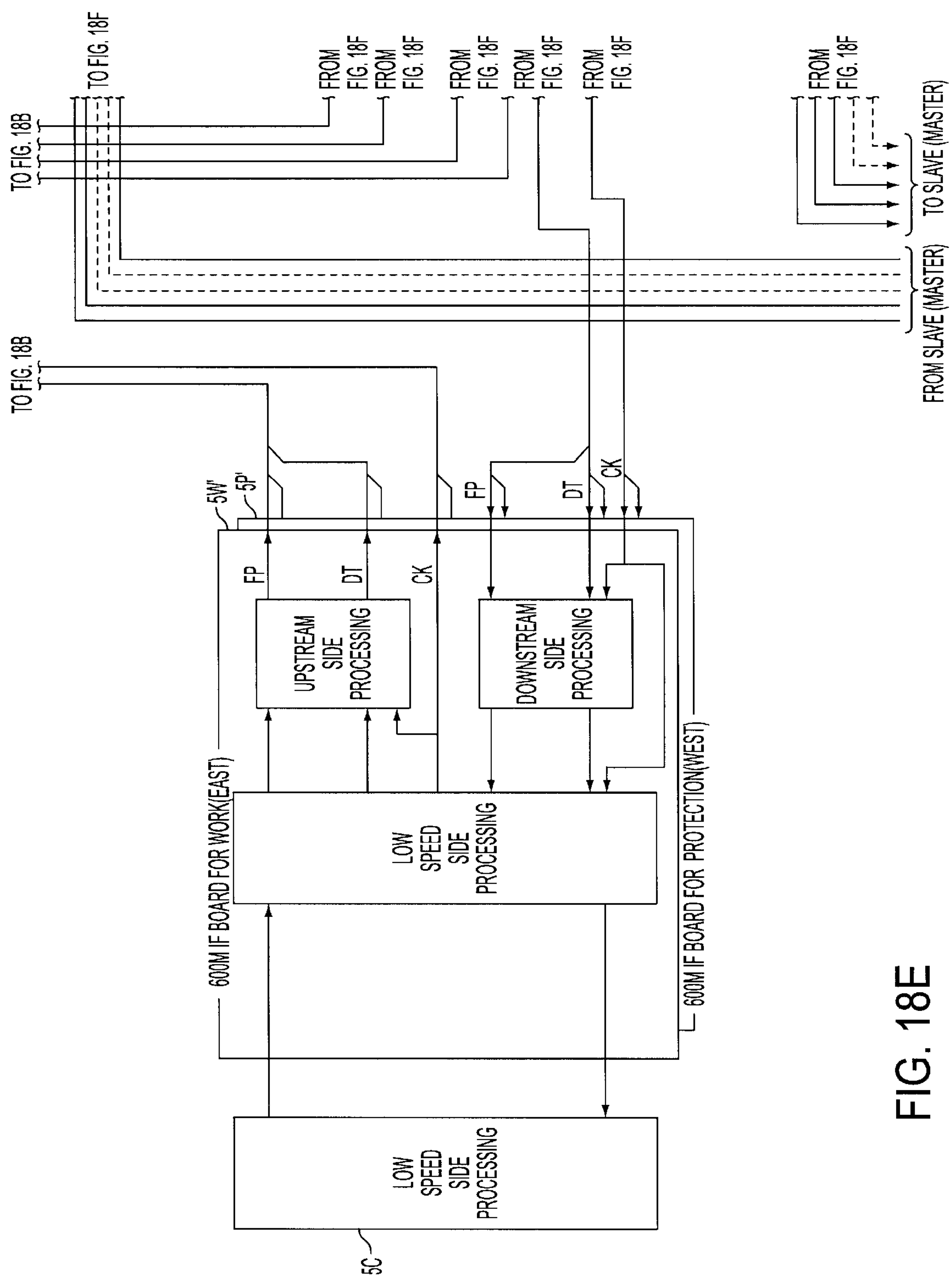
Figure 18F:
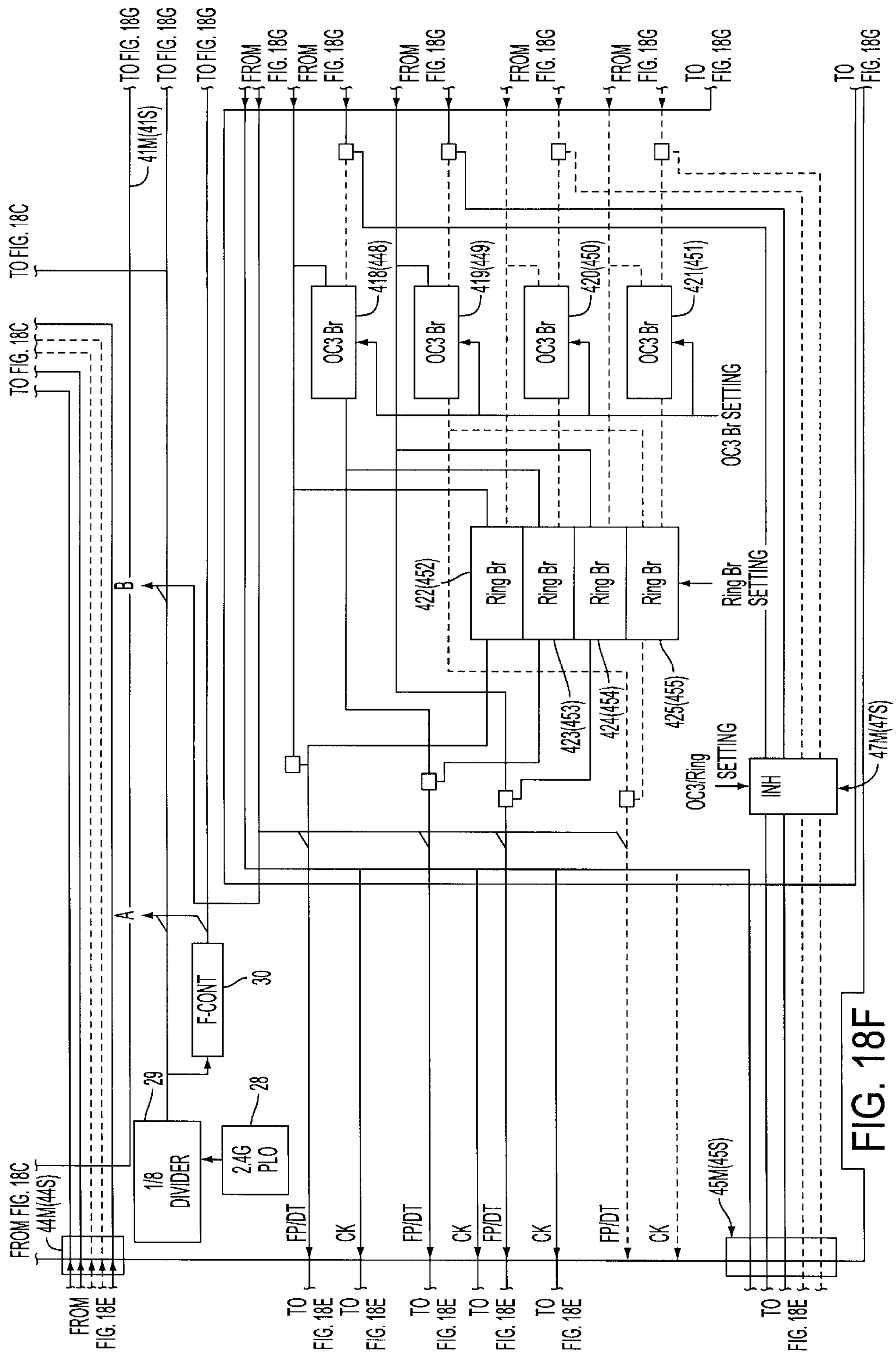
Figure 18G:
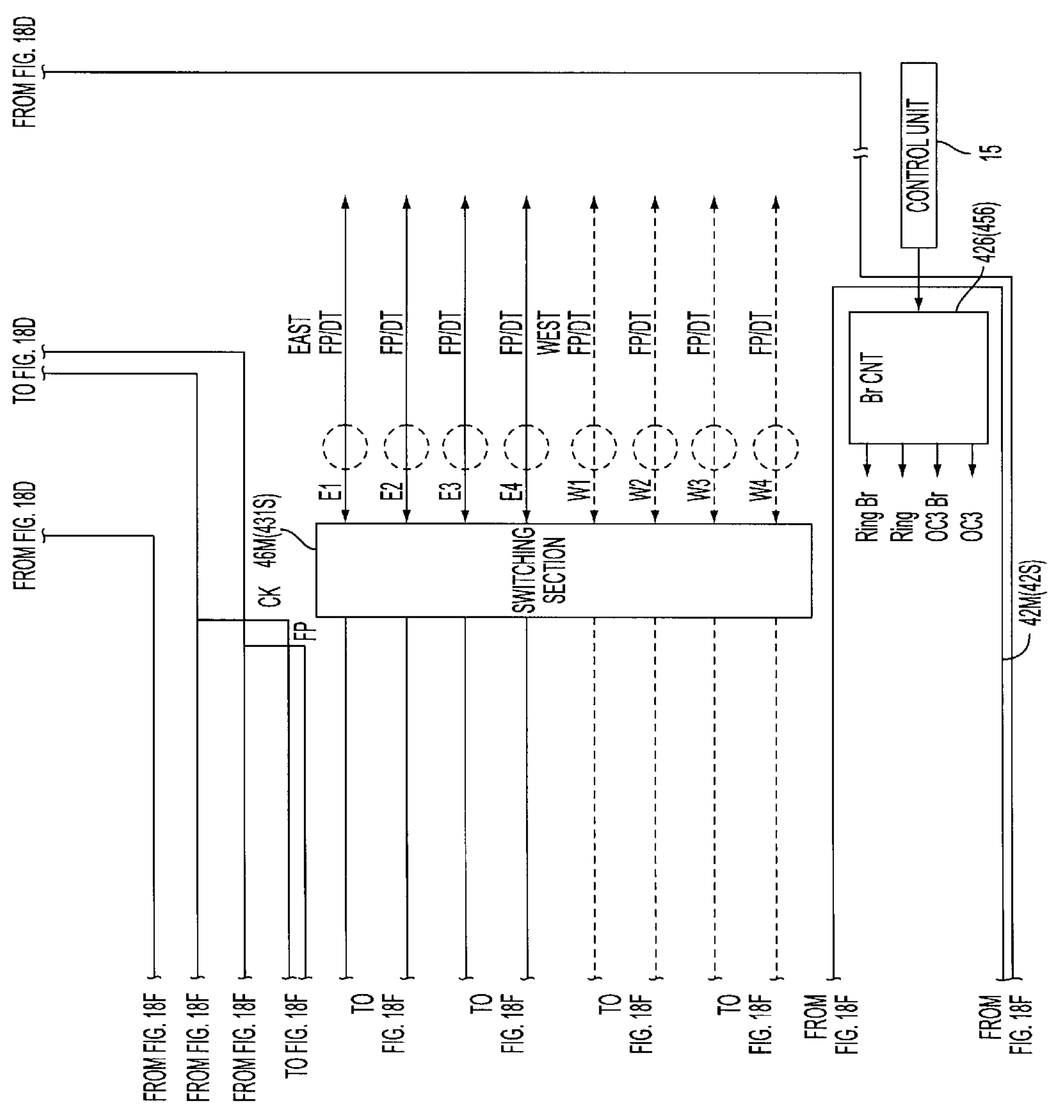

In this instance, as shown in FIGS. 12 and 13, the IF boards 5W-1 to 5W-4 for the work lines (EAST lines) "1" to "4" and the IF boards 5P-1 to 5P-4 for the protection lines (WEST lines) "1" to "4" are connected to the MB 4-1 (4-3), and the IF boards 5W-5 to 5W-8 for the work lines (EAST lines) "5" to "8" and the IF boards 5P-5 to 5P-8 for the protection lines (WEST lines) "5" to "8" are connected to the SB 4-2 (4-4).

Figure 10A:
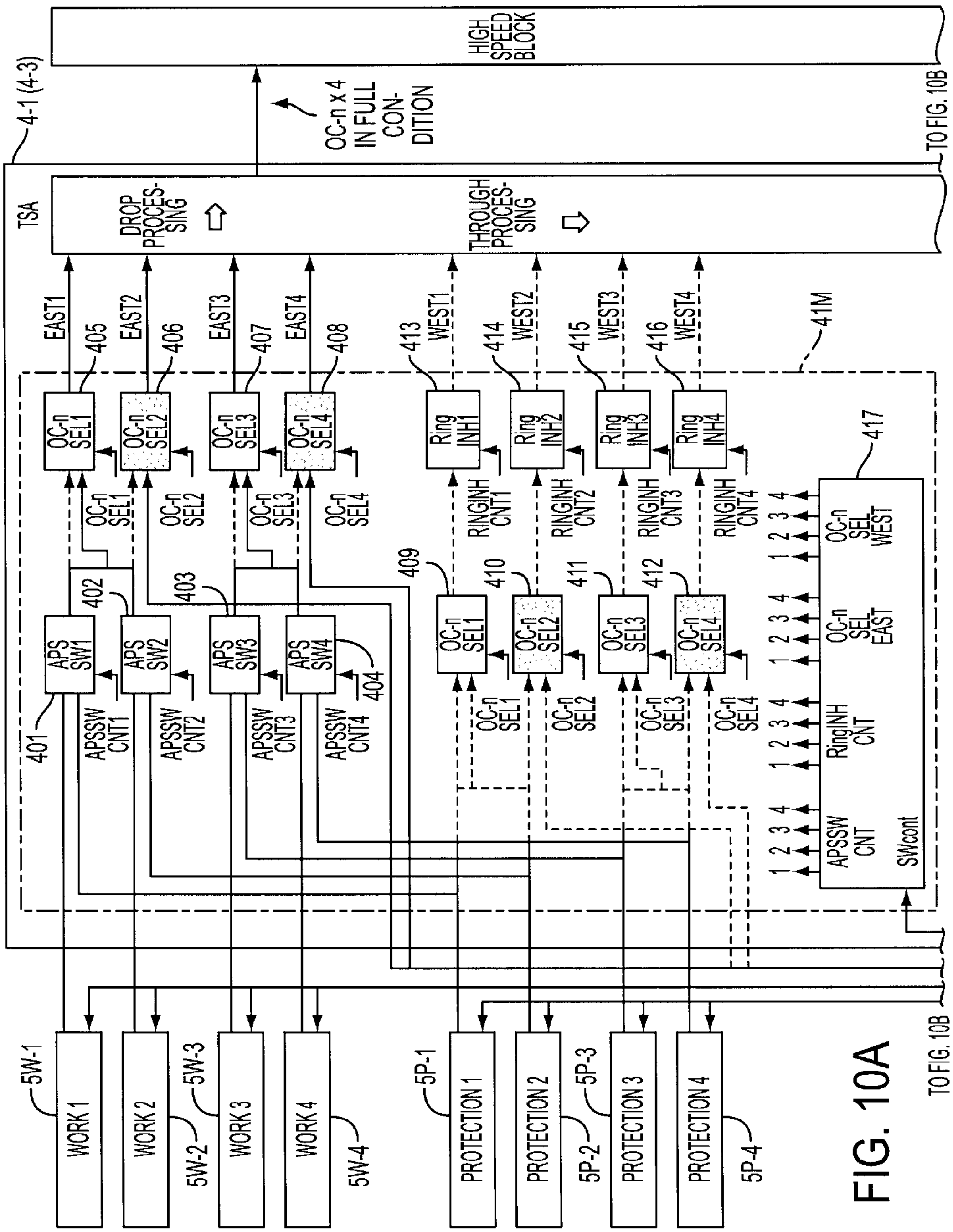
FIG. 10 is a block diagram showing a detailed construction of the master block of the ADM of FIG. 2 and illustrating operation of the master block in the 1+1 mode.
Figure 10B:
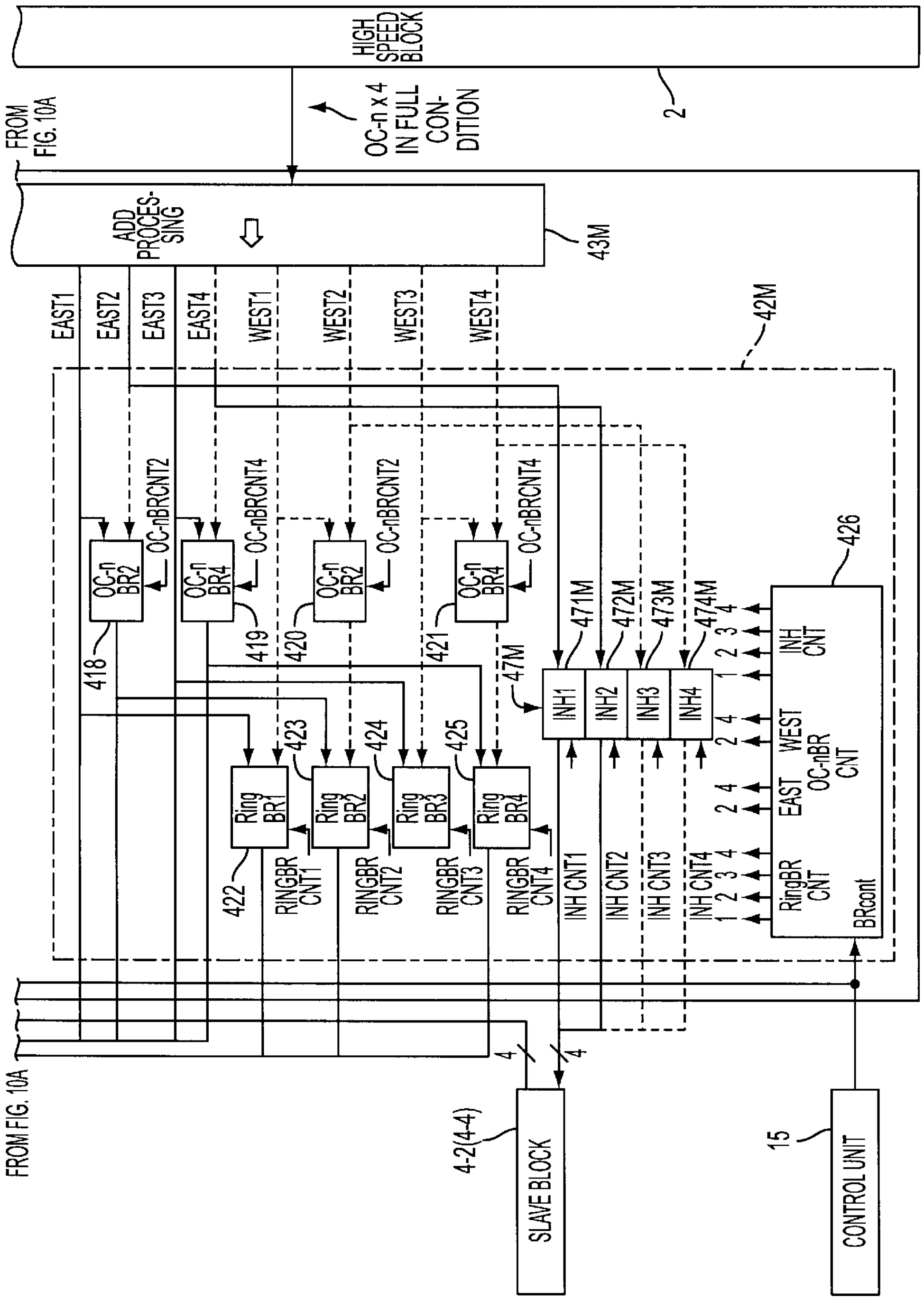
Figure 11A:
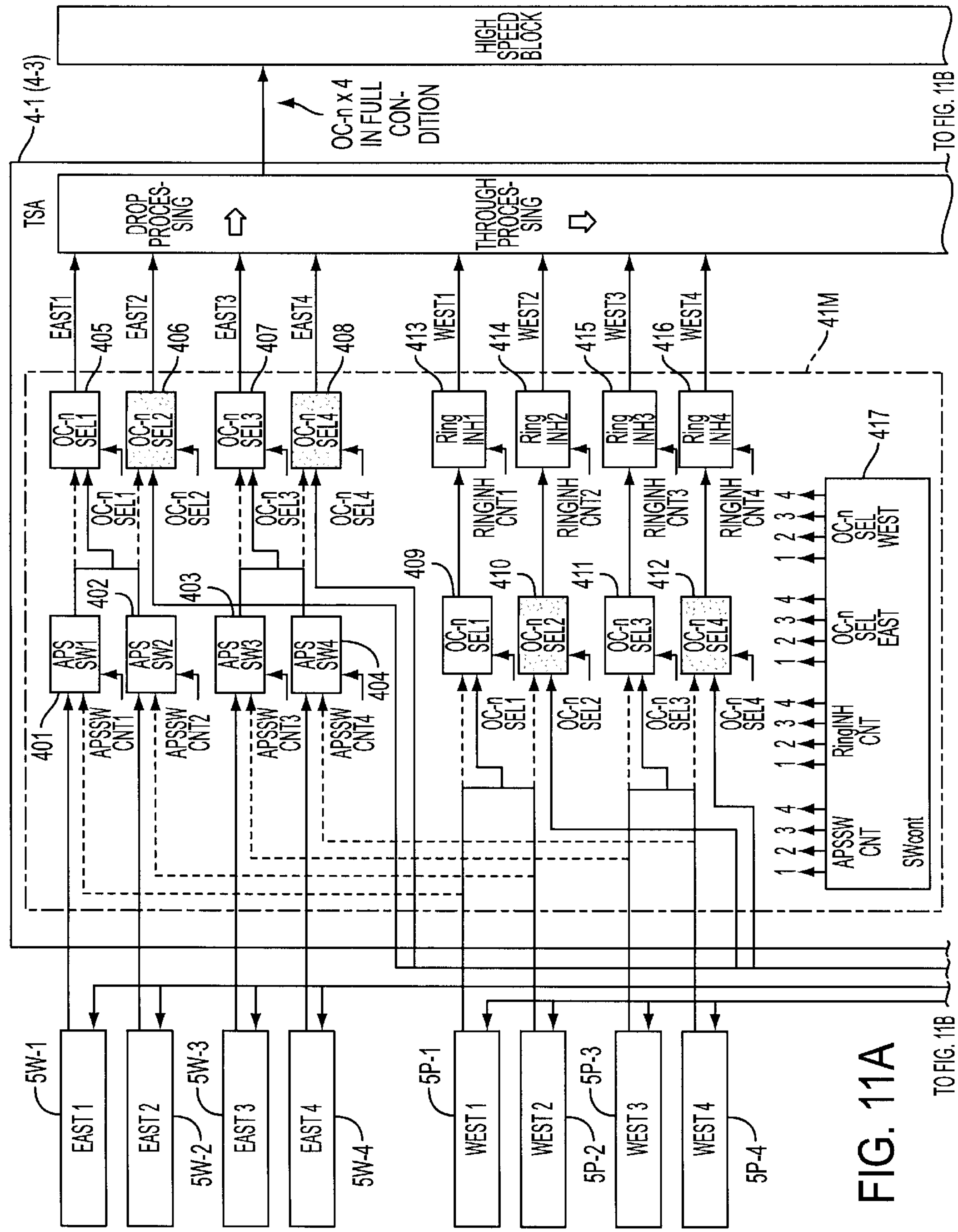
FIG. 11 is a block diagram showing a detailed construction of the master block of the ADM of FIG. 2 and illustrating operation of the master block in the ring mode.
Figure 11B:
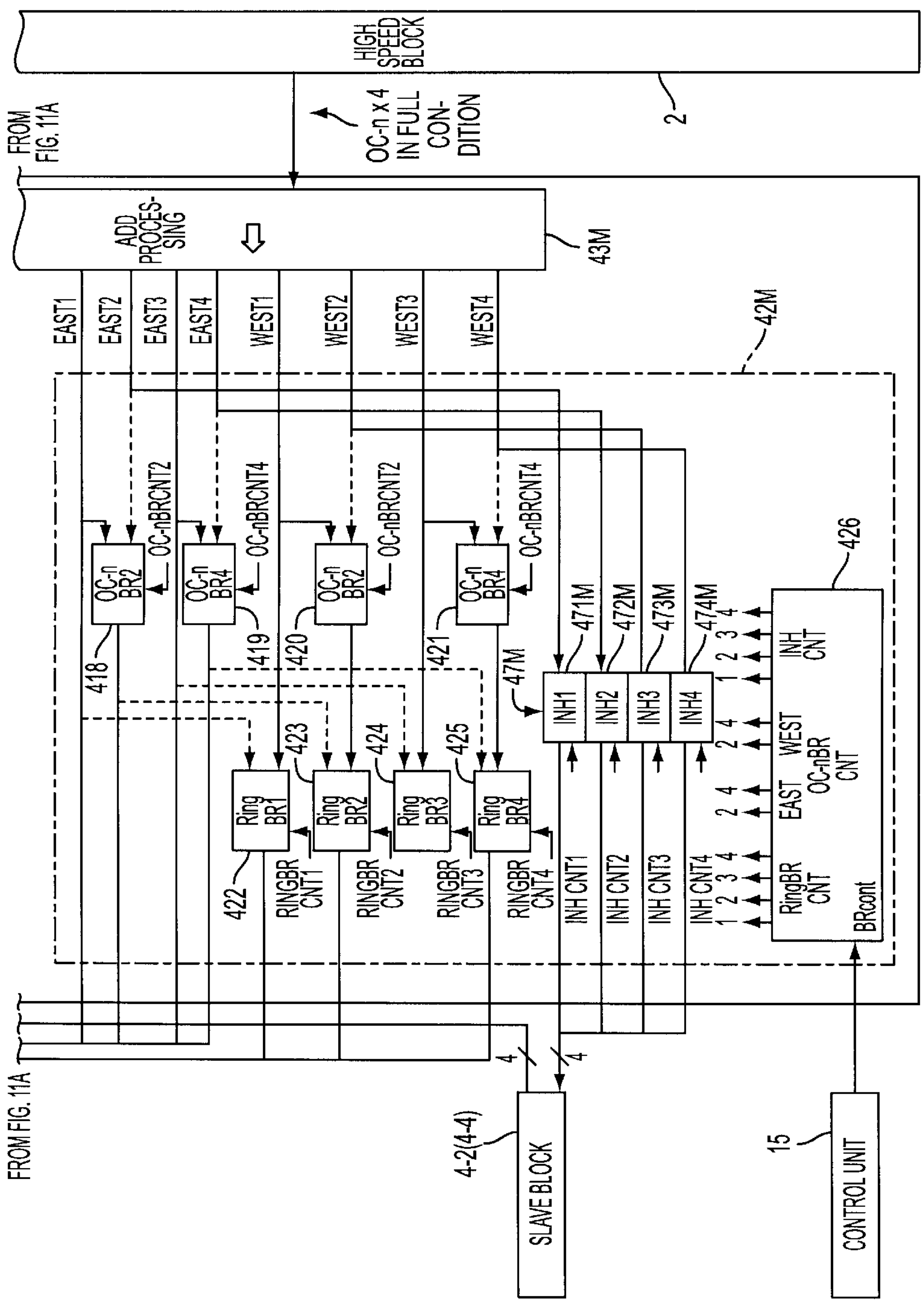

It is to be noted that, in FIGS. 10 and 11, the IF boards 5W-5 to 5W-8 (5P-5 to 5P-8) accommodated in the SB 4-2 (4-4) and the reception side/transmission side SIF sections 44M and 45M and switching section 46M in the MB 4-1 (4-3) are not shown. Further, while the IF boards 5W-j and 5P-j (j=1 to 8) described above have a transmission capacity of OC-n/4 smaller than OC-n, in the present embodiment, they have a "2 ch/Sheet (Board) configuration" (details will be hereinafter described) having a function capable of demultiplexing signals for 2 channels (OC-n/4×2) so that they may be interfaced with the RBs 4-i and thus have a transmission capacity of OC-n/2.

Further, as shown in FIGS. 10 to 13, the line switch section 41M of the MB 4-1 (4-3) includes APS switches 401 to 404, signal selection switches 12 (OC-n SEL) signal selection switch 405 to 412 for the EAST/WEST sides, ring inhibition switches (Ring INH) 413 to 416, and a switch controller 417. The line bridging section 42M includes, in addition to the INH processing section 47M described hereinabove, bridge switches (OC-n BR) 418 to 421, ring bridge switches (Ring BR) 422 to 425, and a bridge controller 426.

The INH processing section 47M includes inhibition switches 471M to 474M for individual wiring lines for allowing inhibition (masking) processing for the wiring lines ("1" to "4").

Meanwhile, the SB 4-2 (4-4) has a construction substantially similar to that of the MB 4-1 (4-3) described above, and the line switch section 41S includes, as shown in FIGS. 12 and 13, APS switches 431 to 434, signal selection switches (OC-n SEL) 435 to 442, ring inhibition switches (Ring INH) 443 to 446, and a switch controller 447. The line bridging section 42M includes, in addition to the INH processing section 47S described hereinabove, bridge switches (OC-n BR) 448 to 451, ring bridge switches (Ring BR) 452 to 455, and a bridge controller 456.

It is to be noted that also the INH processing section 47S includes inhibition switches 471S to 474S for wiring lines for allowing inhibition (masking) processing to be performed individually for the individual wiring lines ("1" to "4").

In the line switch section 41M of the MB 4-1 (4-3), the APS switches 401 to 404 perform selective switching between signals from the IF boards 5W-1 to 5W-4 and signals from the IF boards 5P-1 to 5P-4 in accordance with a control signal (APSSW CNT1-4) from the switch controller 417. In particular, the APS switches 401 to 404 are controlled such that, in the 1+1 mode, they select signals from one side, that is, for example, they select signals from the IF boards 5W-1 to 5W-4 when the control signal (APPSW CNT1-4) has the L level, but select signals from the IF boards 5P-1 to 5P-4 when the control signal (APPSW CNT1-4) has the H level, but in the ring mode, they select signals (EAST side) from the IF boards 5W-1 to 5W-4 fixedly as the control signal (APPSW CNT1-4) has the L level fixed.

The signal selection switch 405 on the EAST side selects one of an output signal of the APS switch 401 and an added (multiplexed) signal of outputs of the APS switches 401 and 402 as a signal to be sent to the EAST1 in accordance with a control signal (OC-n $SEL_{(EAST)}$ 1) from the switch controller 417, and, for example, selects the former signal when the control signal (OC-n $SEL_{(EAST}$ 1) has the L level but selects the latter signal when the control signal (OC-n $SEL_{(EAST)}$ 1) has the H level. In the present embodiment, however, since the IF boards 5W-1 to 5W-4 (5P-1 to 5P-4) having the capacity of OC-n/4×2 smaller than the transmission capacity of OC-n, the control signal (OC-n $SEL_{(EAST)}$ 1) is fixed to the H level so that the latter signal may be selected fixedly.

The signal selection switch 406 on the EAST side selects one of an output signal of the APS switch 402 and a signal from the SB 4-2 (4-4) as a signal to be transmitted to the EAST2 in accordance with a control signal (OC-n $SEL_{(EAST)}$ 2) from the switch controller 417, and, for example, selects the former signal when the control signal (OC-n $SEL_{(EAST)}$ 2) has the L level, but selects the latter signal when the control signal (OC-n $SEL_{(EAST)}$ 1) has the H level. Here, however, since the IF boards 5W-1 to 5W-4 (5P-1 to 5P-4) whose transmission capacity is smaller than OC-n, the control signal (OC-n $SEL_{(EAST)}$ 2) is fixed to the H level so that the latter signal [signal from the SB 4-2 (4-4)] may be selected fixedly and transmitted to the EAST2.

The signal selection switch 407 on the EAST side selects one of an output signal of the APS switch. 403 and an added (multiplexed) signal of outputs of the APS switches 403 and 404 as a signal to be transmitted to the EAST3 in accordance with a control signal (OC-n $SEL_{(EAST)}$ 3) from the switch controller 417 similarly to the signal selection switch 405 described hereinabove. Here, however, the signal selection switch 407 is controlled so that the latter signal may be selected fixedly.

The signal selection switch 408 on the EAST side selects one of an output signal of the APS switch 404 and a signal from the SB 4-2 (4-4) as a signal to be transmitted to the EAST4 in accordance with a control signal (OC-n $SEL_{(EAST)}$ 4) from the switch controller 417 similarly to the signal selection switch 406. Here, however, the signal selection switch 408 is controlled so that the latter signal from the SB 4-2 (4-4) may be selected fixedly.

In short, the signal selection switches 406 and 408 described above function as the signal selection switch 48M described hereinabove with reference to FIG. 4 (FIG. 6).

Consequently, in the 1+1 mode, the line switch section 41M only uses the EAST1 and EAST3 from among the EAST side wiring lines (EAST1 to EAST4) to the TSA processing section 43M to interface signals from the IF boards 5W-1 to 5W-4 (5P-1 to 5P-4) with the HB 2, and uses the EAST2 and EAST4, which are idle (capacity) then, to interface signals from the SB 4-2 (4-4) with the HB 2.

On the other hand, in the ring mode, the line switch section 41M uses the EAST1 and EAST3 and the WEST1 and WEST3 from among the EAST side wiring lines (EAST1 to EAST4) and the WEST side wiring lines (WEST1 to WEST4) to the TSA processing section 43M to interface signals (EAST/WEST line signals) from the IF boards 5W-1 to 5W-4 and 5P-1 to 5P-4 with the HB 2 and uses the EAST2 and EAST4 and the WEST2 and WEST4, which are idle then, to interface signals (EAST/WEST circuit signals) from the SB 4-2 (4-4) with the HB 2.

In this manner, upon processing of signals from the IF boards 5W-1 to 5W-4 (5P-1 to 5P-4) accommodated in the self MB 4-1 (4-3) and having a capacity of OC-n/4 smaller than OC-n, only some of the EAST/WEST wiring lines are used to produce unused wiring lines, and the unused wiring lines are used for processing of signals from the IF boards 5W-5 to 5W-8 (5P-5 to 5P-8) accommodated in the SB 4-2 (4-4). Consequently, the existing wiring line connections can be diverted as they are.

The signal selection switches 409 to 412 on the WEST side function when the IF boards 5P-1 to 5P-4 for protection lines are used for the WEST lines to transmit and receive WEST line signals in the ring mode. In particular, the signal selection switch 409 selects a signal from the IF board 5P-1 or an added (multiplexed) signal of signals from the IF boards 5P-1 and 5P-2 as a signal to be transmitted to the WEST1 in accordance with a control signal (OC-n $SEL_{(WEST)}$ 1) from the switch controller 417. In the ring mode, since, for example, the control signal (OC-n $SEL_{(WEST)}$ 1) is fixed to the H level, the signal selection switch 409 is controlled to select the latter signal fixedly.

The signal selection switch 410 on the WEST side selects a signal from the IF board 5P-2 or a signal from the SB 4-2 (4-4) as a signal to be transmitted to the WEST2 in accordance with a control signal (OC-n $SEL_{(WEST)}$ 2) from the switch controller 417 similarly to the signal selection switch 406 on the EAST side. Here, the signal selection switch 410 is controlled to select the latter signal fixedly.

The signal selection switch 411 on the WEST side selects a signal from the IF board 5P-3 or an added (multiplexed) signal of outputs of the IF boards 5P-3 and 5P-4 as a signal to be transmitted to the WEST3 in accordance with a control signal (OC-n $SEL_{(WEST)}$ 3) from the switch controller 417 similarly to the signal selection switch 409 described above. Here, the signal selection switch 411 is controlled to select the latter signal fixedly.

The signal selection switch 412 on the WEST side selects a signal from the IF board 5P-4 or a signal from the SB 4-2 (4-4) as a signal to be transmitted to the WEST4 in accordance with a control signal (OC-n $SEL_{(WEST)}$ 4) from the switch controller 417 similarly to the signal selection switch 410 described above. Here, the signal selection switch 412 is controlled to select the latter signal fixedly.

The ring inhibition switches 413 to 416 are provided to mask outputs of the WEST side wiring lines in the 1+1 mode in accordance with control signals (RingINH CNT1 to RingINH CNT4) (for example, the H level) from the switch controller 417 because the WEST side wiring lines are not used in the 1+1 mode (in the ring mode, the control signals (RingINH CNT1 to RingINH CNT4) have the L level, and the ring inhibition switches 413 to 416 are controlled to a conducting state).

The switch controller 417 produces various control signals (APSSW CNT1 to APSSW CNT4, RingINH CNT1 to RingINH CNT4, OC-n $SEL_{(EAST)}$ 1 to OC-n $SEL_{(EAST)}$ 4, OC-n $SEL_{(WEST)}$ 1 to OC-n $SEL_{(WEST)}$ 4) for the switches 401 to 416 in accordance with the 1+1 mode or the ring mode to control switching (selection) conditions of the switches 401 to 416 in such a manner as described above. It is to be noted that setting of the 1+1 mode or the ring mode of the line switch section 41M is provided from a control unit 15.

Meanwhile, the bridge switch 418 of the EAST side in the line bridging section 42M selects a signal sent thereto over an EAST side wiring line (EAST1) from the TSA processing section 43M or a signal sent thereto from the EAST2 as a signal to be transmitted to the IF board 5W-2 in response to a control signal (OC-nBR $CNT_{(EAST)}$ 2). For example, the bridge switch 418 selects the former signal when the control signal (OC-nBR $CNT_{(EAST)}$ 2) has the H level, but selects the latter signal when the control signal (OC-nBR $CNT_{(EAST)}$ 2) has the L level.

It is to be noted here, however, that, since the IF boards 5W-1 to 5W-4 (5P-1 to 5P-4) having a transmission capacity smaller than OC-n are mounted, the control signal (OC-nBR $CNT_{(EAST)}$ 2) is fixed to the H level, and consequently, a signal bridged from the signal from the EAST1 is selected fixedly as a signal to be transmitted to the IF board 5W-2.

The bridge switch 419 on the EAST side selects a signal bridged from the signal sent thereto over the EAST side wiring line (EAST3) from the TSA processing section 43M as a signal to be transmitted to the IF board 5W-4 in accordance with a control signal (OC-nBR $CNT_{(EAST)}$ 4) from the bridge controller 426 similarly to the bridge switch 418 described above.

The bridge switch 420 on the WEST side selects, in the ring mode, a signal bridged from the signal sent thereto over the WEST side wiring line WEST1 from the TSA processing section 43M as a signal to be transmitted to the IF board 5P-2 in accordance with a control signal (OC-nBR CNT $_{(WEST)}$ 2) from the bridge controller 426. The bridge switch 421 on the WEST side similarly selects, in the 1+1 mode, a signal bridged from the signal sent thereto over the WEST side wiring line (WEST3) from the TSA processing section 43M as a signal to be transmitted to the IF board 5P-4 in accordance with a control signal (OC-nBR CNT$_{(WEST)}$ 4) from the bridge controller 426.

It is to be noted that signals sent over the remaining EAST side wiring lines (EAST2 and EAST4) and WEST side wiring lines (WEST2 and WEST4) from the TSA processing section 43M are sent out, in the present embodiment, to the SB 4-2 (4-4) through the INH processing section 47M because they are signals to be transmitted to the IF boards 5W-5 to 5W-8 (5P-5 to 5P-8) accommodated in the SB 4-2 (4-4).

The ring bridge switch 422 selects a signal sent over the EAST side wiring line (EAST1) or a signal sent over the WEST side wiring line (WEST1) as a signal to be transmitted to the IF board 5P-1 in accordance with a control signal (RingBR CNT1) from the bridge controller 426. In particular, in the 1+1 mode in which, for example, the control signal (RingBR CNT1)=H level, the ring bridge switch 422 is controlled to select the former signal and send out the same signal as a signal to be transmitted to the work line "1" (IF board 5W-1), but in the ring mode in which, for example, the control signal (RingBR CNT1)=L level, the ring bridge switch 422 is controlled to select the latter signal (WEST side line signal) and send out the signal to the IF board 5P-1.

Similarly, the ring bridge switch 423 is controlled in accordance with a control signal (RingBR CNT2) from the bridge controller 426 such that, in the 1+1 mode, it selects an output of the bridge switch 418 and sends out a signal same as the signal to be transmitted to the IF board 5W-2 to the IF board 5P-2, but in the ring mode, it selects an output of the bridge switch 420 and sends out the WEST line signal to the IF board 5P-2.

The ring bridge switch 424 selects a signal sent over the EAST side wiring line (EAST3) or a signal sent over the WET side wiring line (WEST3) in accordance with a control signal RingBR CNT3 from the bridge controller 426. In particular, the ring bridge switch 424 is controlled such that, in the 1+1 mode, it selects the former signal and sends out a signal same as the signal to be transmitted to the IF board 5W-3 to the IF board 5P-3, but in the ring mode, it selects the latter signal and sends out the WEST line signal to the IF board 5P-3.

The ring bridge switch 425 is controlled in response to a control signal (RingBR CNT4) from the bridge controller 426 such that, in the 1+1 mode, it selects an output of the bridge switch 419 and sends out the same signal as the signal to be transmitted to the IF board 5W-4 to the IF board 5P-4, but in the ring mode, it selects an output of the bridge switch 421 and sends out the WEST line signal to the IF board 5P-4.

The inhibition switches 471M to 474M perform masking processing for unused wiring lines in response to control signals (INH CNT1 to INH CNT4) from the bridge controller 426. For example, the inhibition switches 471M to 474M allow signals to pass therethrough when the control signals (INH CNT1 to INH CNT4) have the L level, but inhibit (mask) their outputs when the control signals (INH CNT1 to INH CNT4) have the H level.

The bridge controller 426 produces the various control signals (RingBR CNT1 to RingBR CNT4, OC-nBR CNT $_{(EAST)}$ 2, OC-nBR CNT$_{(EAST)}$ 4, OC-nBR CNT$_{(WEST)}$ 2, OC-nBR CNT$_{(WEST)}$ 4, INH CNT1 to INH CNT4) for the switches 418 to 425 and 471M to 474M described above in response to the 1+1 mode or the ring mode to control the switching (selection) conditions of the switches 418 to 425 and 471M to 474M. It is to be noted that also setting of the 1+1 mode or the ring mode of the line bridging section 42M is provided from the control unit 15.

Next, while the components of the line switch section 41S and the line bridging section 42S of the SB 4-2 (4-4) have substantially similar functions to those of the MB 4-1 (4-3) described hereinabove (the construction shown in FIGS. 10, and 11), description of them are not omitted here intentionally.

In particular, in the line switch section 41S (refer to FIG. 12), the APS switches 431 to 434 perform selective switching between signals from the IF boards 5W-5 to 5W-8 and signals from the IF boards 5P-5 to 5P-8 in accordance with control signals (APSSW CNT1 to APSSW CNT4) from the switch controller 447. In particular, in the 1+1 mode, the APS switches 431 to 434 are controlled to select signals from the one side such that, for example, they select signals from the IF boards 5W-5 to 5W-8 when the control signals (APSSW CNT1 to APSSW CNT4) have the L level, but select signals from the IF boards 5P-5 to 5P-8 when the control signals (APSSW CNT1 to APSSW CNT4) have the H level, but in the ring mode, they select the signals (EAST side) from the IF boards 5W-5 to 5W-8 fixedly because the control signals (APSSW CNT1 to APSSW CNT4) have the L level fixed.

The signal selection switch 435 on the EAST side selects an output signal of the APS switch 431 or an added (multiplexed) signal of outputs of the APS switches 431 and 432 as a signal to be transmitted to the EAST1 in accordance with a control signal (OC-n SEL$_{(EAST)}$ 1) from the switch controller 447. For example, when the control signal (OC-n SEL$_{(EAST)}$ 1) has the L level, the signal selection switch 435 selects the former signal, but when the control signal (OC-n SEL$_{(EAST)}$ 1) has the H level, the signal selection switch 435 selects the latter signal. In the present embodiment, however, since the IF boards 5W-5 to 5W-8 (5P-5 to 5P-8) having a transmission capacity of OC-n/4×2 smaller than Oc-n are mounted, the control signal (OC-n SEL$_{(EAST)}$ 1) is fixed to the H level. Consequently, the latter signal is selected fixedly.

The signal selection switch 436 on the EAST side selects an output signal of the APS switch 432 or a signal from the MB 4-1 (4-3) as a signal to be transmitted to the EAST2 in accordance with a control signal (OC-n SEL$_{(EAST)}$ 2) from the switch controller 447. For example, when the control signal (OC-n SEL$_{(EAST)}$ 2) has the L level, the signal selection switch 436 selects the former signal, but when the control signal (OC-n SEL$_{(EAST)}$ 2) has the H level, the signal selection switch 436 selects the latter signal. Here, however, since the IF boards 5W-5 to 5W-8 (5P-5 to 5P-8) having a transmission capacity smaller than OC-n are mounted, the control signal (OC-n SEL$_{(EAST)}$ 2) is fixed to the H level so that the latter signal [signal from the MB 4-1 (4-3)] is selected fixedly and transmitted to the EAST2.

The signal selection switch 437 on the EAST side selects an output signal of the APS switch 433 or an added (multiplexed) signal of outputs of the APS switches 433 and 434 as a signal to be transmitted to the EAST3 in accordance with a control signal (OC-n SEL$_{(EAST)}$ 3) from the switch controller 447 similarly to the signal selection switch 435 described above. Here, however, the signal selection switch 437 is controlled so that the latter signal is selected fixedly.

The signal selection switch 438 on the EAST side selects an output signal of the APS switch 434 or a signal from the MB 4-1 (4-3) as a signal to be transmitted to the EAST4 in accordance with a control signal (OC-n $SEL_{(EAST)}$ 4) from the switch controller 447 similarly to the signal selection switch 436 described above. Here, however, the signal selection switch 438 is controlled so that the latter signal from the 4-1 (4-2) is selected fixedly.

In short, the signal selection switches 436 and 438 described above function as the signal selection switch 48S described hereinabove with reference to FIG. 5 (FIG. 7).

Consequently, the line switch section 41S uses only the EAST1 and EAST3 from among the EAST side wiring lines (EAST1 to EAST4) to fold back signals from the IF boards 5W-5 to 5W-8 (5P-5 to 5P-8) to the EAST side wiring lines (EAST2 and EAST4) of the folding back connection section 43S by the folding back connection section 43S (switching section 431S) and send outs the signals to the EAST side wiring lines (EAST2 and EAST4) of the line bridging section 42S. It is to be noted that the EAST2 and EAST4 which become empty in the line switch section 41S are used for folding back connections of signals sent thereto from the MB 4-1 (4-3) to the line bridging section 42S.

On the other hand, in the ring mode, the EAST1 and EAST3 and the WEST1 and WEST3 from among the EAST side wiring lines (EAST1 to EAST4) and the WEST side wiring lines (WEST1 to WEST4) are used to fold back signals from the IF boards 5W-5 to 5W-8 and 5P-5 to 5P-8 (EAST/WEST line signals) at the folding back connection section 43S (switching section 431S) to the EAST2 and EAST4 and the WEST2 and WEST4 of the line bridging section 42S and send out them to the EAST2 and EAST4 and the WEST2 and WEST4 of the MB 4-1 (4-3). It is to be noted that, also in this instance, the EAST2 and EAST4 and the WEST2 and WEST4 which become unused in the line switch section 41S are used for folding back connections of EAST/WEST line signals sent thereto from the MB 4-1 (4-3) to the line bridging section 42S.

In this manner, also in the SB 4-2 (4-4), upon processing of signals from the IF boards 5W-5 to 5W-8 and 5P-5 to 5P-8 of the capacity of OC-n/4 smaller than the basic transmission rate OC-n accommodated in the self SB 4-2 (4-4), only some of the EAST/WEST side wiring lines are used to produce unused wiring lines, and the unused wiring lines are used to process signals from the IF boards 5W-5 to 5W-8 and 5P-5 to 5P-8 accommodated in the MB 4-1 (4-3). Consequently, the existing wiring lines can be diverted as they are, and accordingly, there is need of varying the unit configuration significantly.

The switching section 431S mentioned above is formed from a line similar to that of the switching section 46M of the MB 4-1 (4-3). By making switching setting of the switching section 46M of the MB 4-1 (4-3) same as switching setting of the switching section 431S of the SB 4-2 (4-4), the MB 4-1 (4-3) can be used as an alternative for the SB 4-2 (4-4) as described hereinabove.

The signal selection switches 439 to 442 on the WEST side function when, in the ring mode, the IF boards 5P-5 to 5P-8 for protection lines are used for WEST lines and WEST line signals are communicated. I n particular, the signal selection switch 439 is controlled in accordance with a control signal (OC-n $SEL_{(WEST)}$ 1) from the switch controller 447 such that it selects a signal from the IF board 5P-5 or an added (multiplexed) signal of signals from the IF boards 5P-5 and 5P-6 as a signal to be transmitted to the WEST1. However, in the ring mode, for example, the control signal (OC-n $SEL_{(WEST)}$ 1) is fixed to the H lever, and the signal selection switch 439 is controlled to fixedly select the latter signal.

The signal selection switch 440 on the WEST side selects a signal from the IF board 5P-6 or a signal from the MB 4-1 (4-3) as a signal to be transmitted to the WEST2 in accordance with a control signal (OC-n $SEL_{(WEST)}$ 2) from the switch controller 447 similarly to the signal selection switch 436 on the EAST side. Here, the signal selection switch 440 is controlled to fixedly select the latter signal.

The signal selection switch 441 on the WEST side is controlled in accordance with a control signal (OC-n $SEL_{(WEST)}$ 3) from the switch controller 447 such that it selects a signal from the IF board 5P-7 or an added (multiplexed) signal of outputs of the IF boards 5P-7 and 5P-8 as a signal to be transmitted to the WEST3 similarly to the signal selection switch 439 described hereinabove. Here, however, the signal selection switch 441 is controlled to fixedly select the latter signal.

The signal selection switch 442 on the WEST side selects a signal from the IF board 5P-8 or a signal from the MB 4-1 (4-3) as a signal to be transmitted to the WEST4 in accordance with a control signal (OC-n $SEL_{(WEST)}$ 4) from the switch controller 447 similarly to the signal selection switch 440 described above. Here, however, the signal selection switch 442 is controlled to fixedly select the latter signal.

The ring inhibition switches 443 to 446 are provided to mask, in the 1+1 mode, outputs thereof in accordance with control signals (RingINH CNT1 to RingINH CNT4) (for example, the H level) from the switch controller 447 similarly to the ring inhibition switches 413 to 416 of the MB 4-1 (4-3) because the WEST side wiring lines are not used in the 1+1 mode (in the ring mode, the control signals (RingINH CNT1 to RingINH CNT4) have the L level, and the ring inhibition switches 443 to 446 are controlled to a conducting state).

The switch controller 447 produces the various signals (APSSW CNT1 to APSSW CNT4, RingINH CNT1 to RingINH CNT4, OC-n $SEL_{(EAST)}$ 1 to OC-n $SEL_{(EAST)}$ 4, OC-n $SEL_{(WEST)}$ 1 to OC-n $SEL_{(WEST)}$ 4) for the switches 431 to 446 described above in response to the 1+1 mode or the ring mode to control the switching (selection) conditions of the switches 431 to 446 in such a manner as described above. It is to be noted that also setting of the 1+1 mode or the ring mode of the line switch section 41S is provided from the control unit 15.

Meanwhile, in the line bridging section 42S, the bridge switch 448 bridges a signal folded back at the folding back connection section 43S and sent thereto over the EAST side wiring line (EAST1) and selects a signal to be transmitted to the IF board 5W-6 in accordance with a control signal (OC-nBR $CNT_{(EAST)}$ 2) from the bridge controller 456. The bridge switch 448 on the EAST side selects one of signals sent thereto over the EAST side wiring lines (EAST1 and EAST2) from the folding back connection section 43S as a signal to be transmitted to the IF board 5W-6 in accordance with the control signal (OC-nBR $CNT_{(EAST)}$ 2). For example, when the control signal (OC-nBR $CNT_{(EAST)}$ 2) has the H level, the bridge switch 448 selects (bridges) the former signal, but when the control signal (OC-nBR $CNT_{(EAST)}$ 2) has the L level, the bridge switch 448 selects (bridges) the latter signal.

Here, however, since the IF boards 5W-5 to 5W-8 (5P-5 to 5P-8) having a transmission capacity smaller than OC-n are mounted, the control signal (RingBR CNT2) has the H level fixed, and a signal bridged from a signal from the EAST1 is fixedly selected as a signal to be transmitted to the IF board 5W-6.

The bridge switch 449 on the EAST side selects a signal bridged from a signal sent thereto through the EAST side wiring line (EAST3) from the folding back connection section 43S as a signal to be transmitted to the IF board 5W-8 in response to a control signal (OC-nBR $CNT_{(EAST)}$ 4) from the bridge controller 456 similarly to the bridge switch 448 described hereinabove.

The bridge switch 450 on the WEST side selects, in the ring mode, a signal bridged from a signal sent thereto over the WEST side wiring line (WEST1) from the folding back connection section 43S as a signal to be transmitted to the IF board 5P-6 in accordance with a control signal (OC-nBR $CNT_{(WEST)}$ 2) from the bridge controller 456. The bridge switch 451 on the WEST side similarly selects, in the ring mode, a signal bridged from a signal sent thereto over the WEST side wiring line (WEST3) from the folding back connection section 43S as a signal to be transmitted to the IF board 5P-8 in accordance with a control signal (OC-nBR $CNT_{(WEST)}$ 4) from the bridge controller 456.

It is to be noted that signals sent from the folding back connection section 43S over the remaining EAST side wiring lines (EAST2 and EAST4) and WEST side wiring lines (WEST2 and WEST4) are sent out to the MB 4-1 (4-3) through the INH processing section 47S because they are for signals for the MB 4-1 (4-3).

The ring bridge switch 452 selects one of a signal sent thereto over the EAST side wiring line (EAST1) and a signal sent thereto over the WEST side wiring line (WEST1) as a signal to be transmitted to the IF board 5P-5 in accordance with a control signal (RingBR CNT1) from the bridge controller 456. In particular, the ring bridge switch 452 is controlled such that, in the 1+1 mode in which, for example, the control signal (RingBR CNT1)=H level, it selects the former signal and sends out a signal same as the signal to be transmitted to the work line "1" (IF board 5W-5), but in the ring mode in which the control signal (RingBR CNT1)=L level, it selects the latter signal (WEST side line signal) and sends out it to the IF board 5P-5.

Similarly, the ring bridge switch 453 is controlled in accordance with a control signal (RingBR CNT2) from the bridge controller 456 such that, in the 1+1 mode, it selects an output of the bridge switch 448 and sends out a signal same as the signal to be transmitted to the IF board 5W-6 to the IF board 5P-6, but in the ring mode, it selects an output of the bridge switch 450 and sends out the WEST line signal to the IF board 5P-6.

The ring bridge switch 454 selects one of a signal sent thereto over the EAST side wiring line (EAST3) and a signal sent thereto over the WEST side wiring line (WEST3) in accordance with a control signal (RingBR CNT3) from the bridge controller 456. In particular, the ring bridge switch 454 is controlled such that, in the 1+1 mode, it selects the former signal and sends out a signal same as the signal to be transmitted to the IF board 5W-7 to the IF board 5P-7, but in the ring mode, it selects the latter signal and sends out the WEST line signal to the IF board 5P-7.

The ring bridge switch 455 is controlled in accordance with a control signal (RingBR CNT4) from the bridge controller 456 such that, in the 1+1 mode, it selects an output of the bridge switch 449 and sends out a signal same as the signal to be transmitted to the IF board 5W-8 to the IF board 5P-8, but in the ring mode, it selects an output of the bridge switch 451 and sends out the WEST line signal to the IF board 5P-8.

The inhibition switches 471S to 474S perform masking processing for unused wiring lines in accordance with control signals (INH CNT1 to INH CNT4) from the bridge controller 456 such that, for example, when the control signals (INH CNT1 to INH CNT4) have the L level, signals are transmitted through the inhibition switches 471S to inhibition switch 474S, but when the control signals (INH CNT1 to INH CNT4) have the H level, outputs of the inhibition switches 471S to 474S are inhibited (masked) similarly to the inhibition switches 471M to 474M of the MB 4-1 (4-3).

The bridge controller 456 produces the various control signals (RingBR CNT1 to Ring BR CNT4, OC-nBR $CNT_{(EAST)}$ 2 and OC-nBR $CNT_{(EAST)}$ 4, OC-nBR CNT $_{(WEST)}$ 2 and OC-nBR $CNT_{(WEST)}$ 4, INH CNT1 to INH CNT4) for the switches 448 to 455 and 471S to 474S described above in response to the 1+1 mode or the ring mode to control the switching (selection) conditions of the switches 448 to 455 and 471S to 474S in such a manner as described above. It is to be noted that also setting of the 1+1 mode or the ring mode of the line bridging section 42S described above is provided from the control unit 15.

Detailed operation of the MB 4-1 (4-3) and the SB 4-2 (4-4) having such a construction as described above is described with reference to FIGS. 12 and 13.

B1.1. Detailed Description of Operation in the 1+1 Mode

First, in the 1+1 mode, signals are transmitted along such routes as indicated by thick solid line arrow marks in FIG. 12 in the MB 4-1 (4-3) and the SB 4-2 (4-4). In particular, first in the SB 4-2 (4-4), the signal selection switch 435 selects, from between a signal from the APS switch 431 and a signal (whose signal capacity is OC-n/2×2=OC-n and which is hereinafter denoted by W5+W6) obtained by multiplexing outputs of the APS switches 431 and 432 (for example, signals from the IF boards 5W-5 and 5W-6), the latter signal W5+W6. The signal W5+W6 is folded back at the folding back connection section 43S (switching section 431S) from the EAST1 of the line switch section 41S to the EAST2 of the line bridging section 42S.

Similarly, the signal selection switch 437 selects, from between a signal from the APS switch 433 and a signal (whose signal capacity is OC-n and which is hereinafter denoted by as W7+W8) obtained by multiplexing outputs of the APS switches 433 and 434 (for example, signals from the IF boards 5W-7 and 5W-8), the latter signal W7+W8. The signal W7+W8 is folded back at the folding back connection section 43S (switching section 431S) from the EAST3 of the line switch section 41S to the EAST4 of the line bridging section 42S.

Of the signals W5+W6 and W7+W8, the signal W5+W6 from the EAST2 is outputted from the transmission side MIF section 45S through the inhibition switch 471S of the line bridging section 42S and is sent to the reception side SIF section 44M of the MB 4-1 (4-3). Meanwhile, also the signal W7+W8 from the EAST4 is outputted from the transmission side MIF section 45S through the inhibition switch 472S of the line bridging section 42S and is sent to the reception side SIF section 44M of the MB 4-1 (4-3) similarly.

In this manner, the SB 4-2 (4-4) multiplexes signals of the capacity of OC-n/2 for 2 channels and transmits them as a signal of the capacity of OC-n to the MB 4-1 (4-3).

On the other hand, in the MB 4-1 (4-3), signals from the IF boards 5W-1 to 5W-4 for work lines connected or signals from the IF boards 5P-1 to 5P-4 for protection lines are selected by the APS switches 401 to 404 of the line switch section 41M, respectively. Then, the signal selection switch

405 selects, from the signal from the APS switch 401 and a signal (whose signal capacity is OC-n and which is hereinafter denoted at W1+W2) multiplexed from outputs of the APS switches 401 and 402 (for example, signals from the IF boards 5W-1 and 5W-2), the latter signal W1+W2.

Similarly, the signal selection switch 407 selects, from between a signal from the APS switch 403 and a signal (whose signal capacity is OC-n and which is hereinafter denoted at W3+W4) multiplexed from outputs of the APS switches 403 and 404 (for example, signals from the IF boards 5W-3 and 5W-4), the latter signal W3+W4. In this instance, the signal selection switches 406 and 408 select, from between the signals from the APS switches 402 and 404 and the signals (W5+W6 and W7+W8) sent from the SB 4-2 (4-4) to the reception side SIF section 44M, the latter signals (W5+W6 and W7+W8) from the SB 4-2 (4-4).

Consequently, the signals of the totaling capacity of OC-n×4 including the signals (W1+W2 and W3+W4) of the capacity of OC-n×2 selected by the signal selection switches 405 and 407 as a result of processing such as switching performed by the line switch section 41M of the self MB 4-1 (4-3) and the signals (W5+W6 and W7+W8) of the capacity of OC-n×2 from the SB 4-2 (4-4) selected by the signal selection switches 406 and 408 are sent to the TSA processing section 43M over the EAST side wiring lines (EAST1 to EAST4) and interfaced with the HB 2.

Meanwhile, as regards signals of the capacity of OC-n×4 from the HB 2, the signals to be transmitted to the work lines "1" and "2" are TSA processed to the EAST1, the signals to be transmitted to the work lines "5" and "6" are TSA processed to the EAST2, the signals to be transmitted to the work lines "3" and "4" are TSA processed to the EAST 3 and the signals to be transmitted to the work lines "7" and "8" are processed to the EAST4, by the TSA processing section 43M and are inputted to the line bridging section 42M through the switching section 46M. It is to be noted, however, that, in this instance, such switching (folding back connection) as described above is not performed by the switching section 46M, and the signals are outputted as they are to the EAST1 to EAST4 of the line bridging section 42M.

Here, since, in the 1+1 mode, it is necessary to transmit the same signals as those to be transmitted to the work systems to the protection systems, the signal from the EAST1 is also a signal to the protection lines "1" and "2" which are protection lines to the work lines "1" and "2". Consequently, the signal to be transmitted to the work line "2" is branched (bridged) to the bridge switch 418 and transmitted to the IF board 5W-2 while the signal to be transmitted to the work line "1" is transmitted as it is to the IF board 5W-1. Then, as the signal of the work line "1" is bridged by the ring bridge switch 422, the signal quite same as the signal transmitted to the IF board 5W-1 is transmitted also to the protection line "1" (IF board 5P-1).

Similarly, that portion of the signal from the EAST3 which is to be transmitted to the work line "4" (IF board 5W-4) is branched (bridged) to the bridge switch 419 and transmitted to the IF board 5W-4 while the signal portion to be transmitted to the work line "3" (IF board 5W-3) is transmitted as it is to the IF board 5W-3. Then, as the signal to be transmitted to the IF board 5W-3 is bridged by the ring bridge switch 424, the signal same as the signal transmitted to the IF board 5W-3 is transmitted also to the IF board 5P-3 (protection line "3").

Further, the signals from the EAST2 and EAST4 are signals for the IF boards 5W-5 to 5W-8 (work line "5" to "8") accommodated in the SB 4-2 (4-4), and are outputted from the transmission side SIF section 45M and transmitted to the reception side MIF section 44S of the SB 4-2 (4-4).

In the SB 4-2 (4-4), the signal selection switch 436 of the line switch section 41S selects, from between the signal from the APS switch 431 and the signal from the reception side MIF section 44S, the latter signal. The selected signal is sent from the EAST2 of the line switch section 41S to the EAST1 of the line bridging section 42S by the folding back connection at the folding back connection section 43S (switching section 431S).

Similarly, from between the signal from the APS switch 434 and the signal from the reception side MIF section 44S, the latter signal is selected by the signal selection switch 438 and sent from the EAST4 of the line switch section 41S to the EAST3 of the line bridging section 42S by the folding back connection at the folding back connection section 43S (switching section 431S).

Then, in the line bridging section 42S, that portion of the signal from the EAST1 which is to be transmitted to the work line "6" (IF board 5W-6) is branched (bridged) to the bridge switch 448, but the signal to be transmitted to the work line "5" (IF board 5W-5) is transmitted as it is to the IF board 5W-5. In this instance, the signal to be transmitted to the IF board 5W-5 is bridged by the ring bridge switch 452, and the signal quite same as the signal transmitted to the IF board 5W-5 is transmitted also to the IF board 5P-5 (protection line "5").

Meanwhile, the signal to be transmitted to the work line "6" (IF board 5W-6) bridged to the bridge switch 448 is transmitted as it is to the IF board 5W-6. In this instance, the signal to be transmitted to the IF board 5W-6 is bridged by the ring bridge switch 453, and consequently, the signal quite same as the signal transmitted to the IF board 5W-6 is transmitted also to the IF board 5P-6 (protection line "6").

Further, that portion of the signal from the EAST3 of the line bridging section 42S which is to be transmitted to the work line "8" (IF board 5W-8) is branched (bridged) to the bridge switch 449, and the signal to be transmitted to the work line "7" (IF board 5W-7) is transmitted as it is to the IF board 5W-7. In this instance, the signal to be transmitted to the IF board 5W-7 is bridged by the ring bridge switch 454, and consequently, the signal quite same as the signal transmitted to the IF board 5W-7 is transmitted also to the IF board 5P-7 (protection line "7").

Meanwhile, the signal to be transmitted to the work line "8" (IF board 5W-8) bridged to the bridge switch 449 is transmitted as it is to the IF board 5W-8. In this instance, the signal to be transmitted to the IF board 5W-8 is bridged by the ring bridge switch 455, and consequently, the signal quite same as the signal transmitted to the IF board 5W-8 is transmitted also to the IF board 5P-8 (protection line "8").

It is to be noted that, in the 1+1 mode described above, since the wiring lines "3" and "4" of the transmission side SIF section 45M of the MB 4-1 (4-3) and the transmission side MIF section 45S of the SB 4-2 (4-4) are not used at all, the pertaining outputs are inhibited (masked) by the inhibition switches 473M, 474M, 473S and 474S. Further, in the 1+1 mode, since also the WEST1 to WEST4 of the line bridging sections 42M and 42S are not used, the outputs to the TSA processing section 43M and the folding back connection section 43S (switching section 431S) are inhibited by the ring inhibition switches 413 to 416 and 443 to 446.

B1.2. Detailed Description of Operation in the Ring Mode

Now, detailed operation in the ring mode is described. In the ring mode, signals are transmitted along routes indicated by thick solid line arrow marks in FIG. 13 in the MB 4-1 (4-3) and the SB 4-2 (4-4). In particular, in the SB 4-2 (4-4) first, from between signals from the EAST side/WEST side (signals from the IF boards 5W-5 to 5W-8/5P-5 to 5P-8), the signals from the EAST side (signals from the IF boards 5W-5 to 5W-8) are selected fixedly by the APS switches 431 to 434 of the line switch section 41S.

Then, the signal selection switch 435 selects, from between the signal from the APS switch 431 and a signal (whose signal capacity is OC-n and which is hereinafter denoted at EA5+EA6) multiplexed from outputs of the APS switches 431 and 432 [EAST line signals from the IF boards 5W-5 and 5W-6 (EAST lines "5" and "6")], the latter signal EA5+EA6.

Similarly, the signal selection switch 437 selects, from between the signal from the APS switch 433 and a signal (whose signal capacity is OC-n and which is hereinafter denoted at EA7+EA8) multiplexed from outputs of the APS switches 433 and 434 [EAST line signals from the IF boards 5W-7 and 5W-8 (EAST lines "7" and "8")], the latter signal EA7+EA8.

The EAST line signals (EA5+EA6 and EA7+EA8) are folded back at the folding back connection section 43S (switching section 431S) from the EAST1 and EAST3 of the line switch section 41S to the EAST2 and EAST4 of the line bridging section 42S, respectively.

Then, of the EAST line signals mentioned, the signal from the EAST2 is outputted from the wiring line "1" of the transmission side MIF section 45S through the inhibition switch 471S and then outputted to the reception side SIF section 44M of the MB 4-1 (4-3). Similarly, the signal from the EAST4 is outputted from the wiring line "2" of the transmission side MIF section 45S through the inhibition switch 472S and then outputted to the reception side SIF section 44M of the MB 4-1 (4-3).

Meanwhile, the WEST line signals from the IF boards 5P-5 to 5P-8 for the WEST lines "5" to "8" are outputted to the signal selection switches 439 to 442 of the WEST side. The signal selection switch 439 selects, from between the signal from the IF board 5P-5 and a signal (whose signal capacity is OC-n and which is hereinafter denoted at WE5+WE6) multiplexed from signals from the IF boards 5P-5 and 5P-6, the latter signal WE5+WE6. The signal WE5+WE6 is folded back at the folding back connection section-43S (switching section 431S) from the WEST1 of the line switch section 41S to the WEST2 of the line bridging section 42S.

Similarly, the signal selection switch 441 selects, from between the signal from the IF board 5P-7 and a signal (whose signal capacity is OC-n and which is hereinafter denoted at WE7+WE8) multiplexed from signals from the IF boards 5P-7 and 5P-8, the latter signal WE7+WE8. The signal WE7+WE8 is folded back at the folding back connection section 43S (switching section 431S) from the WEST3 of the line switch section 41S to the WEST4 of the line bridging section 42S.

In the line bridging section 42S, of the WEST line signals (WE5+WE6 and WE7+WE8), the signal WE5+WE6 from the WEST2 is outputted from the wiring line "3" of the transmission side MIF section 45S through the inhibition switch 473S and then outputted to the reception side SIF section 44M of the MB 4-1 (4-3). The signal WE7+WE8 from the WET4 is outputted from the wiring line "4" of the transmission side MIF section 45S through the inhibition switch 474S and then outputted to the reception side SIF section 44M of the MB 4-1 (4-3) similarly.

Meanwhile, in the MB 4-1 (4-3), from between signals of the EAST side/WEST side (signals from the IF boards 5W-1 to 5W-4/5P-1 to 5P-4), the signals from the EAST side (signals from the IF boards 5W-1 to 5W-4) are fixedly selected by the APS switches 401 to 404, respectively, of the line switch section 41M. Then, the signal selection switch 405 selects, from between the signal from the APS switch 401 and a signal (whose signal capacity is OC-n and which is hereinafter denoted at EA1+EA2) multiplexed from outputs of the APS switches 401 and 402 (EAST line signals from the IF boards 5W-1 and 5W-2), the latter signal EA1+EA2.

Similarly, the signal selection switch 407 selects, from between the signal from the APS switch 403 and a signal (whose signal capacity is OC-n and which is hereinafter denoted at EA3+EA4) multiplexed from outputs of the APS switches 403 and 404 (EAST line signals from the IF boards 5W-3 and 5W-4), the latter signal EA3+EA4. Meanwhile, the remaining signal selection switches 406 and 408 select, from between signals from the APS switches 402 and 404 and signals from the APS switch 4-2 (404), the latter signals from the SB 4-2 (4-4), respectively.

Further, the WEST line signals from the WEST lines "1" to "4" (IF boards 5P-1 to 5P-4) are outputted to the signal selection switches 409 to 412 of the WEST side, respectively. The signal selection switch 409 selects, from between the signal from the IF board 5P-1 and a signal (whose signal capacity is OC-n and which is hereinafter denoted at WE1+WE2) multiplexed from signals from the IF boards 5P-1 and 5P-2, the latter signal WE1+WE2.

Similarly, the signal selection switch 411 selects, from between the signal from the IF board 5P-3 and a signal (whose signal capacity is OC-n and which is hereinafter denoted at WE3+WE4) multiplexed from signals from the IF boards 5P-3 and 5P-4, the latter signal WE3+WE4. The remaining signal selection switches 410 and 412 select, from between signals from the WEST lines "2" and "4" (IF boards 5P-2 and 5P-4) and signals from the SB 4-2 (4-4), the latter signal from the 2-4 (4-4).

In this manner, the line signals of the EAST lines "1" to "4" and the WEST lines "1" to "4" accommodated in the MB 4-1 (4-3) and the EAST lines "5" to "8" and the WEST lines "5" to "8" accommodated in the SB 4-2 (4-4) are all sent to the TSA processing section 43M, by which they are interfaced with the HB 2 (dropping processing) or folded back to the line bridging section 42M side (through processing).

It is to be noted that the folding back to the line bridging section 42S side is performed from the EAST to the WEST and from the WEST to the EAST. Further, of the thus folded back signals (some of which are add processed signals from the HB 2), the signals of the EAST 1 to EAST4 and WEST1 to WEST4 are not subject to such switching (folding back connection) as described hereinabove, but are inputted as they are to the line bridging section 42M.

Of the signals mentioned, the signal of the EAST1 is a signal to be transmitted to the EAST lines "1" and "2" (IF boards 5W-1 and 5W-2), and the signal to be transmitted to the IF board 5W-2 is branched (bridged) to the bridge switch 418 while the signal to be transmitted to the IF board 5W-1 is transmitted as it is to the IF board 5W-1. Then, the bridge switch 418 selects, from between the signal from the EAST2 and the signal branched from the EAST1 and to be transmitted to the IF board 5W-1, the latter signal. Consequently, the signal is transmitted to the IF board 5W-2.

Similarly, the signal from the EAST3 is a signal to be transmitted to the EAST lines "3" and "4" (IF boards 5W-3 and 5W-4). The signal to be transmitted to the IF board 5W-4 is branched to the bridge switch 419 of the EAST side while the signal to be transmitted to the IF board 5W-3 is transmitted as it is to the IF board 5W-3. Of the signal from the EAST4 and the signal branched from the EAST3 and to be transmitted to the IF board 5W-4, the latter signal is selected by the bridge switch 419 and transmitted to the IF board 5W-4.

The signal from the WEST1 is a signal to be transmitted to the WEST lines "1" and "2" (IF boards 5P-1 and 5P-2). The signal to be transmitted to the WEST line "2" is branched to the bridge switch 420 of the WEST side while the signal to be transmitted to the WEST line "1" is transmitted to the ring bridge switch 422. Of the signal from the EAST1 and the signal to be transmitted to the IF board 5P-1, the latter signal to be transmitted to the IF board 5P-1 is selected by the ring bridge switch 422 and transmitted to the IF board 5P-1.

Further at this time, of the signal from the WEST2 and the signal branched from the WEST1 and to be transmitted to the IF board 5P-2, the latter signal to be transmitted to the IF board 5P-2 is selected by the bridge switch 420 of the WEST side. Further, of the signal from the EAST2 and the signal to be transmitted to the IF board 5P-2, the latter signal to be transmitted to the IF board 5P-2 is selected by the ring bridge switch 423 and transmitted to the IF board 5P-2.

Similarly, the signal from the WEST3 is a signal to be transmitted to the WEST lines "3" and "4" (IF boards 5P-3 and 5P-4). The signal to be transmitted to the IF board 5P-4 is branched to the bridge switch 421 of the WEST side while the signal to be transmitted to the IF board 5P-3 is transmitted to the ring bridge switch 424. Of the signal from the EAST2 and the signal to be transmitted to the IF board 5P-3, the latter signal to be transmitted to the IF board 5P-3 is selected by the ring bridge switch 424 and transmitted to the IF board 5P-3.

Further at this time, of the signal from the WEST and the signal branched from the WEST3 and to be transmitted to the IF board 5P-4, the latter signal to be transmitted to the IF board 5P-4 is selected by the bridge switch 421 of the WEST side. Further, of the signal from the EAST4 and the signal to be transmitted to the IF board 5P-4, the latter signal to be transmitted to the IF board 5P-4 is selected by the ring bridge switch 425 and transmitted to the IF board 5P-4.

The signals sent to the EAST2, EAST4, WEST2 and WEST4 of the line bridging section 42M are signals to be transmitted to the IF boards 5W-4 to 5W-8 and 5P-4 to 5P-8 connected to the SB 4-2 (4-4), and are outputted from the wiring lines "1" to "4" of the transmission side SIF section 45M of the MB 4-1 (4-3) and sent to the wiring lines "1" to "4" of the reception side MIF section 44S of the SB 4-2 (4-4), respectively.

Then, the signal sent to the wiring line "1" of the reception side MIF section 44S is sent to the signal selection switch 436 of the EAST side of the line switch section 41S. Of the signal from the APS switch 432 and the signal from the wiring line "1" of the reception side MIF section 44S, the latter signal is selected by the signal selection switch 436. The selected signal is folded back by the folding back connection section 43S (switching section 431S) from the EAST2 of the line switch section 41S to the EAST1 of the line bridging section 42S.

Meanwhile, the signal sent to the wiring line "2" of the reception side MIF section 44S is sent to the signal selection switch 438 of the EAST side of the line switch section 41S. Of the signal from the APS switch 434 and the signal from the wiring line "2" of the reception side MIF section 44S, the latter signal is selected by the signal selection switch 438. The selected signal is folded back by the folding back connection section 43S (switching section 431S) from the EAST4 of the line switch section 41S to the EAST3 of the line bridging section 42S.

Similarly, the signal sent to the wiring line "3" of the reception side MIF section 44S is sent to the signal selection switch 440 of the WEST side of the line switch section 41S. The signal selection switch 440 selects, from between the signal from the WEST line "6" (IF board 5P-6) and the signal from the wiring line "3" of the reception side MIF section 44S, the latter signal. The selected signal is folded back by the folding back connection section 43S (switching section 431S) from the WEST2 of the line switch section 41S to the WEST1 of the line bridging section 42S.

Further, the signal sent to the wiring line "4" of the reception side MIF section 44S is sent to the signal selection switch 442 of the WEST side of the line switch section 41S. The signal selection switch 442 selects, from between the signal from the WEST line "8" (IF board 5P-8) and the signal from the wiring line "4" of the reception side MIF section 44S, the latter signal. Then, the selected signal is folded back by the folding back connection section 43S (switching section 431S) from the WEST4 of the line switch section 41S to the WEST3 of the line bridging section 42S.

Meanwhile, in the line bridging section 42S, the signal sent to the EAST1 is an EAST line signal to be transmitted to the EAST lines "5" and "6" (IF boards 5W-5 and 5W-6). The signal to be transmitted to the IF board 5W-6 is branched to the bridge switch 448 of the EAST side while the signal to be transmitted to the IF board 5W-5 is transmitted as it is to the IF board 5W-5. Then, the bridge switch 448 selects, from between the signal from the EAST2 and the signal branched from the EAST1 and to be transmitted to the IF board 5W-6, the latter signal, and the selected signal is transmitted to the IF board 5W-6.

The signal sent to the EAST3 is an EAST line signal to be transmitted to the EAST lines "7" and "8" (IF board 5W-7 and 5W-8). The signal to be transmitted to the IF board 5W-8 is branched to the bridge switch 449 of the EAST side while the signal to be transmitted to the IF board 5W-7 is transmitted as it is to the IF board 5W-7. Then, the bridge switch 449 selects, from between the signal from the EAST4 and the signal branched from the EAST3 and to be transmitted to the IF board 5W-8, the latter signal. The selected signal is transmitted to the IF board 5W-8.

The signal sent to the WEST1 is a signal to be transmitted to the WEST lines "5" and "6" (IF board 5P-5 and 5P-6). The signal to be transmitted to the IF board 5P-6 is branched to the bridge switch 450 of the WEST wide while the signal to be transmitted to the IF board 5P-6 is transmitted to the ring bridge switch 452. The ring bridge switch 452 selects, from between the signal from the EAST1 and the signal to be transmitted to the IF board 5P-5, the latter signal. The selected signal is transmitted to the IF board 5P-5.

At this time, the bridge switch 450 described above selects, from between the signal from the WEST2 and the signal branched from the WEST1 and to be transmitted to the IF board 5P-6, the latter signal to be transmitted to the IF board 5P-6. Further, the ring bridge switch 453 selects, from between the signal from the EAST2 and the signal to be transmitted to the IF board 5P-6, the latter signal. The latter signal is transmitted to the IF board 5P-6.

The signal sent to the WEST3 is a signal to be transmitted to the WEST lines "7" and "8" (IF boards 5P-7 and 5P-8), and the signal to be transmitted to the IF board 5P-8 is branched to the bridge switch 451 of the WEST side while the signal to be transmitted to the IF board 5P-7 is transmitted to the ring bridge switch 454. The ring bridge switch 454 selects, from between the signal from the EAST3 and the signal to be transmitted to the IF board 5P-8, the latter signal. The selected signal is transmitted to the IF board 5P-7.

The bridge switch 451 selects, from between the signal from the WEST4 and the signal branched from the WEST3 and to be transmitted to the IF board 5P-8, the latter signal to be transmitted to the IF board 5P-8. Further, the ring bridge switch 455 selects, from between the signal from the EAST4 and the signal to be transmitted to the IF board 5P-8, the latter signal. The selected signal is transmitted to the IF board 5P-8.

It is to be noted that, in the ring mode, since it is necessary to use all of the wiring lines "1" to "4" of the transmission side SIF section 45M of the MB 4-1 (4-3) and the wiring lines "1" to "4" of the transmission side MIF section 45S of the SB 4-2 (4-4), the inhibition switches 471M to 474M and 471S to 474S of the INH processing sections 47M and 47S do not operate at all (are controlled to a conducting state) and do not perform inhibition (masking) processing of outputs of themselves. The operation of the INH processing sections 47M and 47S is illustrated in Table 1 below.

TABLE 1

Operation of the INH processing section

| Transmission capacity of IF board | Low speed side configuration | Operation of INH Processing section |
|---|---|---|
| ≧ OC-n (standard) | * | Inhibition (masking) processing for all 1 to 4 |
| < OC-n (example: OC-n/4) | 1 + 1 | Inhibition (masking) processing only for 3, 4 |
| < OC-n (example: OC-n/4) | Ring | No inhibition (masking) processing |

*don't care

As described above, with the ADM 1 of the present embodiment, also where the IF boards 5W-1 to 5W-8 (5P-1 to 5P-8) whose transmission capacity is OC-n/4 are mounted in existing slots, while the capacity for signals accommodated in one RB 4-i is provided with flexibility (compatibility) as described above and the reduction of the signal processing capacity (interface capacity with the HB 2) is suppressed to the minimum, both of switching between work lines/protection lines in the 1+1 redundancy configuration and processing regarding EAST lines/WEST lines in the ring (UPSR) configuration can be performed normally.

Accordingly, the necessity for purchase of a new different unit for connection between existing low speed side unit (transmission unit for a tributary network and the present ADM 1 on the existing/new user side is eliminated. Consequently, a network can be constructed readily and flexibly with an existing unit on the user side, and incidentally, the load required for control and supervision of the entire network can be reduced.

Further, since the MB 4-1 (4-3) is provided with the reception side SIF section 44M and the transmission side SIF section 45M and the SB 4-2 (4-4) is provided with the reception side MIF section 44S and the transmission side MIF section 45S, the line switch section 41M and the line bridging section 42M of the MB 4-1 (4-3) and the line switch section 41S and the line bridging section 42S of the SB 4-2 (4-4) can be implemented individually with the same configurations. This contributes very much to reduction of the cost required for development of a unit.

Further, for the RBs 4-i in the present embodiment, wiring line connections of existing RBs (whose basic processing unit is OC-n) can be diverted as they are even where the IF boards 5W-j (5P-j) whose processing capacity is OC-n/4 smaller than OC-n are mounted, and consequently, an existing unit configuration need not be varied very much and simplification in unit designing (development) and reduction in cost can be achieved.

Further, since the MB 4-1 (4-3) can be used alternatively as the SB 4-2 (4-4) due to provision of the switching section 46M (46M') in the 4-1 (4-2), the management unit number is reduced, and the SB 4-2 (4-4) need not newly purchased when an existing user of the TB 3 tries to vary its application to that for IF boards having a smaller transmission capacity and also a demand of a new user can be dealt with flexibly. Further, since the management unit number is reduced in this manner, also reduction of the cost required for maintenance and so forth on the user side can be reduced.

B2. Description of Concrete Examples

In the following, detailed description is given of an example wherein, as the IF boards 5W-j and 5P-j (j=1 to 8) described above, IF boards of a capacity of OC-3c (150 Mb/s) equal to ¼ the basic transmission capacity OC-12 (600 Mb/s) are mounted in the MB 4-1 (4-3) and the SB 4-2 (4-4).

Here , however, IF boards 5W-j and 5P-j of a "2ch/Sheet configuration" having functions (a multiplexing section 51 and a demultiplexing section 52) capable of multiplexing and demultiplexing OC-3c signals for 2 channels are used as shown in FIGS. 14 to 17, and the signal processing capacity of one IF board 5W-j or 5P-j is 150 Mb/s×2=300 Mb/s.

In short, the MB 4-1 (4-3) and the SB 4-2 (4-4) in the present embodiment have IF boards (interface sections) 5W-j and 5P-j for a plurality of (eight) slots which accommodate low speed line signals for a plurality of (two) channels per one slot, respectively. Consequently, where the number of slots is equal, a signal capacity for a greater number of channels can be accommodated, and further, reduction of the interface capacity with the HB 2 can be suppressed.

It is to be noted that signal transmission routes (used wiring lines) in the 1+1 mode are indicated by solid line arrow marks in FIGS. 14 and 15 while signal transmission routes (used wiring lines) in the ring (UPSR) mode are indicated by solid line arrow marks in FIGS. 16 and 17. Further, those elements denoted by like reference symbols are similar elements to those described hereinabove, overlapping detailed description of them is omitted here to avoid redundancy.

Figure 19A:
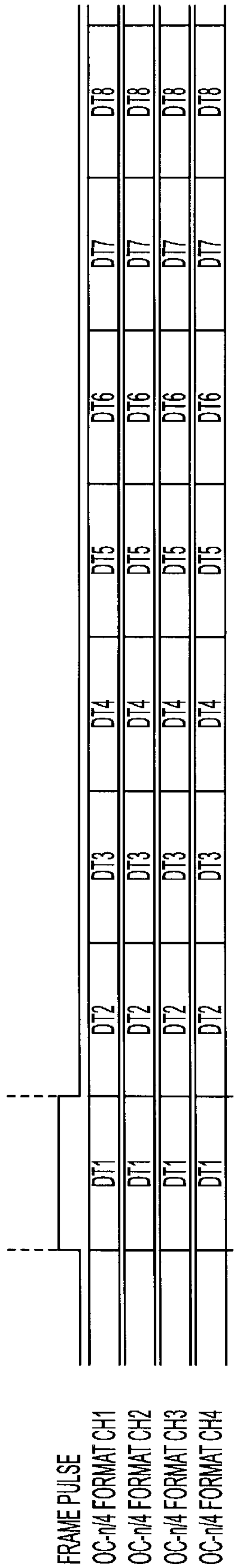
FIG. 19A is a diagrammatic view showing an example of a signal format of an OC-n/4 signal where no speed conversion is performed.
Figure 19B:
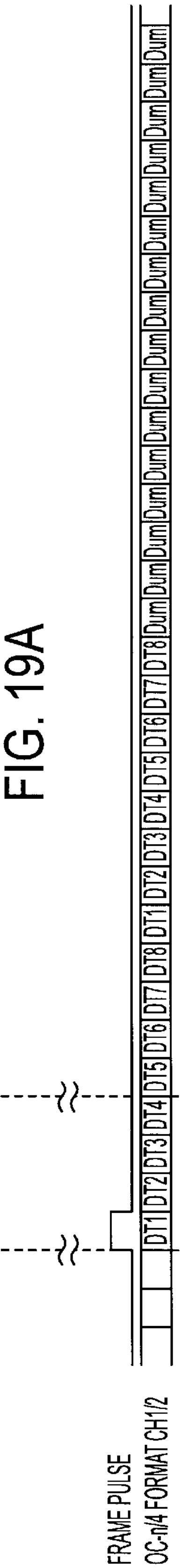
FIGS. 19B and 19C are diagrammatic views showing an example of a signal format of an OC-n/4 signal where speed conversion is performed by the ADM of FIG. 2.

First, in each of the IF boards 5W-j and 5P-j, the 41 multiplexes OC-3c signals [for 2 channels of signals of 150 Mb/s (refer to FIG. 19A)] from the low speed side units (transmission units for a tributary network) 5A and 5B. However, if such multiplexing is performed simply, then the transmission rate becomes 300 Mb/s, and since originally the MB 4-1 (4-3) [for example, pointer processing sections. (timing crossing over sections) 26A to 26C] operates in units of OC-12c (600 Mb/s) (a selection section 25 selects signals in units of OC-12c), speed conversion to a signal of the capacity of OC-12c must be performed somewhere.

Therefore, in the present embodiment, upon multiplexing of OC-3c (which may hereinafter referred to merely as "OC-3") signals by the multiplexing section 51 of each of the TF boards 5W-j and 5P-j, dummy signals (dummy bytes) are added to the data signals to convert the signals of the capacity of OC-3 into signals of the capacity of OC-12c (which may hereinafter referred merely as "OC-12").

For example, the multiplexing section 51 of each of the IF boards 5W-1 (5P-1), 5W-3 (5P-3), 5W-5 (5P-5) and 5W-7 (5P-7) sends out a repetition signal of a data signal (CH1), another data signal (CH2), a dummy signal (Dum) and another dummy signal (Dum) to perform speed conversion of signals of the capacity of OC-3 into a signal of the basic transmission capacity (OC-12) when the TB 3 accommodates low speed line signals (OC-12) for 2.4 Gb/capacity, and sends out the signal of the basic transmission capacity (OC-12).

Figure 19C:
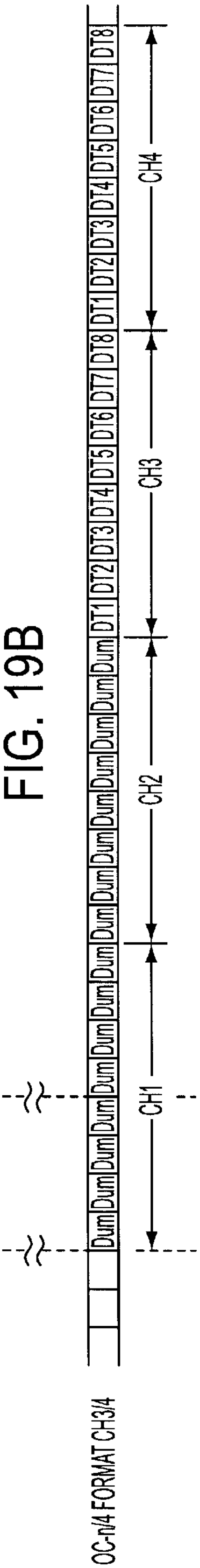

Meanwhile, the multiplexing section 51 of each of the remaining IF boards 5W-2 (5P-2), 5W-4 (5P-4), 5W-6 (5P-6) and 5W-8 (5P-8) sends out a repetition signal of a dummy signal (Dum), another dummy signal (Dum), a data signal (CH3) and another data signal (CH4) reverse to those described above as shown in FIG. 19C to perform speed conversion of the signals of the capacity of OC-3 to a signal of the capacity of OC-12, and outputs the signal of the capacity of OC-12.

Figures 20A, 20B, 20C:
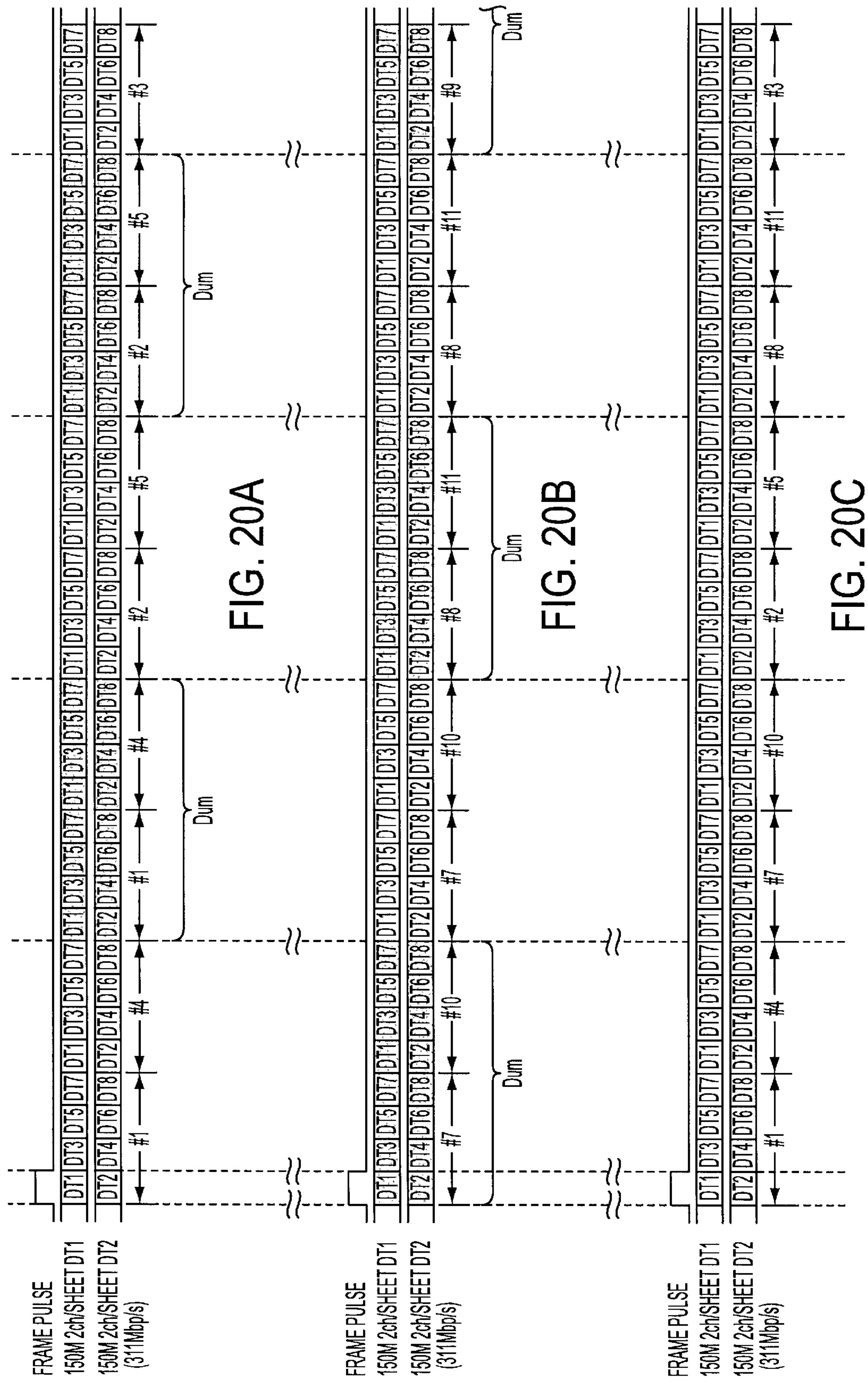
FIG. 20 is a time chart illustrating speed conversion processing of a signal by the ADM of FIG. 2.
Figure 21:
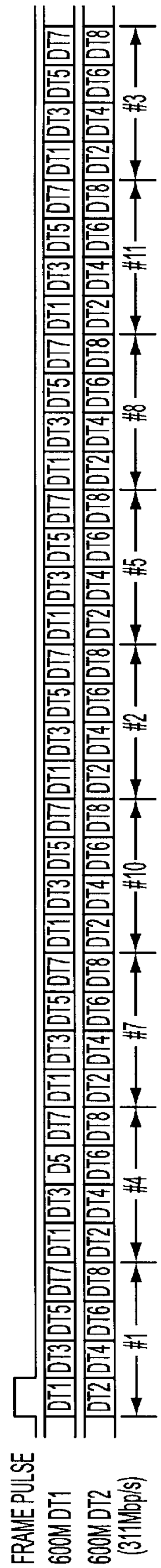
FIG. 21 is a diagram illustrating an example of a signal format of an OC-12c (600 Mb/s) signal.

More particularly, each of the IF boards 5W-1 (5P-1), 5W-3 (5P-3), 5W-5 (5P-5) and 5W-7 (5P-7) which handles signals of the CH1 and CH2 inserts, because the first #1 and #4 (STS channel) portions are actual data signals as shown in (A) of FIG. 20, dummy signals are inserted into the following #1 and #4 [which correspond, in the case of 600 Mb/s (OC-12c), to #7 and #10 as shown in FIG. 21] portions (this similarly applies also to the other STS channels) to obtain a signal of the capacity of approximately 300 Mb/s×2=600 Mb/s.

On the other hand, each of the IF boards 5W-2 (5P-2), 5W-4 (5P-4), 5W-6 (5P-6) and 5W-8 (5P-8) which handles signals of the CH3 and CH4 inserts, because the second #7 and #10 portions are actual data signals as shown in (B) of FIG. 20, dummy signals are inserted into the fist #7 and #10 portions (this similarly applies also to the other STS channels) to obtain a signal of the capacity of approximately 300 Mb/s×2=600 Mb/s.

Then, in each of the MB 4-1 (4-3) and the SB 4-2 (4-4), such a signal of the capacity of 600 Mb/s (OC-12c) as shown in (C) of FIG. 20 can be obtained without performing speed conversion processing (format conversion processing) by successively selecting signals other than dummy signals in a time dividing fashion as hereinafter described from among signals shown in (A) and (B) of FIG. 20. Accordingly, there is no need of significantly modifying the wiring lines to the IF boards 5W-j and 5P-j and the constructions of the MB 4-1 (4-3) and the SB 4-2 (4-4). Also the circuit scales and the processing loads of the MB 4-1 (4-3) and the SB 4-2 (4-4) are reduced.

On the other hand, in the MB 4-1 (4-3) and the SB 4-2 (4-4), since the IF boards 5W-j and 5P-j of the "2ch/Sheet configuration" are used as described above, it is necessary to perform not simple 1+1 switching for a case wherein IF boards for OC-12 (600 Mb/s) are used, but 1+1 switching in units of a signal (units of a channel) of OC-3 signals (150 Mb/s) multiplexed for 2 channels.

Figure 22:
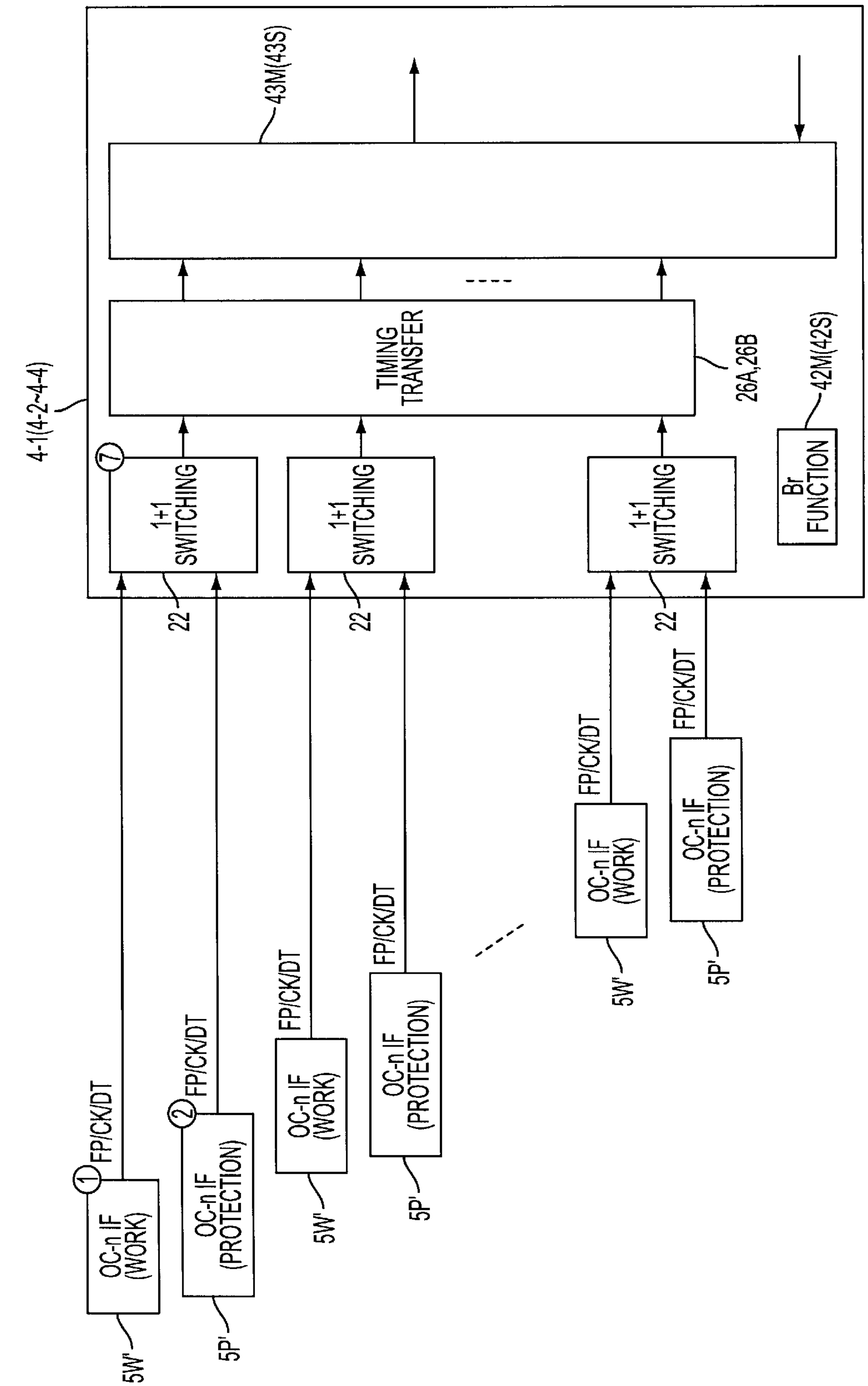
FIG. 22 is a block diagram illustrating 1+1 switching processing when IF boards for work/protection lines of the OC-n (OC-12) capacity.
Figure 23:
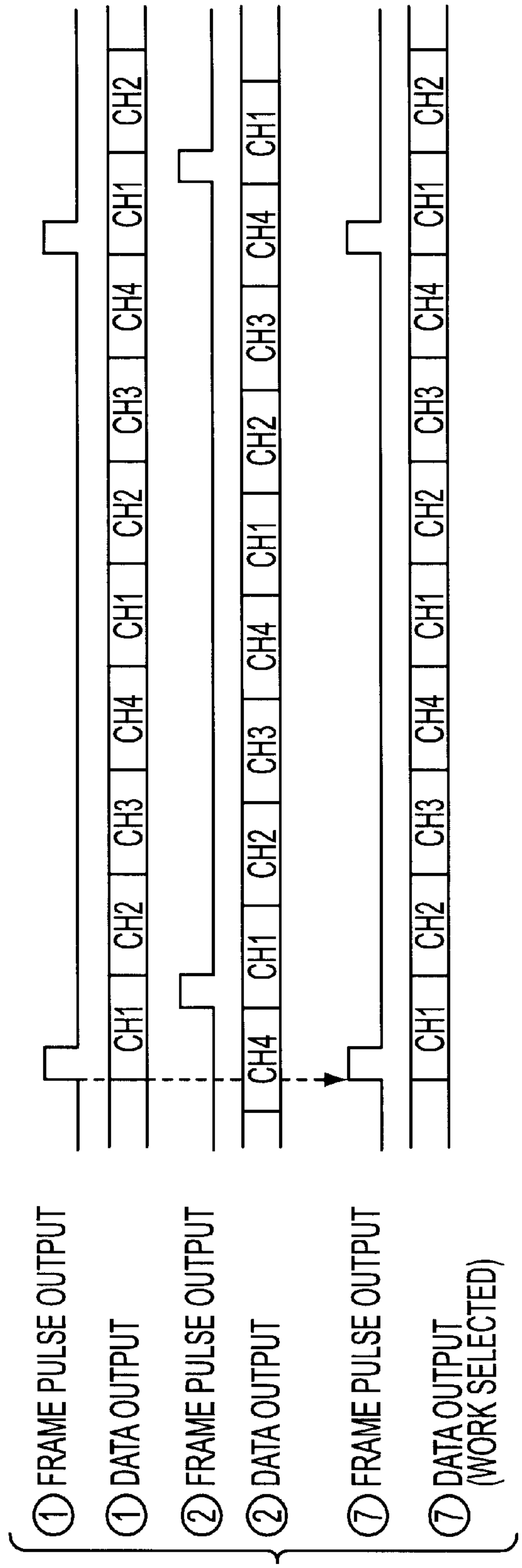
FIG. 23 is a time chart illustrating 1+1 switching processing of the construction shown in FIG. 22.
Figure 24:
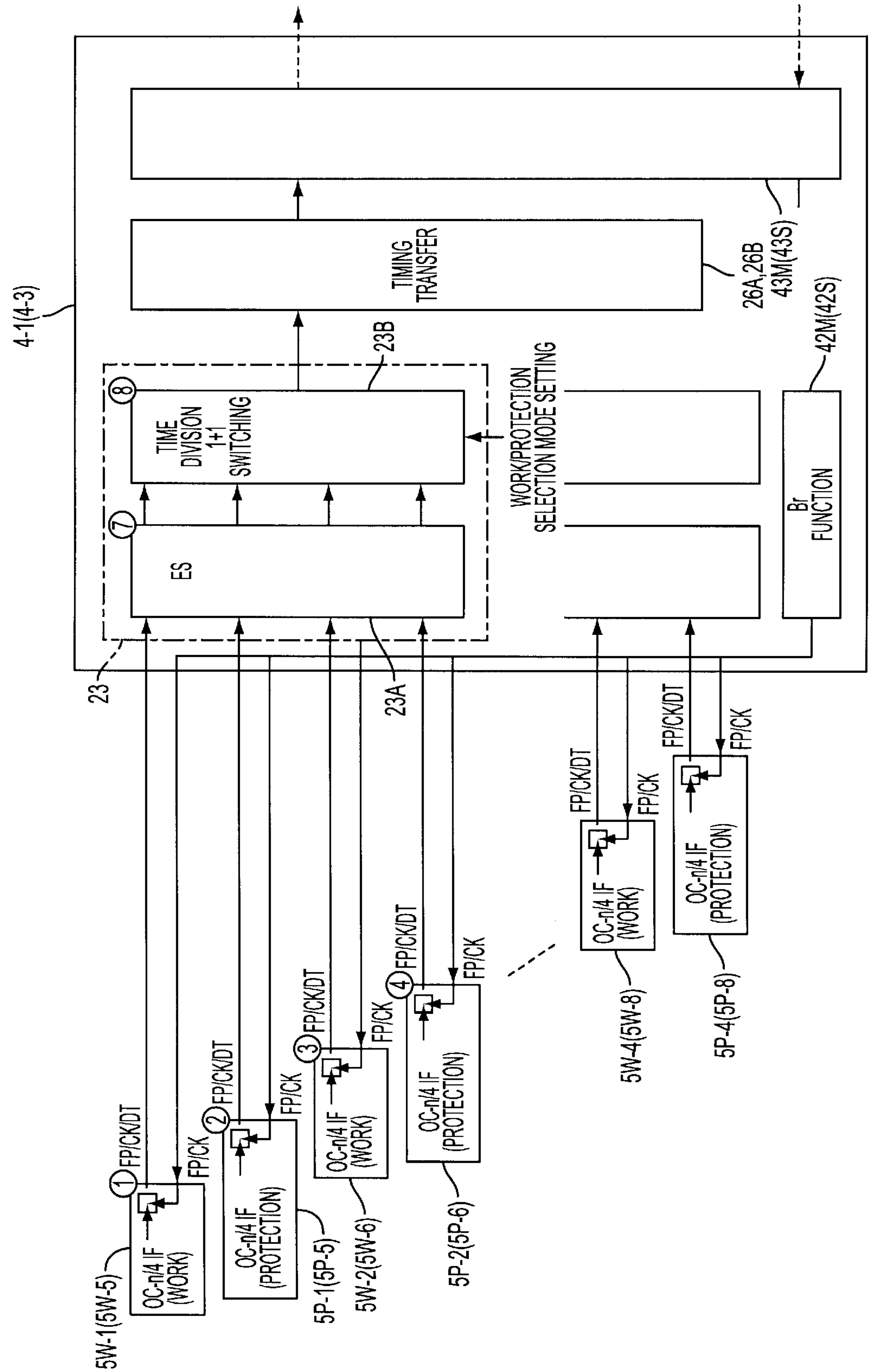
FIG. 24 is a block diagram illustrating a basic construction of the routing block of the ADM of FIG. 2.

Further, for example, where IF boards 5W' and 5P' for work/protection lines of the capacity of OC-n (OC-12) are used (mounted) as shown in FIG. 22, signals are inputted to 1+1 switching sections 22 with frame leading positions thereof dispersed from each other, for example, as shown in FIG. 23 due to a difference in physical distance between the IF boards 5W' and 5P' and the RBs 4-i (i=1 to 4) and a difference in output timing between the IF boards 5W' and 5P' (the IF boards 5W' and 5P' output signals individually at arbitrary timings). However, since each of the 1+1 switching sections 22 merely selects one of signals from the corresponding IF boards 5W' and 5P' (that one of the signals which has a higher quality), such a dispersion in frame leading position between the input signals (that is, a skew between slots) as described above does not matter.

However, where the IF boards 5W-j and 5P-j of the "2ch/Sheet configuration" are used as described hereinabove, if the IF boards 5W-j and 5P-j individually output at arbitrary timings similarly to the IF boards 5W' and 5P' for OC-12 described above, then 1+1 switching processing in units of a channel cannot be performed if frame transfer processing of signals from the IF boards 5W-j and 5P-j (using a memory or the like) is not performed to align the frame leading positions. Further, if frame transfer is performed simply for signals inputted at arbitrary timings, then the circuit (memory capacity) becomes excessively great, and as a result, the scale of the RBs 4-i becomes excessively great and the burden in development increases.

Therefore, each of the RBs [MB 4-1 (4-3) and SB 4-2 (4-4)] in the present embodiment includes, as shown in FIGS. 14 to 17 and 24, in addition to the 1+1 switching sections 22 (not shown in FIG. 24) which perform ordinary 1+1 switching processing where IF boards 5W' and 5P' of the capacity of OC-12 are mounted, a time division 1+1 switching processing section (time division line selection processing section) 23 including an ES (Elastic Store memory) section 23A and a time division 1+1 switching section 23B for performing frame transfer processing and 1+1 switching (line selection) processing in units of a channel when IF boards 5W-j and 5P-j of the "2ch/Sheet configuration" are mounted.

Further, in order to minimize the scale of the ES section 23A, each of the IF boards 5W-j and 5P-j controls the signal outputting timing to the RB 4-i in accordance with an intra-unit (system) clock (SCK) and a system frame pulse signal (SFP) supplied from the line bridging section 42M (42S) to the IF board 5W-j or 5P-j and folds back and outputs the SCK and the SFP received from the line bridging section 42M (42S) together with a data signal.

It is to be noted the SCK mentioned above is obtained as pulses of 300 MHz by dividing pulses produced by an oscillator 28 for 2.4 Gb/s by means of a ⅛ divider 29, and the SFP is produced as pulses having a period of 125 $\mu$s from an output of the ⅛ divider 29 by a frame pulse (FP) control section 30.

Figures 25A, 25B, 25C:
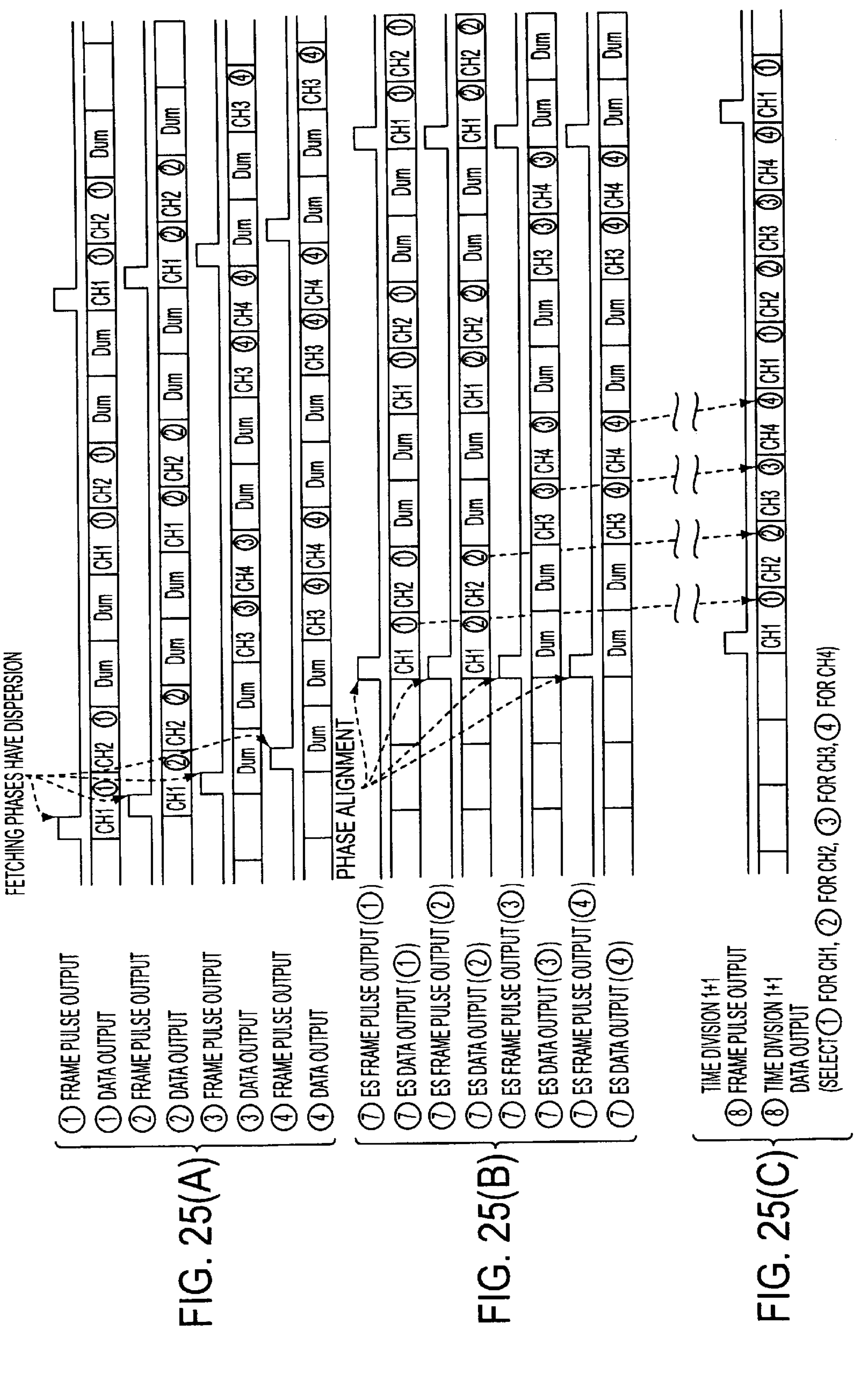
FIG. 25 is a time chart illustrating dispersion absorption processing for a frame phase by the routing block shown in FIG. 24.

Consequently, since, in each of the RBs 4-i, the dispersion in signal reception timing (frame leading positions of reception signals) from the IF boards 5W-j and 5P-j comes within a range which corresponds principally to a difference in distance between slots, the difference in distance between the IF boards 5W-j and 5P-j and the RBs 4-i and the dispersion in output delay between the IF boards 5W-j and 5P-j (skew between slots) can be absorbed to align the frame leading positions of the signals inputted from the IF boards 5W-j and 5P-j [Refer to (A) and (B) of FIG. 25] by the ES section 23A of a minimum scale. As a result, 1+1 switching in units of a channel by the time division 1+1 switching section 23B can be performed readily.

In particular, since signals whose frame leading positions coincide with one another as seen from (B) of FIG. 25 are inputted to the time division 1+1 switching section 23B, in regard to the CH1 and CH2, 1+1 switching is performed for signals from the IF boards 5W-1 and 5P-1 (5W-5 and 5P-5), and in regard to the CH3 and CH4, 1+1 switching is performed for signals from the IF boards 5W-2 and 5P-2 (5W-6 and 5P-6). It is to be noted that this similarly applies to 1+1 switching for signals from the other IF boards 5W-2 to 5W-4 (5P-2 to 5P-4) (5W-6 to 5W-8 (5P-6 to 5P-8))

Then, results of the selection of the CH1 to CH4 are time division multiplexed to obtain a signal of the capacity of OC-12, and this signal is outputted to the timing crossing over section 26A (26B) of the EAST (WEST) side. It is to be noted that, at this time, as described above, a multiplexed signal of signals from the IF boards 5W-1 (5P-1) and 5W-2 (5P-2) [5W-5 (5P-5) and 5W-6 (5P-6)] is outputted as a signal to be transmitted to the EAST1 to the signal selection switch 405 (435) while a multiplexed signal of signals from the IF boards 5W-3 (5P-3) and 5W-4 (5P-4) [5W-7 (5P-7) and 5W-8 (5P-8)] is outputted as a signal to be transmitted to the EAST3 to the signal selection switch 407 (437).

In short, the time division 1+1 switching section 23B has a function as the APS switches 401 to 404 (431 to 434) described above and another function of multiplexing four series of outputs of the APS switches 401 to 404 (431 to 434) into two series. Consequently, the timing transfer section 26A (26B) is required to only perform timing transfer in units of OC-12 similarly as in the case wherein the IF boards 5W' and 5P' of the capacity of OC-12 are mounted.

Since the circuit scale necessary for the frame transfer processing (ES section 23A) can be minimized as a result of employment of such a construction as described above, the burden in development of the RBs 4-i can be reduced significantly. Further, it is possible to perform ordinary 1+1 switching by the 1+1 switching sections 22 for signals from the IF boards 5W' and 5P' for OC-12 and perform time division 1+1 switching by the time division 1+1 switching processing section 23 for signals from the IF board 5W-1 and 5P-1 (5W-2 and 5P-2) for OC-3.

In short, it is possible to provide the IF boards 5W' and 5P' for OC-12 and the IF boards 5W-1 and 5P-2 (5W-2 and 5P-2) for OC-3 in a mixed condition, and, for example, it is possible to cope with a client who uses some of existing slots for the low speed side unit 5A and 5B and uses the remaining slots for the new low speed side unit SC (OC-12).

Figures 26A, 26B:
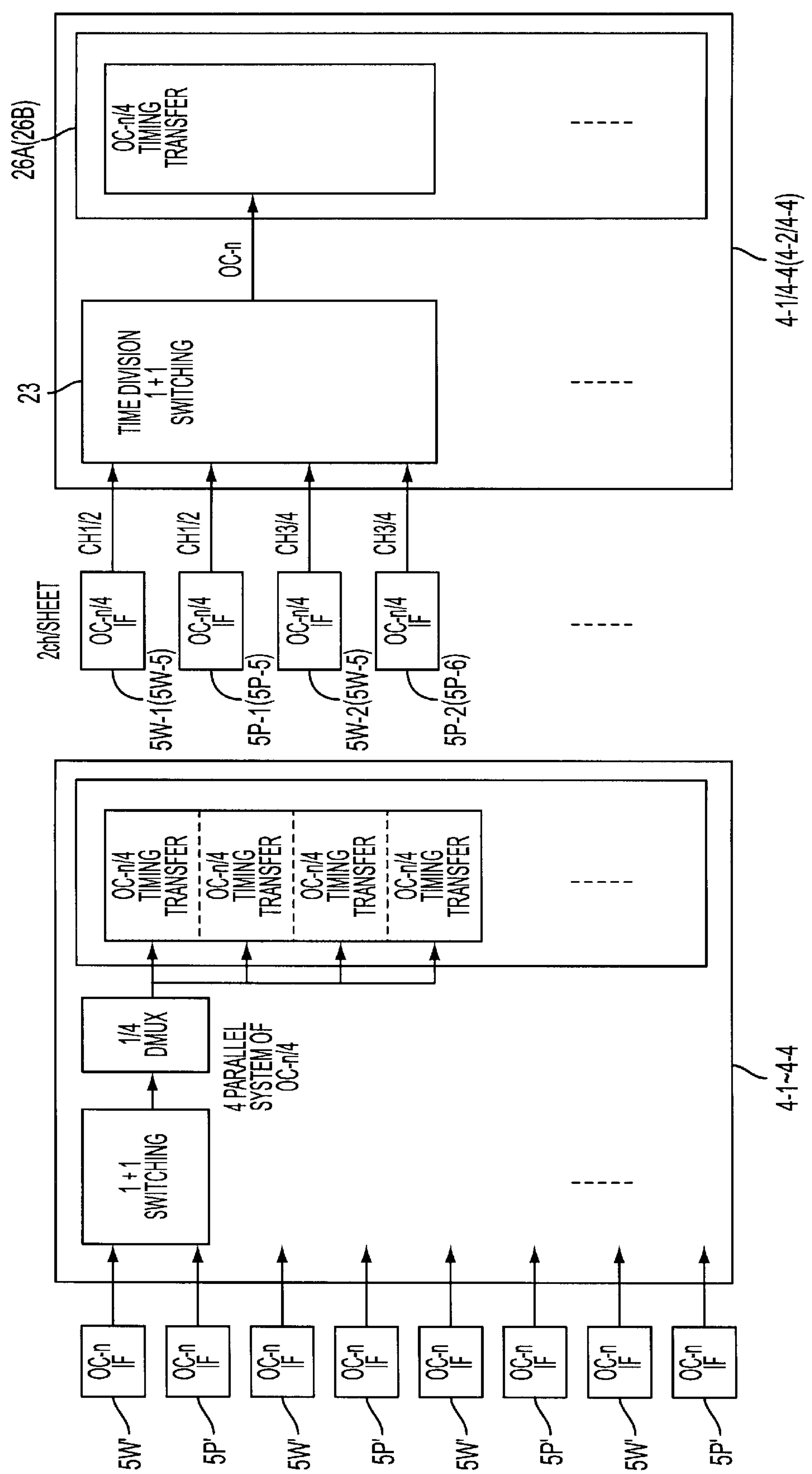
FIG. 26A is a block diagram illustrating timing crossing over processing when an IF board for OC-n is mounted.
FIG. 26B is a block diagram illustrating timing crossing over processing by the routing block of the ADM of FIG. 2 where an IF board for OC-n/4 is mounted.

It is to be noted that, for example, if, where the IF boards 5W' and 5P' for OC-12 are mounted, a signal is demultiplexed (DMUX) in 1/4 (OC-3) units to perform timing transfer in units of OC-3 after usual 1+1 switching processing is performed as seen from FIG. 26A, then also where IF boards 5W-j (5P-j) for OC-3 are mounted, the time division 1+1 switching processing section 23 described above is not required and only it is necessary to perform usual 1+1 switching. In this instance, however, it becomes impossible to handle a signal of a concatenation construction (for example, STS-12c or the like).

Further, the construction shown in FIG. 26A requires an increased scale and is technically difficult because a timing transfer line is required for each of signals after demultiplexed. Therefore, in the present embodiment, after time division 1+1 switching is performed as described above, timing transfer processing is performed in units of OC-12 as seen from FIG. 26B, thereby allowing reduction of the period of development of the unit 1.

It is to be noted that, in FIGS. 14 to 18, reference numeral 27 denotes an OC-48 ring functioning section which functions when IF boards [work $_{(EAST)}$/protection (WEST) IF boards] for OC-48c (2.4 Gb/s) are mounted (the mounted number of such IF boards is 1/4 that where IF boards of the capacity of OC-12c are mounted). Because the OC-48 ring functioning section 27 is provided, it is possible to perform usual 1+1 switching in the 1+1 mode or perform selection of EAST/WEST line signals in the ring mode for signals from the IF boards for OC-48.

Further, in FIGS. 14 to 17, reference symbol 31 denotes a high speed side processing section for performing high speed side processing to establish interfacing with the HB 2, and 5H denotes a high speed side unit which is used in the high speed side network such as the ring described above.

B2.1. Basic Principle of the ES Section 23A

Figure 27:
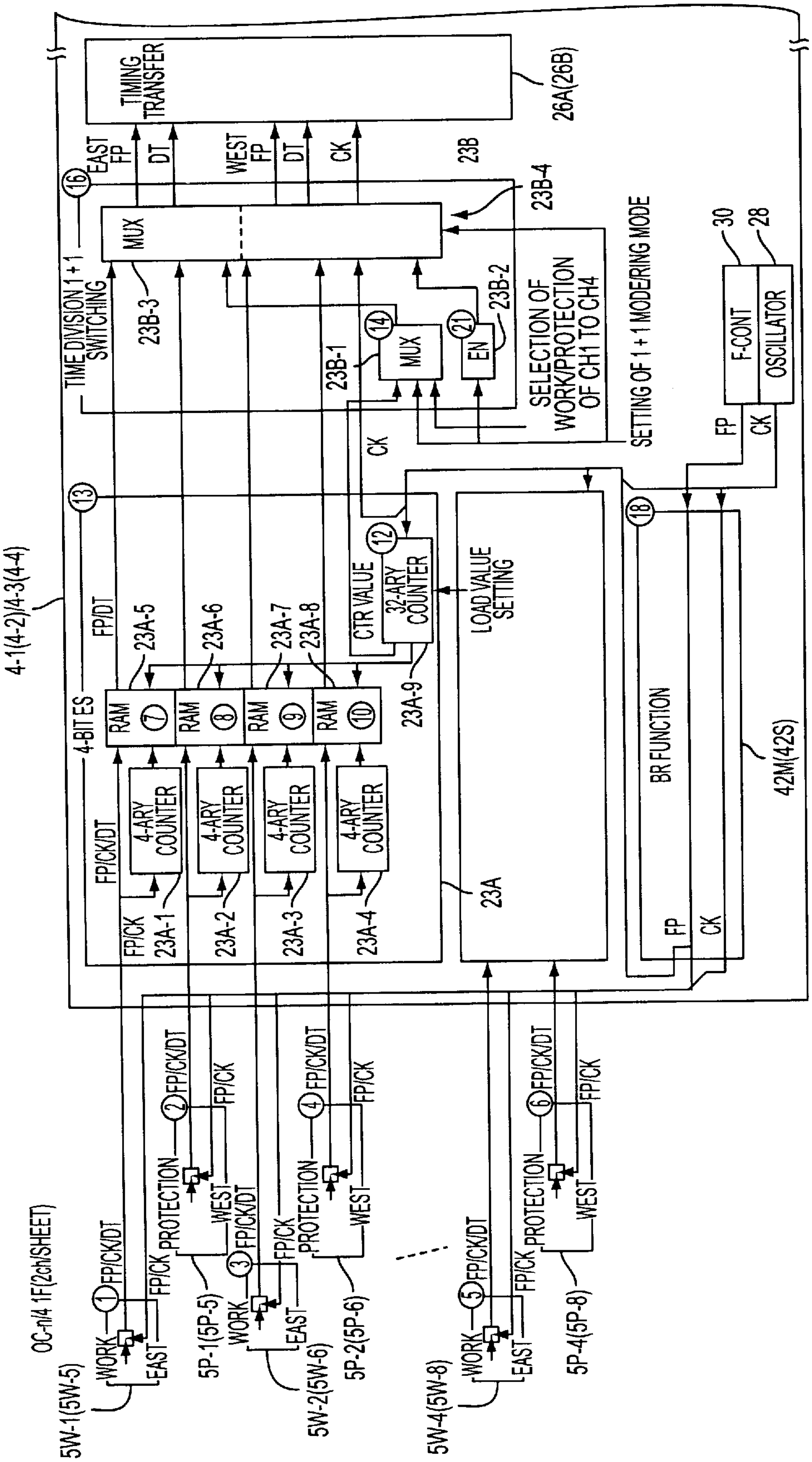
FIG. 27 is a block diagram showing an ES section and a time division 1+1 switching section in the routing block of the ADM of FIG. 2.

In the following, a basic principle of the ES section 23A described above is described with reference to FIGS. 27 to 31.

Where the ES section 23A is regarded as a 4-bit ES as seen from FIG. 27, OC-3 signals, FPs and clock signals are inputted to the ES section 23A at timings synchronized with the SCK and the SFP outputted from the line bridging section 42M (42S) to the IF boards 5W-j (5P-j), and write counters 23A-1 to 23A-4 operate in response to the clock signals and the FPs so that the signals are successively written (stored) into RAMs (memory sections) 23A-5 to 23A-8.

Figures 28A, 28B, 28C:
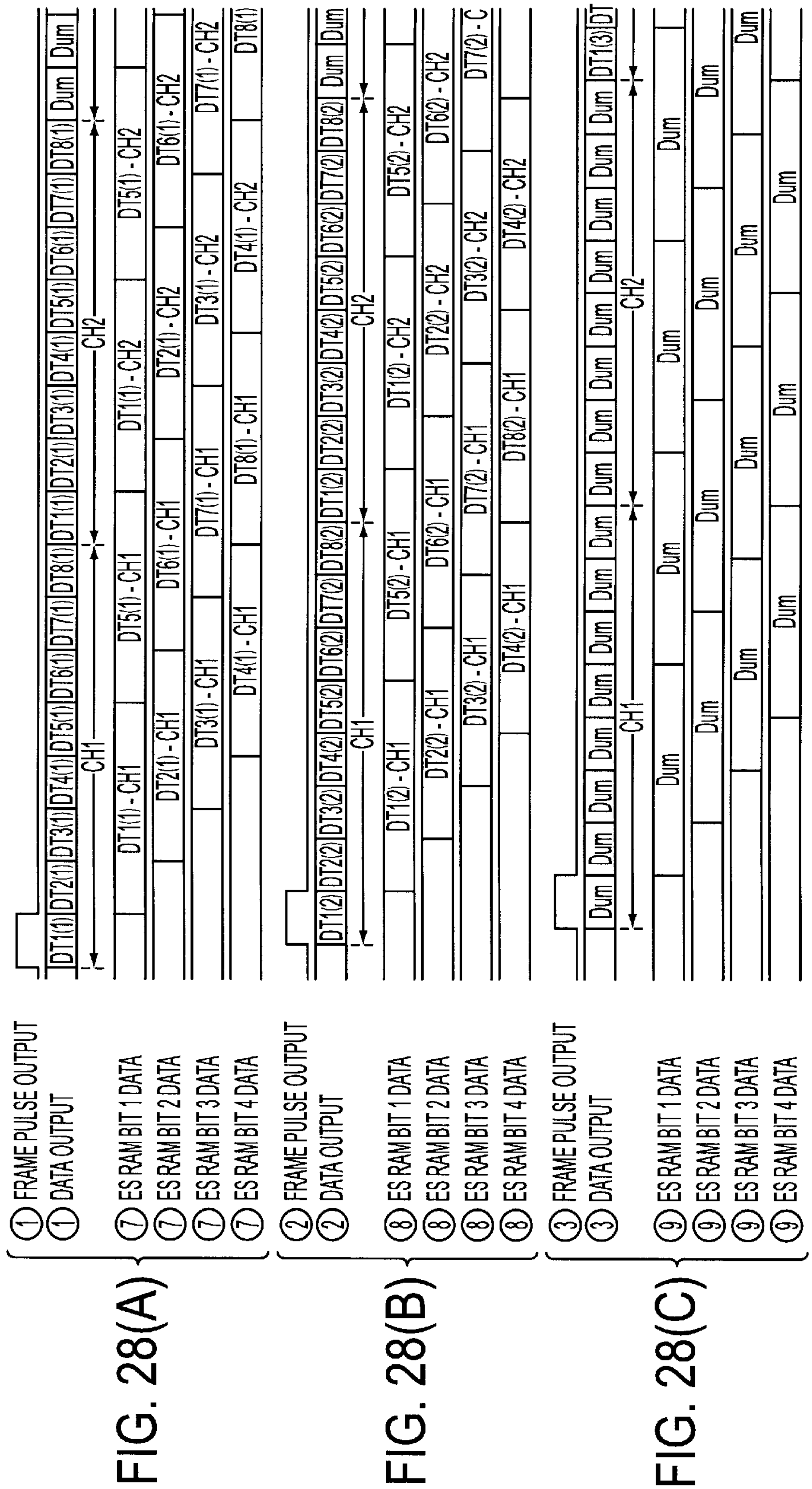
FIGS. 28 and 29 are time charts illustrating dispersion absorption processing and time division 1+1 switching processing in the 1+1 mode for a frame phase by the ES section and the time division 1+1 switching section shown in FIG. 27.
Figures 28D, 28E, 28F, 28G, 28H:
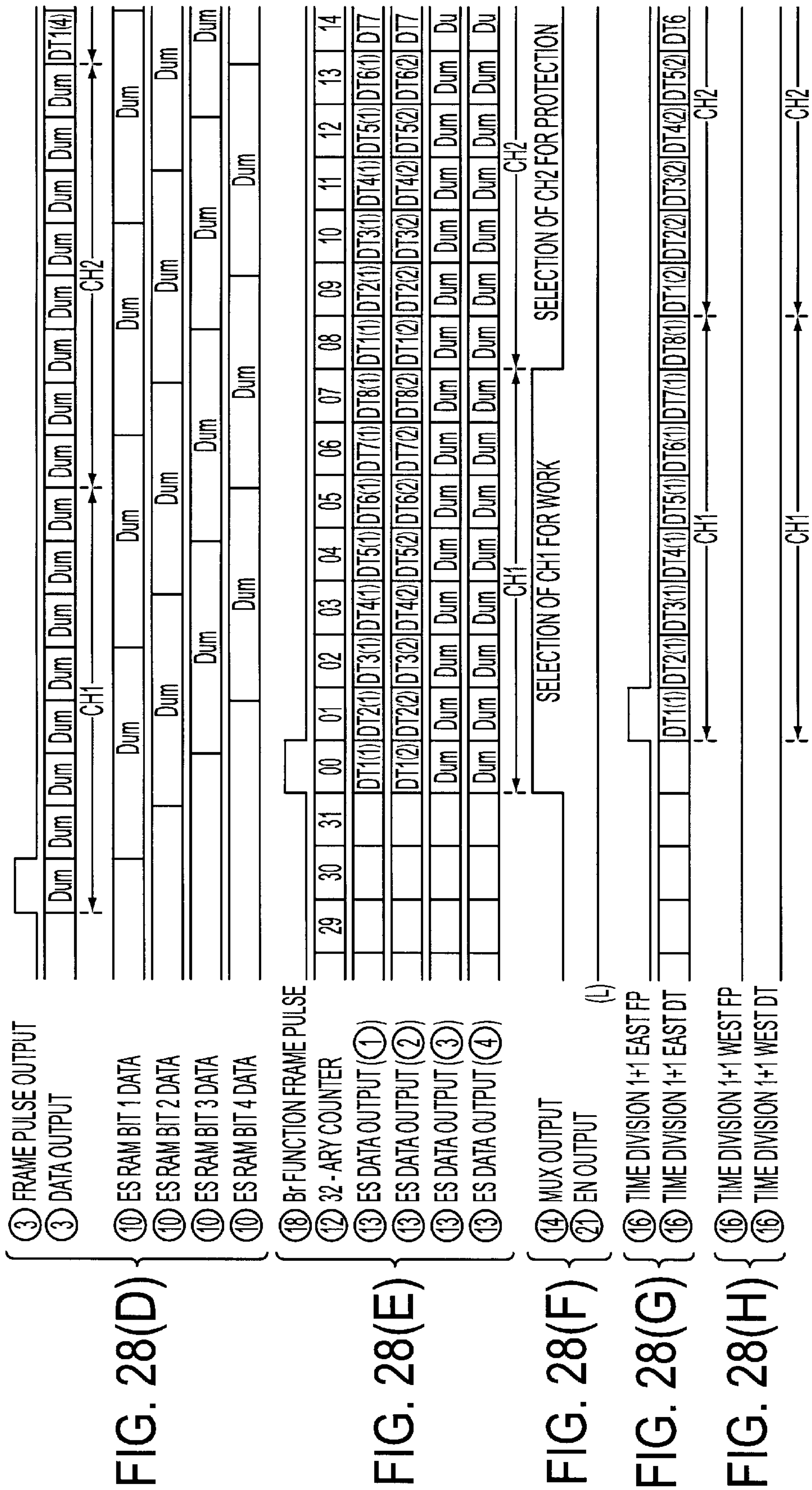
Figures 29A, 29B, 29C:
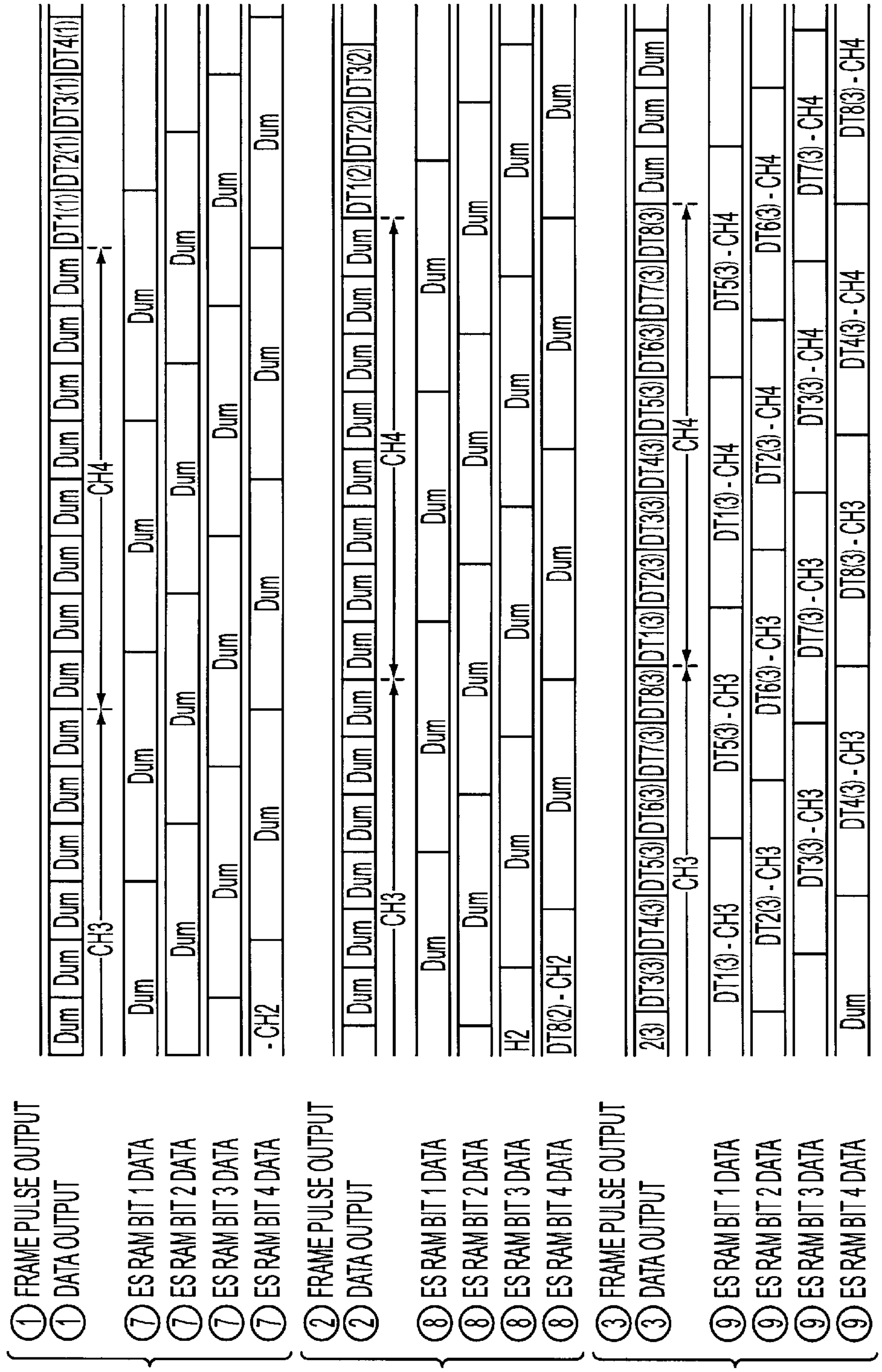
Figures 29D, 29E, 29F, 29G, 29H:
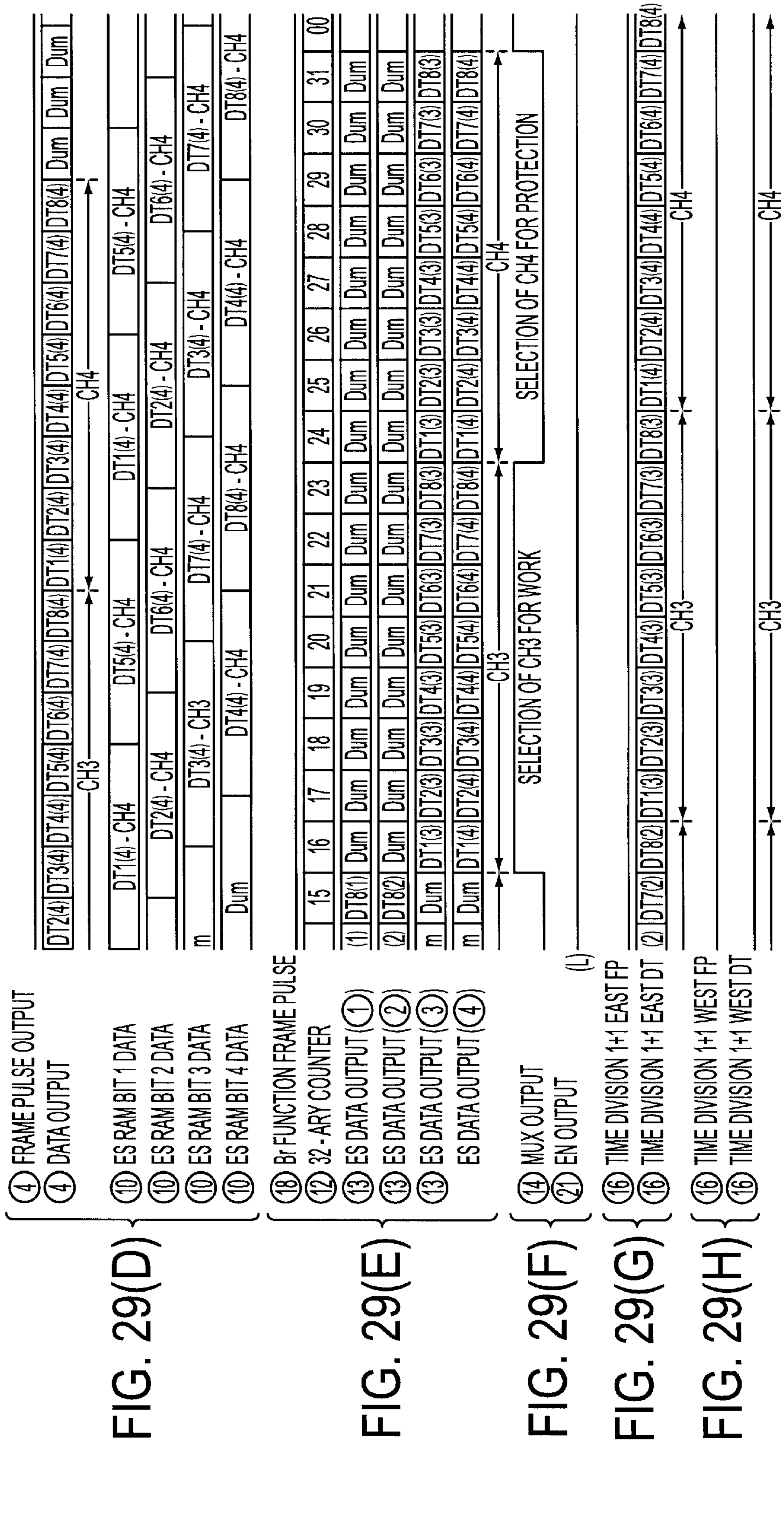
Figures 30A, 30B, 30C:
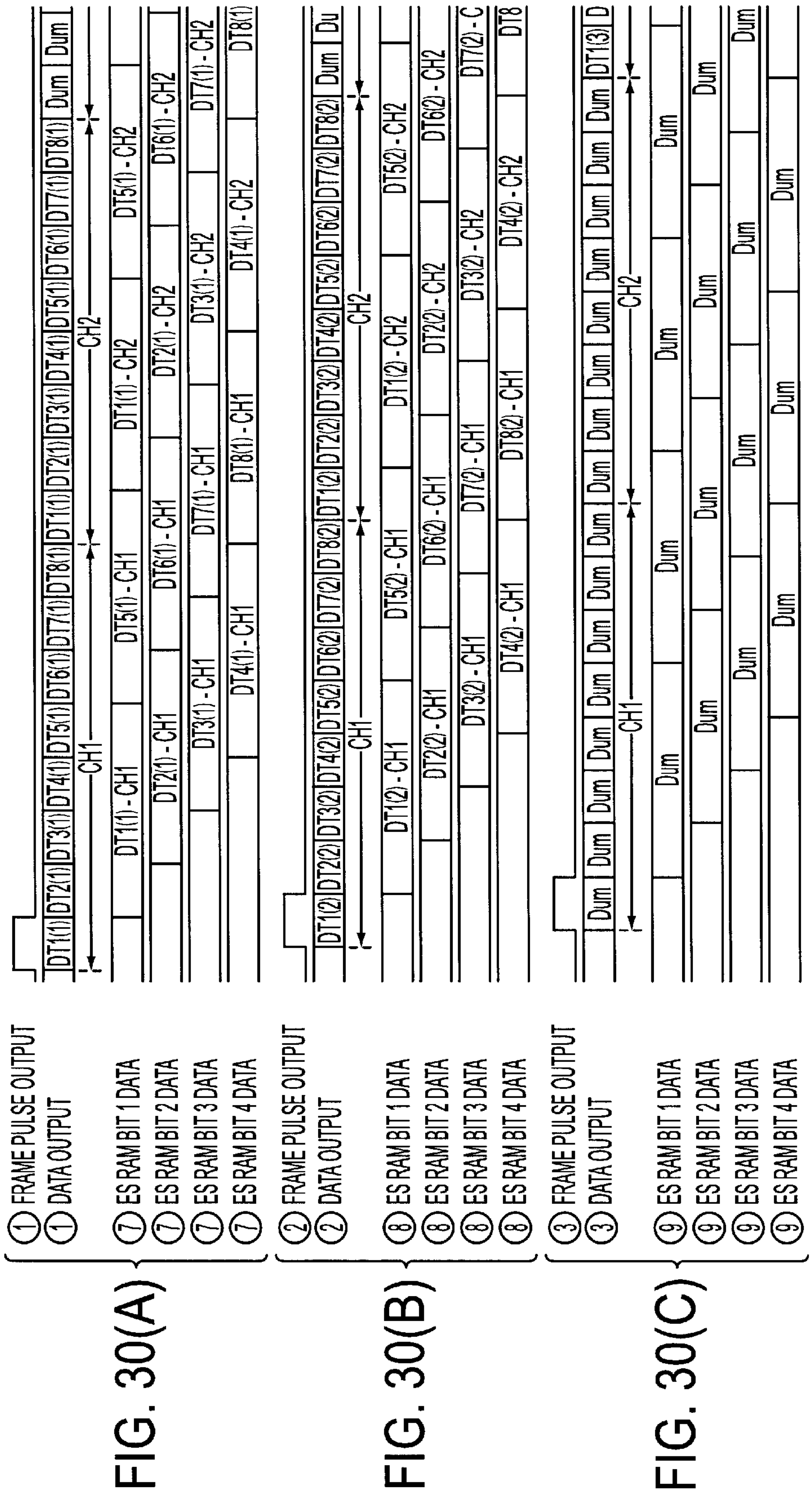
FIGS. 30 and 31 are time charts illustrating dispersion absorption processing and time division 1+1 switching processing in the ring mode for a frame phase by the ES section and the time division 1+1 switching section shown in FIG. 27.
Figures 30D, 30E, 30F, 30G, 30H:
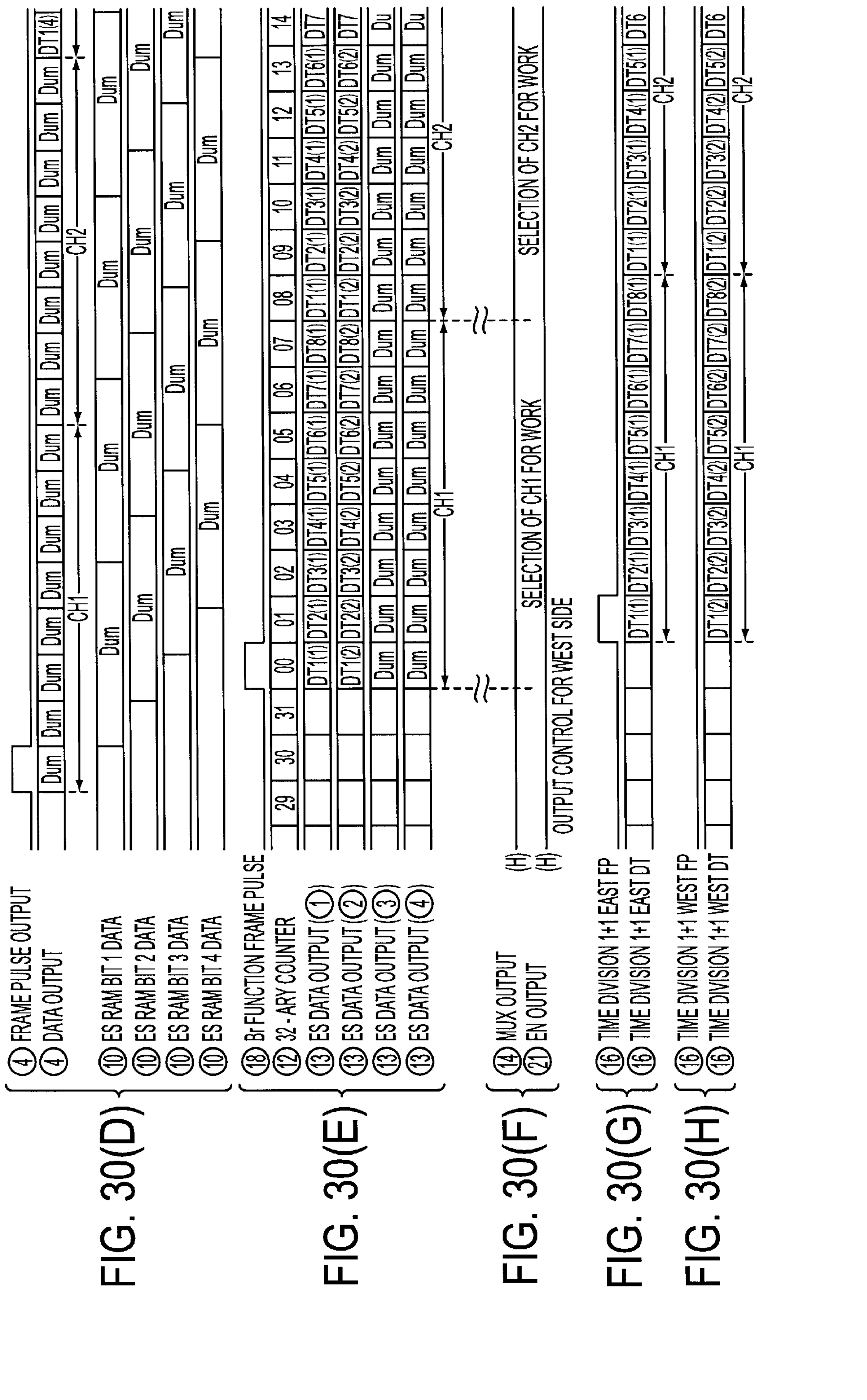
Figures 31A, 31B, 31C:
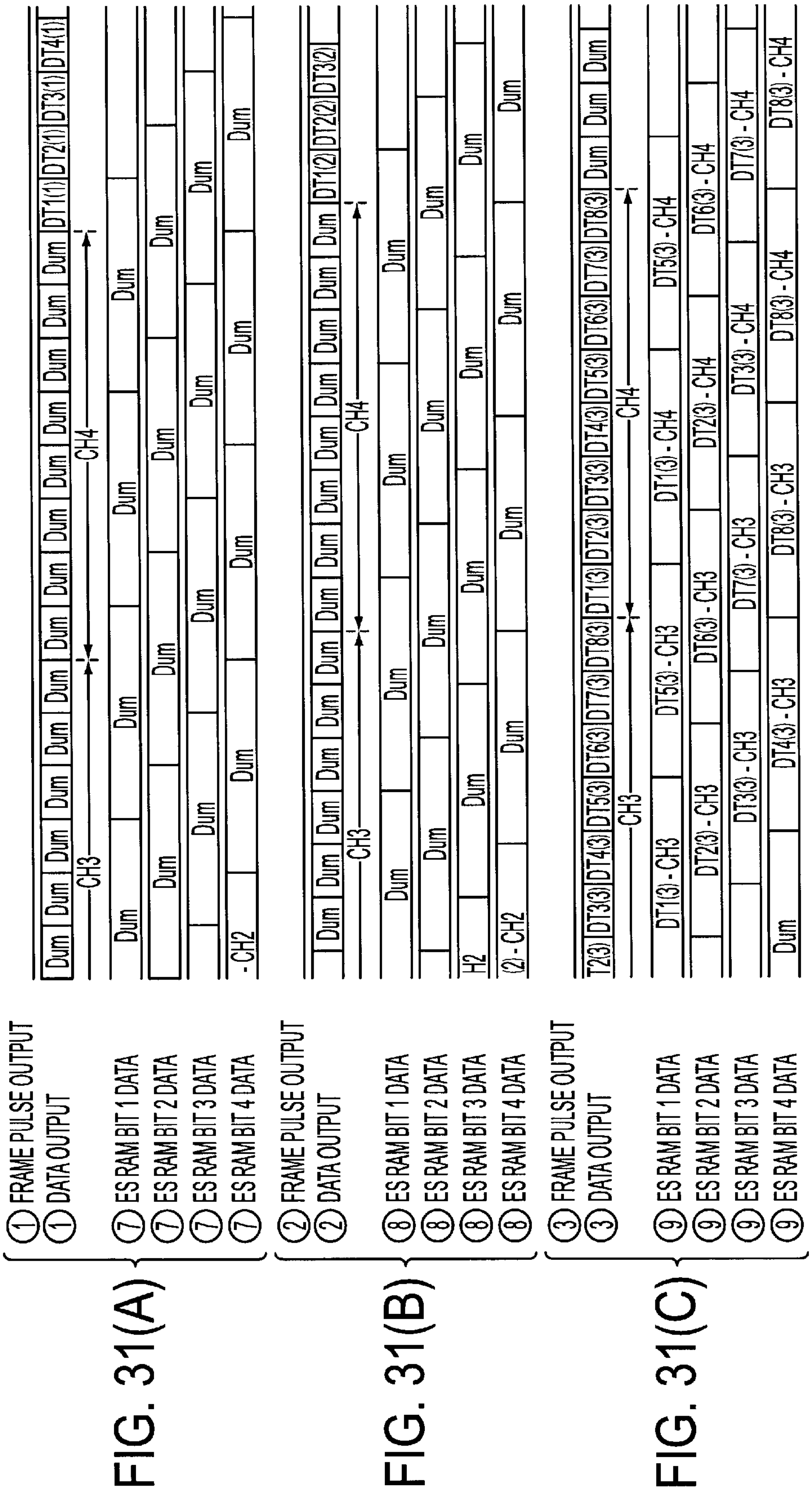
Figures 31D, 31E, 31F, 31G, 31H:
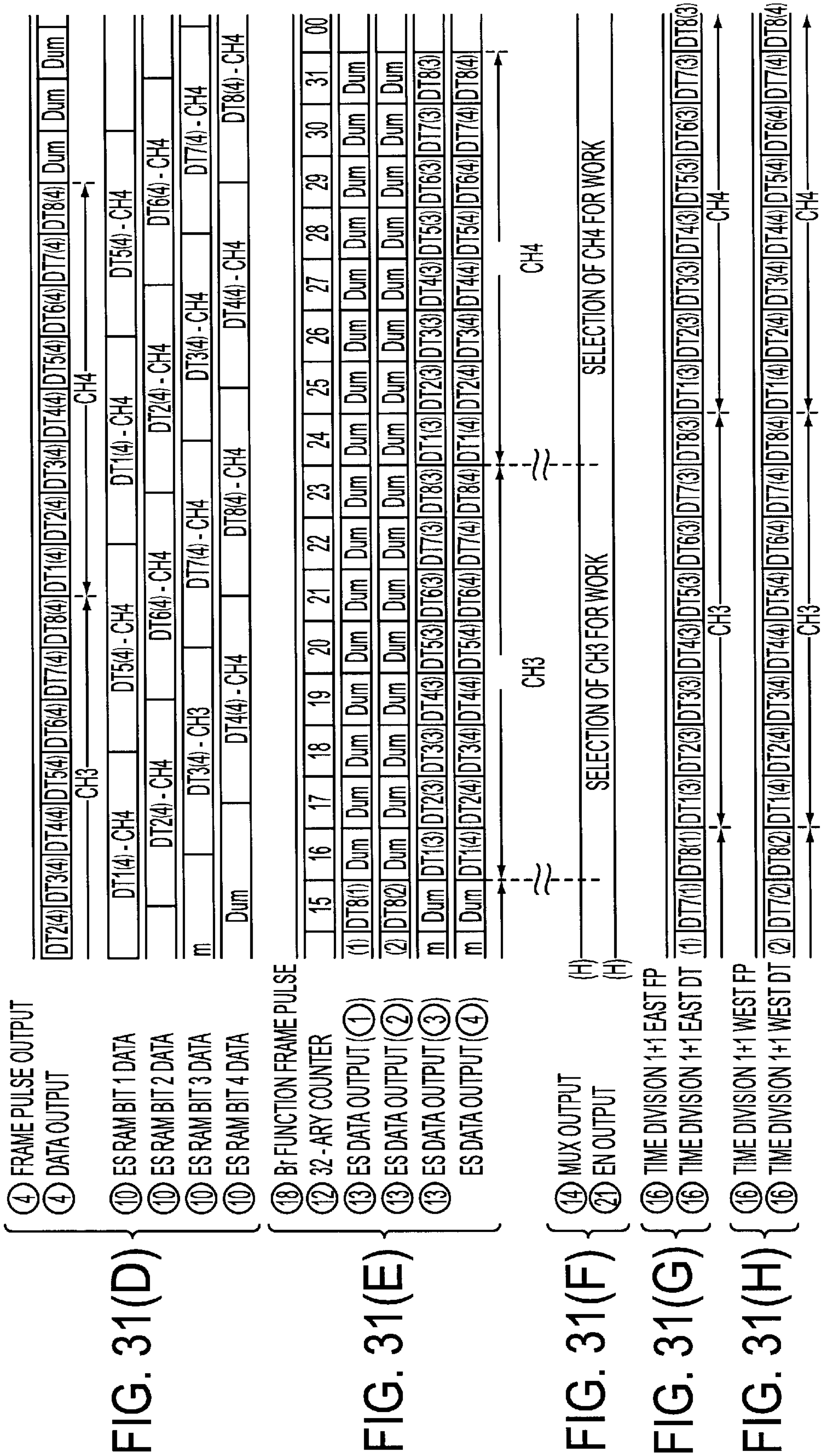

Then, reading control of the RAMs 23A-5 to 23A-8 is performed by means of a 32-ary counter 23A-9 using the clock signals and the FPs same as the SCK and the SFP outputted from the line bridging section 42M (42S) to the IF boards 5W-j (5P-j) to read out the signals with frame leading positions thereof aligned to each other as seen from (E) of FIGS. 28 and 29 [(E) of FIGS. 30 and 31].

In short, the 32-ary counter 23A-9 described above functions as a read control section for reading out OC-3 signals with frame leading positions of the same aligned to each other by controlling read timings of the OC-3 signals from the RAMs 23A-5 to 23A-8 with timings synchronized with timings of the intra-unit FPs to the IF boards 5W-j (5P-j). Accordingly, the time division 1+1 switching section 23B in the following stage can perform time division 1+1 switching processing in units of a channel and can thereby achieve simplification of the unit construction.

By the way, in this instance, the 32-ary counter 23A-9 operates at timings synchronized with the write counters 23A-1 to 23A-4, and if the load value upon an FP timing of the 32-ary counter 23A-9 is set arbitrarily, then the read timings mentioned above can be set arbitrarily [it is to be noted that, in (E) of FIGS. 28 to 31, timings where the loading value=00 (hex) are indicated].

This eliminates the necessity to take the times until signals are outputted after the IF boards 5W-j (5P-j) fetch the FPs (SFP) into consideration in the stage of development of the unit 1. In particular, by verifying the differences in distance between the RBs 4-i and the IF boards 5W-j (5P-j), the times for FPs to be folded back from the IF boards 5W-j (5P-j) to the RBs 4-i, a dispersion in delay amount by individual differences of the IF boards 5W-j (5P-j) and so forth and setting the load value in response to a result of the verification, signal reading starting (phase dispersion absorbing) timings can be adjusted arbitrarily in response to times after the IF boards 5W-j (5P-j) fetch FPs until signals are outputted even after completion of the development.

In short, the RBs 4-i in the present embodiment allow flexible synchronization of CK/FP timings between the IF boards 5W-j (5P-j) and the RBs 4-i (inter-block interfacing), which does not define folded back frame positions from the IF boards 5W-j (5P-j). Accordingly, in the stage of development of the IF boards 5W-j (5P-j) and the RBs 4-i, there is no provision of complicated phase specifications, and the procedure of development (time for development of the unit 1) can be reduced significantly.

Then, in the time division 1+1 switching section 23B shown in FIG. 27, where the 1+1 (APS) mode is set [set from the control unit 15 (switch controller 417 (447))], an enable signal from an enable control section 23B-2 to a multiplexing section 23B-4 of the WEST side is fixed to the L level and work/protection system selection signals for the CH1 to CH4 are produced by a multiplexing section 23B-1 as seen from (F) of FIGS. 28 and 29.

Selection in units of a channel of the EAST side outputs of the multiplexing section 23B-3 of the EAST side is controlled with the work/protection system selection signals, and signals multiplexed to an OC-12 signal are outputted to the EAST side as seen from (G) of FIGS. 28 and 29. It is to be noted that, at this time, since the enable signal from the enable control section 23B-2 to the multiplexing section 23B-4 of the WEST side is fixed to the L level, the output of the multiplexing section 23B-4 (WEST side output) is inhibited (masked) as seen from (H) of FIGS. 28 and 29.

On the other hand, when the ring (UPSR) mode is set, the enable signal from the enable control section 23B-2 to the multiplexing section 23B-4 is fixed to the H level and a work system selection signal (of the H level) for the CH1 to CH4 is produced by the multiplexing section 23B-1 as seen from (F) of FIGS. 30 and 31.

Selection in units of a channel of the EAST side output by the multiplexing section 23B-3 of the EAST side is controlled with the work system selection signal, and signals from the IF board 5W-1 (5W-5) and the IF board 5W-3 (5W-7) for the EAST lines are multiplexed and outputted to the EAST side as seen from (G) of FIGS. 30 and 31.

Further, at this time, since the enable signal from the enable control section 23B-2 to the multiplexing section 23B-4 of the WEST side is fixed to the H level, the inhibit control for the multiplexing section 23B-4 of the WEST side is stopped, and signals from the IF board 5P-1 (5P-5) and the IF board 5P-3 (5P-7) for the WEST lines are multiplexed and outputted to the WEST side as seen from (H) of FIGS. 30 and 31.

In this manner, also where the IF boards 5W-j (5P-j) for OC-3 are mounted, also operation of any of the 1+1 mode and the ring mode can be performed normally similarly as in the case wherein the IF boards 5W' and 5P' for OC-12 are mounted.

It is to be noted that numerals surrounded by circles shown in FIGS. 28 to 31 individually correspond to numerals surrounded by circles in FIG. 27 [for example, DT1 ① indicates that this is a data signal from the IF board 5W-1 (5W-5)], and "Dum" is a dummy signal mentioned hereinabove.

B2.2. Principle of AIS Issuing Processing

Now, a principle of issuing processing of an AIS (Alarm Indication Signal) (data signal ALL "H") when the clock signal to be inputted from an IF board 5W-j (5P-j) to an RB 4-i is interrupted is described.

Figure 34:
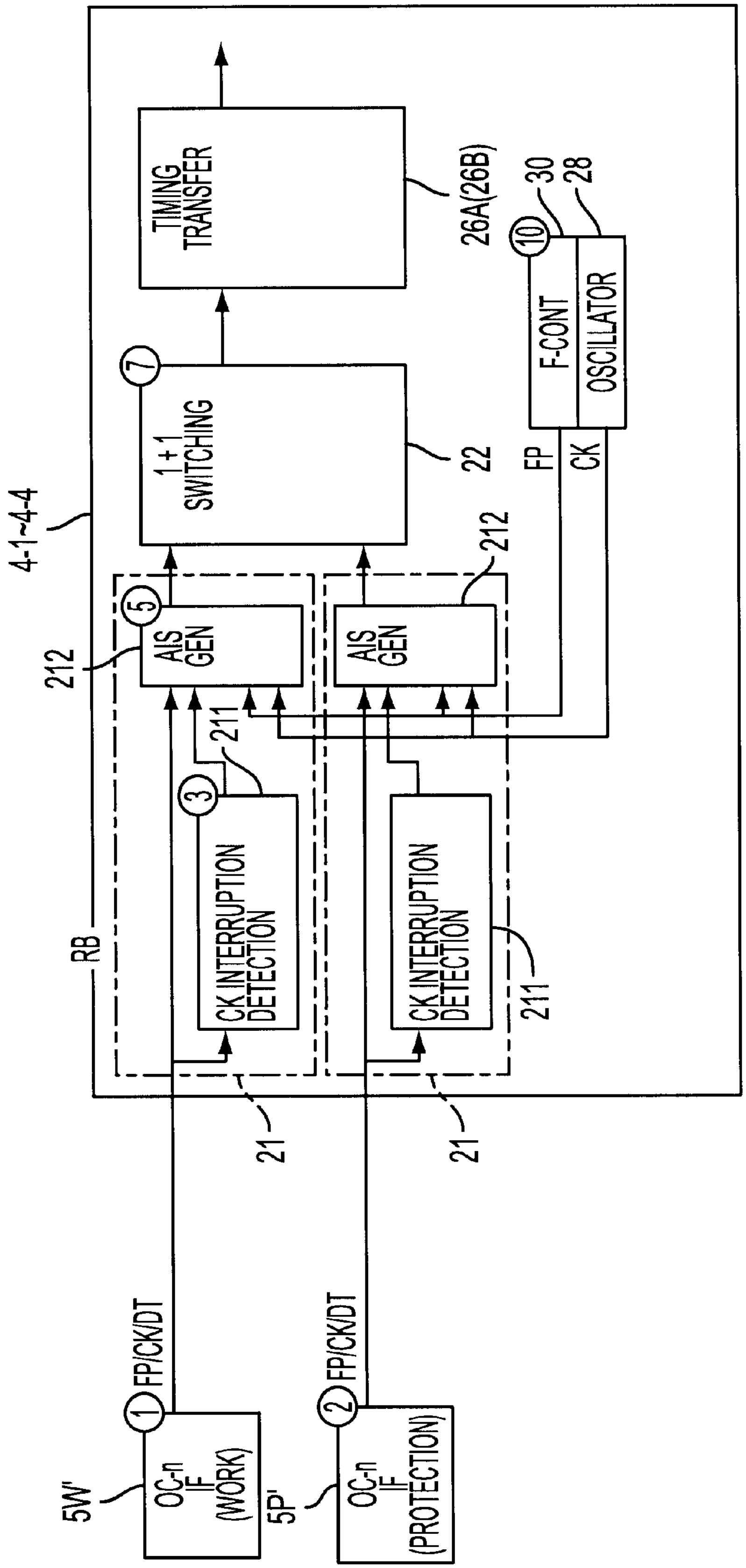
FIG. 34 is a block diagram illustrating AIS issuing processing when an IF board for OC-n is mounted.

First, where, for example, as shown in FIG. 34, IF boards 5W' and 5P' for OC-12 are mounted, since usual 1+1 switching is performed by the 1+1 switching section 22, clock signals from the IF boards 5W' and 5P' are supervised by clock interruption detection sections (trouble detection section2) 211 of clock interruption processing sections 21. If occurrence of interruption of a clock signal (a trouble) is detected by any of the clock interruption detection sections 211, then an AIS generation section 212 should generate an AIS as an OC-12 signal of the channel, with which the clock interruption has occurred, in accordance with the SCK and the SFP produced by the oscillator 28 and the FP control section 30.

Figure 35:
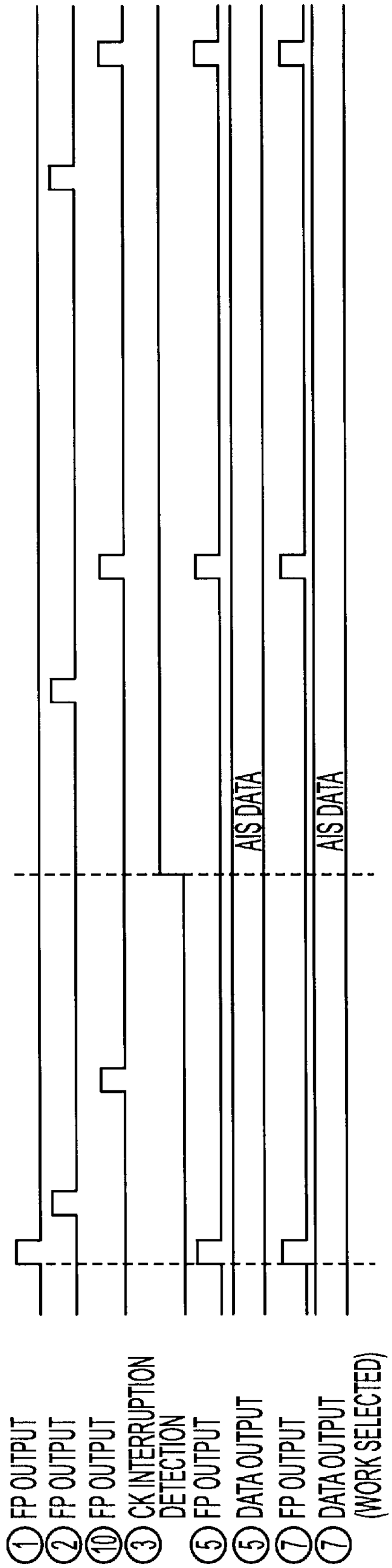
FIG. 35 is a time chart illustrating AIS emission processing when an IF board for OC-n is mounted.
Figure 36A:
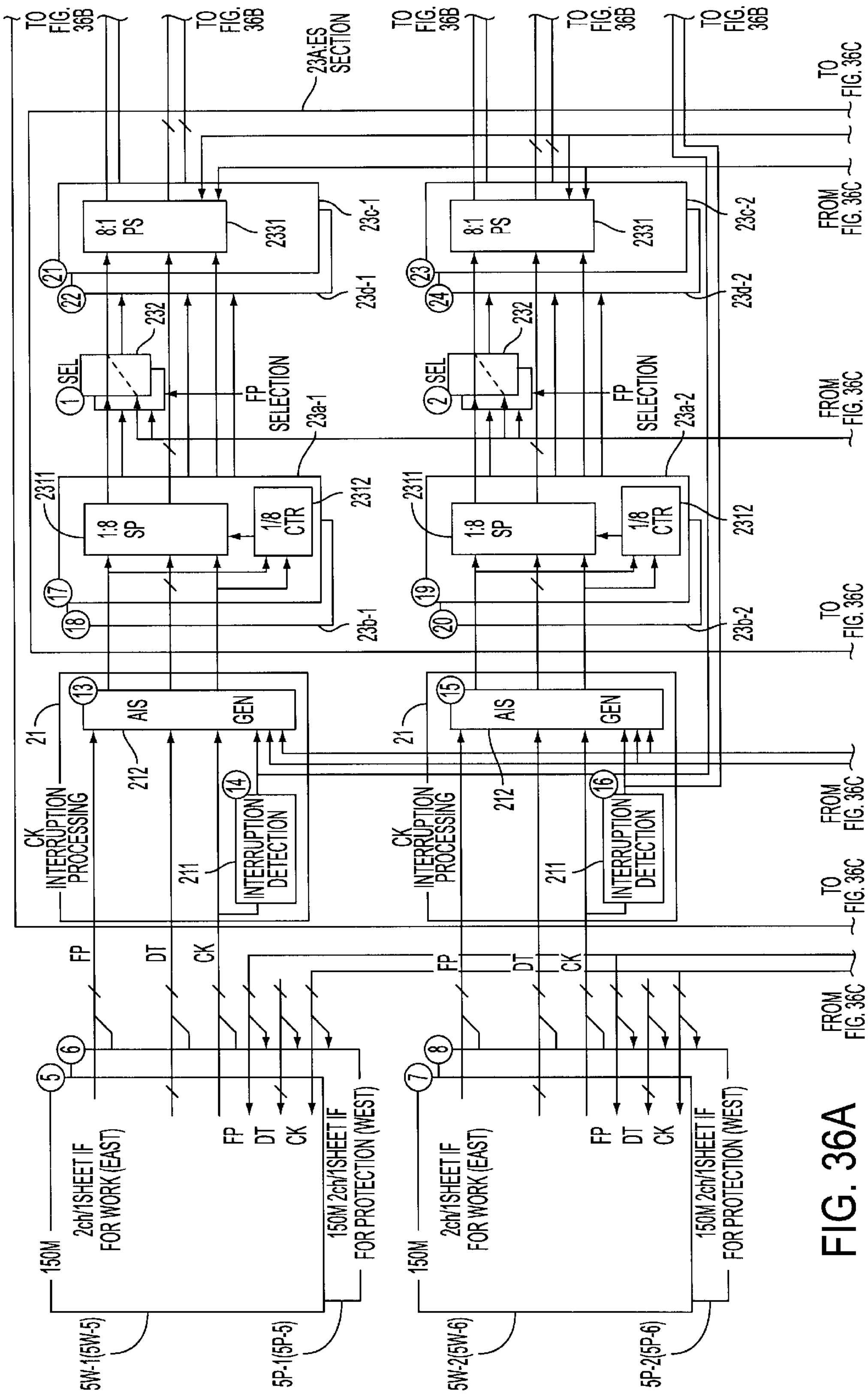
FIG. 36 is a block diagram showing an example of a detailed construction of the routing block in regard to a clock disconnection processing section, the ES section and the time division 1+1 switching section of the ADM of FIG. 2.
Figure 36B:
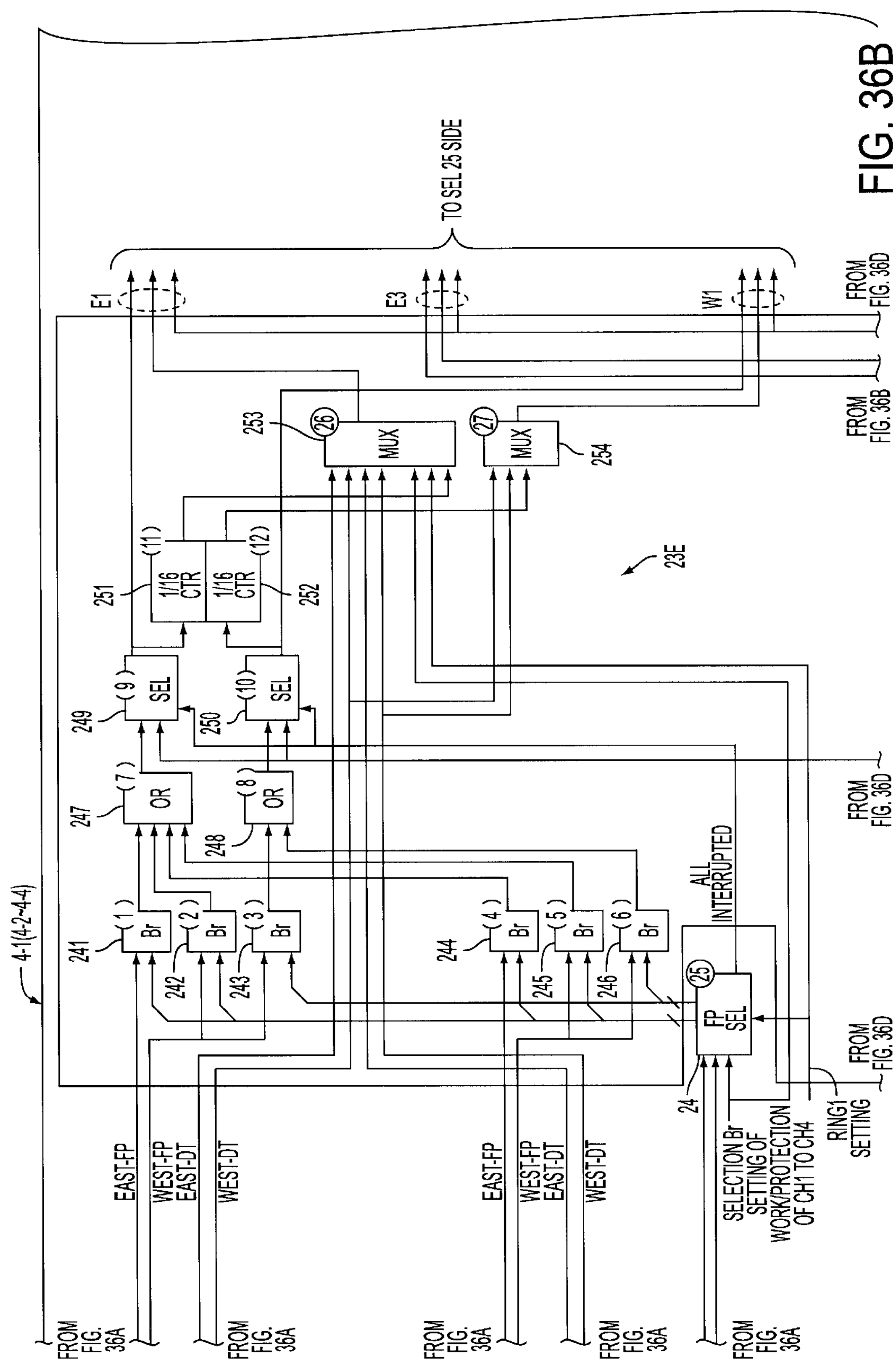
Figure 36C:
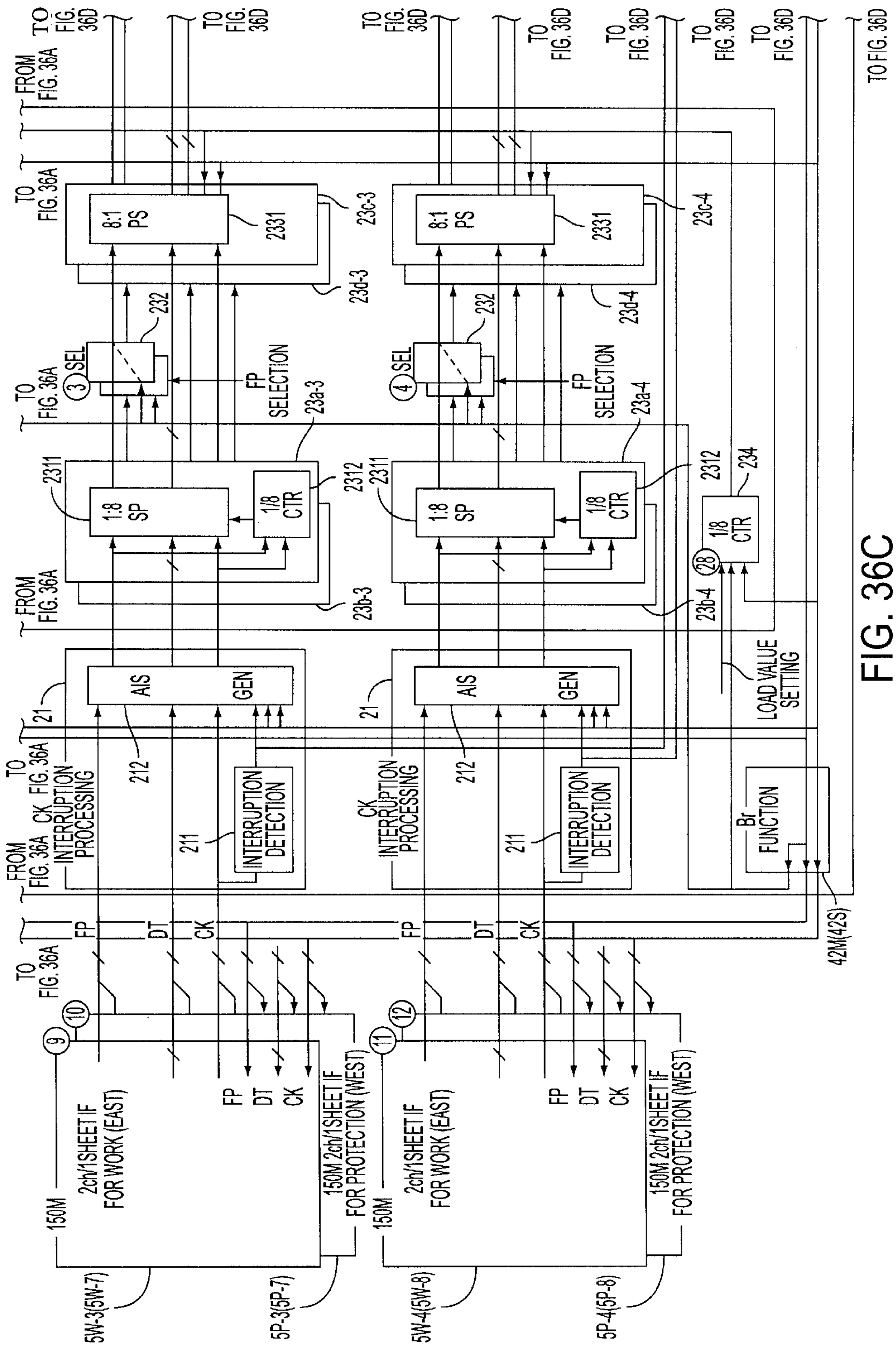
Figure 36D:
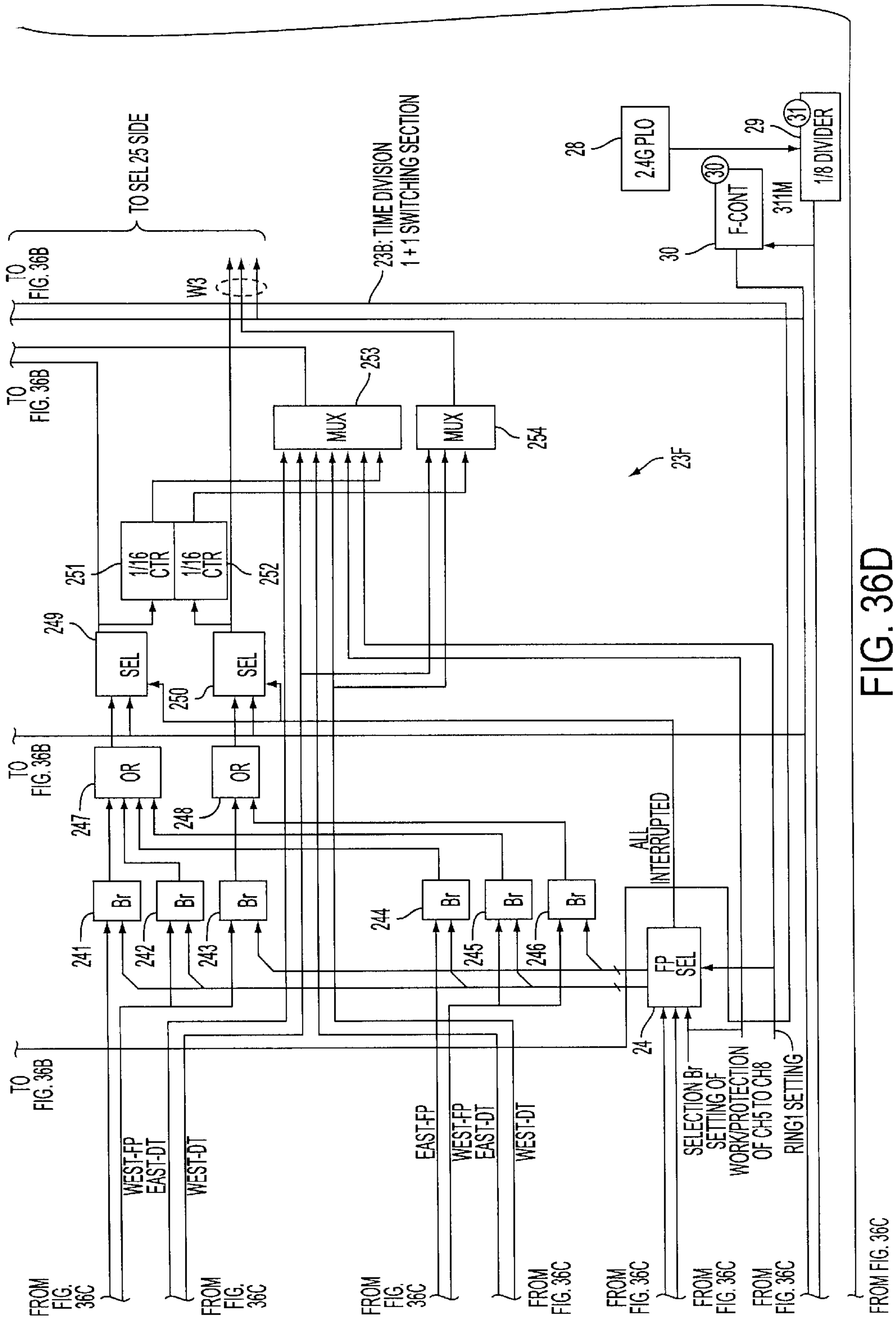

An issuing processing operation timing of the AIS is shown in FIG. 35. It is to be noted that numerals surrounded by a circle such as ① and ② shown in FIG. 35 individually correspond to numerals surrounded by a circle in FIG. 34.

However, if IF boards 5W-j (5P-j) for OC-3 are mounted, then since time division 1+1 switching is performed by the time division 1+1 switching processing sections 23 of the RBs 4-i, also the issuing processing of an AIS must be able to be performed in units of an OC-3 signal (channel).

In particular, if interruption (a trouble) of a clock signal is not detected, for example, even with only one of the clock interruption detection sections 211, it is necessary to perform time division 1+1 switching based on the FP from an IF board 5W-j (5P-j) with which interruption of a clock signal is not detected to insert an AIS into each channel with which clock interruption has occurred.

It is to be noted that, if clock interruption is detected by the clock interruption detection sections 211 of all of the clock interruption processing sections 21 [when all of clocks from the IF boards 5W-j (5P-j) are interrupted], AIS are produced in place of the OC-3 signals by the AIS generation sections 212 in accordance with the SCK and the SFP from the oscillator 28 and the FP control section 30 and frame transfer of the AIS is performed by the ES section 23A as described above. Consequently, the frame leading positions of the AIS to the time division 1+1 switching section 23B are made coincide with one another, and therefore, time division 1+1 switching is allowed.

Figure 32:
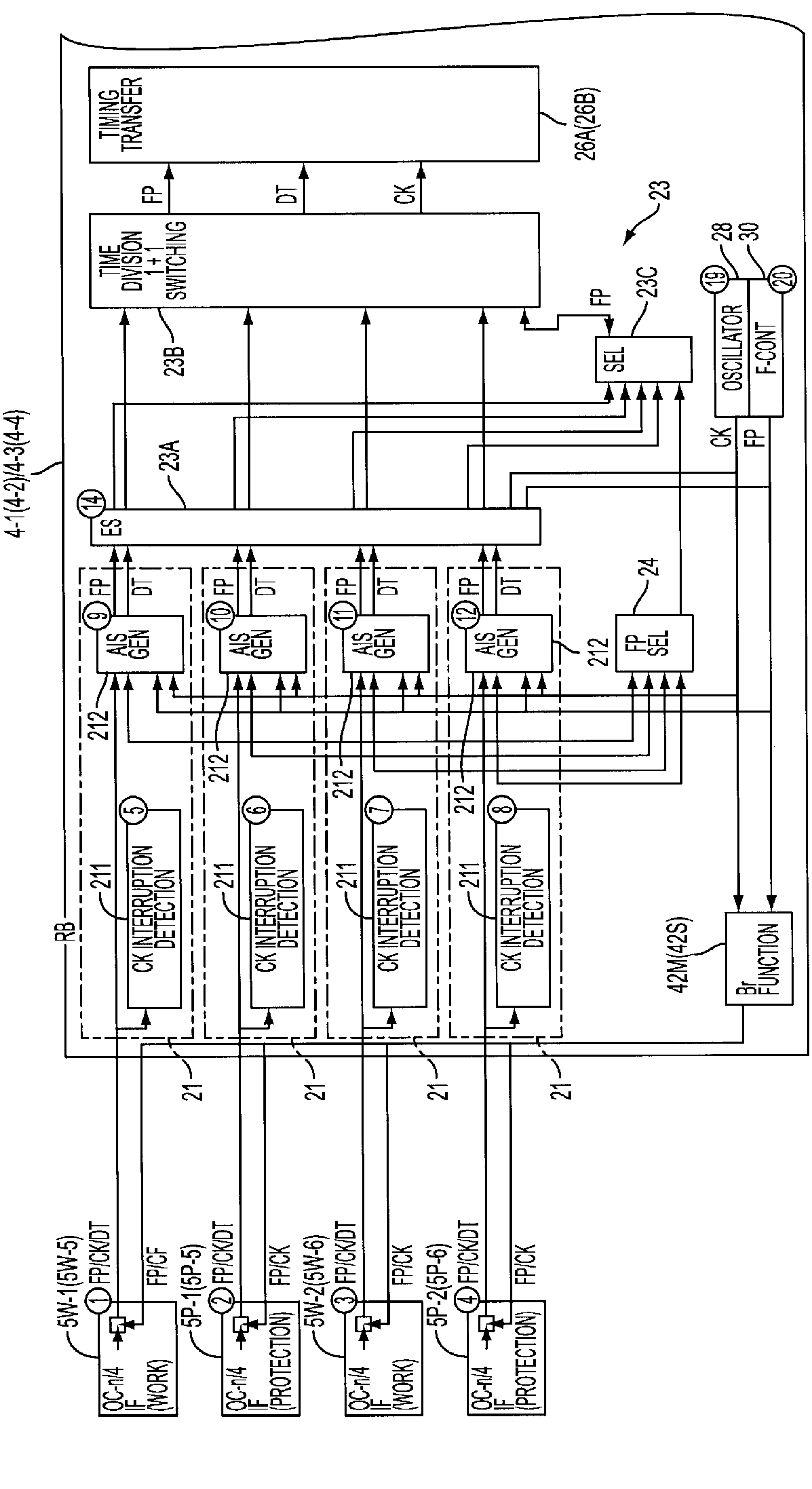
FIG. 32 is a block diagram illustrating an AIS issuing function of the routing block of the ADM of FIG. 2.

Therefore, where IF boards 5W-j (5P-j) of the capacity of OC-3 are mounted, an FP timing for the time division 1+1 switching section 23B is selected by a FP selection section 24 and a selection section 23C shown in FIG. 32 in response to results of detection by the clock interruption detection sections 211. More particularly, when clock interruption is detected by all of the clock interruption detection sections 211, time division sending out processing of an AIS is performed in accordance with the SFP timing, but when clock interruption is not detected by any one of the clock interruption detection sections 211, time division sending out processing of an AIS is performed based on the FP timing of the OC-3 signal from an IF board 5W-j (5P-j) with which clock interruption is not detected. It is to be noted that the selection section 23C described above is, in the present embodiment, a component of the time division 1+1 switching processing section 23.

Figure 33:
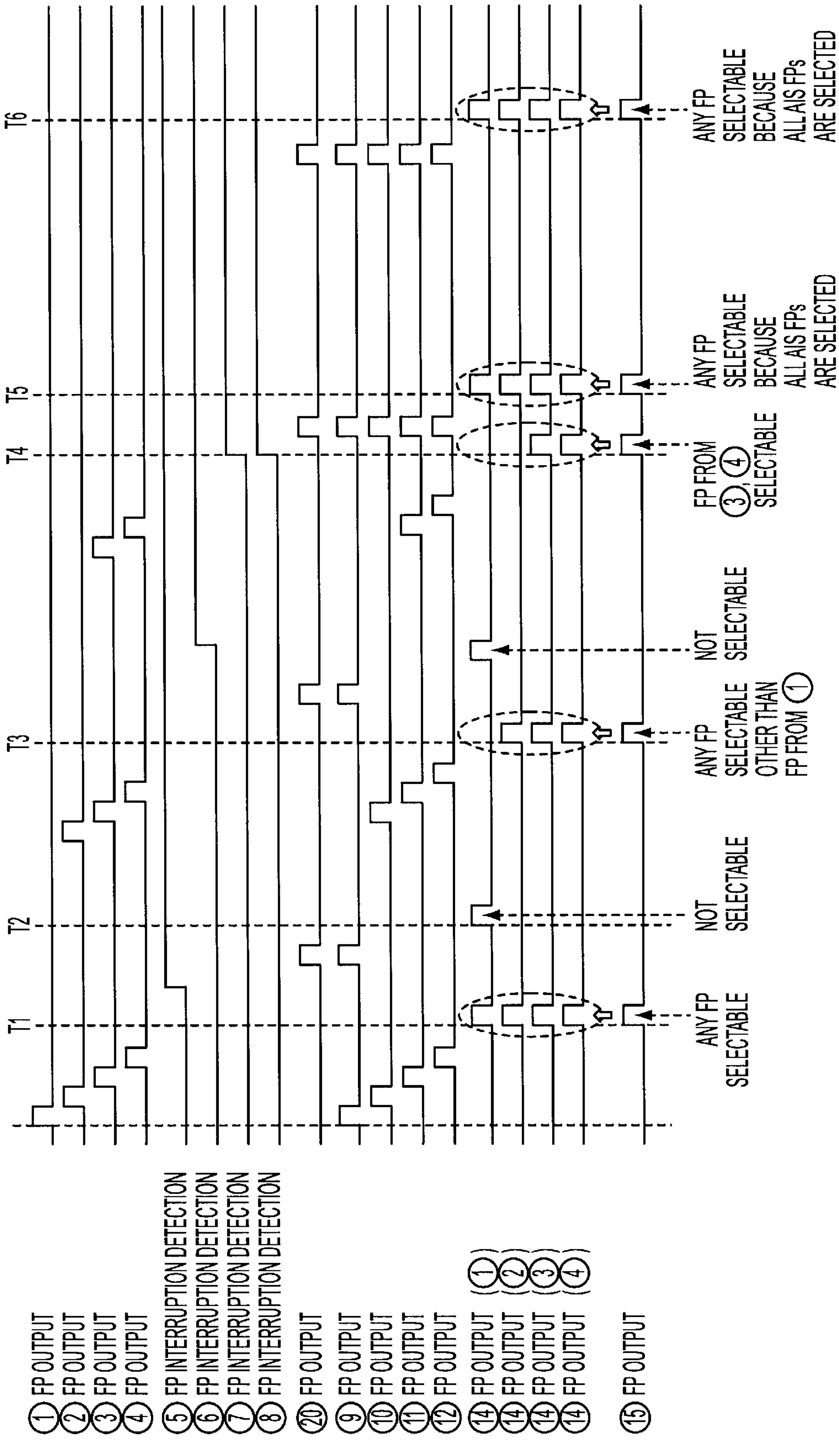
FIG. 33 is a time chart illustrating frame pulse selection operation for time division 1+1 switching processing by the routing block shown in FIG. 32.

Consequently, since, for example, as seen in FIG. 33, clocks from all of the IF boards 5W-j (5P-j) are received normally at time T1, whichever one of the FPs is selected by the FP selection section 24 and the selection section 23C, the time division 1+1 switching section 23B can perform normal time division 1+1 switching in units of an OC-3 signal (channel). It is to be noted that numerals surrounded by a circle shown in FIG. 33 correspond to numerals surrounded by a circle shown in FIG. 32.

Then at time T2, the clock from the IF board 5W-1 (IF board 5W-5) is interrupted, and the clock interruption detection section 211 for the IF board 5W-1 (5W-5) detects the clock interruption. Consequently, the FP selection section 24 and the selection section 23C do not select the FP received already from the IF board 5W-1 (5W-5). Then at time T3, any FP other than this FP is selected, and the time division 1+1 switching section 23B performs time division 1+1 switching in accordance with the selected FP. Consequently, for the channel with which the clock interruption has occurred, the AIS generated by the AIS generation section 212 from the ES section 23A is selected and sent out.

Further, at time T4, the clock from the IF board 5W-1 (5W-5) and the clock from the IF board 5W-2 (5W-6) are interrupted, and the clock interruption is detected by the individually corresponding clock interruption detection sections 211. Consequently, the FP selection section 24 and the selection section 23C can select the FP of one of the IF board 5W-3 (5W-7) and the IF board 5W-4 (5W-8) with which clock interruption is not detected.

Also in this instance, the time division 1+1 switching section 23B performs time division 1+1 switching in accordance with the selected FP, and consequently, for the channels with which the clock interruption has occurred, an AIS generated by the AIS generation section 212 and outputted from the ES section 23A is selected and sent out.

Further at times T5 and T6, the clocks from all of the IF boards 5W-j (5P-j) are interrupted, and the clock interruption is detected by all of the clock interruption detection sections 211. Consequently, each of the AIS generation sections 212 generates an AIS in accordance with the timings in the RBs 4-i (the SCK and the SFP from the oscillator 28 and the FP control section 30). Accordingly, whichever one of the FPs outputted from the ES section 23A the selection section 23C selects, the time division 1+1 switching section 23B can perform sending out of an AIS in units of a channel if time division 1+1 switching is performed for the input signals from the ES section 23A.

By such processing as described above, collision between FP timings at the time division 1+1 switching section 23B when a clock from any of the IF boards 5W-j (5P-5) is interrupted can be prevented by differences between the FP timings inputted from the IF boards 5W-j (5P-j) and the FP timings in the unit (RBs 4-i) (SFP timings produced by the FP control section 30), and normal time division 1+1 switching (issuing processing of an AIS) can always be performed (malfunction when an AIS is sent out can be prevented). This contributes very much also to augmentation of the reliability of AIS sending out processing.

B2.3. Detailed Description of the Clock Interruption Processing Sections 21, ES S ection 23A and Time Division 1+1 Switching Section 23B FIG. 36 shows an example of a detailed construction with regard to the clock interruption processing sections 21, ES section 23A and time division 1+1 switching section 23B described hereinabove. Referring to FIG. 36, the ES section 23A includes four pairs of serial/parallel (SP) conversion processing sections 23*a*-1 to 23*a*-4 and 23*b*-1 to 23*b*-4, frame pulse (FP) selection sections 232, four pairs of parallel/serial (PS) conversion processing sections 23*c*-1 to 23*c*-4 and 23*d*-1 to 23*d*-4 all corresponding to the four sets of IF boards 5W-1 to 5W-4 (5P-1 to 5P-4) [5W-5 to 5W-8 (5P-5 to 5P-8)], and a ⅛ counter (CTR) 234.

Meanwhile, the time division 1+1 switching section 23B includes two switching processing sections 23E and 23F in order to perform time division 1+1 switching processing for each two sets of the four sets of IF boards 5W-1 to 5W-4 (5P-1 to 5P-4) [5W-5 to 5W-8 (5P-5 to 5P-8)] described above. Each of the switching processing sections 23E and 23F includes AND circuits 241 to 246, OR circuits 247 and 248, an FP selection section 249 for the EAST, an FP selection section 250 for the WEST, a 1⁄16 counter 251 for the EAST, a 1⁄16 counter 252 for the WEST, and a multiplexing section 253 for the EAST and a multiplexing section 254 for the WEST.

In the ES section 23A, each of the SP conversion processing sections 23*a*–*k* and 23*b*–*k* (k=1 to 4) performs SP conversion of an input signal (data). Each of the PS conversion processing sections 23*c*–*k* and 23*d*–*k* performs PS conversion of signals SP converted by the SP conversion processing sections 23*a*–*k* or 23*b*–*k* to obtain a signal of an original input signal format. Here, a ⅛ counter 2312 operates and a 1:8 SP conversion section 2311 performs 1:8 SP conversion (to 8-bit parallel data) of the input data in accordance with the FP and the CK from each of the IF boards 5W-1 to 5W-4 (5P-1 to 5P-4) [5W-5 to 5W-8 (5P-5 to 5P-8)], and then the 8-bit parallel data is 8:1 SP converted by an 8:1 PS conversion section 2331.

Further, when any of the IF boards 5W-1 to 5W-4 (5P-1 to 5P-4) [5W-5 to 5W-8 (5P-5 to 5P-8)] is inserted or removed or in some other case, the corresponding FP selection section 232 selects not the FP from that one of the IF boards 5W-1 to 5W-4 (5P-1 to 5P-4) [5W-5 to 5W-8 (5P-5 to 5P-8)] but from a master FP (which will be hereinafter described) based on the FP outputted from the line bridging section 42M (the SFP produced by the FP control section 30), thereby preventing a bad influence of an FP produced inadvertently upon inserting or removing of an IF board upon time division 1+1 switching. Details of the FP selection section 232 will be hereinafter described.

Meanwhile, the AND circuit 241 in the time division 1+1 switching section 23B controls, under the control of the FP selection section 24, the FP from the PS conversion processing section 23*c*-1 (23*c*-3), that is, the FP (EAST-FP) from the IF board 5W-1 (5W-5) [5W-3 (5W-7)], so as to pass therethrough or inhibit (mask) the same. The AND circuits 242 and 243 control the FP from the PS conversion processing section 23*d*-1 (23*d*-3) that is, the FP (WEST-FP) from the IF board 5P-1 (SP-5) [5P-3 (5P-7)], so as to pass therethrough or inhibit (mask) the same.

The AND circuit 244 controls, under the control of the FP selection section 24, the FP from the PS conversion processing section 23*c*-2 (23*c*-4), that is, the FP (EAST-FP) from the IF board 5W-2 (5W-6) [5W-4 (5W-8)], so as to pass therethrough or inhibit (mask) the same. The AND circuits 245 and 246 control the FP from the PS conversion processing section 23*d*-2 (23*d*-4), that is, the FP (WEFT-FP) from the PS conversion processing section 23*d*-2 (23*d*-4), so as to pass therethrough or inhibit (mask) the same.

It is to be noted that the control of the AND circuits 241 to 246 by the FP selection section 24 is hereinafter described in detail with reference to Table 2 to Table 9.

The OR circuit 247 logically ORs outputs of the AND circuits 241, 242, 244 and 245 from among the AND circuits 241 to 246. Thus, except when all of the FPs from the IF boards 5W-1 (5P-1) [5W-5 (5P-5)], 5W-2 (5P-2) [5W-6 (5P-6)], 5W-3 (5P-3) [5W-7 (5P-7)], and 5W-4 (5P-4) [5W-8 (5P-8)] are interrupted, the output FP of the OR circuit 247 is outputted as an-FP of the EAST side [E1 (E3)] and is used for time division multiplexing (time division 1+1 switching) processing of the multiplexing section 253.

The OR circuit 248 logically ORs outputs of the remaining AND circuits 243 and 246 from among the AND circuits 241 to 246. The output of the OR circuit 248 is rendered valid in the ring mode, and is outputted as an FP of the WEST [W1 (W3)] side and used for time division processing (time division 1+1 switching) of the multiplexing section 254.

The FP selection sections 249 and 250 for the EAST/WEST correspond to the selection section 23C shown in FIG. 32 and select the FPs (EAST-FP and WEST-FP) outputted from the OR circuits 247 and 248 and the SFP produced by the FP control section 30. If all of the FPs from the IF boards 5W-1 (5P-1) [5W-5 (5P-5)], 5W-2 (5P-2) [5W-6 (5P-6)], 5W-3 (5P-3) [5W-7 (5P-7)], and 5W-4 [5W-8 (5P-8)] are interrupted (an all interruption signal is outputted from the FP selection section 24), then the FP selection sections 249 and 250 select the latter SFP produced by the FP control section 30.

The 1/16 counters 251 and 252 produce count values for time division 1+1 switching by the multiplexing sections 253 and 254 with reference to the FPs selected by the FP selection sections 249 and 250, respectively. The multiplexing sections 253 and 254 select an input signal from the ES section 23A in a time dividing relationship based on the count values of the 1/16 counters 251 and 252 to perform time division 1+1 switching processing.

However, in the 1+1 mode, since the WEST side is not used (no WEST line signal is inputted), the output of the AND circuit 243 is masked, and as a result, the 1/16 counter 252 does not operate and consequently the multiplexing section 254 does not operate while only the multiplexing section 253 operates [signals are outputted only on the EAST side (E1, E3)]. It is to be noted that the E2 and E4 which become idle (unused) then are used for communication of signals with the other RBs 4-i described above. On the other hand, in the ring mode, since both of the EAST/WEST sides [E1 (E3) and W1 (W3)] are used, both of the multiplexing sections 253 and 254 operate.

In short, the multiplexing sections 253 and 254 correspond to the multiplexing section 23B-3 of the EAST side and the multiplexing section 23B-4 of the WEST side described hereinabove with reference to FIG. 27, respectively.

In the following, operation of the ES section 23A and the time division 1+1 switching section 23B having such a construction as described above is described with reference to FIGS. 37 and 38. Here, it is assumed that the time axes in FIGS. 37 and 38 coincide with each other at time T0.

Figures 37A, 37B:
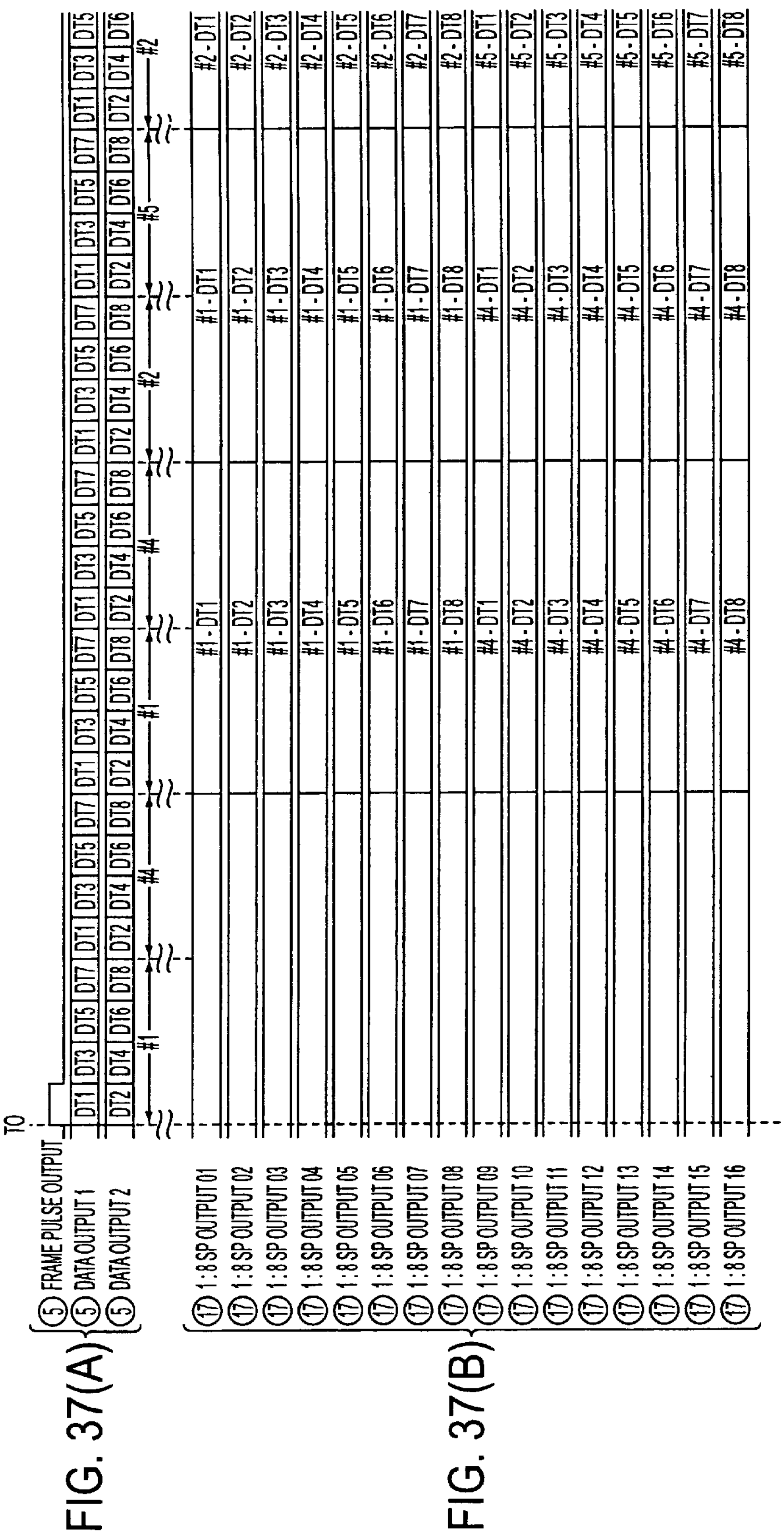
FIGS. 37 to 40 are time charts illustrating different operations of the ES section and the time division 1+1 switching section of the ADM of FIG. 2.

First, in the ES section 23A, predetermined load values are loaded into the 1/8 counters 2312 in response to an FP timing sent thereto from the IF boards 5W-1 and 5W-2 (SP-1 and 5P-2) [5W-5 and 5W-6 (SP-6 and 5P-6)] and the 1/8 counters 2312 start their counting operation, and the SP conversion processing sections 23a-1, 23b-1, 23a-2 and 23b-2 (1:8 SP conversion sections 2311) perform 1:8 SP conversion of signals from the IF boards 5W-1 and 5W-2 (5P-1 and 5P-2) [5W-5 and 5W-6 (5P-6 and 5P-6)] (refer to (A) and (B) of FIG. 37), respectively.

Figures 38A, 38B, 38C, 38D:
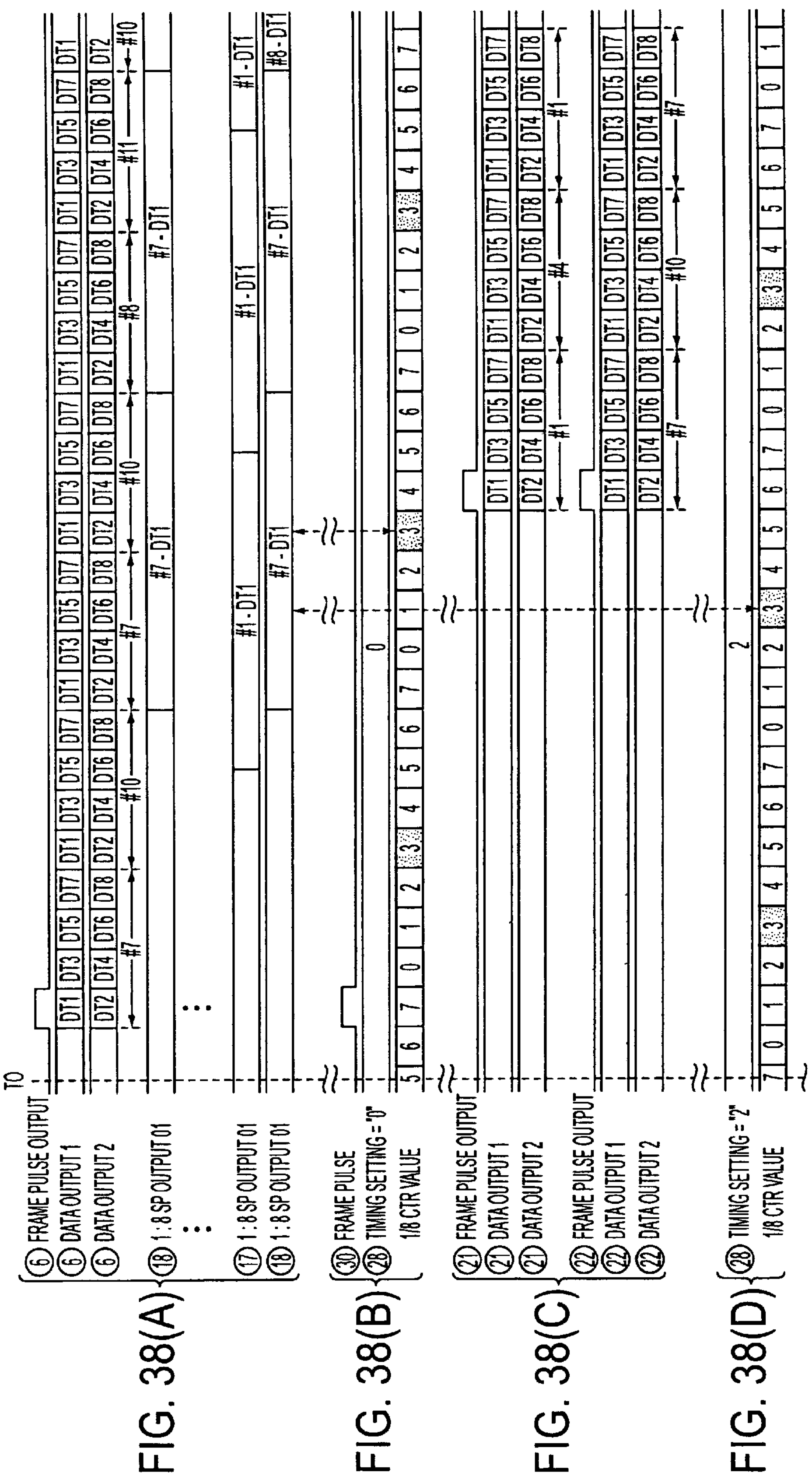
Figure 38E:
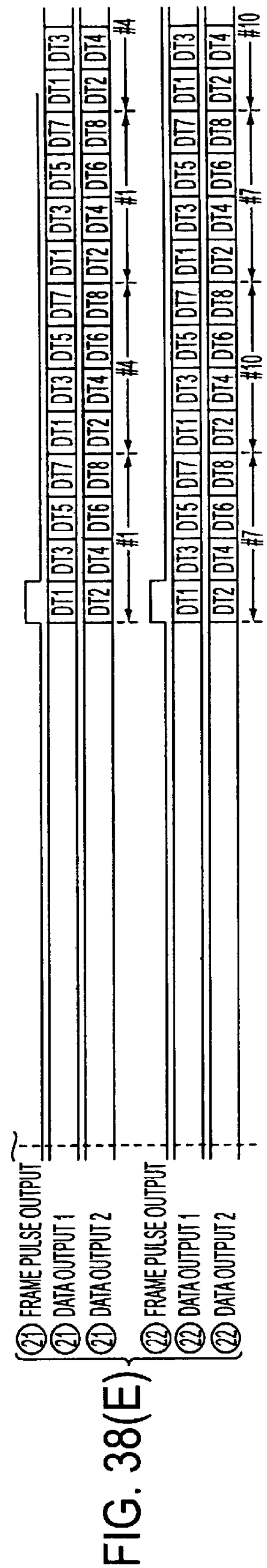

Similarly predetermined load values are loaded into the 1/8 counters 2312 in response to an FP timing sent thereto from the IF boards 5W-3 and 5W-4 (5P-3 and 5P-4) [5W-7 and 5W-8 (5P-7 and 5P-8)] and the 1/8 counters 2312 start their counting operation, and the SP conversion processing sections 23a-3, 23b-3, 23a-4 and 23b-4 (1:8 SP conversion sections 2311) perform 1:8 SP conversion of signals from the IF boards 5W-1 and 5W-2 (5P-1 and 5P-2) [5W-5 and 5W-6 (5P-6 and 5P-6)] (refer to (A) of FIG. 38), respectively, and output resulting signals.

Then, the 1/8 counter 234 for reading is loaded in response to an SFP timing outputted from the line bridging section 42M (42S) [load value=0 in (B) of FIG. 38], and under the control (counting operation) of the 1/8 counter 234, the signals outputted from the 1:8 SP conversion sections 2311 of the SP conversion processing sections 23a-1, 23b-1, 23a-2 and 23b-2 are PS converted by the 8:1 PS conversion sections 2331 of the corresponding PS conversion processing sections 23c-1, 23d-1, 23c-2 and 23d-2, respectively.

Similarly, under the control of the 1/8 counter 234, the signals outputted from the 1:8 SP conversion sections 2311 of the SP conversion processing sections 23a-3, 23b-3, 23a-4 and 23b-4 are PS converted by the 8:1 PS conversion sections 2331 of the corresponding PS conversion processing sections 23c-3, 23d-3, 23c-3 and 23d-3, respectively. In short, the 1/8 counter 234 has a function equivalent to the 32-ary counter 23A-9 (refer to FIG. 27) which functions as a reading control section described above.

Here, the SP/PS conversion processing is described in more detail with reference to FIG. 46. It is to be noted that, in FIG. 46, data signals (DATA)/FPs/clocks inputted from the IF boards 5W-j (5P-j) (IF Block (1) to IF Block (3)) are represented that a skew (dispersion) of one bit occurs for each slot. Further, the 1:8 SP conversion sections 2311 and the 8:1 PS conversion sections 2331 have a memory depth of 8-bit width.

First, after signals (data signals) from the IF boards 5W-j (5P-j) are SP converted individually by the 1:8 SP conversion sections 2311, they are converted (decompressed) into signals of the 8-bit width as indicated by netted representations in (A) to (C) of FIG. 36. It is to be noted that, at this time, also the FPs are decompressed so that they have an 8-bit width similarly. As a result of such decompression of the data signals and the FPs to the 8-bit width in this manner, they have some margin in the PS timing widths (portions at which the FPs overlap with each other in time).

Figures 46A, 46B, 46C:
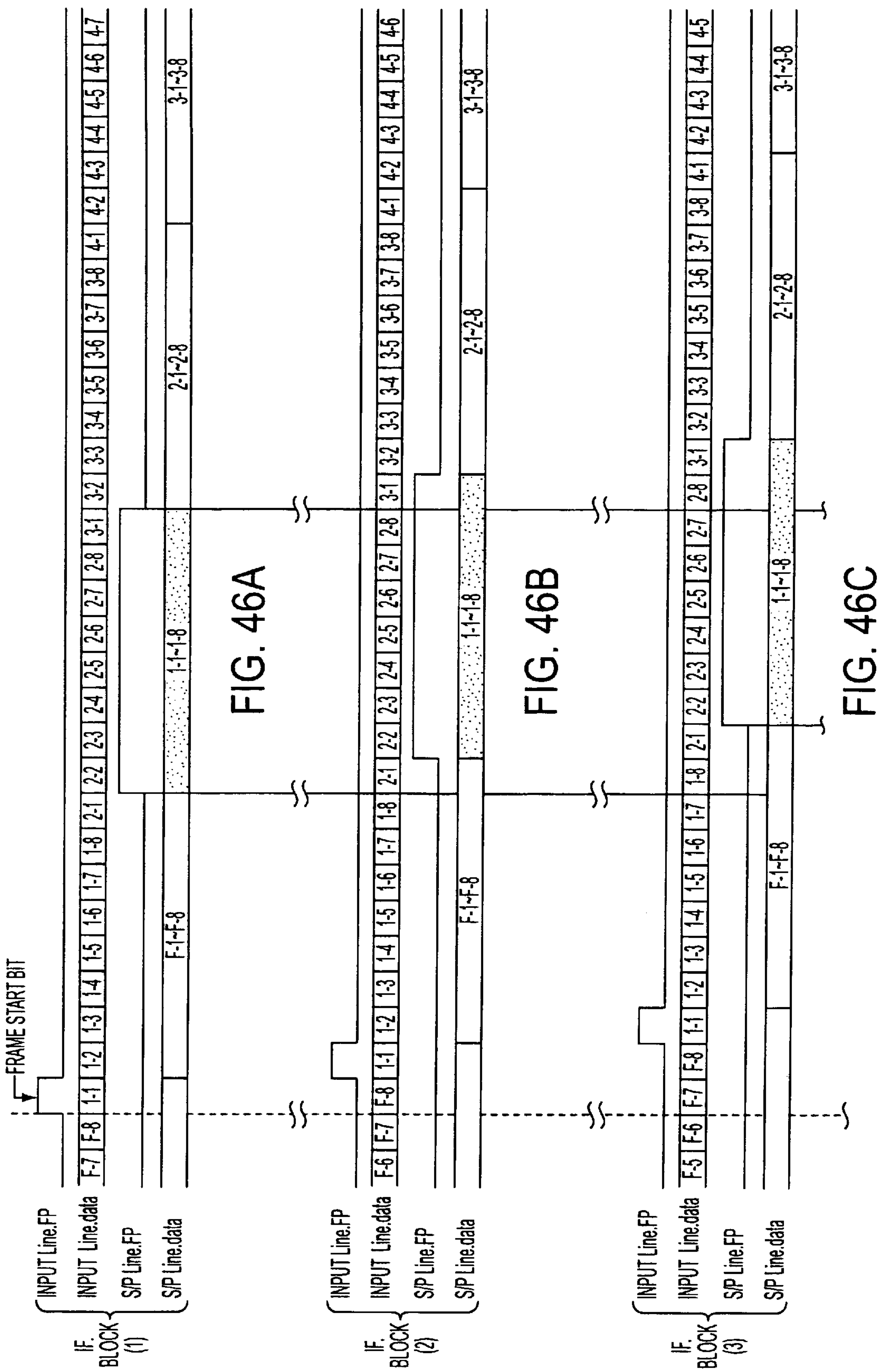
Figure 46D:
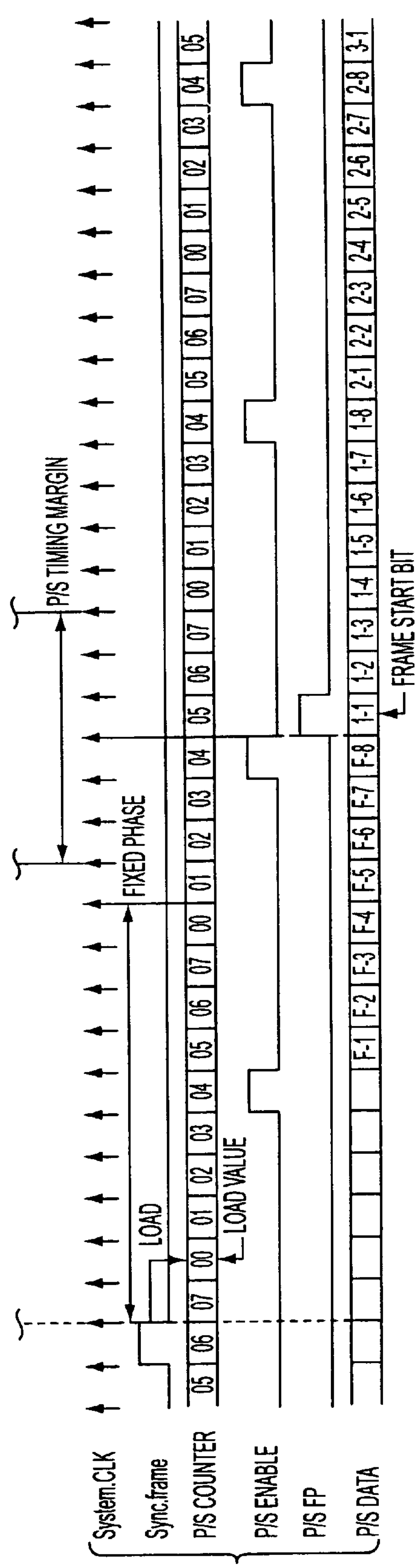
Figure 47:
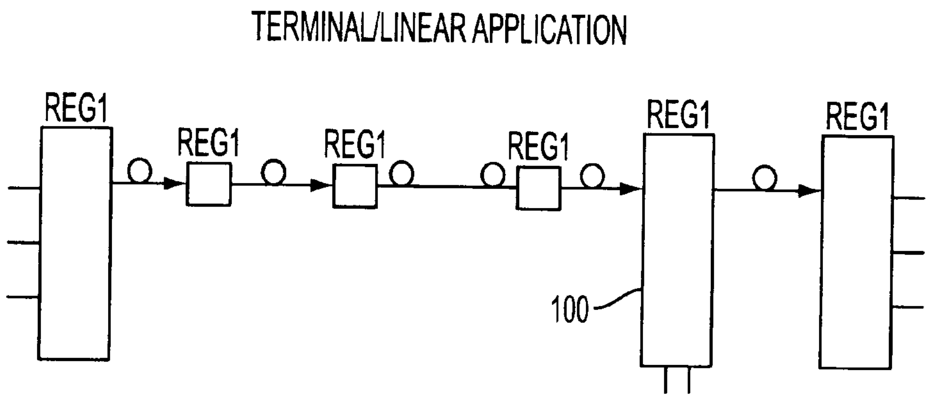
FIG. 47 is a block diagram showing an existing network application (terminal 1 linear)
Figure 48:
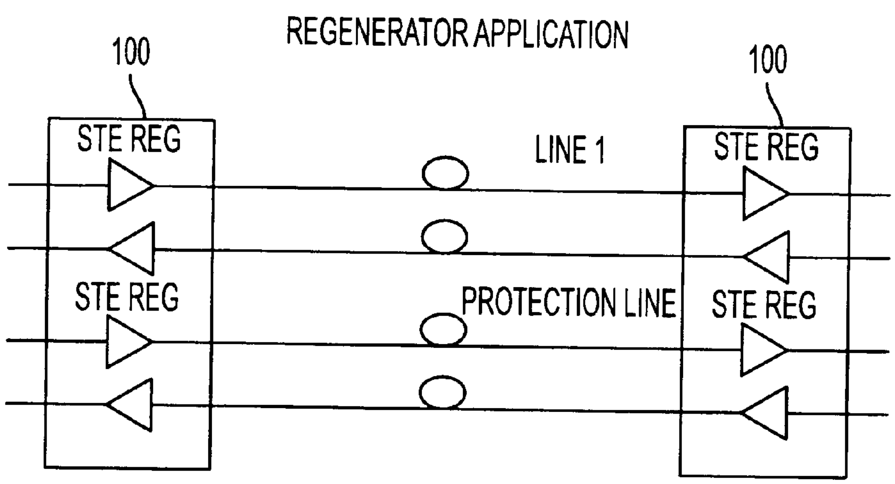
FIG. 48 is a block diagram showing another existing network application (regenerator)
Figure 49:
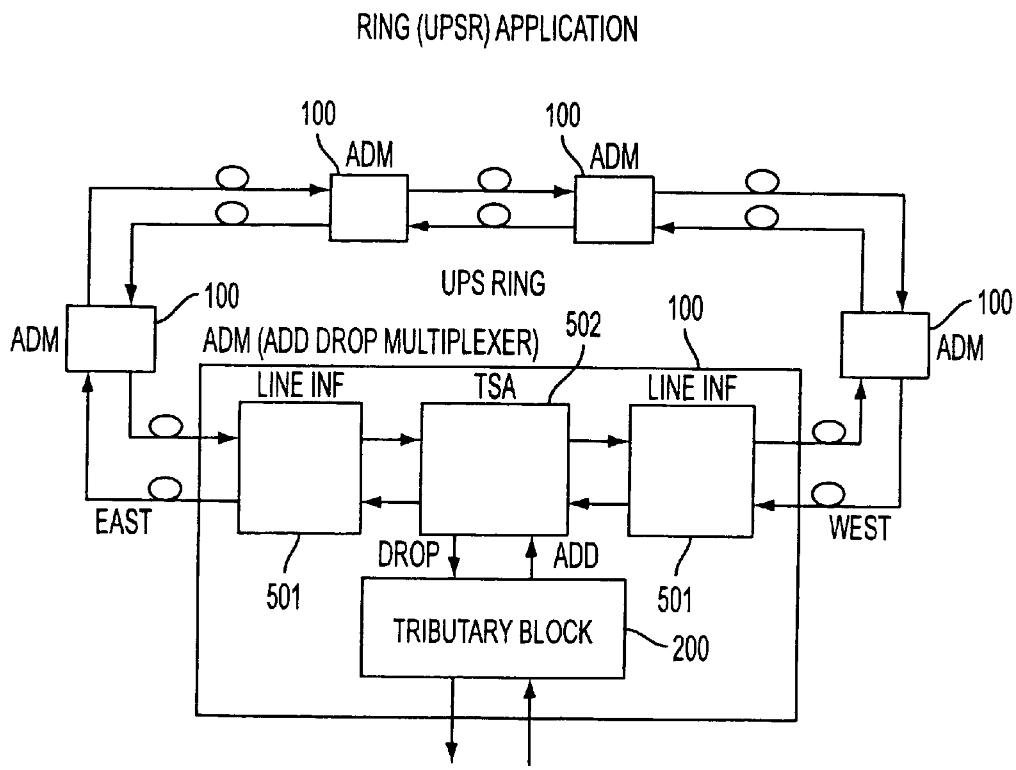
FIG. 49 is a block diagram showing a further existing network application (ring)
Figure 50:
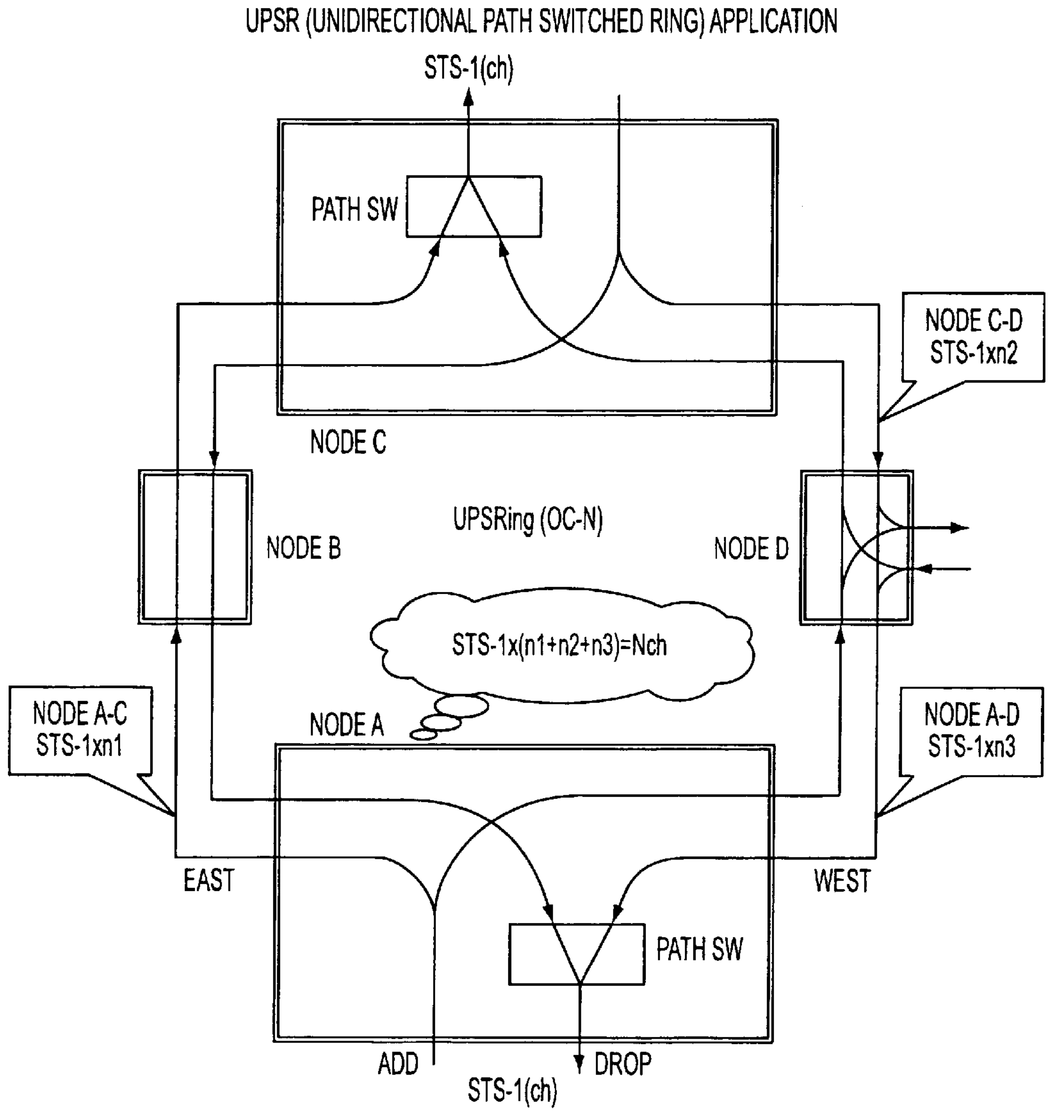
FIG. 50 is a block showing a construction of the UPSR of FIG. 49 and illustrating operation of a UPSR.
Figure 51:
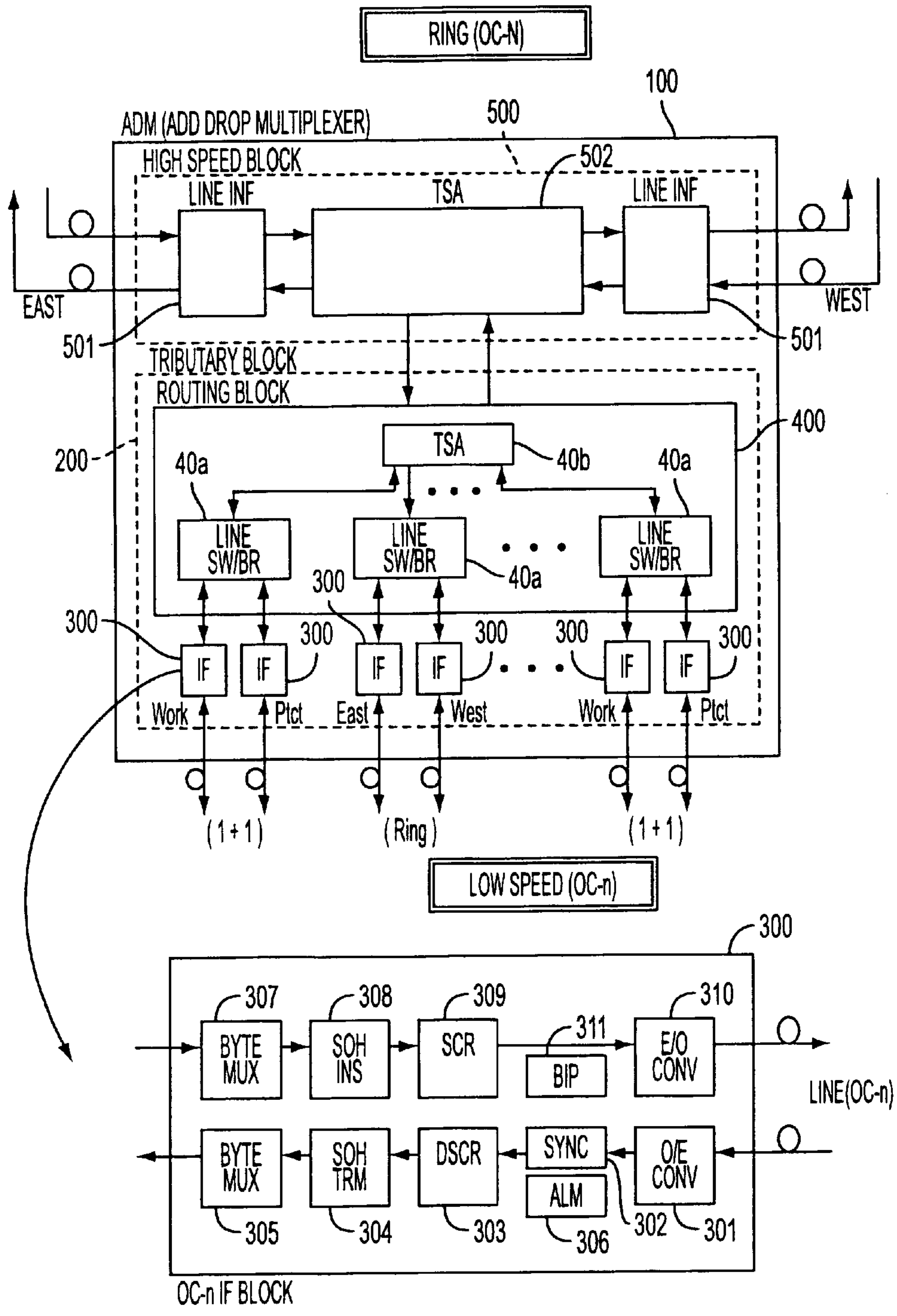
FIG. 51 is a block diagram showing an example of a construction of an ADM used in the UPSR shown in FIG. 50.
Figure 52:
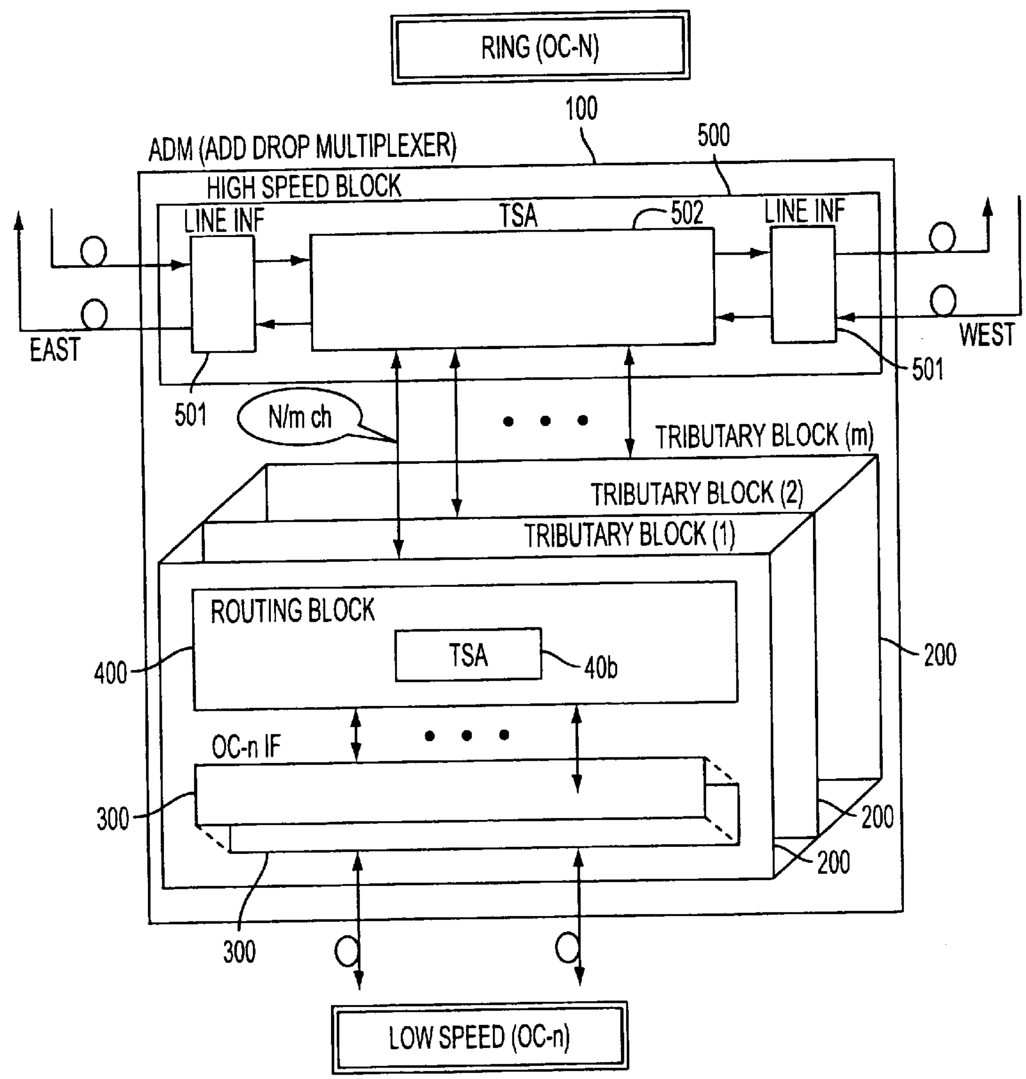
FIG. 52 is a block diagram showing an example of an accommodation structure for a high speed block and a routing block of the ADM shown in FIG. 51.
Figure 53:
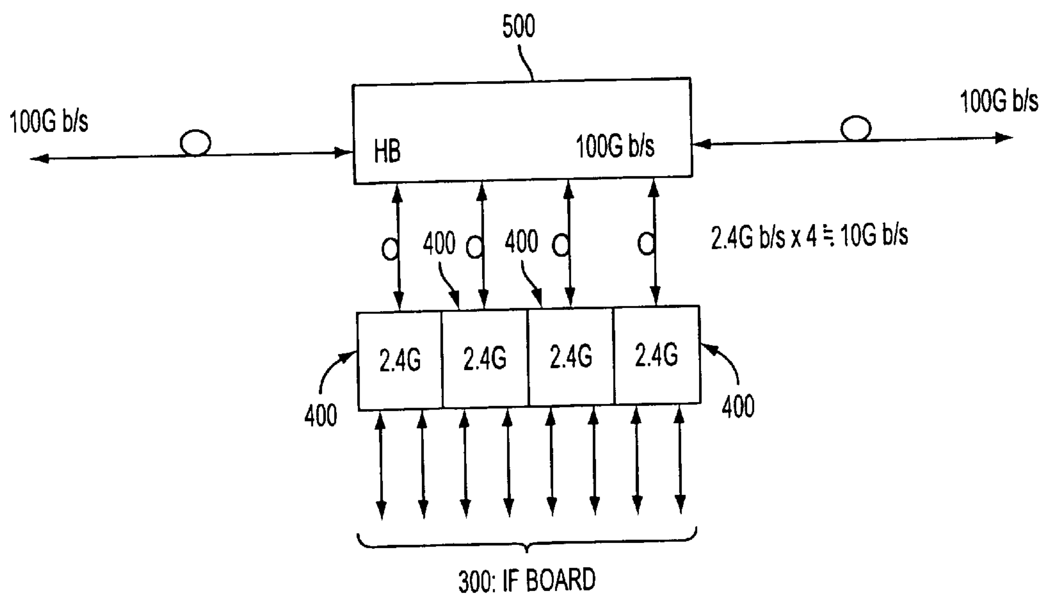
FIG. 53 is a block diagram showing a detailed example of the accommodation structure for the high speed block and the routing block of the ADM shown in FIG. 51.
Figure 54:
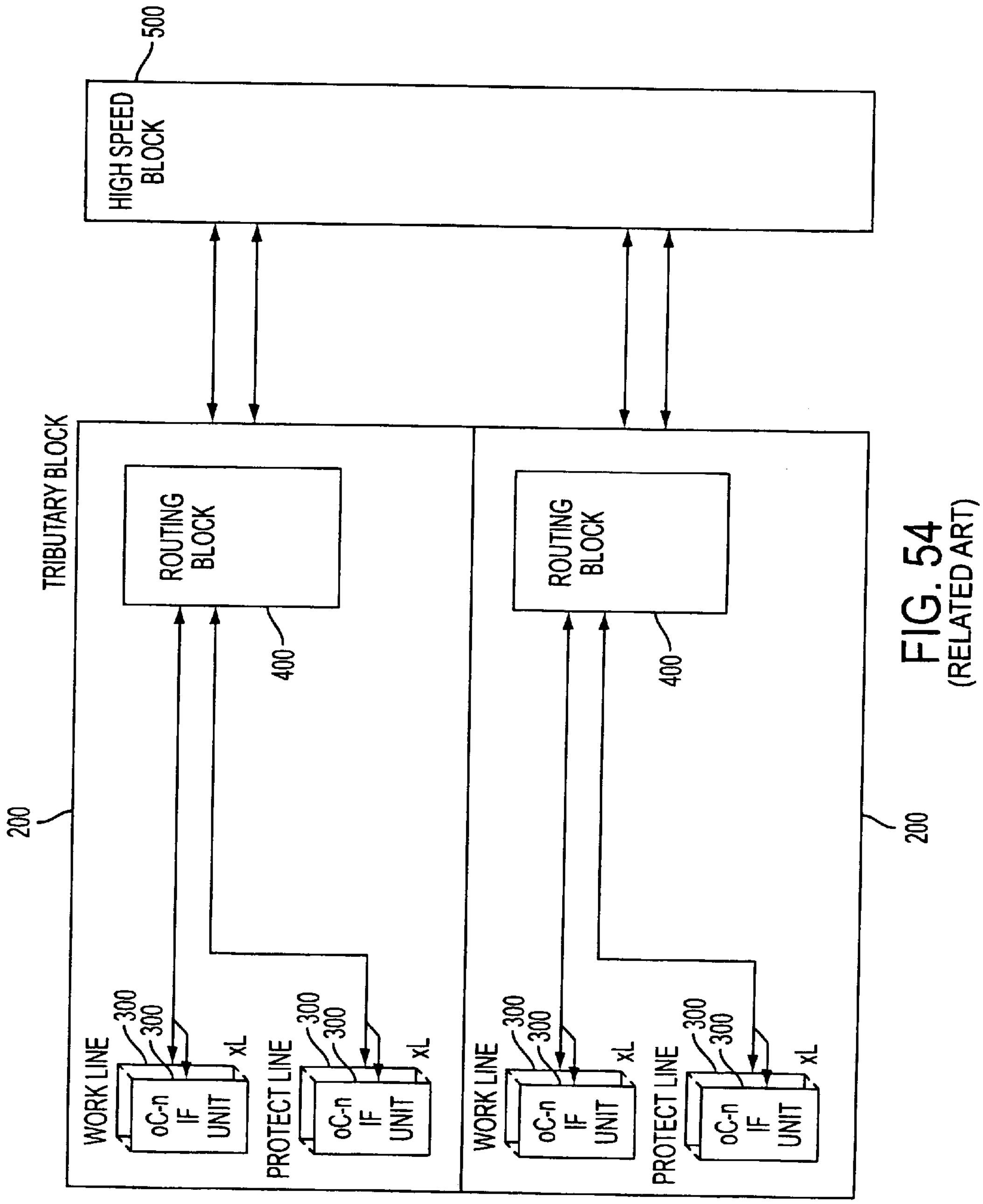
FIG. 54 is a block diagram illustrating a subject to be solved regarding the accommodation structure shown in FIG. 51.

Meanwhile, the 1/8 counter 234 is loaded with the load value "0" in response to an SFP (Sync.frame) produced by the FP control section 30 and starts its counting operation as seen from (D) of FIG. 46. Consequently, the 1/8 counter 234 thereafter produces an enable signal (P/S enable) periodically. Then, the 8:1 PS conversion sections 2331 strike the FPs decompressed to the 8-bit width as described above with the enable signal produced by the 1/8 counter 234 so that the FPs may remain within the PS timing width mentioned hereinabove to produce PS-converted FPs (P/S FPs), and collectively PS covert the data signals in response to the FPs.

As a result, any dispersion in frame leading position of the signals inputted from the IF boards 5W-1 and 5W-2 (5P-1 and 5P-2) [5W-5 and 5W-6 (5P-6 and 5P-6)] is absorbed as seen from (C) of FIG. 38. It is to be noted that, if, in the SP/PS conversion processing described above, the load value of the 1/8 counter 234 described above is set to "2", then since the enable signal (P/S enable) moves leftwardly in (D) of FIG. 46, the PS conversion timing (reading timing) can be advanced when compared with that in (C) of FIG. 38.

In short, since the enable timing of the PS processing can be varied arbitrarily by varying the setting of the load value of the 1/8 counter 234 arbitrarily, the reading timing of the ES section 23A can be adjusted arbitrarily as described hereinabove, and an increase in setting steps by complicated setting prescriptions in the stage of development can be prevented.

By the way, in this instance, in the FP selection section 24, the AND circuits 241 to 246 are controlled in accordance with FP control settings illustrated in Table 2 to Table 9 below based on a result of detection of clock interruption by the clock interruption detection sections 211, setting of work/protection selections of the CH1 to CH4 and setting of the S-RING1 (UPSR) to perform passing through and masking (inhibition) processing of the FPs outputted from the ES section 23A. Then, the selected (passed through) FPs are logically ORed by the OR circuits 247 and 248 to obtain timings at which time division 1+1 switching is to be performed.

The 1/16 counters 251 and 252 operate with reference to the FPs outputted from the OR circuits 247 and 248, respectively, and the multiplexing sections 253 and 254 perform multiplexing processing of the input signals in accordance with the count values of the 1/16 counters 251 and 252 to realize a time division 1+1 switching function [including a UPSR (RING) function] when the IF boards 5W-j (5P-j) are mounted.

TABLE 2

FP control of AND circuit 241 in S-RING1 setting = 1 + 1 mode in FIG. 36

| Item | Clock from IF board ⑤ | Interruption of all clocks from IF boards ⑤ to ⑧ (*) | CH1: Selection of work/ protection systems | CH2: Selection of work/ protection systems | FP control of AND circuit 241 |
|---|---|---|---|---|---|
| 1 | Normal | NO | Work system | Work system | Through |
| 2 | Normal | NO | Work system | Protection system | Through |
| 3 | Normal | NO | Protection system | Work system | Through |
| 4 | Normal | NO | Protection system | Protection system | INH |
| 5 | Clock interrupted | — | — | — | INH |

*When all clocks from IF boards selected by time division 1 + 1 switching processing are interrupted

TABLE 3

FP control of AND circuit 241 in S-RING1 setting = ring mode in FIG. 36

| Item | Clock from IF board ⑤ | Interruption of all clocks from IF boards ⑤, ⑦ (*) | CH1: Selection of work/ protection systems | CH2: Selection of work/ protection systems | FP control of AND circuit 241 |
|---|---|---|---|---|---|
| 1 | Normal | — | — | — | Through |
| 2 | Clock interrupted | — | — | — | INH |

TABLE 4

FP control of AND circuit 243 in S-RING1 setting = 1 + 1 mode in FIG. 36

| Item | Clock from IF board ⑥ | Interruption of all clocks from IF boards ⑤ to ⑧ | CH1: Selection of work/ protection systems | CH2: Selection of work/ protection systems | FP control of AND circuit 243 |
|---|---|---|---|---|---|
| 1 | — | — | — | — | INH |

TABLE 5

FP control of AND circuit 243 in S-RING1 setting = ring mode in FIG. 36

| Item | Clock from IF board ⑥ | Interruption of all clocks from IF boards ⑥, ⑧ (*) | CH1: Selection of work/ protection systems | CH2: Selection of work/ protection systems | FP control of AND circuit 243 |
|---|---|---|---|---|---|
| 1 | Normal | — | — | — | Through |
| 2 | Clock interrupted | — | — | — | INH |

TABLE 6

FP control of AND circuit 244 in S-RING1 setting = 1 + 1 mode in FIG. 36

| Item | Clock from IF board ⑦ | Interruption of all clocks from IF boards ⑤ to ⑧ (*) | CH3: Selection of work/ protection systems | CH4: Selection of work/ protection systems | FP control of AND circuit 244 |
|---|---|---|---|---|---|
| 1 | Normal | NO | Work system | Work system | Through |
| 2 | Normal | NO | Work system system | Protection | Through |
| 3 | Normal | NO | Protection | Work system system | Through |
| 4 | Normal | NO | Protection | Protection system | INH system |
| 5 | Clock interrupted | — | — | — | INH |

*When all clocks from IF boards selected by time division 1 + 1 switching processing are interrupted

TABLE 7

FP control of AND circuit 244 in S-RING1 setting = ring mode in FIG. 36

| Item | Clock from IF board ⑦ | Interruption of all clocks from IF boards ⑤, ⑦ (*) | CH3: Selection of work/ protection systems | CH4: Selection of work/ protection systems | FP control of AND circuit 244 |
|---|---|---|---|---|---|
| 1 | Normal | — | — | — | Through |
| 2 | Clock interrupted | — | — | — | INH |

TABLE 8

FP control of 246 in S-RING1 setting = 1 + 1 mode in FIG. 36

| Item | Clock from IF board ⑧ | Interruption of all clocks from IF boards ⑤ to ⑧ | CH3: Selection of work/ protection systems | CH4: Selection of work/ protection systems | FP control of AND circuit 246 |
|---|---|---|---|---|---|
| 1 | — | — | — | — | INH |

TABLE 9

FP control of 246 in S-RING1 setting = ring mode in FIG. 36

| Item | Clock from IF board ⑧ | Interruption of all clocks from IF boards ⑥, ⑧ (*) | CH3: Selection of work/ protection systems | CH4: Selection of work/ protection systems | FP control of AND circuit 246 |
|---|---|---|---|---|---|
| 1 | Normal | — | — | — | Through |
| 2 | Clock interrupted | — | — | — | INH |

In particular, when, in the 1+1 mode, one of signals from the IF board 5W-1 (5W-5) which corresponds to one of the work systems of the CH1 and the CH2 is selected by the switching processing section 23E as indicated by the items 1 to 3 of Table 2 above, the FP (EAST-FP) from the IF board 5W-1 (5W-5) is used for a time division 1+1 switching processing timing (passed through), but when none of the CH1 and the CH2 is selected as indicated by the item 4, the FP (EAST-FP) inputted from the IF board 5W-1 (5W-5) is not used for time division 1+1 switching (but is inhibited).

However, if clock interruption is detected from the clock inputted from the IF board 5W-1 (5W-5) to the RBs 4-i as indicated by the item 5 of Table 2 above, then an AIS is generated at the SFP timing from the FP control section 30 by the corresponding AIS generation section 212 as described above, and if clock interruption does not occur at least one of the IF board 5W-1 (5P-1) and 5W-2 (5P-2), then time division 1+1 switching processing is performed in accordance with the FP timing inputted from the IF board 5W-1 (5P-1) or 5W-2 (5P-2). Consequently, the FP (EAST-FP) from the IF board 5W-1 (5P-1) or 5W-2 (5P-2) with which clock interruption occurs is not selected (also Table 6 indicates similar contents).

However, if clock interruption is detected from all of the IF boards 5W-1 (5P-1) and 5W-2 (5P-2) [5W-5 (5P-5) and 5W-6 (5P-6)], then the SFP from the FP control section 30 is selected in response to an all interruption signal outputted from the FP selection section 24 by the FP selection section 249 of the switching processing section 23E (also Table 6 indicates similar processing contents).

Such EP control as illustrated in the time chart of FIG. 33 is realized by controlling the AND circuits 241, 242, 244 and 245 and the FP selection section 249 in such a manner as described above by means of the FP selection section 24.

It is to be noted that, in the 1+1 mode, since the W1 (WEST side output) is not used, the WEST side FP (WEFT-FP) is masked by the AND circuits 243 and 246 of the switching processing section 23E so that the WEST side FP (WEST-FP) is not outputted as seen from Table 4 and Table 8.

On the other hand, in the UPSR (ring) mode, the multiplexing section 253 of the switching processing section 23E does not multiplex signals from the IF boards 5P-1 and 5P-2 (5P-5 and 5P-5), but multiplexes signals only from the IF boards 5W-1 and 5W-2 (5W-5 and 5W-6). Therefore, the WEST side FP (WEST-FP) is masked by the AND circuits 242 and 245 similarly as in the control illustrated in Table 4 or Table 8.

Further, as seen from Table 3 and Table 7, the AND circuits 241 and 243 are controlled such that, when the clocks are normal, the FPs (EAST-FP and WEFT-FP) on the EAST/WEST sides are passed through, but when any of the clocks is interrupted, the FPs (EAST-FP and WEST-FP) are masked. It is to be noted that both of the clocks from the IF boards 5W-1 and 5W-2 (5W-5 and 5W-6) are interrupted, the SFP from the FP control section 30 is selected by the FP selection section 249 similarly as in the 1+1 mode.

Also FP control by the AND circuits 243 and 246 of the switching processing section 23E is performed by performing similar processing (Table 5 or Table 9) to control the 1/16 counter 252 and the multiplexing section 254 for the WEST to realize outputting of the FP (WEST-FP) of the W1 (WEST side) in the ring mode.

It is to be noted that similar control to that described above is performed also by the switching processing section 23F which processes signals from the IF boards 5W-3 and 5W-4 (5P-3 and 5P-4) [5W-7 and 5W-8 (5P-7 and 5P-8)].

Figures 39A, 39B:
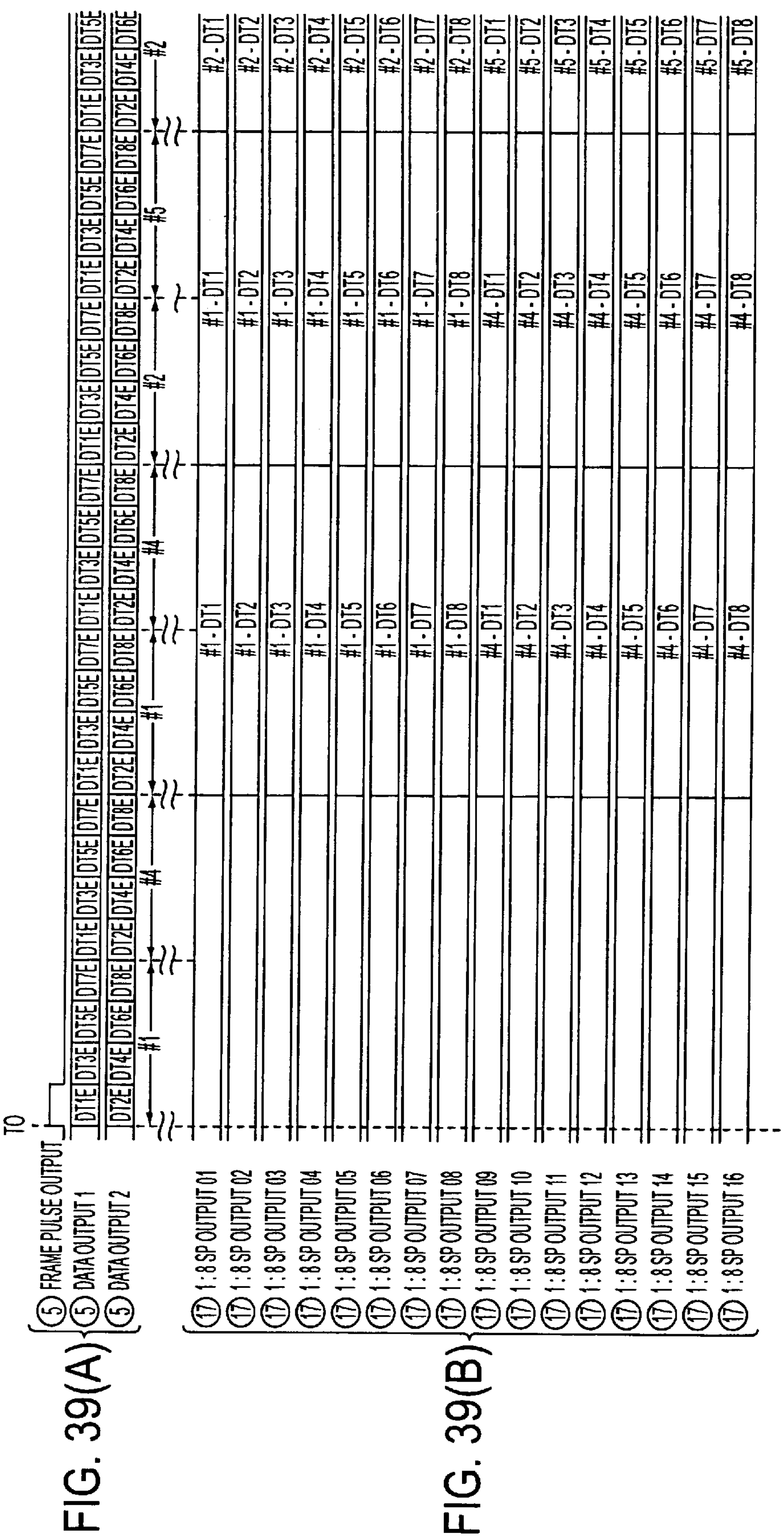
Figure 40:
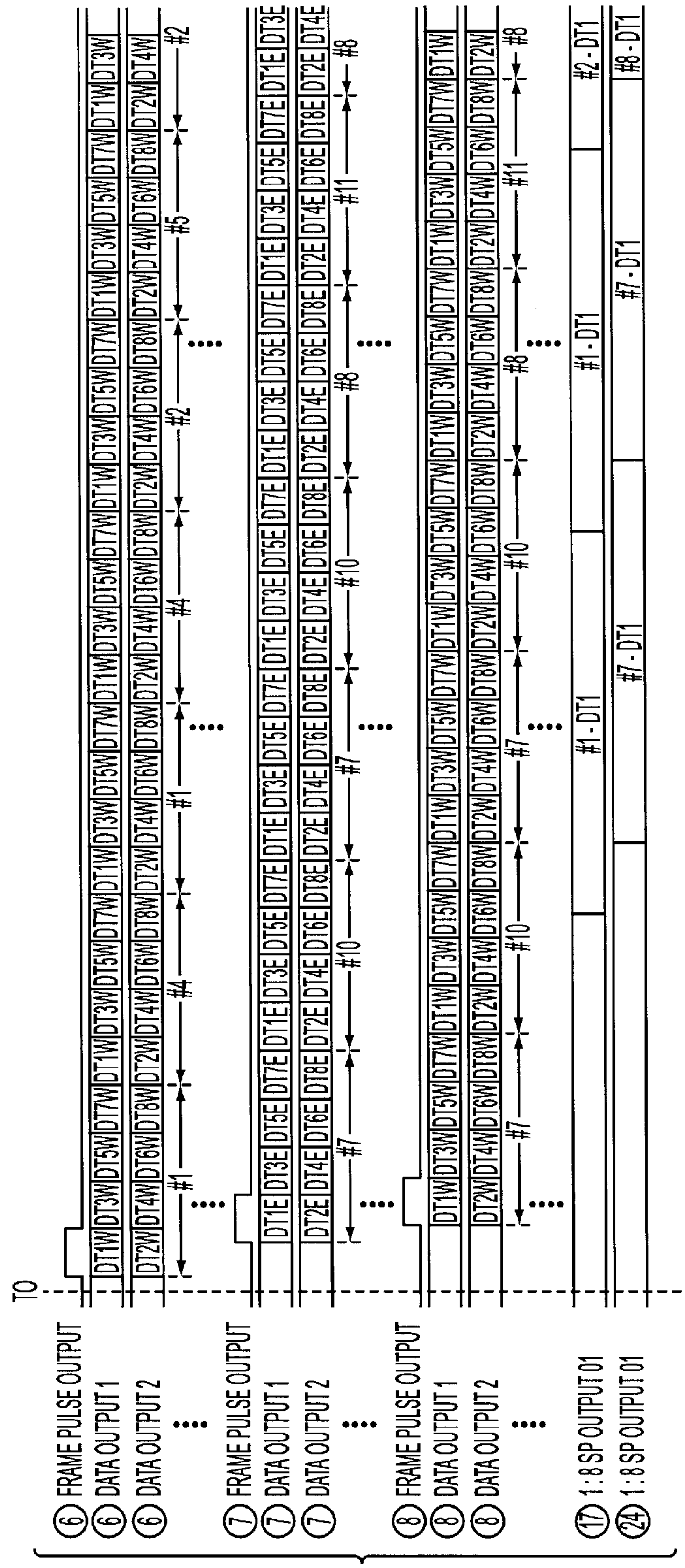
Figures 41A, 41B, 41C:
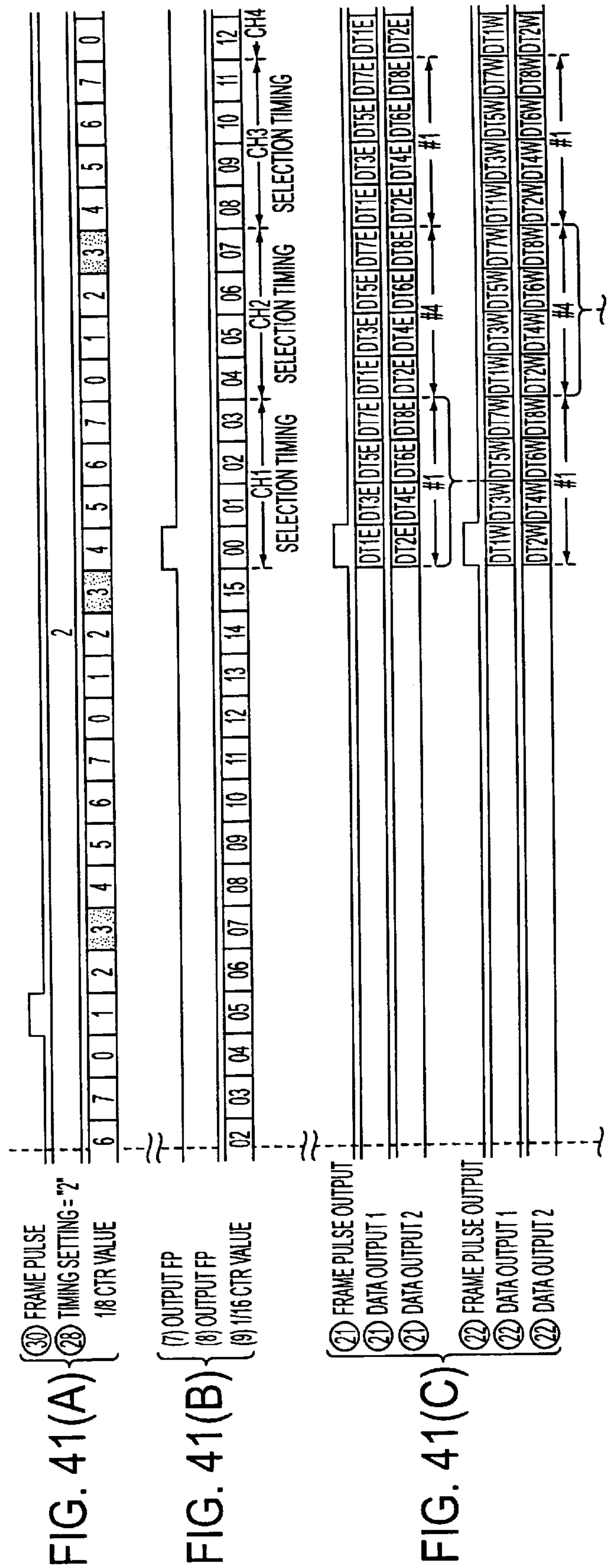
FIGS. 41 and 42 are time charts illustrating operation of the ES section and the time division 1+1 switching section of the ADM of FIG. 2 in the ring mode.
Figures 41D, 41E, 41F, 41G:
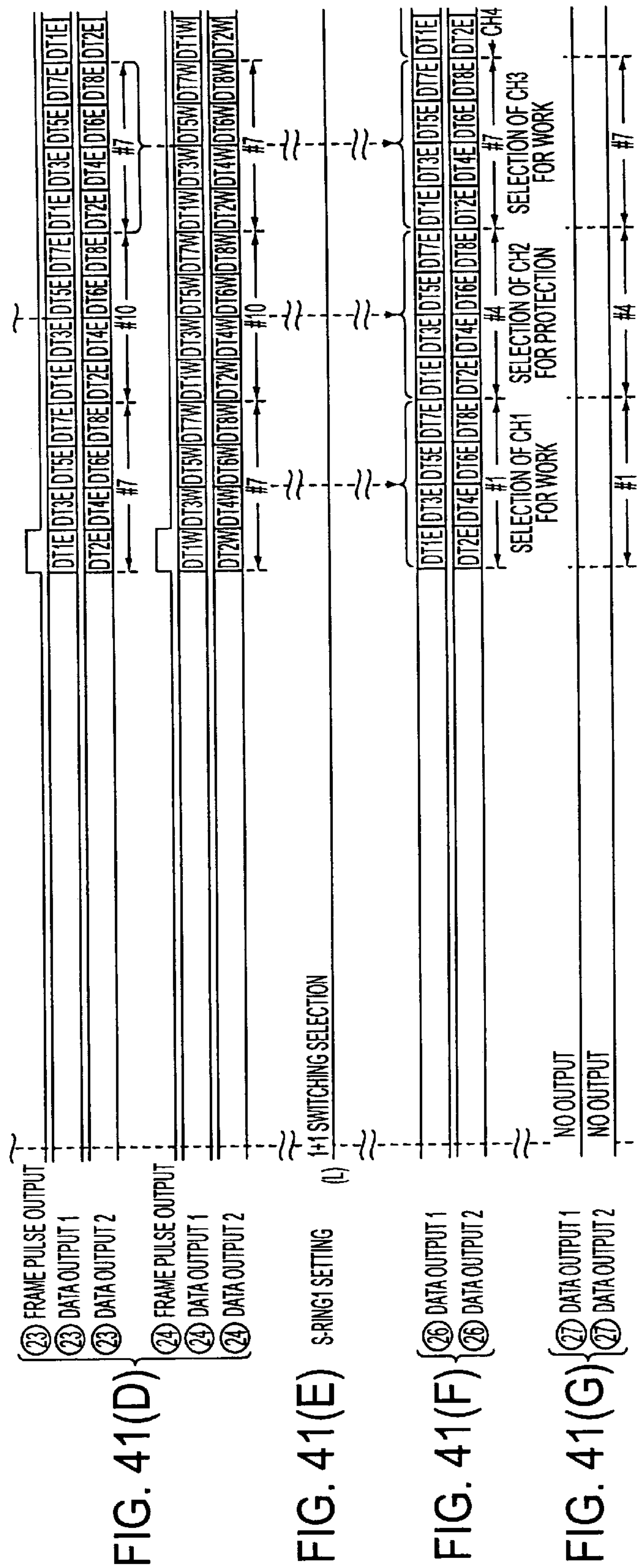

Detailed operation of the construction described hereinabove with reference to FIG. 36 in the 1+1 mode is such as illustrated in FIGS. 39 to 41. It is to be noted that the time axes of FIGS. 39 to 41 coincide with one another at time T0.

First, signals (two parallel signals) from the IF boards 5W-1 (5W-5), 5P-1 (5P-5), 5W-2 (5W-6) and 5P-2 (5P-6) [or the IF boards 5W-3 (5W-7), 5P-3 (5P-7), 5W-4 (5W-8) and 5P-4 (5P-8)] are 1:8 SP converted to form 2×8=16 parallel signals as seen from (A) and (B) of FIG. 39 and FIG. 40 by the 1:8 SP conversion sections 2311 of the corresponding SP conversion processing sections 23*a*-1, 23*b*-1, 23*a*-2 and 23*b*-2 (or 23*a*-3, 23*b*-3, 23*a*-4 and 23*b*-4) of the ES section 23A.

Then, the 16 parallel signals are 8:1 PS converted to form original two parallel signals as seen from (C) and (D) of FIG. 41 by the 8:1 PS conversion sections 2331 of the corresponding PS conversion processing sections 23*c*-1, 23*d*-1, 23*c*-2 and 23*d*-2 (or 23*c*-3, 23*d*-3, 23*c*-4 and 23*d*-4), respectively.

In this instance, the 8:1 PS conversion sections 2331 PS convert the signals in accordance with the count value of the 1/8 counter 234, which is loaded with a preset load value [in (A) of FIG. 41, "2"] in response to an FP produced by the FP control section 30 and performs a counting operation, so that they output signals whose frame leading positions (FP) are aligned to one another to the time division 1+1 switching section 23B.

In the time division 1+1 switching section 23B, the FPs outputted from the 8:1 PS conversion sections 2331 are inputted to the 1/16 counter 251 for the EAST through the AND circuits 241 and 244 and the OR circuit 247. Then, in response to the FPs, the 1/16 counter 251 is loaded with the load value "00" to produce a channel selection timing for time division 1+1 switching.

Then, the multiplexing section 253 for the EAST selects the signals individually PS converted by the 8:1 PS conversion sections 2331 in such a manner as described above in a time dividing relationship in units of 600 Mb/s in accordance with the count value (channel selection timing) outputted from the 1/16 counter 251, thereby to multiplex the signals as seen from (F) of FIG. 41. The thus multiplexed signal is outputted to the EAST side [E1 (E3)]. It is to be noted that (F) of FIG. 41 represents that the CH1 and the CH3 are selected as the work systems while the CH2 and the CH4 are selected as the protection systems.

Further, in this instance (in the 1+1 mode), since the ring mode setting signal is fixed to the L level as seen from (E) of FIG. 41, the outputs of the AND circuits 243 and 246 are masked by the FP selection section 24, and the output of the OR circuit 248 is fixed to the L level as seen from (B) of FIG.

41. Accordingly, the 1/16 counter 252 for the WEST does not operate, and the multiplexing section 254 for the WEST does not operate either [no multiplexed signal is outputted to the WEST side (W1 and W3) as seen from (G) of FIG. 41].

Figures 42A, 42B, 42C:
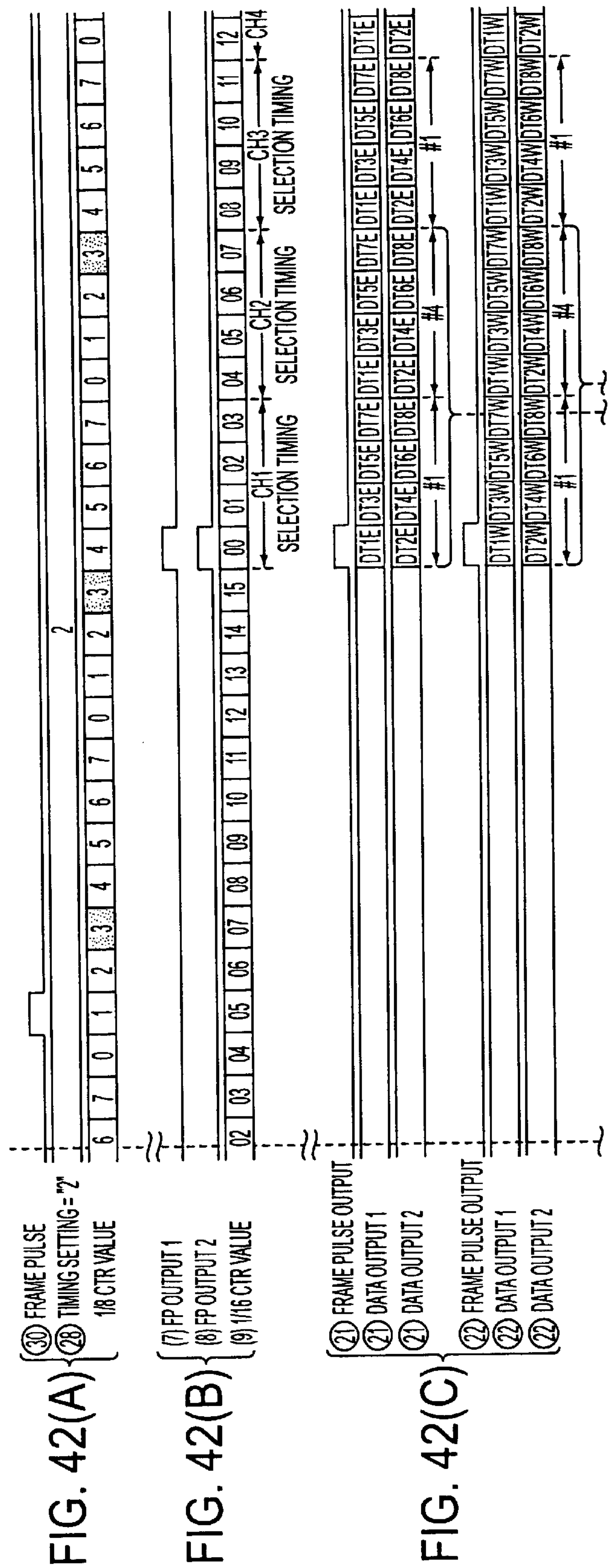
Figures 42D, 42E, 42F, 42G:
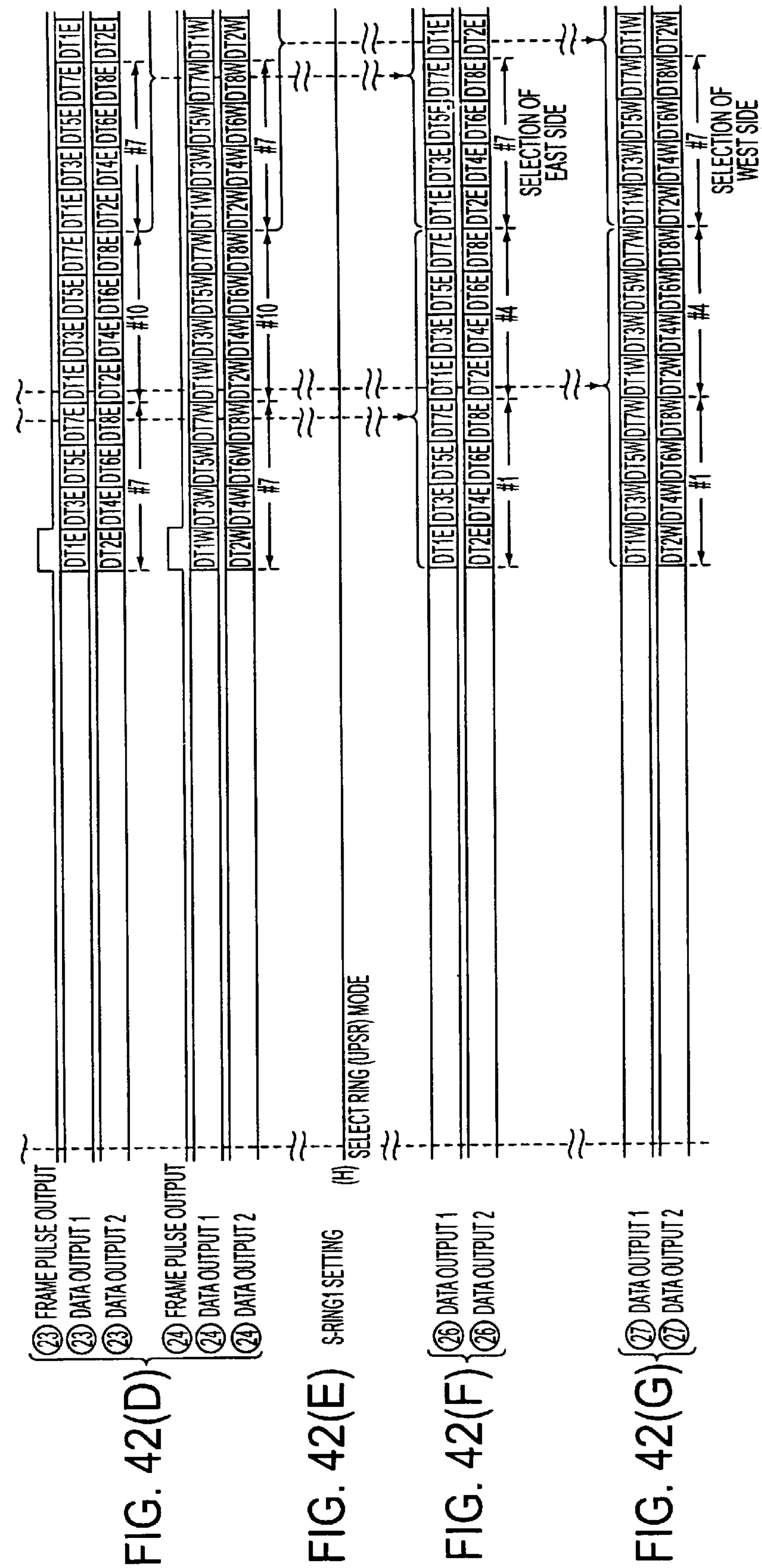

On the other hand, detailed operation in the ring mode is such as illustrated in (A) and (B) of FIG. 39, FIG. 40 and (A) to (G) of FIG. 42. It is to be noted that also the time axis of FIG. 42 coincides with the time axis of FIG. 39 at time T0.

In particular, also in this instance, signals (two parallel signals) from the IF boards 5W-1 (5W-5), 5P-1 (5P-5), 5W-2 (5W-6) and 5P-2 (5P-6) [or the IF boards 5W-3 (5W-7), 5P-3 (5P-7), 5W-4 (5W-8) and 5P-4 (5P-8) ] a 1:8 SP converted to form 2×8=16 parallel signals as seen from (A) and (B) of FIG. 39 and FIG. 40 by the 1:8 SP conversion sections 2311 of the corresponding SP conversion processing sections **23*a*-1, 23*b*-1, 23*a*-2 and 23*b*-2 (or 23*a*-3, 23*b*-3, 23*a*-4 and 23*b*-4) of the ES section 23**A.

Then, the 16 parallel signals are 8:1 PS converted to form original two parallel signals as seen from (C) and (D) of FIG. 42 by the 8:1 PS conversion sections 2331 of the corresponding PS conversion processing sections **23*c*-1, 23*d*-1, 23*c*-2 and 23*d*-2 (or 23*c*-3, 23*d*-3, 23*c*-4 and 23*d*-4**), respectively.

In this instance, the 8:1 PS conversion sections 2331 PS convert the signals in accordance with the count value of the 1/8 counter 234, which is loaded with a preset load value [in (A) of FIG. 42, "2"] in response to an FP produced by the FP control section 30 and performs a counting operation, so that they output signals whose frame leading positions (FP) are aligned to one another to the time division 1+1 switching section 23B.

In the time division 1+1 switching section 23B, since the ring mode setting signal has the H level as seen from (E) of FIG. 42, the outputs of the AND circuits 241 and 243 are controlled to pass through the FP selection section 24. Consequently, the FPs are outputted to the FP selection sections 249 and 250 for the EAST/WEST through the OR circuits 247 and 248, respectively, as seen from (B) of FIG. 42.

Then, the FP selection sections 249 and 250 are loaded with the load value "00", as seen from (B) of FIG. 42 to produce channel selection timings for time division 1+1 switching. Consequently, the multiplexing sections 253 and 254 for the EAST/WEST operate in accordance with channel selection timings inputted from the FP selection sections 249 and 250, respectively.

As a result, the multiplexing section 253 for the EAST selects the signals (EAST line signals) from the IF boards 5W-1 (5W-5) and 5W-2 (5W-6) [or the IF boards 5W-3 (5W-7) and 5W-4 (5W-8)] in a time dividing relationship to multiplex them as seen from (F) of FIG. 42, and outputs the multiplexed signal. Meanwhile, the multiplexing section 254 for the WEST selects the signals (WEST line signals) from the IF boards 5P-1 (5P-5) and 5P-2 (5P-6) [or the IF boards 5P-3 (5P-7) and 5P-4 (5P-8)] in a time dividing relationship to multiplex them as seen from (G) of FIG. 42, and outputs the multiplexed signal.

In short, the multiplexing section 253 for the EAST functions, in the 1+1 mode, as a 4:1 selector whose selection object is input signals for totaling four ports including 2 ports for each of the EAST and the WEST, but functions, in the ring mode, as a 2:1 selector whose selection object is input signals for 2 ports of the work (=EAST) lines. Meanwhile, the multiplexing section 253 for the WEST functions, in the ring mode, as a 2:1 selector whose selection object is signals for 2 ports of the protection (=WEST) lines.

In this manner, since the time division 1+1 switching processing section 23 (time division 1+1 switching section 23B) in the present embodiment includes the multiplexing sections 253 and 254 for the EAST/WEST such that, in the 1+1 mode, the OC-3 signals of the work systems or the protection systems are selected in a time dividing relationship, but in the ring mode, the OC-3 signals for the transmission directions (EAST/WEST) of the ring can be selected individually in a time dividing relationship, also the universality (compatibility) of the present ADM 1 with the form of a tributary network can be assured sufficiently.

B2.4. Detailed Description of the FP Selection Section 232

By the way, while the RBs 4-i in the present embodiment have such a flexible unit construction that folded back frame positions from the IF boards 5W-j (5P-j) are not defined by using FPs folded back by and inputted from the IF boards 5W-j (5P-j) for timing control of time division 1+1 switching processing by the ES section 23A after dispersions among the FPs (skews between slots) are absorbed by the ES section 23A similarly to data signals, where the folded back FPs from the IF boards 5W-j (5P-j) are used for timing control of time division 1+1 switching control in this manner, the following problem may occur depending upon a construction of the IF boards 5W-j (5P-j).

Figure 43:
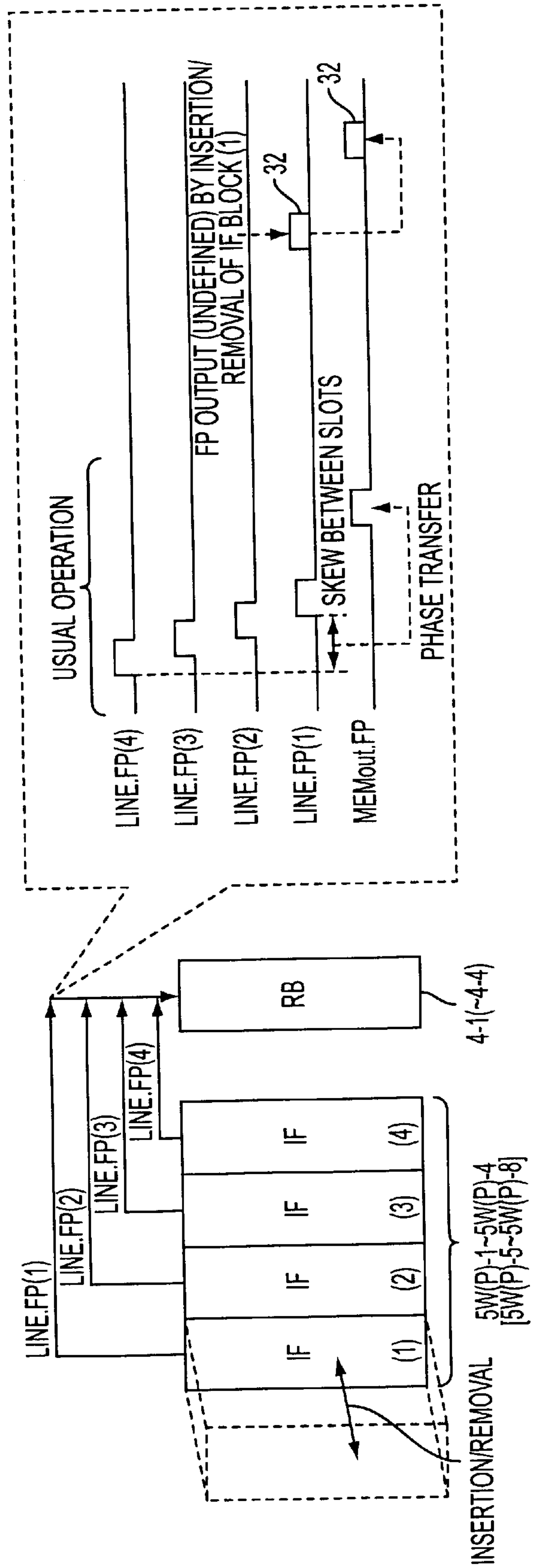
FIG. 43 is a diagrammatic view illustrating occurrence of an undefined FP when an IF board is inserted or removed.

In particular, for example where the IF boards 5W-j (5P-j) have such a construction that, using a self-running counter which performs a self-running operation in response to an FP from a corresponding RB4-i, a data signal, a clock and an FP are folded back and outputted, if an IF board 5W-j (5P-j) [for example, the IF board SW-1 (5P-1) (IF Block (1)) is mounted or dismounted, then an FP is sometimes received within a period within which no FP should originally be received as seen from reference numeral 32 in FIG. 43.

This FP (undefined FP) should be prevented from being used for timing control of time division 1+1 switching processing by the time division 1+1 switching section 23B. However, since the embodiment described above is constructed such that a received FP is only logically ORed by the OR circuits 247 and 248 (refer to FIG. 36), also the undefined FP is naturally used for timing control of time division 1+1 switching processing, and in this instance, the time division 1+1 switching cannot be performed normally.

Therefore, in the present embodiment, where it has a construction wherein the IF boards 5W-j (5P-j) employ a self-running counter, an FP selection section 232 for selecting not a folded back FP from each of the IF boards 5W-j (5P-j) but an output (master FP) of a 1/N counter 33 which operates in synchronism with a count value from a master counter 36 (which operates in synchronism with the system clock) is interposed between each of the 1:8 SP conversion sections 2311 and a corresponding 8:1 PS conversion section 2331.

Figure 44:
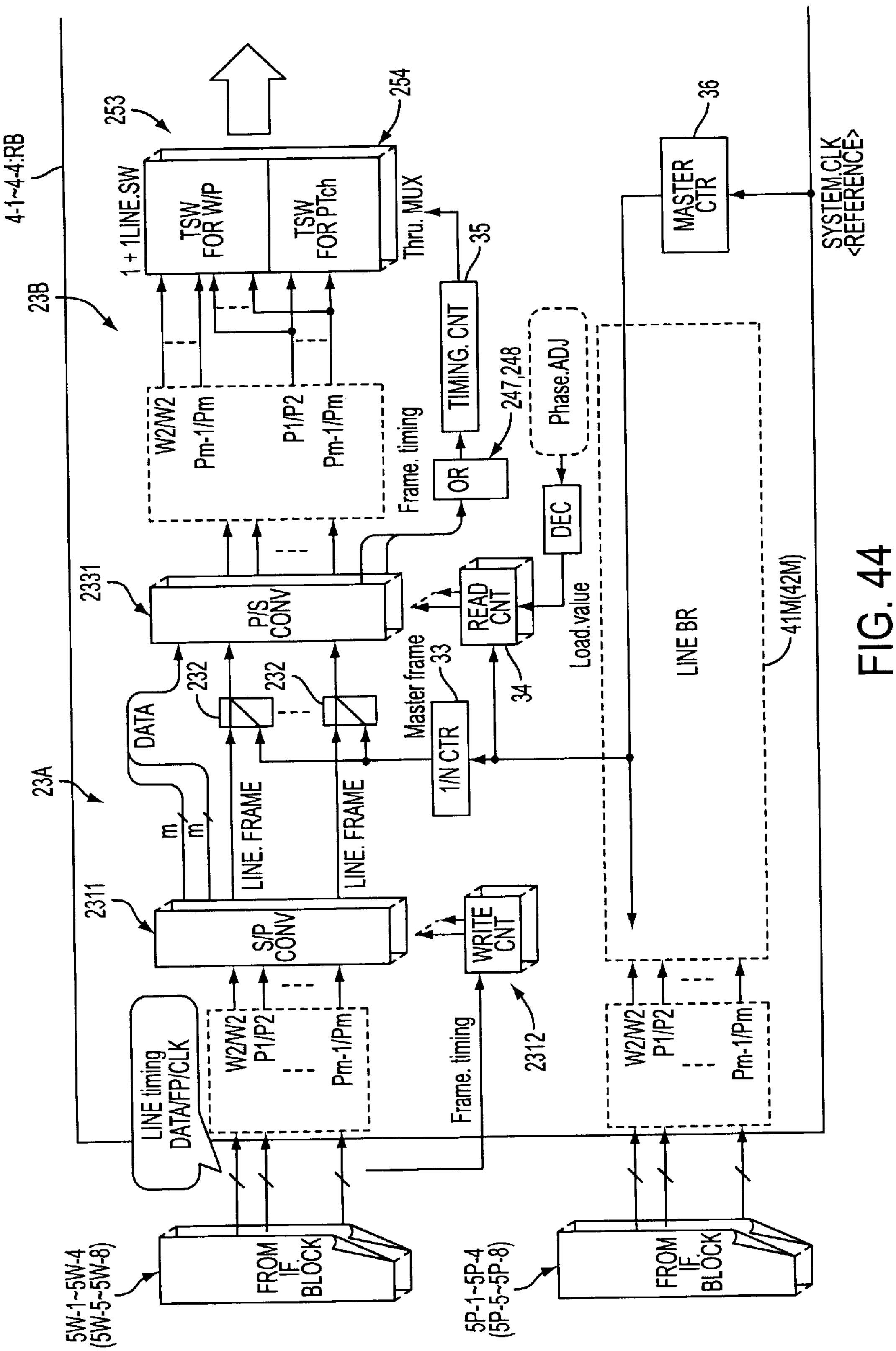
FIGS. 44 is a block diagram illustrating a function for preventing an influence of an undefined FP in the ES section of the ADM of FIG. 2.

It is to be noted that those elements in FIG. 44 which are denoted by like reference symbols to those described hereinabove are similar to those described hereinabove. It is to be noted that, in FIG. 44, reference numeral 34 denotes a reading control section which corresponds to the 1/8 counter 234 shown in FIG. 36, and 35 a timing control section for time division 1+1 switching processing which corresponds to the 1/16 counters 251 and 252 shown in FIG. 36.

In the following, operation of the ES section 23A in regard to the FP selection section 232 is described with reference to a flow chart shown in FIG. 45. It is to be noted that, also in FIG. 45, skews (dispersions) of 1 bit occur with data signals (DATA)/FPs/clocks inputted from the IF boards 5W-j (5P-j) (IF Block (1) to IF Block (3)), and the memory depth used for the 1:8 SP conversion sections 2311 and the 8:1 PS conversion sections 2331 has an 8-bit width.

Figures 45A, 45B, 45C:
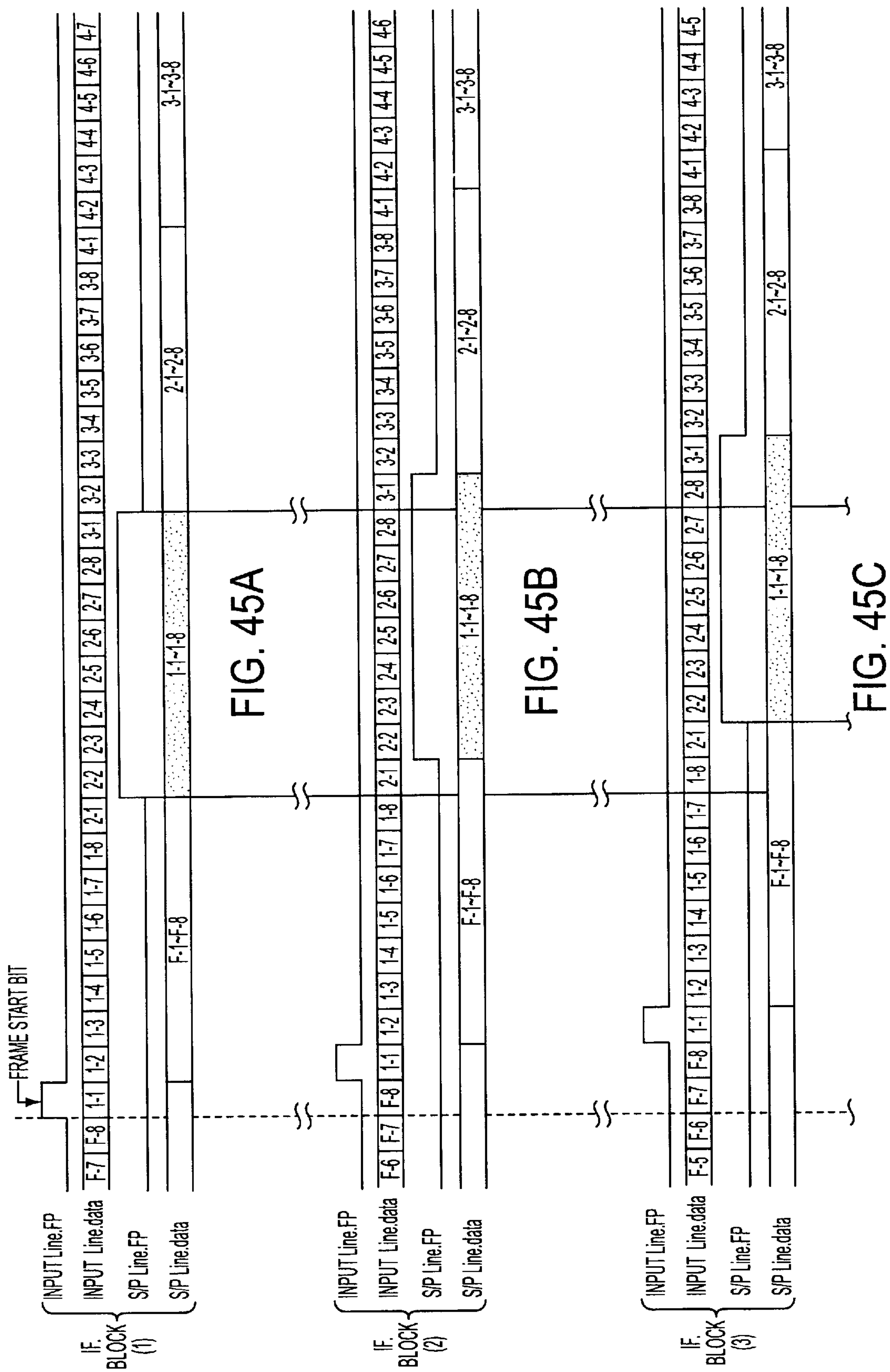
FIGS. 45 and 46 are time charts illustrating detailed operation of PS conversion processing by the ES section of the ADM of FIG. 2.
Figure 45D:
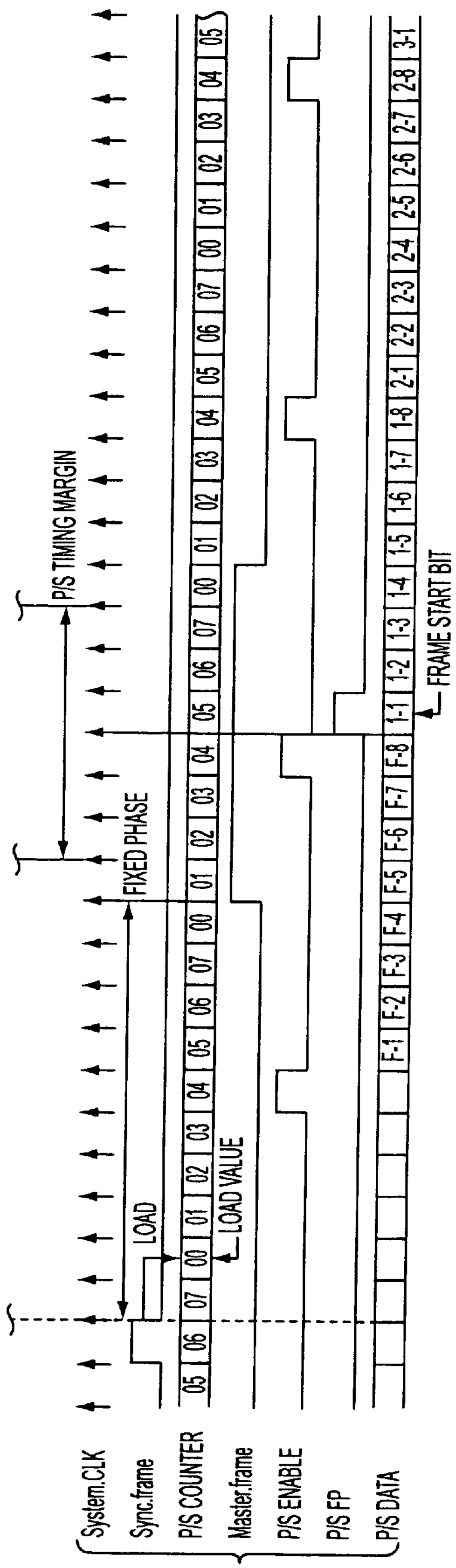

First, where the IF boards 5W-j (5P-j) have a construction wherein a self-running counter is used, the FP selection section 232 is set so that the master FP described above [which is denoted by "Master.frame" in (D) of FIG. 45] is selected fixedly. As a result, the master FP is inputted periodically to the 8:1 PS conversion sections 2331 in place of the FPs from the IF boards 5W-j (5P-j) indicated by (A) to (D) of FIG. 45.

Meanwhile, at this time, the reading control section 34 (⅛ counter 234) is loaded also in this instance with the load value "0" and starts its counting operation in response to an SFP (Sync.frame) produced by the FP control section 30 as seen from (D) of FIG. 45, and produces an enable signal (P/S enable: reading timing) periodically. Then, the PS conversion sections 2331 strike the master FP with the enable signal to produce an FP (P/S FP) with a fixed phase as seen from (D) of FIG. 45, and SP convert the data signals collectively in response to the FP.

In short, the reading control section 34 can control the reading timing described above with a fixed timing based on an intra-unit frame outputting timing to each of the IF boards 5W-j (5P-j). Consequently, even if such an undefined FP as described above is inputted, the undefined FP is ignored, and consequently, a bad influence of the undefined FP upon time division 1+1 switching processing can be prevented and the reliability of time division 1+1 switching processing of the time division 1+1 switching section 23B can be augmented significantly.

It is to be noted that the reason why the FP selection sections 232 are interposed between the 1:8 SP conversion sections 2311 and the 8:1 PS conversion sections 2331 (are provided on the output side of the 1:8 SP conversion sections 2311) as described above is that the function by which the PS timing can be varied arbitrarily (the folded back frame position is not defined) by varying the load value of the reading control section 34 (⅛ counter 234) described hereinabove is kept valid.

For example, even if switching (selection from) between FPs from the IF boards 5W-j (5P-j) and the master FP is performed on the output side of the 8:1 PS conversion sections 2331, an influence of an undefined FP can still be prevented similarly as described above. In this instance, however, even if the load value described above is varied to vary the PS timing, since the master FP is selected fixedly on the output side of the 8:1 PS conversion sections 2331, the variation resultantly becomes invalid.

Therefore, in the present embodiment, the FP selection sections 232 are provided on the output side of the 1:8 SP conversion sections 2311 in such a manner as described above so that, while the variation function of varying the load value (PS timing) is rendered valid, also an influence of an undefined FP can be prevented.

C. Others

It is to be noted that, while the.IF boards 5W-j (5P-j) in the embodiment described above have a "2ch/Sheet configuration" wherein each of them can process low speed line signals for 2 channels, this is because, in the current situation of the LSI technology at present, it is difficult from the point of view of the unit scale to make it possible to process signals for a greater number of channels (for example, four channels) with a single IF board, and the "2ch/Sheet configuration" is the upper limit at present.

However, if the progress of the LSI technology allows implementation of an IF board of, for example, a "4ch/Sheet configuration", then since signals of a capacity of OC-n/4×4 OC-n are obtained, the necessity to perform speed conversion using dummy signals as in the embodiment described above is eliminated.

On the other hand, where the IF boards 5W-j (5P-j) are formed with a "1ch/Sheet configuration", then since a low speed line signal for only one channel is inputted from each of the IF boards 5W-j (5P-j) to an RB 4-i, there is no necessity to perform such time division 1+1 switching processing as described above, and usual 1+1 switching processing (similar to that where processing is performed in units of an OC-n) may be performed.

Further, while, in the embodiment described above, an example wherein OC-12c signals are principally handled as OC-n signals is described, similar effects to those described above can be achieved also where OC-n signals of any other signal capacity than this are handled.

The present invention is not limited to the embodiment specifically described above, and variations and modifications can be made without departing from the scope of the present invention.

What is claimed is:

1. An SDH transmission unit, comprising:

a high speed block for accommodating high speed line signals of a source network based on an SDH transmission system; and a tributary block for accommodating low speed line signals of a tributary network based on an SDH transmission system and having a transmission capacity lower than that of the high speed line signals and interfacing with said high speed block;

said tributary block including a plurality of routing blocks each of which accommodates low speed line signals for a predetermined capacity and performing line selection processing for low speed line signals to be interfaced with said high speed block in accordance with a form of said tributary network;

at least one of said routing blocks serving, when the low speed line signals accommodated therein do not fully occupy the predetermined capacity, as a master block which accommodates at least one of the other routing blocks as a slave block in order to accommodate the low speed line signals accommodated in the other routing block, wherein each of said master block and said slave block includes a masking processing section for performing masking processing for signal lines which are not used between said master block and said slave block by the line selection processing in accordance with the form of said tributary network.

2. An SDH transmission unit as claimed in claim 1, wherein the slave block includes a first folding back section for causing the low speed line signals accommodated therein to be folded back and accommodated in an idle capacity portion of the master block.

3. An SDH transmission unit as claimed in claim 1, wherein said master block includes a second folding back section for causing the low speed line signals accommodated therein to be folded back and accommodated in an idle capacity portion of another master block.

4. An SDH transmission unit as claimed in claim 1, wherein each of said master block and said slave block includes interface sections for a plurality of slots each of which accommodates low speed line signals for a plurality of channels, and a time division line selection processing section for performing time division line selection processing for the low speed line signals from said interface sections in accordance with the form of said tributary network.

5. An SDH transmission unit comprising:

a high speed block for accommodating high speed line signals of a source network based on an SDH transmission system; and a tributary block for accommodating low speed line signals of a tributary network based on an SDH transmission system and having a transmission capacity lower than that of the high speed line signals and interfacing with said high speed block;

said tributary block including a plurality of routing blocks each of which accommodates low speed line signals for a predetermined capacity and performing line selection processing for low speed line signals to be interfaced with said high speed block in accordance with a form of said tributary network;

at least one of said routing blocks serving, when the low speed line signals accommodated therein do not fully occupy the predetermined capacity, as a master block which accommodates at least one of the other routing blocks as a slave block in order to accommodate the low speed line signals accommodated in the other routing block;

wherein each of said master block and said slave block includes interface sections for a plurality of slots each of which accommodates low speed line signals for a plurality of channels, and a time division line selection processing section for performing time division line selection processing for the low speed line signals from said interface sections in accordance with the form of said tributary network, wherein said time division line selection processing section includes:

a memory section for storing low speed line signals from said interface sections; and a reading control section for controlling read timing of the low speed line signals from said memory section with the read timing synchronized with intra-unit frame outputting timings to said interface sections to read out the low speed line signals with frame leading positions thereof aligned to one another;

time division line selection processing being performed for the low speed line signals in a condition wherein the frame leading positions are aligned to one another by said reading control section.

6. An SDH transmission unit as claimed in claim 5, wherein said reading control section is constructed to allow arbitrary variation of the read timing.

7. An SDH transmission unit as claimed in claim 5, wherein said reading control section is constructed so as to be capable of controlling the read timing with a fixed timing based on an intra-unit frame outputting timing to each of said interface sections.

8. An SDH transmission unit as claimed in claim 5, wherein each of said master block and said slave blocks includes a plurality of trouble detection sections each for detecting a trouble of one of said interface sections, and a plurality of alarm signal generation sections each for generating an alarm signal as a low speed line signal when trouble is detected by the corresponding trouble detection section, and said time division line selection processing section is constructed such that, when trouble is detected by all of said trouble detection sections, said time division line selection processing section performs time division sending out processing of the alarm signal in accordance with an intra-unit frame timing, but when trouble is detected by a part of said trouble detection sections, said time division line selection processing section performs time division sending out processing of the alarm signal in accordance with a frame timing of the low speed line signal from interface sections from which no trouble is detected.

9. An SDH transmission unit comprising:

a high speed block for accommodating high speed line signals of a source network based on an SDH transmission system; and a tributary block for accommodating low speed line signals of a tributary network based on an SDH transmission system and having a transmission capacity lower than that of the high speed line signals and interfacing with said high speed block;

said tributary block including a plurality of routing blocks each of which accommodates low speed line signals for a predetermined capacity and performing line selection processing for low speed line signals to be interfaced with said high speed block in accordance with a form of said tributary network;

at least one of said routing blocks serving, when the low speed line signals accommodated therein do not fully occupy the predetermined capacity, as a master block which accommodates at least one of the other routing blocks as a slave block in order to accommodate the low speed line signals accommodated in the other routing block, wherein each of said master block and said slave block includes interface sections for a plurality of slots each of which accommodates low speed line signals for a plurality of channels, and a time division line selection processing section for performing time division line selection processing for the low speed line signals from said interface sections in accordance with the form of said tributary network, wherein said time division line selection processing section is constructed such that, where the configuration of said tributary network is a redundancy configuration which includes a work system and a protective system, said time division line selection processing section selects one of the low speed line signals of the work systems and the protective system, but where the configuration of the tributary network is a ring configuration, said time division line selection processing section selects the low speed line signals in different transmission directions in the ring configuration individually.

10. An SDH transmission unit comprising:

a high speed block for accommodating high speed line signals of a source network based on an SDH transmission system; and a tributary block for accommodating low speed line signals of a tributary network based on an SDH transmission system and having a transmission capacity lower than that of the high speed line signals and interfacing with said high speed block;

said tributary block including a plurality of routing blocks each of which accommodates low speed line signals for a predetermined capacity and performing line selection processing for low speed line signals to be interfaced with said high speed block in accordance with a form of said tributary network;

at least one of said routing blocks serving, when the low speed line signals accommodated therein do not fully occupy the predetermined capacity, as a master block which accommodates at least one of the other routing blocks as a slave block in order to accommodate the low speed line signals accommodated in the other routing block, wherein each of said master block and said slave block includes interface sections for a plurality of slots each of which accommodates low speed line signals for a plurality of channels, and a time division line selection processing section for performing time division line selection processing for the low speed line signals from said interface sections in accordance with the form of said tributary network, wherein said interface section is constructed so as to add a dummy signal to the low speed line signals to convert the transmission rate of the low speed line signals to a basic transmission capacity when the low speed line signals for the predetermined capacity are accommodated, and said time division line selection processing section performs the line selection processing at a basic processing rate equal to that when the low speed line signals for the basic transmission capacity are accommodated.

* * * * *